(12) United States Patent
Tsukuba

(10) Patent No.: US 11,109,046 B2
(45) Date of Patent: Aug. 31, 2021

(54) IMAGE PROCESSING APPARATUS AND IMAGE PROCESSING METHOD

(71) Applicant: SONY CORPORATION, Tokyo (JP)

(72) Inventor: Takeshi Tsukuba, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/968,332

(22) PCT Filed: Jan. 31, 2019

(86) PCT No.: PCT/JP2019/003275
§ 371 (c)(1),
(2) Date: Aug. 7, 2020

(87) PCT Pub. No.: WO2019/159696
PCT Pub. Date: Aug. 22, 2019

(65) Prior Publication Data
US 2021/0099721 A1 Apr. 1, 2021

(30) Foreign Application Priority Data
Feb. 14, 2018 (JP) .............................. JP2018-024410

(51) Int. Cl.
H04N 19/00 (2014.01)
H04N 19/196 (2014.01)
(Continued)

(52) U.S. Cl.
CPC ......... *H04N 19/196* (2014.11); *H04N 19/126* (2014.11); *H04N 19/184* (2014.11); *H04N 19/61* (2014.11)

(58) Field of Classification Search
CPC .................................................. H04N 19/00
See application file for complete search history.

(56) References Cited

U.S. PATENT DOCUMENTS

2003/0206582 A1* 11/2003 Srinivasan .............. G06T 9/007
375/240.01
2006/0222254 A1* 10/2006 Zandi ..................... H04N 19/15
382/240
(Continued)

FOREIGN PATENT DOCUMENTS

JP  2013-534795 A  9/2013
JP  2014-131172 A  7/2014
(Continued)

OTHER PUBLICATIONS

ITU-T, High efficiency video coding, Series H: Audiovisual and Multimedia Systems Infrastructure of audiovisual services—Coding of moving video, Dec. 2016, pp. i-646.
(Continued)

*Primary Examiner* — Maryam A Nasri
(74) *Attorney, Agent, or Firm* — Paratus Law Group, PLLC

(57) ABSTRACT

There is provided an image processing apparatus and an image processing method by which a reduction in encoding efficiency can be suppressed. A prediction residual of an image is orthogonally transformed, the number of significant figures of coefficient data obtained by performance of orthogonal transform on the prediction residual is controlled on the basis of a bit depth indicating a range of pixel values of a local level that is a data unit smaller than a sequence level of the image; the coefficient data is quantized, and the number of significant figures of a quantized coefficient obtained by quantization of the coefficient data is controlled on the basis of the bit depth of the local level; and the quantized coefficient is encoded, and a bit stream is generated. The present disclosure is applicable to, for example, an image processing apparatus, an image encoding apparatus, or an image decoding apparatus.

20 Claims, 53 Drawing Sheets

(51) Int. Cl.
*H04N 19/126* (2014.01)
*H04N 19/184* (2014.01)
*H04N 19/61* (2014.01)

(56) References Cited

U.S. PATENT DOCUMENTS

| | | | |
|---|---|---|---|
| 2009/0087111 A1* | 4/2009 | Noda | H04N 19/176 |
| | | | 382/238 |
| 2012/0014455 A1* | 1/2012 | Joshi | H04N 19/196 |
| | | | 375/240.18 |
| 2012/0307889 A1 | 12/2012 | Kerofsky et al. | |
| 2013/0077884 A1* | 3/2013 | Ikai | H04N 19/86 |
| | | | 382/233 |
| 2019/0208203 A1* | 7/2019 | Tsukuba | H04N 19/147 |
| 2020/0404257 A1* | 12/2020 | Filippov | H04N 19/184 |

FOREIGN PATENT DOCUMENTS

| | | |
|---|---|---|
| JP | 2014-523699 A | 9/2014 |
| WO | WO 2007/114368 A1 | 10/2007 |

OTHER PUBLICATIONS

ITU-T, High efficiency video coding, Series H: Audiovisual and Multimedia Systems Infrastructure of audiovisual services—Coding of moving video, Apr. 2013, pp. 63, 64, and 140-145.

\* cited by examiner

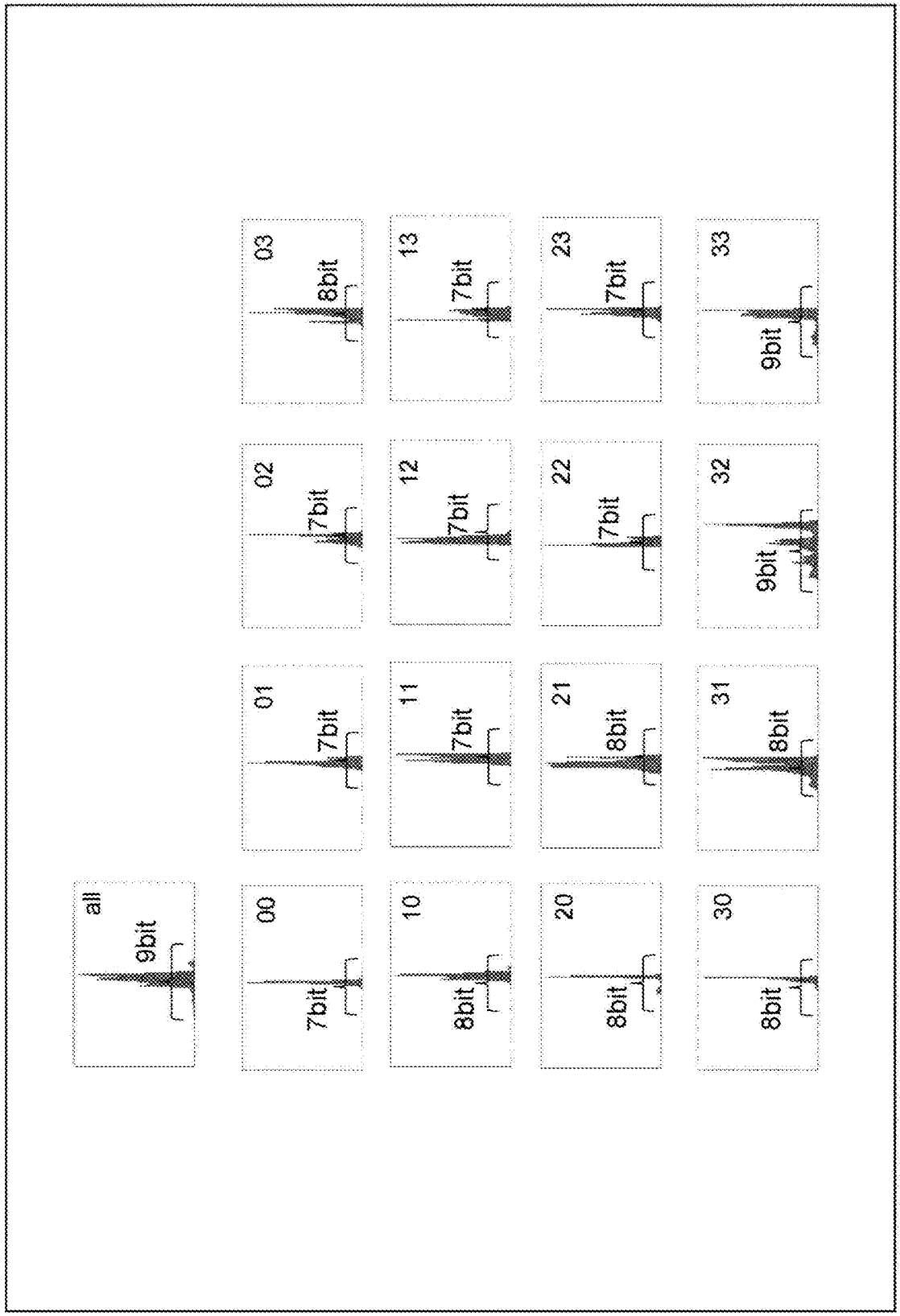

FIG. 9

| METHOD | METHOD OF DERIVING EXTENSION BIT PRECISION dBD | | PROCESSING (EXPANSION/NORMALIZATION) FOR EXPANDING NUMBER OF SIGNIFICANT FIGURES OF TRANSFORM COEFFICIENT | EFFECT |
|---|---|---|---|---|
| | DECODING/ENCODING DIFFERENCE PARAMETER deltaX OF dBD | PREDICTED IMAGE BASIS (DECODED IMAGE BASIS) | INTEGRATED WITH INVERSE QUANTIZATION AND INVERSE ORTHOGONAL TRANSFORM (ORTHOGONAL TRANSFORM AND QUANTIZATION) | |
| #1 | ○ | | ○ | ·COMPUTING PRECISION OF INVERSE QUANTIZATION/INVERSE TRANSFORM (ORTHOGONAL TRANSFORM/QUANTIZATION) IMPROVES (ENCODING EFFICIENCY IMPROVES) ·PROCESSING FOR EXPANDING NUMBER OF SIGNIFICANT FIGURES OF TRANSFORM COEFFICIENT (EXPANSION/NORMALIZATION) AND INVERSE QUANTIZATION/INVERSE ORTHOGONAL TRANSFORM CAN BE PERFORMED COLLECTIVELY (GROWTH IN CIRCUIT SCALE IS SUPPRESSED) ·EXTENSION BIT PRECISION dBD CAN BE CONTROLLED BY SYNTAX (ENCODER SIDE HAS DEGREE OF FREEDOM) |
| #2 | | ○ | ○ | ·COMPUTING PRECISION OF INVERSE QUANTIZATION/INVERSE TRANSFORM (ORTHOGONAL TRANSFORM/QUANTIZATION) IMPROVES (ENCODING EFFICIENCY IMPROVES) ·PROCESSING FOR EXPANDING NUMBER OF SIGNIFICANT FIGURES OF TRANSFORM COEFFICIENT (EXPANSION/NORMALIZATION) AND INVERSE QUANTIZATION/INVERSE ORTHOGONAL TRANSFORM CAN BE PERFORMED COLLECTIVELY (GROWTH IN CIRCUIT SCALE IS SUPPRESSED) ·EXTENSION BIT PRECISION dBD CAN BE DERIVED ON THE BASIS OF PREDICTED IMAGE (DECODED IMAGE) (OVERHEAD RELATED TO EXTENSION BIT PRECISION dBD CAN BE REDUCED) |

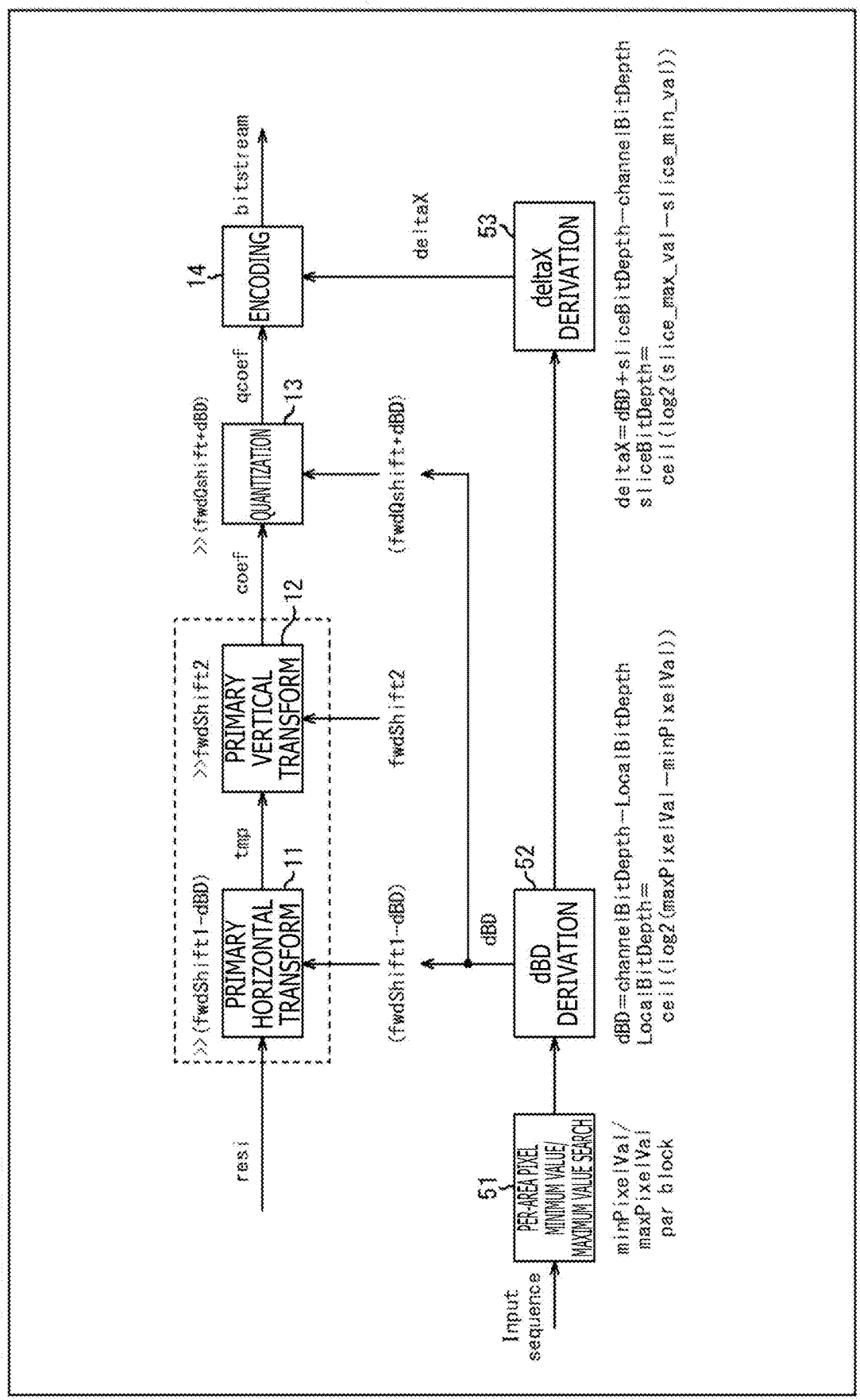

FIG. 31

| adaptive_scaling_param ( ) { | Descriptor |
|---|---|
| if (adaptive_scaling_enabled_flag) { | |
| deltaY | ae(v) |
| deltaCb | ae(v) |
| deltaCr | ae(v) |
| } | |
| } | |

A

| adaptive_scaling_param ( ) { | Descriptor |
|---|---|
| if (adaptive_scaling_enabled_flag) { | |
| if (cbfY) | |
| deltaY | ae(v) |
| if (cbfCb) | |
| deltaCb | ae(v) |
| if (cbfCr) | |
| deltaCr | ae(v) |
| } | |
| } | |

B

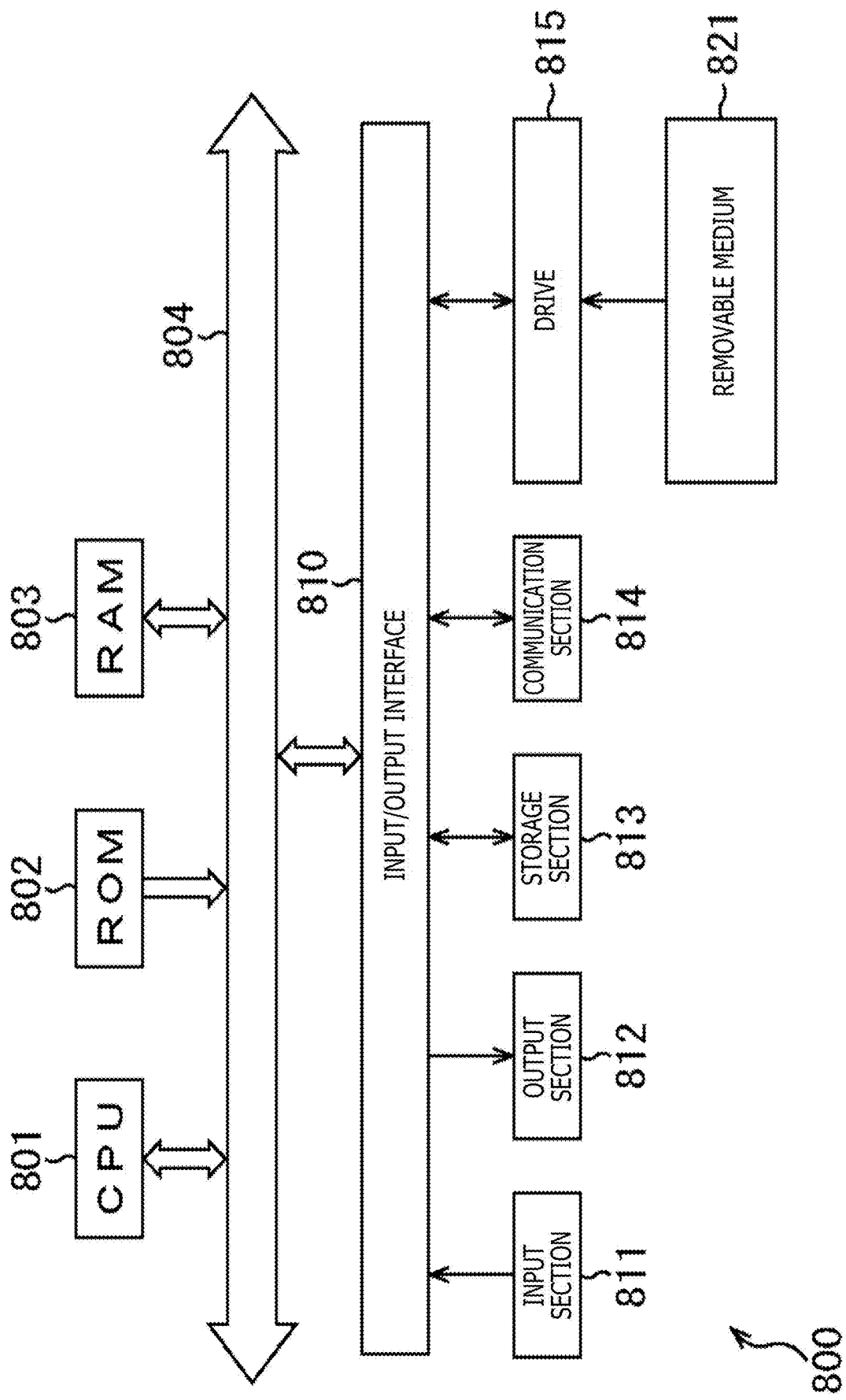

IMAGE PROCESSING APPARATUS AND IMAGE PROCESSING METHOD

CROSS REFERENCE TO PRIOR APPLICATION

This application is a National Stage Patent Application of PCT International Patent Application No. PCT/JP2019/003275 (filed on Jan. 31, 2019) under 35 U.S.C. § 371, which claims priority to Japanese Patent Application No. 2018-024410 (filed on Feb. 14, 2018), which are all hereby incorporated by reference in their entirety.

TECHNICAL FIELD

The present disclosure relates to an image processing apparatus and an image processing method and particularly relates to an image processing apparatus and an image processing method capable of suppressing a reduction in encoding efficiency.

BACKGROUND ART

There has conventionally been known a method of controlling computing precision of orthogonal transform and quantization (inverse quantization and inverse orthogonal transform) on the basis of a bit depth 'BitDepth' of an input image specified by a sequence parameter set (SPS) in image encoding and decoding (refer to, for example, NPL 1).

For example, a scaling parameter 'bdShift' for controlling the computing precision of the orthogonal transform and quantization (inverse quantization and inverse orthogonal transform) is set on the basis of the bit depth 'BitDepth' set per sequence (specified by the SPS) as described above, in the image encoding and decoding described in NPL 1.

CITATION LIST

Non Patent Literature

[NPL 1]
J TELECOMMUNICATION STANDARDIZATION SECTOR OF ITU (International Telecommunication Union), "High efficiency video coding", H.265, 12/2016

SUMMARY

Technical Problems

The bit depth of the input image changes in a time direction or a spatial direction within a sequence, for example, per picture or per local area within each picture. With the conventional method, however, it has been difficult to control the computing precision of the orthogonal transform and the quantization (the inverse quantization and the inverse orthogonal transform) in the time direction or the spatial direction within the sequence according to such a change in the bit depth of the input image. Owing to this, there is a concern of a reduction in encoding efficiency.

The present disclosure has been achieved in light of such circumstances, and an object of the present disclosure is to enable suppression of a reduction in encoding efficiency.

Solution to Problems

An image processing apparatus according to one aspect of the present technology is an image processing apparatus including an orthogonal transform section that orthogonally transforms a prediction residual of an image and that controls the number of significant figures of coefficient data obtained by orthogonal transform of the prediction residual, on the basis of a bit depth indicating a range of pixel values of a local level that is a data unit smaller than a sequence level of the image, a quantization section that quantizes the coefficient data obtained by the orthogonal transform section and that controls the number of significant figures of a quantized coefficient obtained by quantization of the coefficient data, on the basis of the bit depth of the local level, and an encoding section that encodes the quantized coefficient obtained by the quantization section and that generates a bit stream.

An image processing method according to one aspect of the present technology is an image processing method including orthogonally transforming a prediction residual of an image, controlling the number of significant figures of coefficient data obtained by orthogonal transform of the prediction residual, on the basis of a bit depth indicating a range of pixel values of a local level that is a data unit smaller than a sequence level of the image, quantizing the coefficient data, controlling the number of significant figures of a quantized coefficient obtained by quantization of the coefficient data, on the basis of the bit depth of the local level, encoding the quantized coefficient, and generating a bit stream.

An image processing apparatus according to another aspect of the present technology is an image processing apparatus including an orthogonal transform section that orthogonally transforms a prediction residual of an image and that controls the number of significant figures of coefficient data obtained by orthogonal transform of the prediction residual, on the basis of a bit depth indicating a range of pixel values of a local level that is a data unit smaller than a sequence level of a predicted image corresponding to the image or of a decoded image referred to at a time of generation of the predicted image, a quantization section that quantizes the coefficient data obtained by the orthogonal transform section and that controls the number of significant figures of a quantized coefficient obtained by quantization of the coefficient data, on the basis of the bit depth of the local level of the predicted image or the decoded image, and an encoding section that encodes the quantized coefficient obtained by the quantization section and that generates a bit stream.

An image processing method according to another aspect of the present technology is an image processing method including orthogonally transforming a prediction residual of an image, controlling the number of significant figures of coefficient data obtained by orthogonal transform of the prediction residual, on the basis of a bit depth indicating a range of pixel values of a local level that is a data unit smaller than a sequence level of a predicted image corresponding to the image or of a decoded image referred to at a time of generation of the predicted image, quantizing the coefficient data, controlling the number of significant figures of a quantized coefficient obtained by quantization of the coefficient data, on the basis of the bit depth of the local level of the predicted image or the decoded image, encoding the quantized coefficient, and generating a bit stream.

An image processing apparatus according to still another aspect of the present technology is an image processing apparatus including a decoding section that decodes a bit stream, an inverse quantization section that inversely quantizes a quantized coefficient obtained by decoding of the bit stream by the decoding section and that controls the number of significant figures of coefficient data obtained by inverse quantization of the quantized coefficient, on the basis of a bit depth indicating a range of pixel values of a local level that is a data unit smaller than a sequence level, and an inverse orthogonal transform section that performs inverse orthogonal transform on the coefficient data obtained by inverse quantization of the quantized coefficient by the inverse quantization section and that controls the number of significant figures of residual data obtained by performance of inverse orthogonal transform on the coefficient data, on the basis of the bit depth of the local level.

An image processing method according to still another aspect of the present technology is an image processing method including decoding a bit stream, inversely quantizing a quantized coefficient obtained by decoding of the bit stream, controlling the number of significant figures of coefficient data obtained by inverse quantization of the quantized coefficient, on the basis of a bit depth indicating a range of pixel values of a local level that is a data unit smaller than a sequence level, performing inverse orthogonal transform on the coefficient data obtained by inverse quantization of the quantized coefficient, and controlling the number of significant figures of residual data obtained by performance of inverse orthogonal transform on the coefficient data, on the basis of the bit depth of the local level.

An image processing apparatus according to yet another aspect of the present technology is an image processing apparatus including a decoding section that decodes a bit stream, an inverse quantization section that inversely quantizes a quantized coefficient obtained by decoding of the bit stream by the decoding section and that controls the number of significant figures of coefficient data obtained by inverse quantization of the quantized coefficient, on the basis of a bit depth indicating a range of pixel values of a local level that is a data unit smaller than a sequence level of a predicted image or of a decoded image referred to at a time of generation of the predicted image, and an inverse orthogonal transform section that performs inverse orthogonal transform on the coefficient data obtained by inverse quantization of the quantized coefficient by the inverse quantization section and that controls the number of significant figures of residual data obtained by performance of inverse orthogonal transform on the coefficient data, on the basis of the bit depth of the local level of the predicted image or the decoded image.

An image processing method according to yet another aspect of the present technology is an image processing method including decoding a bit stream, inversely quantizing a quantized coefficient obtained by decoding of the bit stream, controlling the number of significant figures of coefficient data obtained by inverse quantization of the quantized coefficient, on the basis of a bit depth indicating a range of pixel values of a local level that is a data unit smaller than a sequence level of a predicted image or of a decoded image referred to at a time of generation of the predicted image, performing inverse orthogonal transform on the coefficient data obtained by performance of the inverse quantization on the quantized coefficient, and controlling the number of significant figures of residual data obtained by performance of the inverse orthogonal transform on the coefficient data, on the basis of the bit depth of the local level of the predicted image or the decoded image.

With the image encoding apparatus and the image processing method according to one aspect of the present technology, a prediction residual of an image is orthogonally transformed, the number of significant figures of the coefficient data obtained by performance of orthogonal transform on the prediction residual is controlled on the basis of a bit depth indicating a range of pixel values of a local level that is a data unit smaller than a sequence level of the image, the coefficient data is quantized, the number of significant figures of a quantized coefficient obtained by quantization of the coefficient data is controlled on the basis of the bit depth of the local level, the quantized coefficient is encoded, and a bit stream is generated.

With the image encoding apparatus and the image processing method according to another aspect of the present technology, a prediction residual of an image is orthogonally transformed, the number of significant figures of coefficient data obtained by performance of orthogonal transform on the prediction residual is controlled on the basis of a bit depth indicating a range of pixel values of a local level that is a data unit smaller than a sequence level of a predicted image corresponding to the image or of a decoded image referred to at the time of generation of the predicted image, the coefficient data is quantized, the number of significant figures of a quantized coefficient obtained by quantization of the coefficient data is controlled on the basis of the bit depth of the local level of the predicted image or the decoded image, the quantized coefficient is encoded, and a bit stream is generated.

With the image processing apparatus and the image processing method according to still another aspect of the present technology, a bit stream is decoded, inverse quantization is performed on a quantized coefficient obtained by decoding of the bit stream, the number of significant figures of coefficient data obtained by performance of the inverse quantization on the quantized coefficient is controlled on the basis of a bit depth indicating a range of pixel values of a local level that is a data unit smaller than a sequence level, inverse orthogonal transform is performed on the coefficient data obtained by performance of the inverse quantization on the quantized coefficient, and the number of significant figures of residual data obtained by performance of the inverse orthogonal transform on the coefficient data is controlled on the basis of the bit depth of the local level.

With the image processing apparatus and the image processing method according to yet another aspect of the present technology, a bit stream is decoded, a quantized coefficient obtained by decoding of the bit stream is inversely quantized, the number of significant figures of coefficient data obtained by inverse quantization of the quantized coefficient is controlled on the basis of a bit depth indicating a range of pixel values of a local level that is a data unit smaller than a sequence level of a predicted image or a decoded image referred to at a time of generation of the predicted image, inverse orthogonal transform is performed on the coefficient data obtained by inverse quantization of the quantized coefficient, and the number of significant figures of residual data obtained by performance of inverse orthogonal transform on the coefficient data is controlled on the basis of the bit depth of the local level of the predicted image or the decoded image.

Advantageous Effect of Invention

According to the present disclosure, it is possible to process an image. It is particularly possible to suppress a reduction in encoding efficiency.

BRIEF DESCRIPTION OF DRAWINGS

FIG. 8 is a diagram depicting an example of a state of a change in bit depth of a chrominance signal between local areas.

FIG. 9 is a diagram depicting a list of principal computing precision control methods.

FIG. 10 is a diagram depicting an example of a state of control over computing precision of orthogonal transform and quantization by method #1.

FIG. 31 is a diagram depicting an example of a syntax.

FIG. 54 is a block diagram depicting an example of principal configurations of a computer.

DESCRIPTION OF EMBODIMENTS

Figure 1:
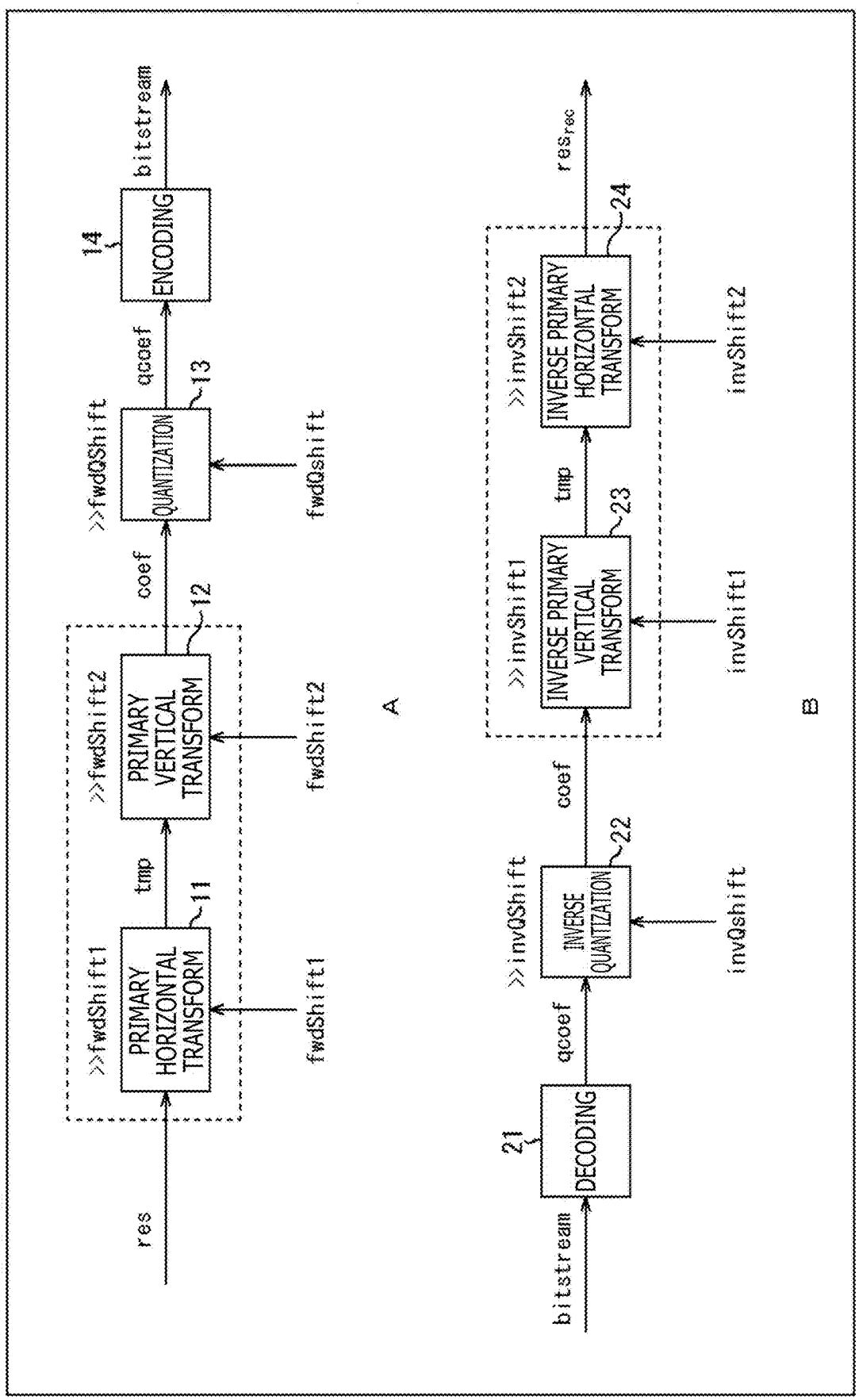
FIG. 1 is a diagram depicting an example of a state of control over computing precision.

Modes for carrying out the present disclosure (hereinafter, referred to as "embodiments") will be described below. It is noted that the description will be given in the following order.

1. Control over computing precision
2. Common concept (outline of each approach)
3. First embodiment (details of method #1)
4. Second embodiment (details of method #2)
5. Notes

1. Control Over Computing Precision

<Documents and the Like Supporting Technical Contents and Technical Terms>

The scope disclosed in the present technology includes not only the contents described in embodiments but also the contents described in the following pieces of NPL that were well known at the time of filing of the present application.

NPL 1: (described above)

NPL 2: TELECOMMUNICATION STANDARDIZATION SECTOR OF ITU (International Telecommunication Union), "Advanced video coding for generic audiovisual services", H.264, 04/2017

NPL 3: Jianle Chen, Elena Alshina, Gary J. Sullivan, Jens-Rainer, Jill Boyce, "Algorithm Description of Joint Exploration Test Model 4", JVET-G1001_v, Joint Video Exploration Team (JVET) of ITU-T SG 16 WP 3 and ISO/IEC JTC 1/SC 29/WG 11 7th Meeting: Torino, IT, 13-21 Jul. 2017

In other words, the contents described in the above pieces of NPL also form the basis for determining support requirements. It is assumed, for example, that Quad-Tree Block Structure described in NPL 1 and QTBT (Quad Tree Plus Binary Tree) Block Structure described in NPL 3 are within the scope of disclosure of the present technology and satisfy support requirements for claims even if direct description of such structures is not made in the embodiment. In addition, it is assumed that technical terms such as parsing, syntax, and semantics are similarly within the scope of the disclosure of the present technology and satisfy support requirements for claims even if direct description of such terms is not made in the embodiment.

Furthermore, a "block" (not a block indicating a processing section) used as a partial area or a processing unit of an image (picture) in description indicates any partial area within the picture, and a magnitude, a shape, characteristics, and the like thereof are not limited to specific ones unless particularly mentioned otherwise. It is assumed that examples of the "block" include any partial areas (processing units) such as a TB (Transform Block), a TU (Transform Unit), a PB (Prediction Block), a PU (Prediction Unit), a SCU (Smallest Coding Unit), a CU (Coding Unit), an LCU (Largest Coding Unit), a CTB (Coding Tree Block), a CTU (Coding Tree Unit), a transform block, a sub-block, a macroblock, a tile, and a slice described in NPL 1 to NPL 3.

Moreover, in designating a size of such a block, a block size may be designated not only directly but also indirectly. For example, the block size may be designated using identification information for identifying the size. Alternatively, the block size may be designated by, for example, a ratio or a difference of the size to or from a size of a reference block (for example, LCU or SCU). For example, in a case of transmitting information designating the block size as a syntax element or the like, the information indirectly designating the size as described above may be used as the information. This can sometimes decrease an information amount of the information and improve encoding efficiency. In addition, this designation of the block size includes designation of a range of the block size (for example, designation of an allowable range of the block size).

<Control Over Computing Precision>

There has conventionally been known a method of controlling computing precision of orthogonal transform and quantization (inverse quantization and inverse orthogonal transform) on the basis of a bit depth 'BitDepth' of an input image specified by a sequence parameter set (SPS) in image encoding and decoding as described in, for example, NPL 1.

As depicted in, for example, A of FIG. 1, there is a method including, in encoding, obtaining (not depicted) residual data (also referred to as a "prediction residual") that is a difference between an input image and a predicted image of the input image and performing primary horizontal transform 11, primary vertical transform 12, secondary transform (not depicted), quantization 13, and encoding 14 on the prediction residual res.

There is a method, in such encoding, including bit-shifting transform coefficient data tmp by using a primary horizontal transform shift amount fwdShift1 that is a predetermined scaling parameter in the primary horizontal transform 11, bit-shifting transformed coefficient data (also referred to as a "transform coefficient") coef by using a primary vertical transform shift amount fwdShift2 that is a predetermined scaling parameter in the primary vertical transform 12, and bit-shifting quantized coefficient data (also referred to as a "quantized coefficient") qcoef by using a quantization shift amount fwdQShift that is a predetermined scaling parameter in the quantization 13, thereby controlling the number of significant figures of each data. It is noted that, among these scaling parameters, the primary horizontal transform shift amount fwdShift1 and the quantization shift amount fwdQShift depend on the bit depth 'bitDepth'.

In the case of decoding corresponding to such encoding, as depicted in B of FIG. 1, decoding 21, inverse quantization 22, inverse secondary transform (not depicted), inverse primary vertical transform 23, and inverse primary horizontal transform 24 are sequentially performed on a bit stream bitstream, a predicted image is added (not depicted) to an obtained prediction residual $res_{rec}$, and a decoded image is obtained.

There is a method including, in such decoding, bit-shifting inversely quantized coefficient data (that is, transform coefficient) coef by using an inverse quantization shift amount invQShift that is a predetermined scaling parameter in the inverse quantization 22, bit-shifting transform coefficient data tmp by using an inverse primary vertical transform shift amount invShift1 that is a predetermined scaling parameter in the inverse primary vertical transform 23, and bit-shifting transformed residual data (that is, prediction residual) $res_{rec}$ by using an inverse primary horizontal transform shift amount invShift2 that is a predetermined scaling parameter as the inverse primary horizontal transform 24, thereby controlling the number of significant figures of each data. It is noted that, among these scaling parameters, the inverse primary horizontal transform shift amount invShift2 and the inverse quantization shift amount invQShift depend on the bit depth 'bitDepth'.

Figure 2:
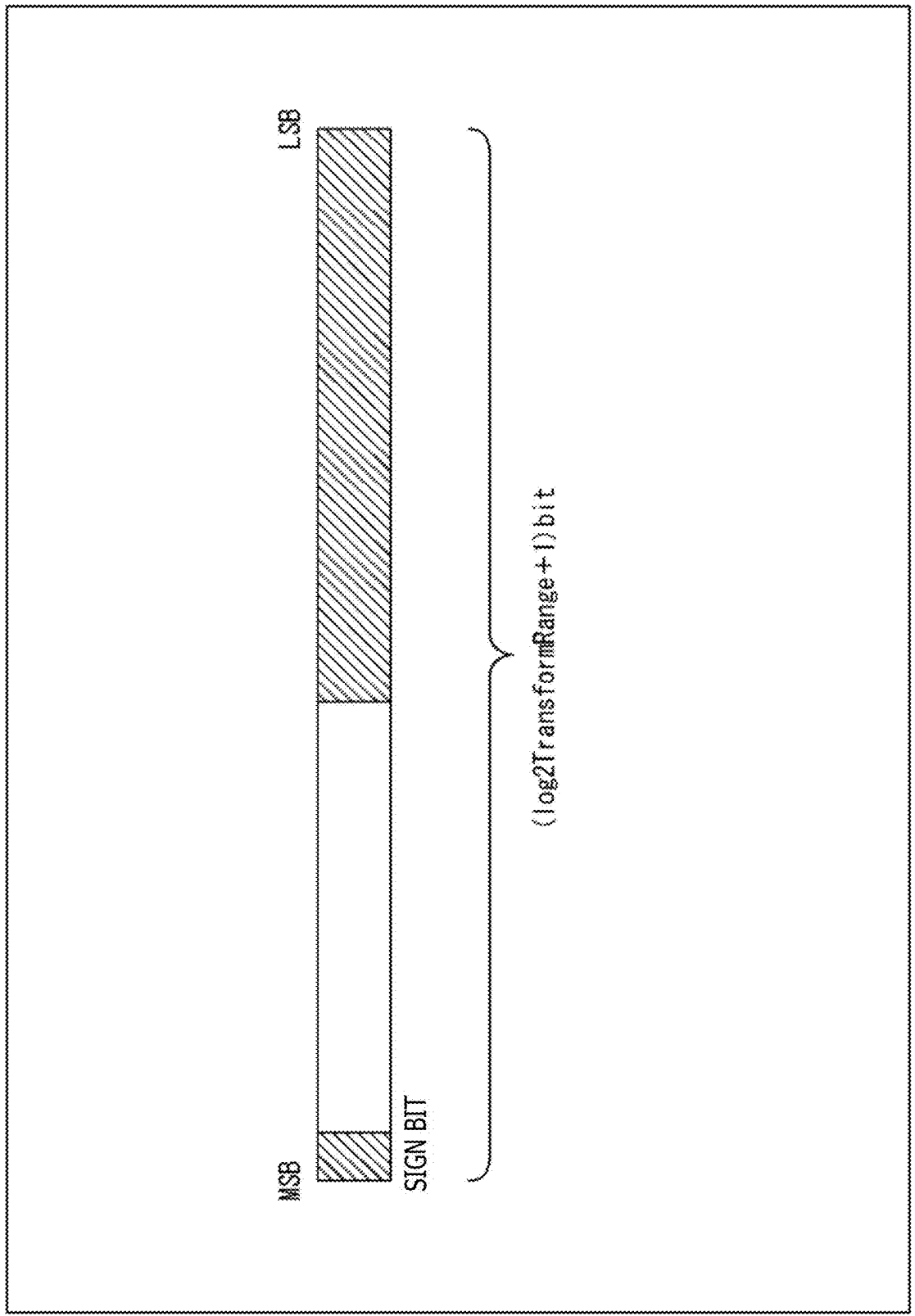
FIG. 2 is a diagram depicting an example of a bit range to be used.

In other words, in a case of supposing a narrow-range signal, data is not computed using a full range from a minimum value coefMin to a maximum value coefMax that can be taken on by the data. In other words, as depicted in FIG. 2, bit fields (shaded parts in FIG. 2) used in numerical representation of a coefficient and a bit field (blank part in FIG. 2) not used in numerical representation are present in a bit width (log 2TransformRange+1) bit from an LSB (Least Significant Bit) to an MSB (Most Significant Bit) of data. That is, there is room for using part of the unused bit field as bits for increasing the number of significant figures of the coefficient within the range from the minimum value coefMin to the maximum value coefMax.

Figure 3:
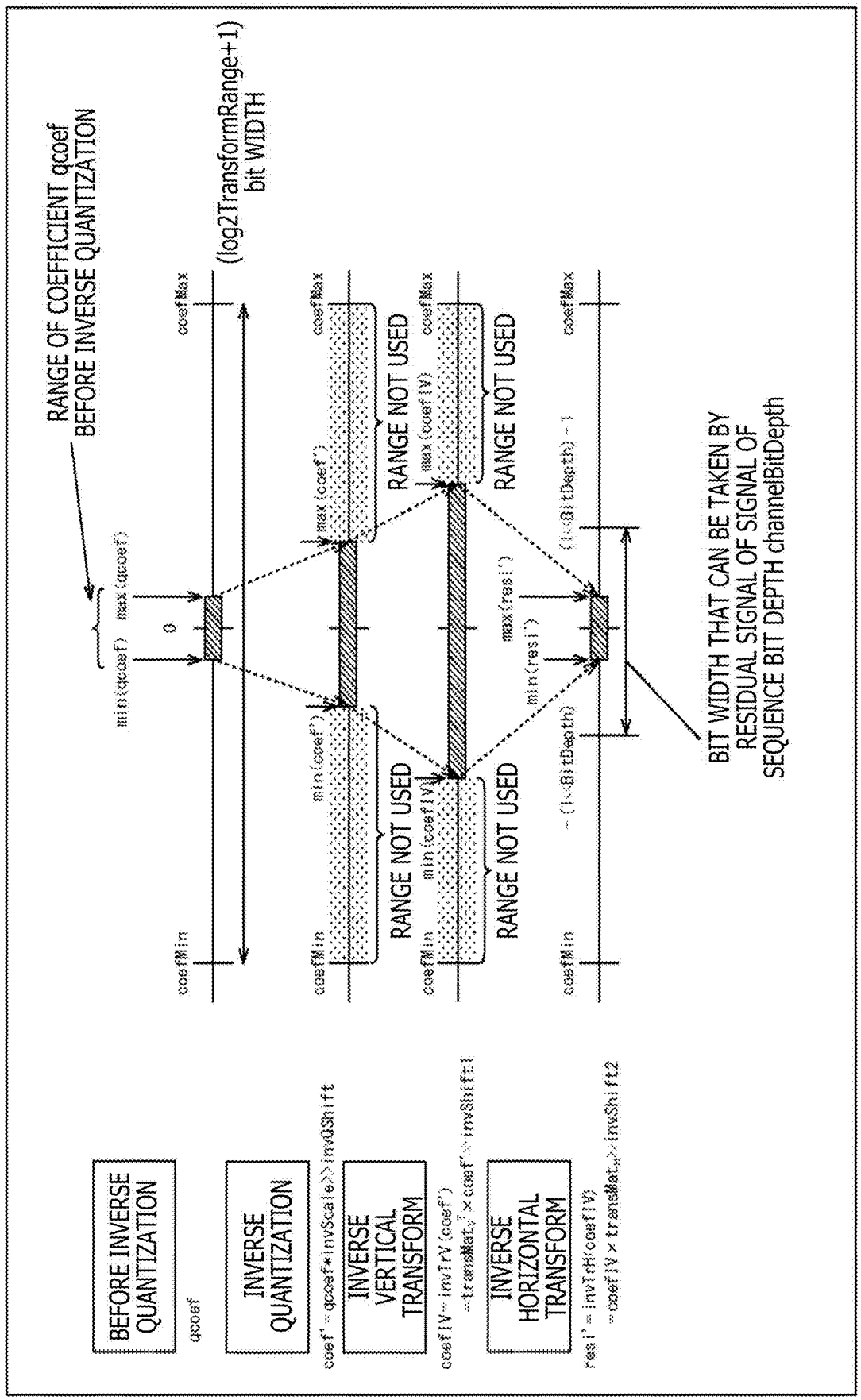
FIG. 3 is a diagram depicting an example of a state of a change in computing precision.

In the example of FIG. 1, bit-shifting the coefficient data by using this room (unused range) makes it possible to control the number of significant figures of each coefficient data (i.e., computing precision) in orthogonal transform and quantization (inverse quantization and inverse orthogonal transform). In a case of decoding, for example, the number of significant figures of the coefficient data or the residual data is expanded in each of the inverse quantization processing, the inverse vertical transform processing, and inverse horizontal transform processing, as depicted in FIG. 3. Expanding the number of significant figures of data enables improvement in computing precision.

However, a bit depth of an input image changes in a time direction or a spatial direction within a sequence, for example, per picture or per local area within each picture. For example, in a frame 41 depicted in A of FIG. 4, an overall image is dark because of less illumination. The distribution of pixel values within this frame 41 is like a histogram 42, and a signal range (width from a minimum value to a maximum value of pixel values) (hereinafter, also referred to as a "bit depth") is nine bits.

Figure 4:
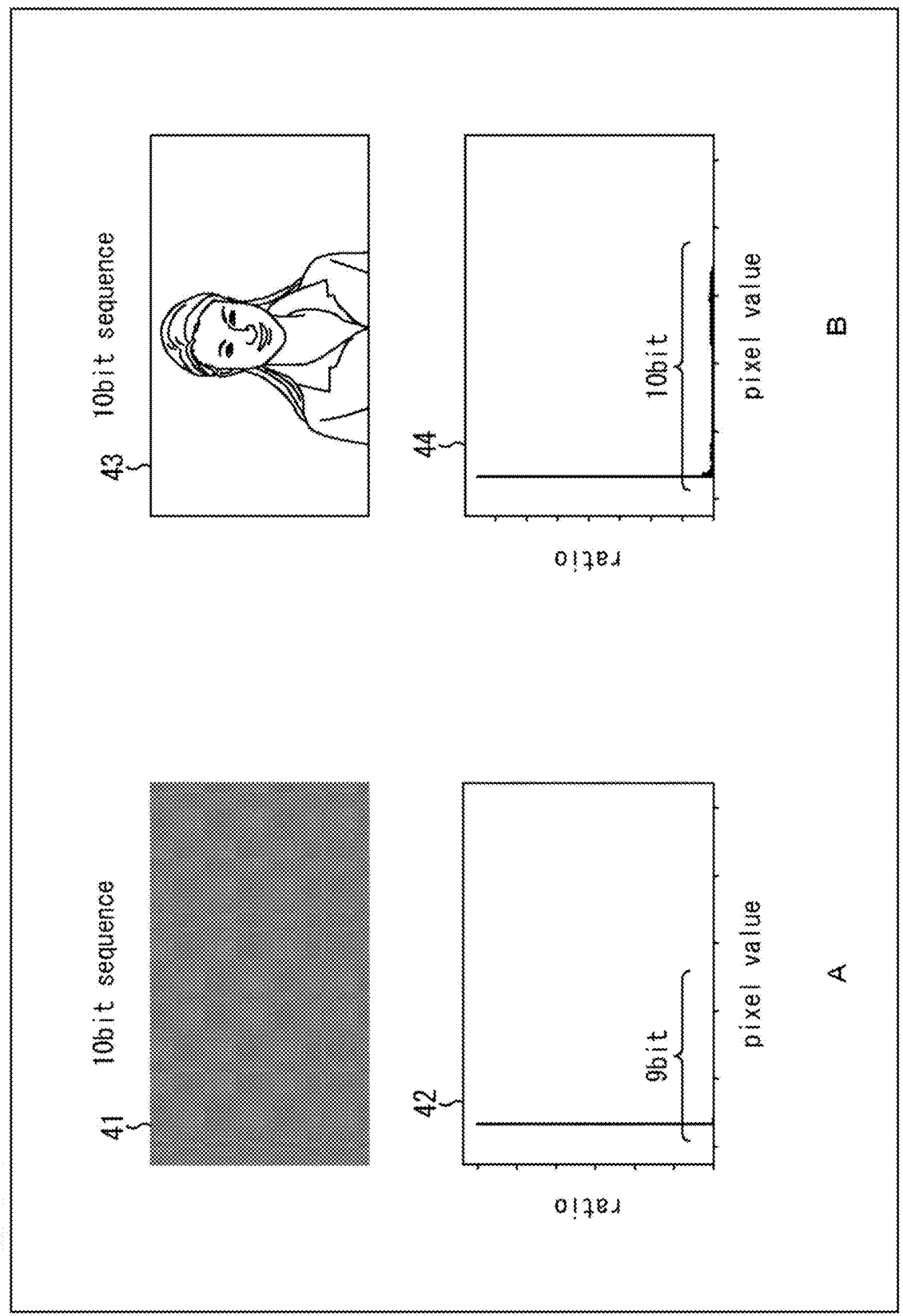
FIG. 4 is a diagram depicting an example of a state of a change in bit depth between pictures.

A frame 43 depicted in B of FIG. 4 is a next frame of the frame 41. The frame 43 is an overall bright image because of much illumination. The distribution of pixel values of the frame 43 is like a histogram 44, and a bit depth is 10 bits.

In such way, for example, when a variation in illumination or the like occurs, the signal range (bit depth) changes between pictures. In other words, a change in the bit depth in the time direction also possibly occurs within a sequence.

Figure 5:
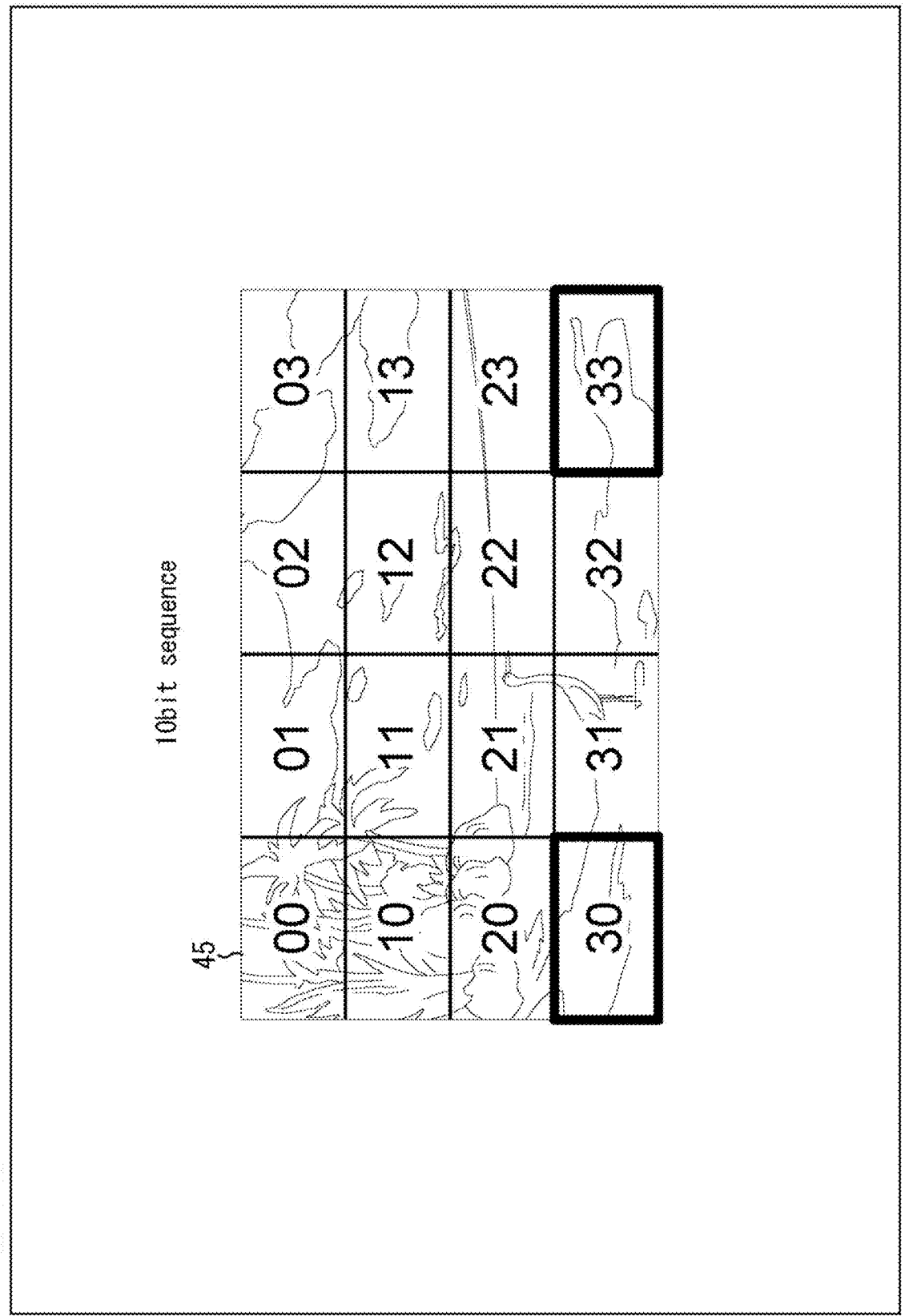
FIG. 5 is a diagram depicting an example of a state of a change in bit depth of a luminance signal between local areas.
Figure 6:
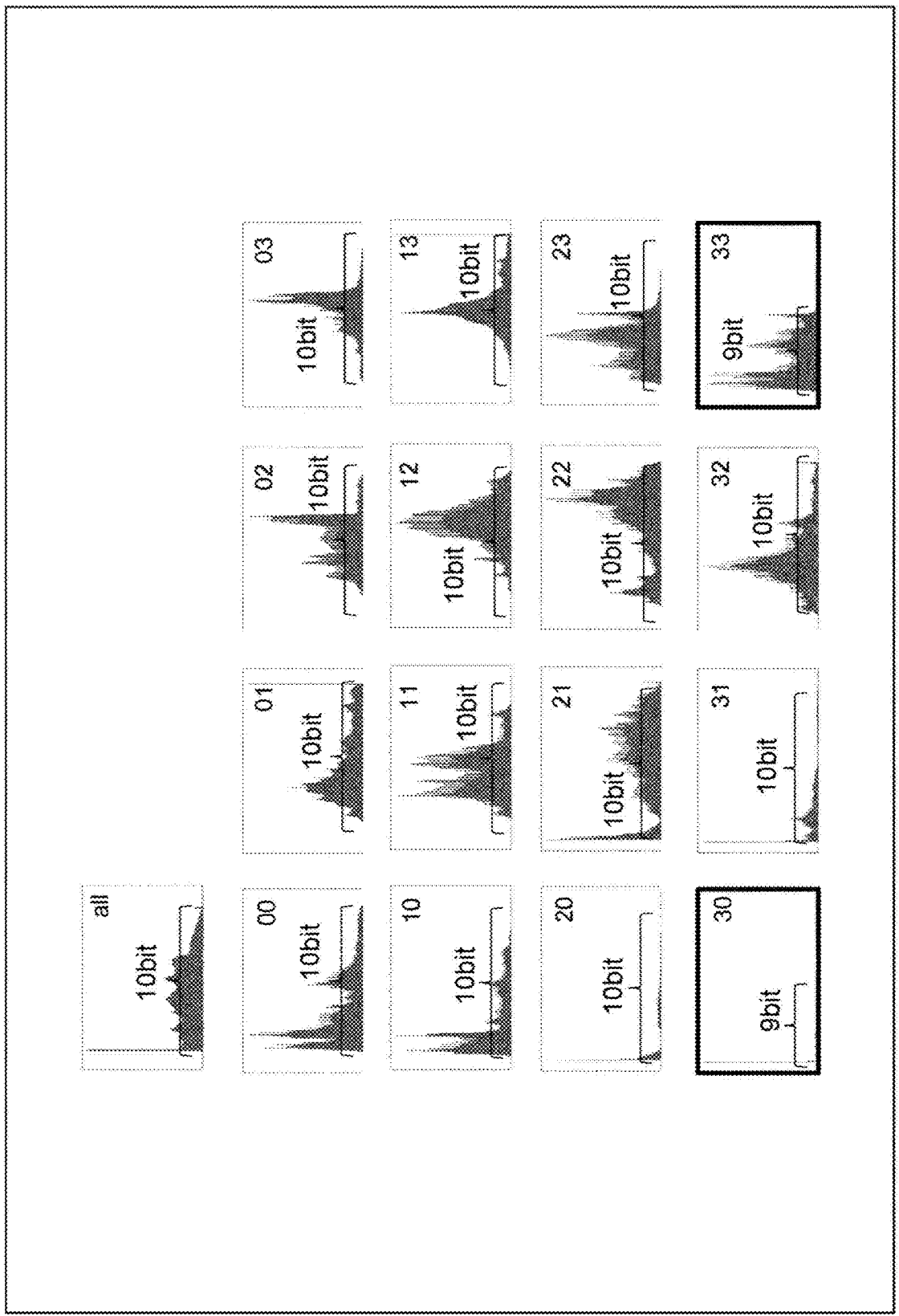
FIG. 6 is a diagram depicting an example of a state of a change in bit depth of a luminance signal between local areas.

In addition, the bit depth also possibly changes per local area within each picture. In other words, a change in the bit depth in the spatial direction also possibly occurs. For example, in a case of segmenting a picture 45 of a luminance signal depicted in FIG. 5 into 4×4=16 and setting the segmented parts as local areas (local areas 00 to 33), a histogram of pixel values of each local area of the picture 45 of this luminance signal is as that of FIG. 6. In other words, a bit depth of each of the local areas 30 and 33 of the picture 45 is nine bits, and a bit depth of each of an overall picture (all) and the other local areas is 10 bits. In such way, the bit depth of the luminance signal possibly changes in the spatial direction according to a luminance distribution within the picture.

Figure 7:
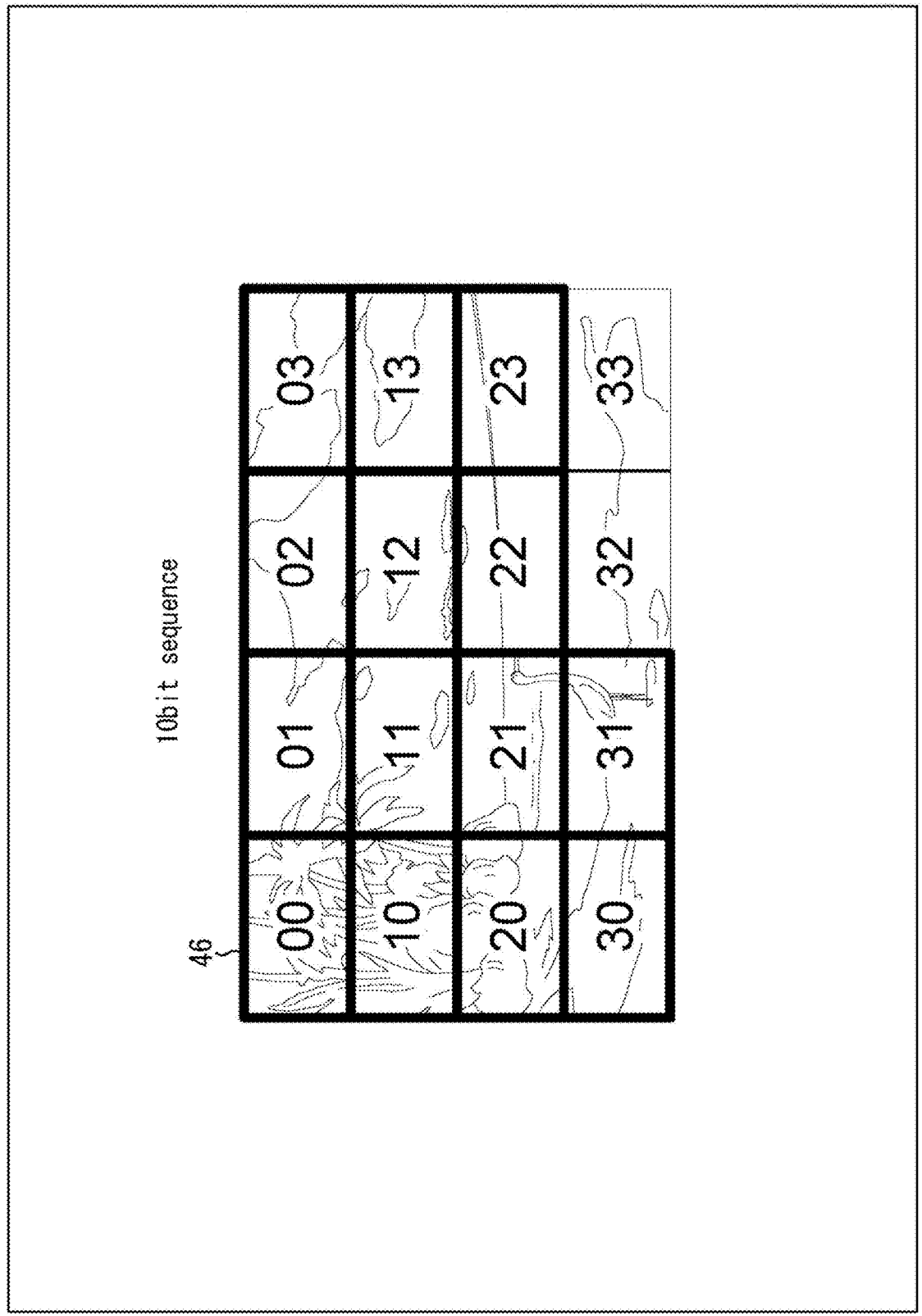
FIG. 7 is a diagram depicting an example of a state of a change in bit depth of a chrominance signal between local areas.

Furthermore, in a case of segmenting, for example, a picture 46 of a chrominance signal (Cb) depicted in FIG. 7 into 4×4=16 and setting the segmented parts as local areas (local areas 00 to 33), a histogram of pixel values of each local area of the picture 46 of this chrominance signal is as that depicted in FIG. 8. In other words, in this case, the local areas where a bit depth is seven bits, the local areas where a bit depth is eight bits, and the local areas where a bit depth is nine bits are present in the picture 46. In such way, the bit depth of the chrominance signal possibly changes in the spatial direction according to a chrominance distribution within the picture.

On the other hand, the scaling parameters used in the orthogonal transform and the quantization (the inverse quantization and the inverse orthogonal transform) are set in the sequence parameter set as described above. In other words, control over the numbers of significant figures in the orthogonal transform and the quantization (the inverse quantization and the inverse orthogonal transform) is exercised per sequence.

Owing to this, it is difficult to control the computing precision of the orthogonal transform and the quantization (the inverse quantization and the inverse orthogonal transform) in the time direction or the spatial direction within each sequence according to the change in the bit depth of the input image. Owing to this, there is a concern of a reduction in encoding efficiency.

2. Common Concept

<Control Over Computing Precision within Sequence>

To address the challenge, a prediction residual of an image is orthogonally transformed, the number of significant figures of coefficient data obtained by orthogonal transform of the prediction residual is controlled on the basis of a bit depth indicating a range of pixel values of a local level that is a data unit smaller than a sequence level of the image, coefficient data is quantized, the number of significant figures of a quantized coefficient obtained by quantization of the coefficient data is controlled on the basis of the bit depth of the local level, the quantized coefficient is encoded, and a bit stream is generated.

For example, an image processing apparatus includes an orthogonal transform section that orthogonally transforms a prediction residual of an image and that controls the number of significant figures of coefficient data obtained by orthogonal transform of the prediction residual on the basis of a bit depth indicating a range of pixel values of a local level that is a data unit smaller than a sequence level of the image, a quantization section that quantizes the coefficient data obtained by the orthogonal transform section and that controls the number of significant figures of a quantized coefficient obtained by quantization of the coefficient data on the basis of the bit depth of the local level, and an encoding section that encodes the quantized coefficient obtained by the quantization section and that generates a bit stream.

By doing so, it is possible to control the number of significant figures of each data in orthogonal transform and quantization in the time direction or the spatial direction even within each sequence. In other words, it is possible to control the computing precision of the orthogonal transform and the quantization in the time direction or the spatial direction even within the sequence. It is therefore possible to suppress a reduction in encoding efficiency.

Furthermore, a bit stream is decoded, inverse quantization is performed on a quantized coefficient obtained by decoding of the bit stream, the number of significant figures of coefficient data obtained by inverse quantization of the quantized coefficient is controlled on the basis of a bit depth indicating a range of pixel values of a local level that is a data unit smaller than a sequence level, inverse orthogonal transform is performed on the coefficient data obtained by inverse quantization of the quantized coefficient, and the number of significant figures of residual data obtained by performance of the inverse orthogonal transform on the coefficient data is controlled on the basis of the bit depth of the local level.

For example, an image processing apparatus includes a decoding section that decodes a bit stream, an inverse quantization section that inversely quantizes a quantized coefficient obtained by decoding of the bit stream by the decoding section and that controls the number of significant figures of coefficient data obtained by inverse quantization of the quantized coefficient on the basis of a bit depth indicating a range of pixel values of a local level that is a data unit smaller than a sequence level, and an inverse orthogonal transform section that performs inverse orthogonal transform on the coefficient data obtained by inverse quantization of the quantized coefficient by the inverse quantization section and that controls the number of significant figures of residual data obtained by inverse orthogonal transform of the coefficient data on the basis of the bit depth of the local level.

By doing so, it is possible to control the number of significant figures of each data in the inverse quantization and the inverse orthogonal transform in the time direction or the spatial direction even within each sequence. In other words, it is possible to control the computing precision of the inverse quantization and the inverse orthogonal transform in the time direction or the spatial direction even within the sequence. It is therefore possible to suppress a reduction in encoding efficiency.

Furthermore, a prediction residual of an image is orthogonally transformed, the number of significant figures of coefficient data obtained by orthogonal transform of the prediction residual is controlled on the basis of a bit depth indicating a range of pixel values of a local level that is a data unit smaller than a sequence level of a predicted image corresponding to the image (or of a decoded image referred to at a time of generation of the predicted image), the coefficient data is quantized, the number of significant figures of a quantized coefficient obtained by quantization of the coefficient data is controlled on the basis of the bit depth of the local level of the predicted image (or the decoded image referred to at the time of generating the predicted image), the quantized coefficient is encoded, and a bit stream is generated.

For example, an image processing apparatus includes an orthogonal transform section that orthogonally transforms a prediction residual of an image and that controls the number of significant figures of coefficient data obtained by orthogonal transform of the prediction residual on the basis of a bit depth indicating a range of pixel values of a local level that is a data unit smaller than a sequence level of a predicted image corresponding to the image (or of a decoded image referred to at a time of generation of the predicted image), a quantization section that quantizes the coefficient data obtained by the orthogonal transform section and that controls the number of significant figures of a quantized coefficient obtained by quantization of the coefficient data, on the basis of the bit depth of the local level of the predicted image (or the decoded image referred to at the time of generating the predicted image), and an encoding section that encodes the quantized coefficient obtained by the quantization section and that generates a bit stream.

By doing so, it is possible to control the number of significant figures of each data in orthogonal transform and quantization in the time direction or the spatial direction even within each sequence. In other words, it is possible to control the computing precision of the orthogonal transform and the quantization in the time direction or the spatial direction even within the sequence. It is therefore possible to suppress a reduction in encoding efficiency.

Moreover, a bit stream is decoded, a quantized coefficient obtained by decoding of the bit stream is inversely quantized, the number of significant figures of coefficient data obtained by inverse quantization of the quantized coefficient is controlled on the basis of a bit depth indicating a range of pixel values of a local level that is a data unit smaller than a sequence level of a predicted image (or a decoded image referred to at a time of generation of the predicted image), inverse orthogonal transform is performed on the coefficient data obtained by inverse quantization of the quantized coefficient, and the number of significant figures of residual data obtained by inverse orthogonal transform of the coefficient data is controlled on the basis of the bit depth of the local level of the predicted image (or the decoded image referred to at the time of generation of the predicted image).

For example, an image processing apparatus includes a decoding section that decodes a bit stream, an inverse quantization section that performs inverse quantization on a quantized coefficient obtained by decoding of the bit stream by the decoding section and that controls the number of significant figures of coefficient data obtained by inverse quantization of the quantized coefficient, on the basis of a bit depth indicating a range of pixel values of a local level that is a data unit smaller than a sequence level of a predicted image (or of a decoded image referred to at a time of generation of the predicted image), and an inverse orthogonal transform section that performs inverse orthogonal transform on the coefficient data obtained by inverse quantization of the quantized coefficient by the inverse quantization section and that controls the number of significant figures of residual data obtained by inverse orthogonal transform of the coefficient data, on the basis of the bit depth of the local level of the predicted image (or the decoded image referred to at the time of generation of the predicted image).

By doing so, it is possible to control the number of significant figures of each data in the inverse quantization and the inverse orthogonal transform in the time direction or the spatial direction even within each sequence. In other words, it is possible to control the computing precision of the inverse quantization and the inverse orthogonal transform in the time direction or the spatial direction even within the sequence. It is therefore possible to suppress a reduction in encoding efficiency.

Examples of Control

FIG. 9 depicts a list of examples of control over the computing precision described above. In a table depicted in FIG. 9, in a case of an example of a first stage from the top (method #1) without counting the row indicating item names in an uppermost stage, an encoding side derives the extension bit precision dBD that is a parameter indicating a correction amount of control over the number of significant figures from an input image. In addition, the control over (expansion and normalization of) the number of significant figures by using the extension bit precision dBD is performed in the orthogonal transform processing and the quantization processing and in the inverse quantization processing and the inverse orthogonal transform processing. More specifically, the control over the number of significant figures of data per sequence is corrected using this extension bit precision dBD in the series of processing.

The encoding side then transmits a difference parameter deltaX using the extension bit precision dBD to a decoding side. The decoding side derives the extension bit precision dBD by using the difference parameter deltaX transmitted thereto. In addition, the decoding side performs the control over (expansion and normalization of) the number of significant figures by using the extension bit precision dBD in the inverse quantization processing and the inverse orthogonal transform processing. More specifically, the decoding side corrects the control over the number of significant figures of data per sequence in the series of processing, by using this extension bit precision dBD.

In the case of the method #1, it is therefore possible to improve the computing precision in the orthogonal transform processing and the quantization processing and in the inverse quantization processing and the inverse orthogonal transform processing (that is, it is possible to suppress a reduction in computing precision). It is therefore possible to improve encoding efficiency (that is, it is possible to suppress a reduction in encoding efficiency).

Furthermore, the control over (expansion and normalization of) the number of significant figures can be performed using this extension bit precision dBD in the orthogonal transform processing and the quantization processing and in the inverse quantization processing and the inverse orthogonal transform processing (can be performed collectively with the series of processing). It is therefore possible to realize the control over the number of significant figures without providing new processing sections; thus, it is possible to suppress a growth of a load of processing related to encoding and decoding (for example, an implementation cost of a circuit scale and the like).

Moreover, the encoding side can control the extension bit precision dBD used on the decoding side since the difference parameter deltaX is transmitted from the encoding side to the decoding side. In other words, it is possible to improve a degree of freedom of processing on the encoding side, for example, it is possible for the encoding side to control the computing precision (the number of significant figures of data) on the decoding side.

It is noted that there is a method by which the orthogonal transform processing and the quantization processing (the inverse quantization processing and the inverse orthogonal transform processing) can be skipped, as an encoding/decoding method. In the case of such an encoding/decoding method, it is unnecessary to exercise control over (expansion and normalization of) the number of significant figures within each sequence by using the extension bit precision dBD described above. In the case of the method #1 described above, the control over (expansion and normalization of) the number of significant figures can be performed collectively with the orthogonal transform processing and the quantization processing (the inverse quantization processing and the inverse orthogonal transform processing); thus, it is possible to omit the control over the number of significant figures of coefficient data for which the orthogonal transform processing and the quantization processing (the inverse quantization processing and the inverse orthogonal transform processing) are skipped. In other words, the number of significant figures of only the coefficient data can be controlled. It is therefore possible to suppress an increase in unnecessary processing and suppress a growth of the load of the processing related to encoding and decoding.

Moreover, in a case of an example of the second stage from the top of the table of FIG. 9 (method #2), both the encoding side and the decoding side derive the extension bit precision dBD from a predicted image (or decoded image referred to at a time of generation of the predicted image). In addition, the control over (expansion and normalization of) the number of significant figures by using the extension bit precision dBD is performed in the orthogonal transform processing and the quantization processing and in the inverse quantization processing and the inverse orthogonal transform processing. More specifically, the control over the number of significant figures of data per sequence is corrected using this extension bit precision dBD in the series of processing. In other words, in this case, the transmission of the difference parameter deltaX is omitted.

In the case of the method #2, it is therefore possible to improve the computing precision in the orthogonal transform processing and the quantization processing and in the inverse quantization processing and the inverse orthogonal transform processing (that is, it is possible to suppress a reduction in computing precision). It is therefore possible to improve encoding efficiency (that is, it is possible to suppress a reduction in encoding efficiency).

Furthermore, the control over (expansion and normalization of) the number of significant figures can be performed using this extension bit precision dBD in the orthogonal transform processing and the quantization processing and in the inverse quantization processing and the inverse orthogonal transform processing (can be performed collectively with the series of processing). It is therefore possible to realize the control over the number of significant figures without providing new processing sections; thus, it is possible to suppress an implementation cost of a circuit scale.

Furthermore, since the transmission of the difference parameter deltaX is omitted as described above, it is possible to improve the encoding efficiency correspondingly (it is possible to reduce overhead related to the extension bit precision dBD).

Moreover, similarly to the case of the method #1, the control over (expansion and normalization of) the number of significant figures is performed collectively with the orthogonal transform processing and the quantization processing (the inverse quantization processing and the inverse orthogonal transform processing); thus, it is possible to omit control over the number of significant figures of the coefficient data for which the series of processing is skipped. It is therefore possible to control the number of significant figures of only the coefficient data in the case of the encoding/decoding method which enables skipping of the orthogonal transform processing and the quantization processing (the inverse quantization processing and the inverse orthogonal transform processing). In other words, it is possible to suppress an increase in the number of unnecessary processing and suppress the growth of the load of the processing related to encoding and decoding.

<Outline of Method #1>

In the case of, for example, the method #1, a series of processing from the primary horizontal transform 11 to the encoding 14 in encoding is performed as depicted in FIG. 10. First, per-area pixel minimum value/maximum value search 51 that is processing performed on an input image (Input sequence) for searching a minimum value (minPixelVal) and a maximum value (maxPixelVal) of pixel values per local level (block), which is a data unit smaller than a sequence level, is performed.

In addition, dBD derivation 52 for deriving the extension bit precision dBD per local level is performed using the minimum value (minPixelVal) and the maximum value (maxPixelVal) of the pixel values per local level detected by this search. In the dBD derivation 52, for example, each local-level bit depth LocalBitDepth is derived by use of the minimum value (minPixelVal) and the maximum value (maxPixelVal) of pixel values per local level, as represented by the following Equation (1).

It is noted that the local bit depth LocalBitDepth derived in Equation (1) may further be corrected to LocalBitDepth=max(minLocalBitDepth,LocalBitDepth) by referring to a predetermined threshold minLocalBitDepth (for example, eight), as represented in Equation (1A). By doing so, it is possible to suppress occurrence of a case in which the extension bit precision dBD derived in subsequent Equation (2) becomes excessively large in value (that is, the number of significant figures is excessively expanded, and intermediate coefficient data exceeds the range from the minimum value coefMin to the maximum value coefMax). It is noted that in Equation (1A), an operator max (x, y) is an operator that returns a larger value out of numeric values x and y.

$$\text{LocalBitDepth} = \text{ceil}(\log 2(\text{maxPixelVal} - \text{minPixelVal})) \quad (1)$$

$$\text{LocalBitDepth} = \max(\text{minLocalBitDepth}, \text{LocalBitDepth}) \quad (1A)$$

It is noted that log 2(x) is a function that returns a base 2 logarithmic value of a real number x, and ceil(x) is a ceiling function that returns a minimum integer equal to or greater than x to the real number x. In addition, the extension bit precision dBD is derived by use of the local-level bit depth LocalBitDepth and a sequence-level bit depth channelBitDepth, as represented by the following Equation (2).

$$dBD=\text{channelBitDepth}-\text{LocalBitDepth} \qquad (2)$$

In the primary horizontal transform 11, a controlled variable (shift amount) of the number of significant figures of the sequence level is corrected by use of the extension bit precision dBD. In other words, the number of significant figures of coefficient data tmp is controlled by use of the primary horizontal transform shift amount fwdShift1 of the sequence level and the extension bit precision dBD. More specifically, the coefficient data tmp is bit-shifted by (fwdShift1−dBD) bits (>>(fwdShift1−dBD)). In other words, the extension bit precision dBD is a correction value of the controlled variable (fwdShift1) of the number of significant figures of the coefficient data and the controlled variable of the number of significant figures of the quantized coefficient set per sequence of the input image.

In the primary vertical transform 12, the number of significant figures of the transform coefficient coef is controlled by use of the primary vertical transform shift amount fwdShift2 of the sequence level. More specifically, the transform coefficient coef is bit-shifted by fwdShift2 bits (>>fwdShift2).

In the quantization 13, a controlled variable (shift amount) of the number of significant figures of the sequence level is corrected by use of the extension bit precision dBD. In other words, the number of significant figures of the quantization coefficient qcoef is controlled using the quantization shift amount fwdQShift of the sequence level and the extension bit precision dBD. More specifically, the quantized coefficient qcoef is bit-shifted by (fwdQShift+dBD) bits (>>(fwdQShift+dBD)). In other words, the extension bit precision dBD is a correction value of the quantization shift amount fwdQShift that is a controlled variable of the number of significant figures of the quantized coefficient qcoef and a controlled variable of the number of significant figures of the quantized coefficient set per sequence of the input image.

It is noted that the controlled variable (shift amount, scaling parameter) of the number of significant figures determined by referring to the sequence-level bit depth channelBitDepth, as a parameter, will be referred to as a "controlled variable (shift amount, scaling parameter) of the number of significant figures of the sequence level," and the controlled variable (shift amount, scaling parameter) of the number of significant figures of the sequence level corrected by the extension bit precision dBD described above will be referred to as a "corrected controlled variable (shift amount, scaling parameter)," for the sake of convenience.

Furthermore, deltaX derivation 53 in which the difference parameter deltaX is derived by use of the extension bit precision dBD derived in the dBD derivation 52 is performed. In the deltaX derivation 53, for example, a slice-level bit depth sliceBitDepth is derived by use of a minimum value (slice_min_val) and a maximum value (slice_max_val) of pixel values per slice level, as represented by the following Equation (3).

$$\text{sliceBitDepth}=\text{ceil}(\log 2(\text{slice\_max\_val}-\text{slice\_min\_val})) \qquad (3)$$

In addition, the difference parameter deltaX is derived by use of the extension bit precision dBD, the slice-level bit depth sliceBitDepth, and the sequence-level bit depth channelBitDepth, as represented by the following Equation (4).

$$\text{deltaX}=dBD+\text{sliceBitDepth}-\text{channelBitDepth} \qquad (4)$$

In the encoding 14, the quantized coefficient is encoded to obtain a bit stream bitstream, the difference parameter deltaX is encoded, and the encoded difference parameter deltaX is contained in the bit stream.

It is noted that the control over the number of significant figures within each sequence by use of the extension bit precision dBD described above is performed in the primary horizontal transform 11, the primary vertical transform 12, and the quantization 13; thus, in a case of skipping the series of processing, this control over the number of significant figures is also omitted.

Figure 11:
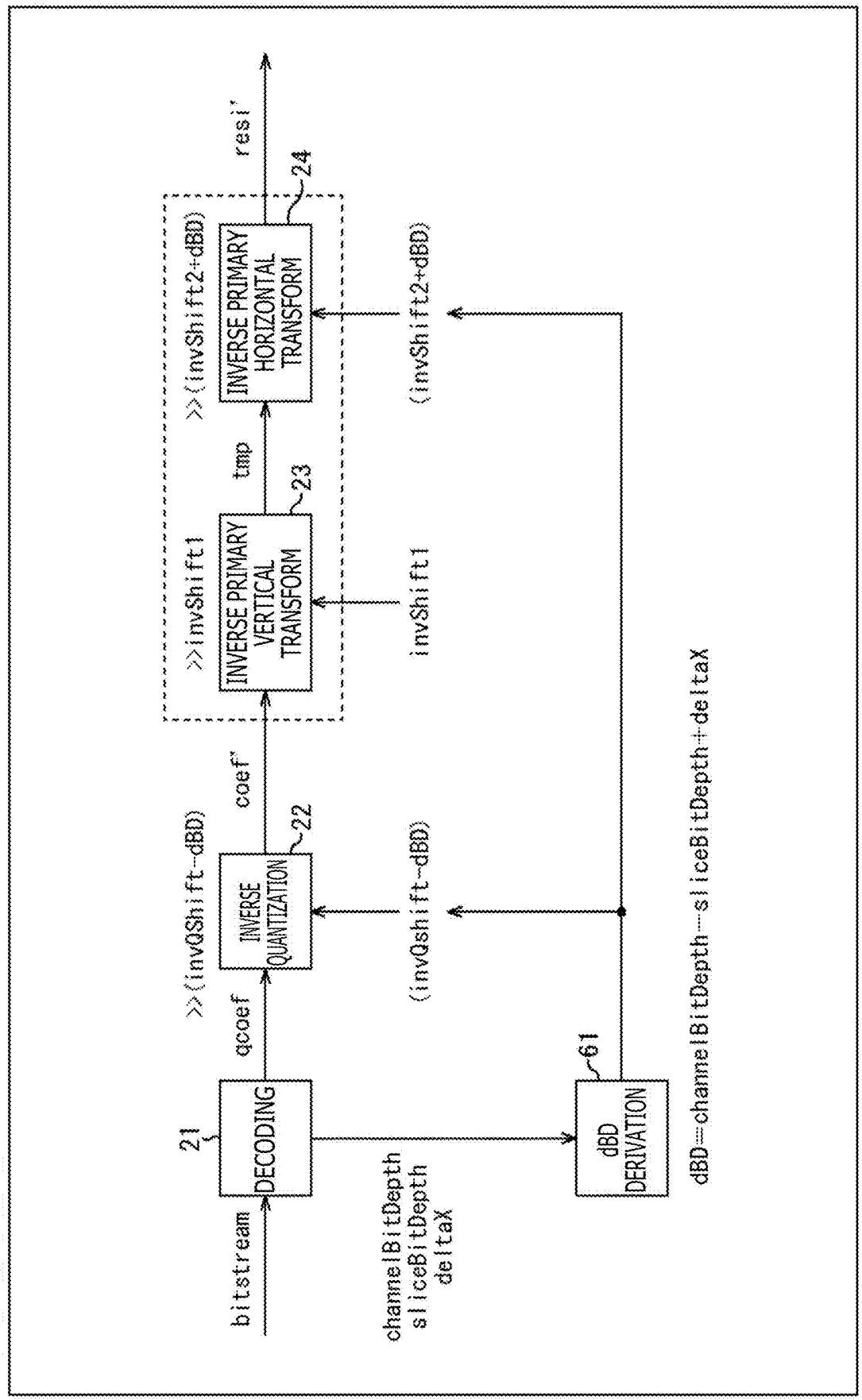
FIG. 11 is a diagram depicting an example of a state of control over computing precision of inverse quantization and inverse orthogonal transform by the method #1.

Moreover, in the case of, for example, the method #1, a series of processing from the decoding 21 to the inverse primary horizontal transform 24 in decoding is performed as depicted in FIG. 11. First, in the decoding 21, the bit stream bitstream is decoded, the quantized coefficient qcoef is obtained, the sequence-level bit depth channelBitDepth and the slice-level bit depth sliceBitDepth are derived, and furthermore, the difference parameter deltaX is obtained.

By use of the sequence-level bit depth channelBitDepth, the slice-level bit depth sliceBitDepth, and the difference parameter deltaX, dBD derivation 61 in which the extension bit precision dBD is derived is performed. In the dBD derivation 61, the extension bit precision dBD is derived using those parameters as represented by the following Equation (5).

$$dBD=\text{channelBitDepth}-\text{sliceBitDepth}+\text{deltaX} \qquad (5)$$

In the inverse quantization 22, a controlled variable (shift amount) of the number of significant figures of the sequence level is corrected by use of the extension bit precision dBD. In other words, the number of significant figures of the transform coefficient coef is controlled using the inverse quantization shift amount invQShift of the sequence level and the extension bit precision dBD. More specifically, the transform coefficient coef is bit-shifted by (invQShift−dBD) bits (>>(invQShift−dBD)). In other words, the extension bit precision dBD is a correction value of the quantization shift amount invQShift that is a controlled variable of the number of significant figures of the transform coefficient coef and a controlled variable of the number of significant figures of the quantized coefficient qcoef set per sequence of the input image.

In the inverse primary vertical transform 23, the number of significant figures of the coefficient data tmp is controlled by use of an inverse primary vertical transform shift amount invShift1 of the sequence level. More specifically, the coefficient data tmp is bit-shifted by invShift1 bits (>>invShift1).

In the inverse primary horizontal transform 24, a controlled variable (shift amount) of the number of significant figures of the sequence level is controlled by use of the extension bit precision dBD. In other words, the number of significant figures of a prediction residual resi is controlled using the inverse primary horizontal transform shift amount invShift2 of the sequence level and the extension bit precision dBD. More specifically, the prediction residual resi is bit-shifted by (invShift2+dBD) bits (>>(invShift2+dBD)). In other words, the extension bit precision dBD is a correction value of the inverse primary horizontal transform shift amount invShift2 that is a controlled variable of the number of significant figures of the prediction residual resi and a controlled variable of the number of significant figures of the quantized coefficient set per sequence of the input image.

Figure 12:
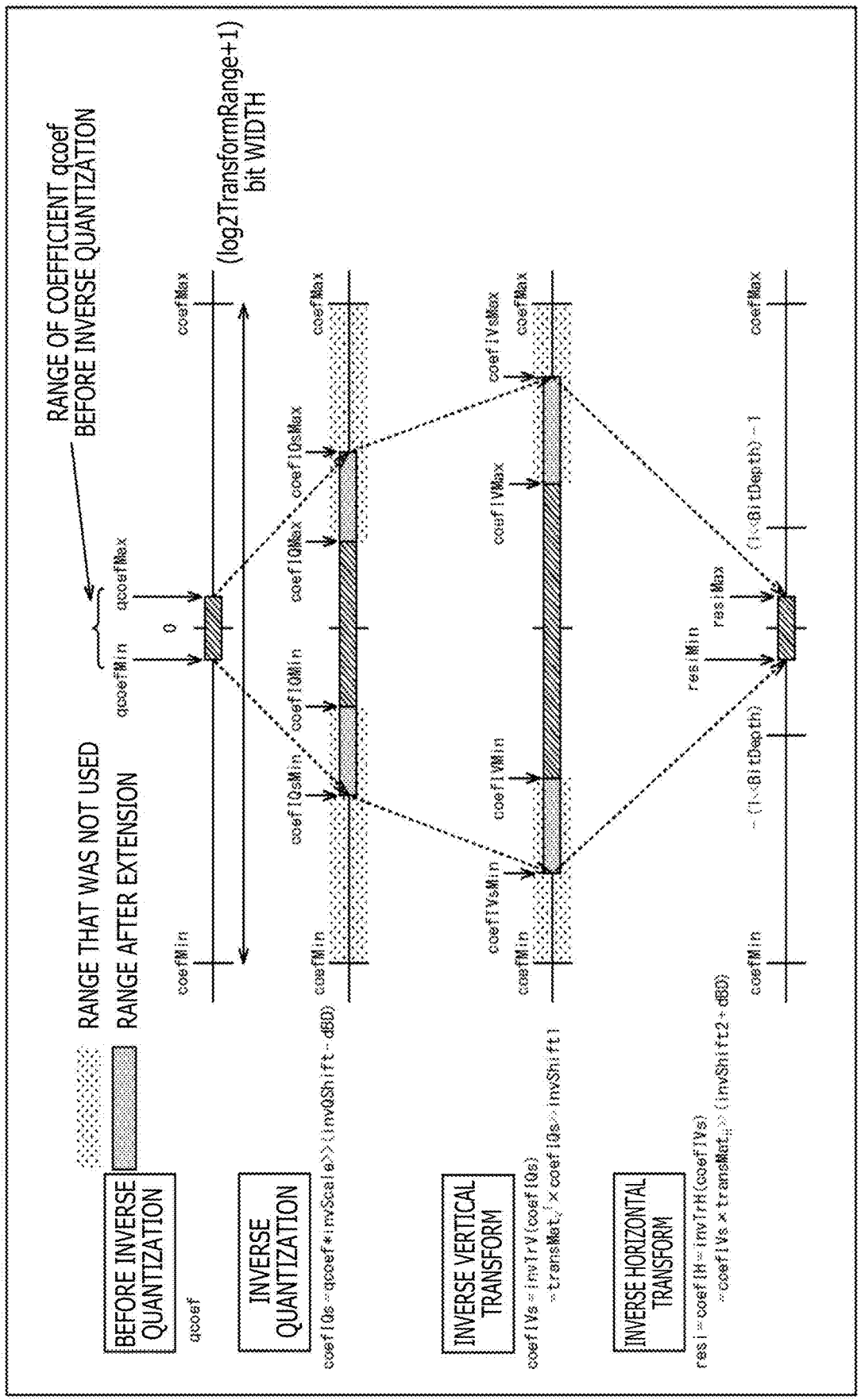
FIG. 12 is a diagram depicting an example of a state of change in computing precision.

In a case of, for example, decoding, the number of significant figures of the coefficient can further be expanded from expansion of the sequence level in each of the inverse quantization processing, the inverse vertical transform processing, and the inverse horizontal transform processing, as depicted in FIG. 12. In other words, it is possible to control the number of significant figures according to a change in the time direction or the spatial direction within a sequence of a bit depth. By expanding the number of significant figures in such way, the computing precision is improved. It is therefore possible to suppress a reduction in encoding efficiency.

It is noted that the control over the number of significant figures within each sequence by use of the extension bit precision dBD is performed in the inverse quantization 22, the inverse primary vertical transform 23, and the inverse primary horizontal transform 24, as described above; thus, in a case of skipping the series of processing, this control over the number of significant figures is also omitted. It is therefore possible to suppress an increase in the number of unnecessary processing and suppress a growth of the load of the processing related to decoding.

Likewise, in a case of encoding, the number of significant figures of the coefficient can further be expanded from expansion of the sequence level in each of the horizontal transform processing, the vertical transform processing, and the quantization processing. In other words, it is possible to control the number of significant figures according to a change in the time direction or the spatial direction within a sequence of a bit depth. By expanding the number of significant figures in such way, the computing precision is improved. It is therefore possible to suppress a reduction in encoding efficiency.

Moreover, as described above, in a case of skipping the primary horizontal transform 11, the primary vertical transform 12, and the quantization 13, this control over the number of significant figures is also omitted; thus, it is possible to suppress an increase in the number of unnecessary processing and suppress a growth of the load of the processing related to encoding.

It is noted that in the case of encoding, similarly to the case of decoding, the number of significant figures is controlled in each of the inverse quantization processing, the inverse vertical transform processing, and the inverse horizontal transform processing. In other words, it is possible to expand the number of significant figures similarly to the case of decoding. In other words, it is possible to improve encoding efficiency of the series of processing and suppress a reduction in encoding efficiency.

<Outline of Method #2>

Figure 13:
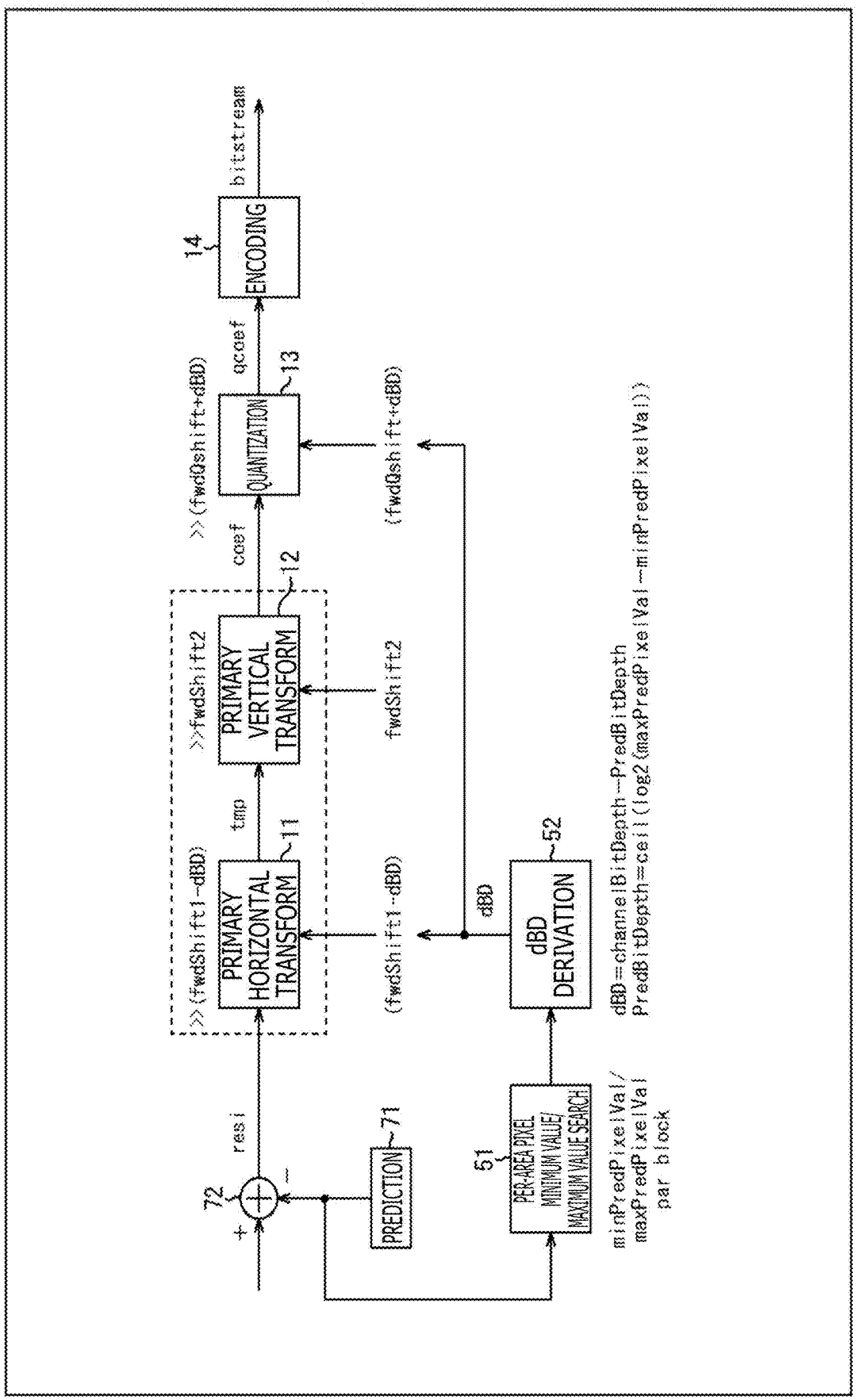
FIG. 13 is a diagram depicting an example of a state of control over computing precision of orthogonal transform and quantization by method #2.

In the case of, for example, the method #2 of FIG. 9, a series of processing from the primary horizontal transform 11 to the encoding 14 in encoding is performed as depicted in FIG. 13. First, per-area pixel minimum value/maximum value search 51 is performed on a predicted image corresponding to the input image obtained by prediction 71, to search a minimum value (minPredPixelVal) and a maximum value (maxPredPixelVal) of pixel values per local level (block).

In addition, dBD derivation 52 is performed using the minimum value (minPredPixelVal) and the maximum value (maxPredPixelVal) of the pixel values per local level of the predicted image detected by this search. In the dBD derivation 52, each local-level bit depth PredBitDepth of a predicted image is derived, for example, by use of the minimum value (minPredPixelVal) and the maximum value (maxPredPixelVal) of the pixel value at each local level of the predicted image, as represented by the following Equation (6).

It is noted that the local-level bit depth PredBitDepth derived in Equation (6) may further be corrected to PredBitDepth=max(minLocalBitDepth, PredBitDepth) by referring to a predetermined threshold minLocalBitDepth (for example, eight), as depicted in Equation (6A). By doing so, it is possible to suppress occurrence of a case in which the extension bit precision dBD derived in subsequent Equation (7) becomes excessively large in value (that is, the number of significant figures is excessively expanded, and intermediate coefficient data exceeds the range from the minimum value coefMin to the maximum value coefMax). It is noted that in Equation (6A), the operator max (x, y) is an operator that returns a larger value out of numeric values x and y.

$$\text{PredBitDepth}=\text{ceil}(\log 2(\text{maxPredPixelVal}-\text{minPredPixelVal})) \quad (6)$$

$$\text{PredBitDepth}=\max(\text{minLocalBitDepth},\text{PredBitDepth}) \quad (6A)$$

In addition, the extension bit precision dBD is derived as represented by the following Equation (7), by using the local-level bit depth PredBitDepth of the predicted image and the sequence-level bit depth channelBitDepth.

$$dBD=\text{channelBitDepth}-\text{PredBitDepth} \quad (7)$$

The predicted image obtained by the prediction 71 is subtracted from the input image by computing 72, and the prediction residual resi is obtained.

Each processing of the primary horizontal transform 11, the primary vertical transform 12, and the quantization 13 is performed on this prediction residual resi similarly to the case of the method #1 (FIG. 10). It is noted, however, that in the case of this method #2, the processing of the deltaX derivation 53 is omitted, and the processing related to encoding of the difference parameter deltaX is omitted in the encoding 14. In other words, in the case of the method #2, transmission of the difference parameter deltaX from the encoding side to the decoding side is omitted.

It is noted that the control over the number of significant figures within each sequence by use of the extension bit precision dBD described above is performed in the primary horizontal transform 11, the primary vertical transform 12, and the quantization 13; thus, in a case of skipping the series of processing, this control over the number of significant figures is also omitted.

Figure 14:
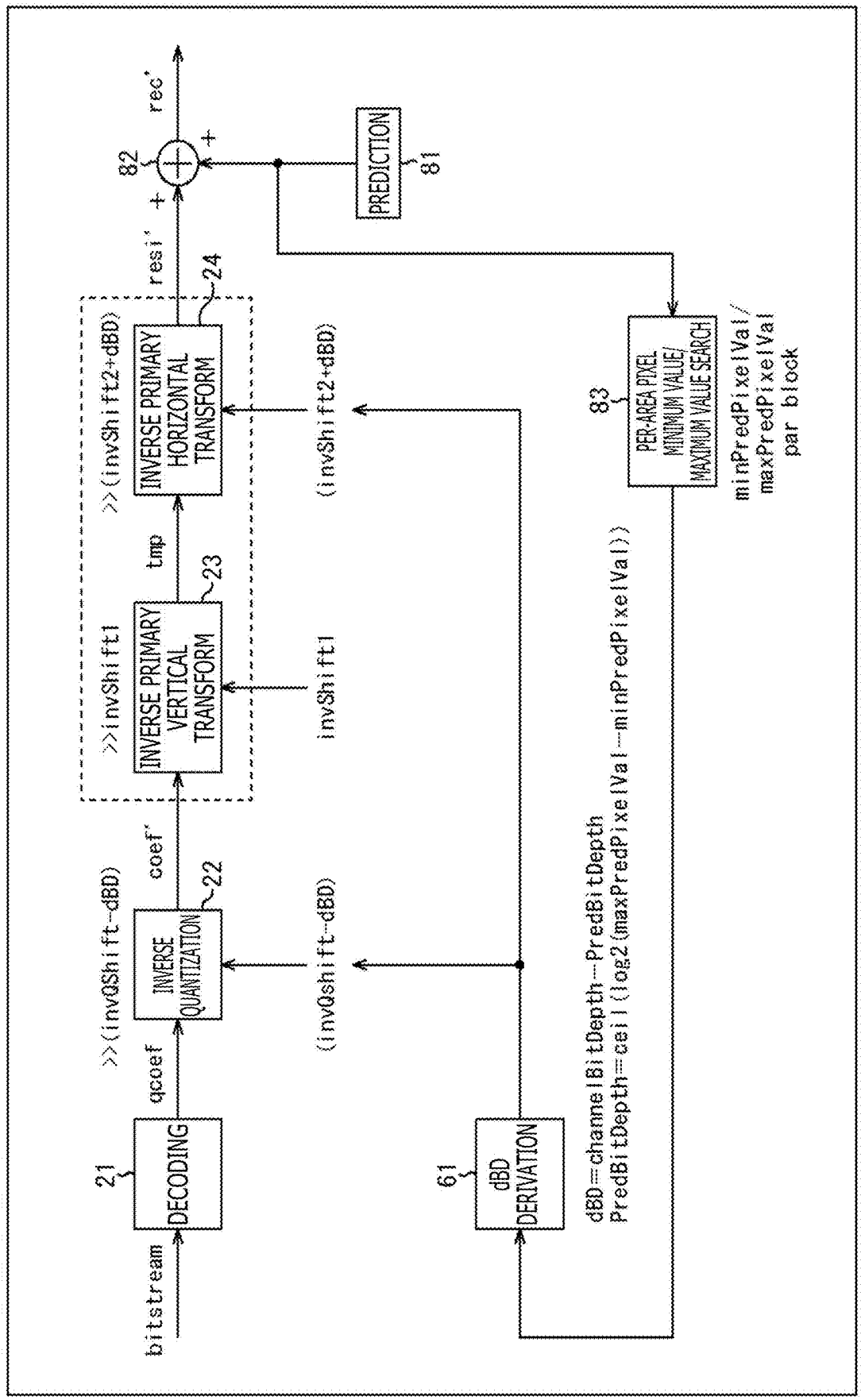
FIG. 14 is a diagram depicting an example of a state of control over computing precision of inverse quantization and inverse orthogonal transform by the method #2.

Moreover, in the case of, for example, the method #2, a series of processing from the decoding 21 to the inverse primary horizontal transform 24 in decoding is performed as depicted in FIG. 14. In this case, the derivation of the slice-level bit depth sliceBitDepth and the decoding of the difference parameter deltaX in the decoding 21 are omitted.

Furthermore, per-area pixel minimum value/maximum value search 83 is performed on the predicted image obtained by prediction 81, to obtain a minimum value (minPredPixelVal) and a maximum value (maxPredPixelVal) of a pixel value per local level (block).

In addition, the dBD derivation 61 is performed using the minimum value (minPredPixelVal) and the maximum value (maxPredPixelVal) of the pixel values per local level of the predicted image detected by this search. In the dBD derivation 61, for example, each local-level bit depth PredBitDepth of the predicted image is derived as represented by the above Equations (6) and (6A). In addition, the extension bit precision dBD is derived as represented by the above Equation (7).

Each processing of the inverse quantization 22, the inverse primary vertical transform 23, and the inverse primary horizontal transform 24 is performed on the quantized coefficient qcoef obtained by the decoding 21, similarly to the case of the method #1 (FIG. 11).

Computing 82 is performed on the prediction residual resi obtained by the inverse primary horizontal transform 24, to add the predicted image obtained by the prediction 81 to the prediction residual resi, and a decoded image rec' is obtained.

In the case of decoding, it is possible to control the number of significant figures according to a change in the time direction or the spatial direction within a sequence of a bit depth, similarly to the case of decoding of the method #1 depicted in FIG. 12. By expanding the number of significant figures in such way, the computing precision is improved. It is therefore possible to suppress a reduction in encoding efficiency.

It is noted that the control over the number of significant figures within each sequence by use of the extension bit precision dBD described above is performed in the inverse quantization 22, the inverse primary vertical transform 23, and the inverse primary horizontal transform 24; thus, in a case of skipping the series of processing, this control over the number of significant figures is also omitted. It is therefore possible to suppress an increase in the number of unnecessary processing and suppress a growth of the load of the processing related to decoding.

Furthermore, in the case of encoding, similarly to the case of the method #1, the number of significant figures of the coefficient can further be expanded from expansion of the sequence level in each of the horizontal transform processing, the vertical transform processing, and the quantization processing. In other words, it is possible to control the number of significant figures according to a change in the time direction or the spatial direction within a sequence of a bit depth. By expanding the number of significant figures in such way, the computing precision is improved. It is therefore possible to suppress a reduction in encoding efficiency.

Moreover, as described above, in the case of skipping the primary horizontal transform 11, the primary vertical transform 12, and the quantization 13, this control over the number of significant figures is also omitted; thus, it is possible to suppress an increase in the number of unnecessary processing and suppress a growth of the load of the processing related to encoding.

It is noted that in the case of encoding, similarly to the case of decoding, the number of significant figures is controlled in each of the inverse quantization processing, the inverse vertical transform processing, and the inverse horizontal transform processing. In other words, it is possible to expand the number of significant figures similarly to the case of decoding. In other words, it is possible to improve encoding efficiency of the series of processing and suppress a reduction in encoding efficiency.

It is noted that in the method #2, the local-level bit depth of a block to be processed is derived by Equations (6) and (6A) by reference to the predicted image corresponding to the block to be processed obtained in the prediction 71 (81) as depicted in FIG. 13 (FIG. 14). Alternatively, the local bit depth of the block to be processed may be derived using the decoded image referred to at the time of generation of the predicted image, as an alternative to the predicted image (method #2').

In other words, in FIG. 13 (FIG. 14), the per-area pixel minimum value/maximum value search 51 (83) is performed on a decoded image $Rec_{ref}$ referred to at the time of generation of the predicted image in the prediction 71 (81), to search a minimum value (minRecPixelVal) and a maximum value (maxRecPixelVal) of pixel values per local level (block). Subsequently, the dBD derivation 61 is performed using the minimum value (minRecPixelVal) and the maximum value (maxRecPixelVal) of pixel values per local level of the decoded image detected by this search. In the dBD derivation 61, each local-level bit depth RecBitDepth of the decoded image is derived as represented by the following Equations (6') and (6A'). In addition, the extension bit precision dBD is derived as represented by Equation (7').

$$RecBitDepth = ceil(\log 2(maxRecPixelVal - minRecPixelVal)) \quad (6')$$

$$RecBitDepth = max(minLocalBitDepth, recBitDepth) \quad (6A')$$

$$dBD = channelBitDepth - RecBitDepth \quad (7')$$

By doing so, the method #2' can exhibit advantageous effects similar to those of the method of deriving the extension bit precision dBD by referring to the predicted image (method #2). It is noted that the advantage of the method #2' over the method #2 is that the extension bit precision dBD can be derived only from the decoded image without the need to generate the predicted image.

It is noted that the decoded image $Rec_{ref}$ in the above description indicates a local decoded pixel area referred to for generation of an intra predicted image of a block to be processed in a case of intra prediction and indicates a local decoded pixel area referred to for generation of an inter predicted image of the block to be processed in a case of inter prediction.

3. First Embodiment

<Image Encoding Apparatus>

Figure 15:
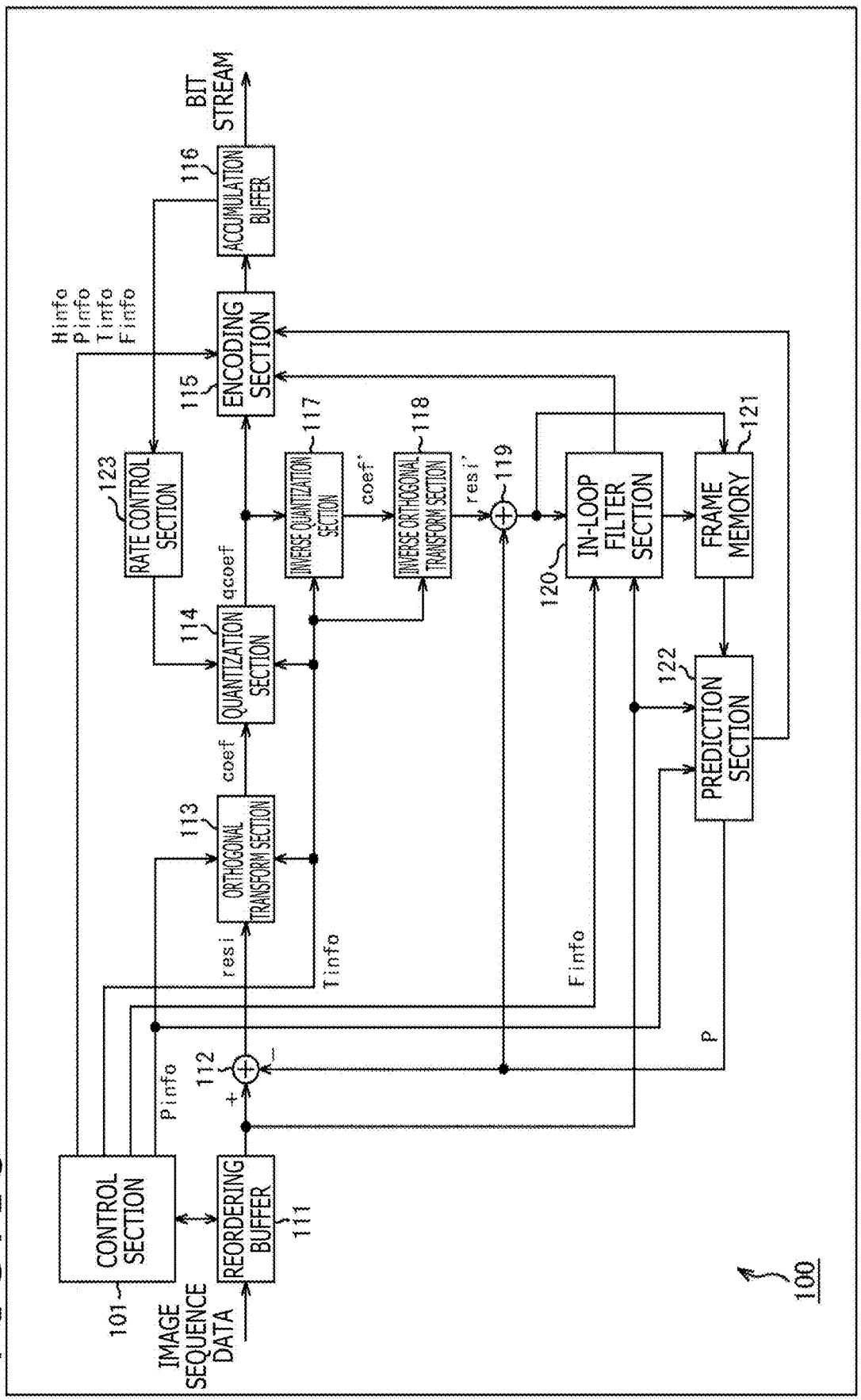
FIG. 15 is a block diagram depicting an example of principal configurations of an image encoding apparatus.

In the first embodiment, details of the method #1 described above will be described. First, configurations of exercising such control over the computing precision at the time of encoding will be described. FIG. 15 is a block diagram depicting an example of configurations of an image encoding apparatus according to one aspect of an image processing apparatus to which the present technology is applied. An image encoding apparatus 100 depicted in FIG. 15 is an apparatus that encodes image data regarding an image sequence. For example, the image encoding apparatus 100 implements the technologies described in NPL 1 to NPL 3 and encodes image data regarding an image sequence by a method compliant with standards described in any of those documents.

It is noted that principal configurations such as processing sections and flows of data depicted in FIG. 15 are not necessarily all configurations. In other words, processing sections that are not depicted as blocks in FIG. 15 may be present or processing and flows of data that are not indicated by arrows or the like in FIG. 15 may be present in the image encoding apparatus 100. This applies to other drawings for illustrating processing sections and the like within the image encoding apparatus 100.

As depicted in FIG. 15, the image encoding apparatus 100 has a control section 101, a reordering buffer 111, a computing section 112, an orthogonal transform section 113, a quantization section 114, an encoding section 115, an accumulation buffer 116, an inverse quantization section 117, an inverse orthogonal transform section 118, a computing section 119, an in-loop filter section 120, a frame memory 121, a prediction section 122, and a rate control section 123.

<Control Section>

The control section 101 segments image sequence data held in the reordering buffer 111 into blocks (such as CUs, PUs, or transform blocks) that are processing units, on the basis of an external block size or a block size of each processing unit designated in advance. In addition, the control section 101 determines encoding parameters (such as header information Hinfo, prediction mode information Pinfo, transform information Tinfo, and filter information Finfo) to be supplied to the blocks, on the basis of, for example, RDO (Rate-Distortion Optimization).

Details of these encoding parameters will be described later. Upon determining the encoding parameters described above, the control section 101 supplies those encoding parameters to the blocks. Specifically, the control section 101 supplies the encoding parameters as follows.

The header information Hinfo is supplied to each block.

The prediction mode information Pinfo is supplied to the encoding section 115 and the prediction section 122.

The transform information Tinfo is supplied to the encoding section 115, the orthogonal transform section 113, the quantization section 114, the inverse quantization section 117, and the inverse orthogonal transform section 118.

The filter information Finfo is supplied to the in-loop filter section 120.

<Reordering Buffer>

Fields (input images) of the image sequence data are input to the image encoding apparatus 100 in order of reproduction (order of display). The reordering buffer 111 acquires and holds (stores) the input images in the order of reproduction (order of display). The reordering buffer 111 reorders the input images in order of encoding (order of decoding) or segments each of the input images into blocks as processing units, under control of the control section 101. The reordering buffer 111 supplies each processed input image to the computing section 112. In addition, the reordering buffer 111 supplies the input image (original image) to the prediction section 122 and the in-loop filter section 120.

<Computing Section>

An image I corresponding to each block as the processing unit and a predicted image P supplied from the prediction section 122 are input to the computing section 112, and the computing section 112 subtracts the predicted image P from an image rec as represented by the following Equation (8), derives a prediction residual resi, and supplies the prediction residual resi to the orthogonal transform section 113.

$$resi=rec-P \quad (8)$$

<Orthogonal Transform Section>

The prediction residual resi supplied from the computing section 112 and the transform information Tinfo supplied from the control section 101 are input to the orthogonal transform section 113, and the orthogonal transform section 113 orthogonally transforms the prediction residual resi on the basis of the transform information Tinfo and derives the transform coefficient coef. The orthogonal transform section 113 supplies the obtained transform coefficient coef to the quantization section 114.

<Quantization Section>

The transform coefficient coef supplied from the orthogonal transform section 113 and the transform information Tinfo supplied from the control section 101 are input to the quantization section 114, and the quantization section 114 scales (quantizes) the transform coefficient coef on the basis of the transform information Tinfo. It is noted that a rate of this quantization is controlled by the rate control section 123. The quantization section 114 supplies the quantized transform coefficient obtained by such quantization, that is, quantized coefficient qcoef, to the encoding section 115 and the inverse quantization section 117.

<Encoding Section>

The quantized coefficient qcoef supplied from the quantization section 114, various encoding parameters (such as the header information Hinfo, the prediction mode information Pinfo, the transform information Tinfo, and the filter information Finfo) supplied from the control section 101, information associated with filters such as filter coefficients supplied from the in-loop filter section 120, and information associated with an optimum prediction mode supplied from the prediction section 122 are input to the encoding section 115. The encoding section 115 performs variable-length encoding (for example, arithmetic encoding) on the quantized coefficient qcoef and generates a bit sequence (encoded data).

In addition, the encoding section 115 derives residual information Rinfo from the quantized coefficient qcoef, encodes the residual information Rinfo, and generates a bit sequence.

Further, the encoding section 115 contains the information associated with the filters supplied from the in-loop filter section 120 in the filter information Finfo and contains the information associated with the optimum prediction mode supplied from the prediction section 122 in the prediction mode information Pinfo. The encoding section 115 then encodes the various encoding parameters (such as the header information Hinfo, the prediction mode information Pinfo, the transform information Tinfo, and the filter information Finfo) described above and generates bit sequences.

Moreover, the encoding section 115 multiplexes the bit sequences of the various kinds of information generated as described above and generates encoded data. The encoding section 115 supplies the encoded data to the accumulation buffer 116.

<Accumulation Buffer>

The accumulation buffer 116 temporarily holds the encoded data obtained by the encoding section 115. The accumulation buffer 116 outputs the encoded data it holds to outside of the image encoding apparatus 100 as, for example, a bit stream at a predetermined timing. This encoded data is transmitted, for example, to a decoding side via a freely-selected recording medium, a freely-selected transmission medium, a freely-selected information processing apparatus, and the like. In other words, the accumulation buffer 116 also serves as a transmission section that transmits the encoded data (bit stream).

<Inverse Quantization Section>

The inverse quantization section 117 performs processing associated with inverse quantization. For example, the quantized coefficient qcoef supplied from the quantization section 114 and the transform information Tinfo supplied from the control section 101 are input to the inverse quantization section 117, and the inverse quantization section 117 scales (inversely quantizes) a value of the quantized coefficient qcoef on the basis of the transform information Tinfo. It is noted that this inverse quantization is inverse processing of the quantization performed by the quantization section 114. The inverse quantization section 117 supplies transform coefficient coef' obtained by such inverse quantization to the inverse orthogonal transform section 118.

<Inverse Orthogonal Transform Section>

The inverse orthogonal transform section 118 performs processing associated with inverse orthogonal transform. For example, the transform coefficient coef' supplied from the inverse quantization section 117 and the transform information Tinfo supplied from the control section 101 are input to the inverse orthogonal transform section 118, and the inverse orthogonal transform section 118 performs inverse orthogonal transform on the transform coefficient coef' on the basis of the transform information Tinfo and derives a prediction residual resi'. It is noted that this inverse orthogonal transform is inverse processing of the orthogonal transform performed by the orthogonal transform section 113. The inverse orthogonal transform section 118 supplies the prediction residual resi' obtained by such inverse orthogonal transform to the computing section 119. It is noted that description to be given (below) with respect to the decoding side can be applied to the inverse orthogonal transform section 118 since the inverse orthogonal transform section 118 is similar to an inverse orthogonal transform section on the decoding side (to be described below).

<Computing Section>

The prediction residual resi' supplied from the inverse orthogonal transform section 118 and the predicted image P supplied from the prediction section 122 are input to the computing section 119. The computing section 119 adds up the prediction residual resi' and the predicted image P corresponding to the prediction residual resi' and derives a local decoded image $R_{local}$. The computing section 119 supplies the derived local decoded image $R_{local}$ to the in-loop filter section 120 and the frame memory 121.

<In-Loop Filter Section>

The in-loop filter section 120 performs processing associated with in-loop filter processing. For example, the local decoded image $R_{local}$ supplied from the computing section 119, the filter information Finfo supplied from the control section 101, and the input image (original image) supplied from the reordering buffer 111 are input to the in-loop filter section 120. It is noted that information to be input to the in-loop filter section 120 can be any information, and information other than these pieces of information may be input to the in-loop filter section 120. For example, information regarding a prediction mode, motion information, a code amount target value, a quantization parameter QP, a picture type, blocks (CUs, CTUs, or the like), and the like may be input to the in-loop filter section 120, as needed.

The in-loop filter section 120 performs filter processing on the local decoded image $R_{local}$ on the basis of the filter information Finfo, as appropriate. The in-loop filter section 120 uses the input image (original image) and other pieces of input information in the filter processing, as needed.

For example, the in-loop filter section 120 applies four in-loop filters which are a bilateral filter, a deblocking filter (DBF (DeBlocking Filter)), an adaptive offset filter (SAO (Sample Adaptive Offset), and an adaptive loop filter (ALF (Adaptive Loop Filter)), in this order. It is noted that the specific filters to be applied and order of application thereof can be selected freely, and selection can be made as appropriate.

Needless to say, the filter processing to be performed by the in-loop filter section 120 can be selected freely and is not limited to an example described above. For example, the in-loop filter section 120 may apply a Wiener filter and the like.

The in-loop filter section 120 supplies the filter-processed local decoded image $R_{local}$ to the frame memory 121. It is noted that in a case of transmitting, for example, the information associated with filters such as filter coefficients to the decoding side, the in-loop filter section 120 supplies the information associated with filters to the encoding section 115.

<Frame Memory>

The frame memory 121 performs processing associated with storage of data related to images. For example, the local decoded image $R_{local}$ supplied from the computing section 119 and the filter-processed local decoded image $R_{local}$ supplied from the in-loop filter section 120 are input to the frame memory 121, and the frame memory 121 stores the images. In addition, the frame memory 121 reconstructs a decoded image R per picture unit by using the local decoded image $R_{local}$ and holds the decoded image R (stores the decoded image R in a buffer within the frame memory 121). The frame memory 121 supplies the decoded image R (or part of the decoded image R) to the prediction section 122 in response to a request of the prediction section 122.

<Prediction Section>

The prediction section 122 performs processing associated with generation of a predicted image. For example, the prediction mode information Pinfo supplied from the control section 101, the input image (original image) supplied from the reordering buffer 111, and the decoded image R (or part of the decoded image R) read out from the frame memory 121 are input to the prediction section 122. The prediction section 122 performs prediction processing such as inter prediction or intra prediction by using the prediction mode information Pinfo and the input image (original image), performs prediction while referring to the decoded image R as a reference image, performs motion compensation processing on the basis of a result of the prediction, and generates the predicted image P. The prediction section 122 supplies the generated predicted image P to the computing sections 112 and 119. In addition, the prediction section 122 supplies a prediction mode selected by the processing described above, that is, the information associated with the optimum prediction mode, to the encoding section 115, as needed.

<Rate Control Section>

The rate control section 123 performs processing associated with rate control. For example, the rate control section 123 controls a rate of a quantization operation performed by the quantization section 114, on the basis of a code amount of the encoded data accumulated in the accumulation buffer 116, in such a manner as not to generate overflow or underflow.

In the image encoding apparatus 100 configured as described above, the control section 101, the orthogonal transform section 113, the quantization section 114, the encoding section 115, the inverse quantization section 117, and the inverse orthogonal transform section 118 perform processing to which the present technology is applied (processing associated with control over the number of significant figures within a sequence) as described above.

For example, the control section 101 generates information associated with this control over the number of significant figures. The control section 101 generates, for example, the sequence-level bit depth channelBitDepth (also referred to as a "sequence bit depth"), the slice-level bit depth sliceBitDepth (also referred to as a "slice bit depth"), the extension bit precision dBD per local level, and the difference parameter deltaX corresponding to each extension bit precision dBD, as the information associated with this control over the number of significant figures.

The control section 101 supplies these pieces of information to predetermined processing sections. The control section 101 supplies, for example, the sequence bit depth channelBitDepth and the extension bit precision dBD to the orthogonal transform section 113, the quantization section 114, the inverse quantization section 117, and the inverse orthogonal transform section 118, as the transform information Tinfo.

In addition, the control section 101 supplies, for example, the sequence bit depth channelBitDepth, the slice bit depth sliceBitDepth, and the difference parameter deltaX to the encoding section 115. It is noted that the control section 101 supplies a value (luminance sequence bit depth bit_depth_luma_minus8 and a chrominance sequence bit depth bit_depth_chroma_minus8) obtained by subtracting a predetermined value (for example, eight) from the sequence bit depth channelBitDepth, as an alternative to the sequence bit depth channelBitDepth, to the encoding section 115, as the information associated with the sequence bit depth. In addition, the control section 101 supplies the minimum value slice_min_val and the maximum value slice_max_val of the slice level of pixel values of the input image, as an alternative to the slice bit depth sliceBitDepth, to the encoding section 115, as the information associated with the slice-level bit depth. It is noted that the control section 101 supplies the difference parameter deltaX to the encoding section 115, as information associated with the extension bit precision.

The orthogonal transform section 113 performs the orthogonal transform as described above and controls the computing precision (the number of significant figures of coefficient data) according to a change of the bit depth in the time direction or the spatial direction within the sequence, on the basis of the sequence bit depth channelBitDepth and the extension bit precision dBD supplied from the control section 101 as the transform information Tinfo. For example, the orthogonal transform section 113 controls the number of significant figures of the coefficient data by bit-shifting the coefficient data by the shift amount according to the local-level bit depth (shift amount according to the extension bit precision dBD).

The quantization section 114 performs quantization as described above and controls the computing precision (number of significant figures of the coefficient data) according to the change of the bit depth in the time direction or the spatial direction within the sequence, on the basis of the sequence bit depth channelBitDepth and the extension bit precision dBD supplied from the control section 101 as the transform information Tinfo. For example, the quantization section 114 controls the number of significant figures of the quantized coefficient by bit-shifting the quantized coefficient by the shift amount according to the local-level bit depth (shift amount according to the extension bit precision dBD).

The inverse quantization section 117 performs inverse quantization as described above and controls the computing precision (the number of significant figures of the coefficient data) according to the change of the bit depth in the time direction or the spatial direction within the sequence, on the basis of the sequence bit depth channelBitDepth and the extension bit precision dBD supplied from the control section 101 as the transform information Tinfo.

The inverse orthogonal transform section 118 performs inverse orthogonal transform as described above and controls the computing precision (the number of significant figures of coefficient data) according to the change of the bit depth in the time direction or the spatial direction within the sequence, on the basis of the sequence bit depth channelBitDepth and the extension bit precision dBD supplied from the control section 101 as the transform information Tinfo.

The encoding section 115 encodes the information associated with the sequence bit depth, the information associated with the slice bit depth, and the difference parameter deltaX (information associated with the extension bit) that are supplied from the control section 101 and contains the encoded information and parameter in a bit stream (generates a bit stream containing the difference parameter deltaX). For example, the encoding section 115 contains the information associated with the sequence bit depth in a sequence parameter set of the bit stream. In addition, for example, the encoding section 115 contains the information associated with the slice bit depth in a slice header of the bit stream.

Therefore, the image encoding apparatus 100 can suppress a reduction in encoding efficiency.

<Details of Control Section>

Figure 16:
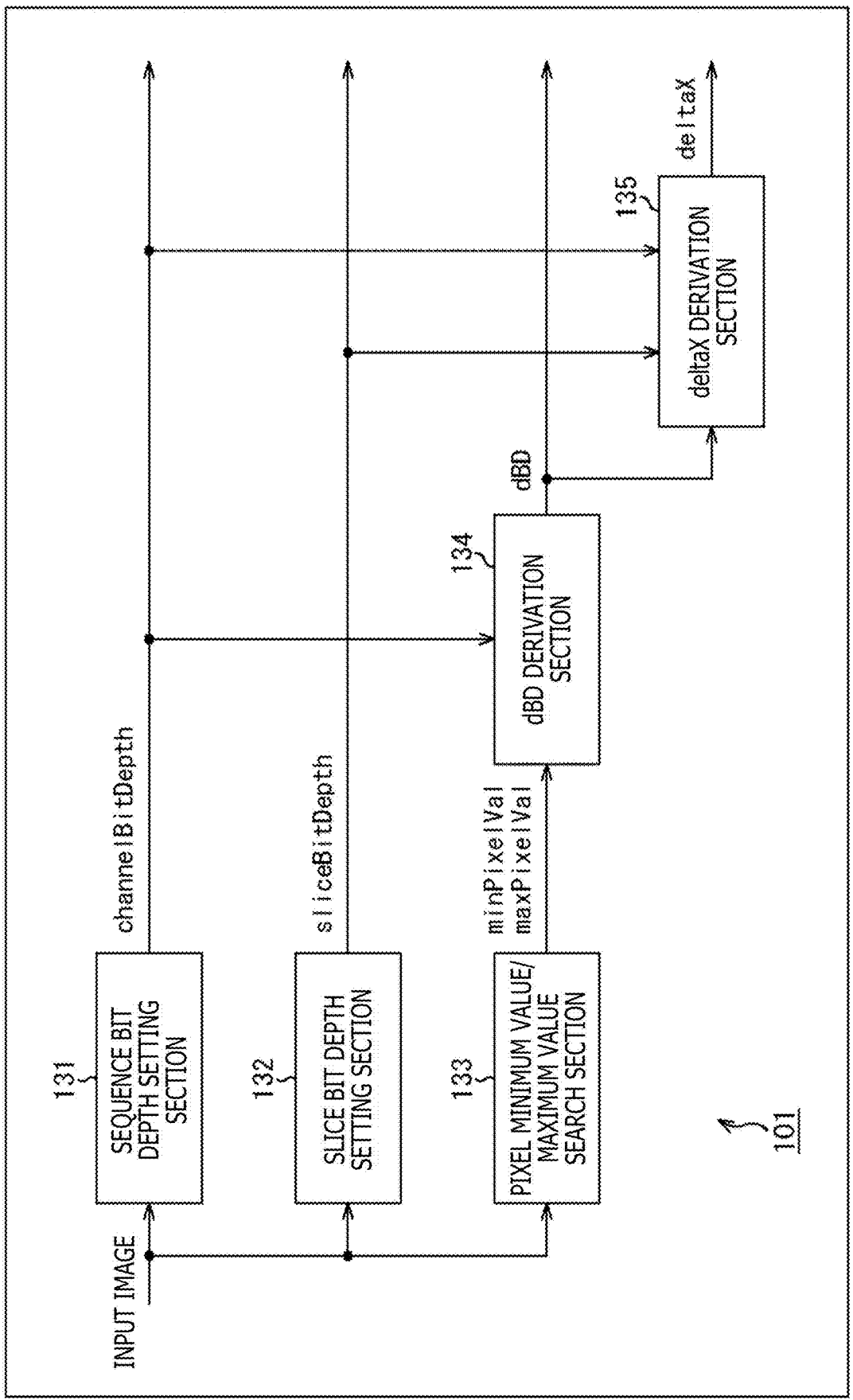
FIG. 16 is a block diagram depicting an example of principal configurations of a control section.

FIG. 16 is a block diagram depicting an example of principal configurations of the control section 101, the principal configurations being related to generation of information associated with control over the number of significant figures. As depicted in FIG. 16, the control section 101 has a sequence bit depth setting section 131, a slice bit depth setting section 132, a pixel minimum value/maximum value search section 133, a dBD derivation section 134, and a deltaX derivation section 135. While the control section 101 performs processing other than the generation of the information associated with the control over the number of significant figures such as generation of other pieces of information as described above, description of configurations with respect to those series of processing is omitted.

The input image from the reordering buffer 111 is input to the sequence bit depth setting section 131, and the sequence bit depth setting section 131 sets the sequence bit depth channelBitDepth on the basis of external parameters. The sequence bit depth setting section 131 supplies the set sequence bit depth channelBitDepth to the dBD derivation section 134 and the deltaX derivation section 135. In addition, the sequence bit depth setting section 131 supplies the sequence bit depth channelBitDepth to the orthogonal transform section 113, the quantization section 114, the inverse quantization section 117, and the inverse orthogonal transform section 118, as the transform information Tinfo. Furthermore, the sequence bit depth setting section 131 generates the information associated with the sequence bit depth and supplies the information to the encoding section 115.

The input image from the reordering buffer 111 is input to the slice bit depth setting section 132, and the slice bit depth setting section 132 sets the slice bit depth sliceBitDepth. The slice bit depth setting section 132 supplies the set slice bit depth sliceBitDepth to the deltaX derivation section 135. In addition, the slice bit depth setting section 132 supplies the information associated with the slice bit depth to the encoding section 115.

The input image from the reordering buffer 111 is input to the pixel minimum value/maximum value search section 133, and the pixel minimum value/maximum value search section 133 searches the minimum value (minPixelVal) and the maximum value (maxPixelVal) of pixel values of the input image per local level that is a data unit smaller than the sequence level. The pixel minimum value/maximum value search section 133 supplies the minimum value (minPixel- Val) and the maximum value (maxPixelVal) of each local level detected by the search to the dBD derivation section 134.

The sequence bit depth channelBitDepth supplied from the sequence bit depth setting section 131 and the minimum value (minPixelVal) and the maximum value (maxPixelVal) supplied from the pixel minimum value/maximum value search section 133 are input to the dBD derivation section 134, and the dBD derivation section 134 derives the extension bit precision dBD per local level on the basis of those parameters.

The dBD derivation section 134 supplies the derived extension bit precision dBD to the deltaX derivation section 135. In addition, the dBD derivation section 134 supplies the derived extension bit precision dBD to the orthogonal transform section 113, the quantization section 114, the inverse quantization section 117, and the inverse orthogonal transform section 118, as the transform information Tinfo.

The extension bit precision dBD supplied from the dBD derivation section 134 is input to the deltaX derivation section 135, and the deltaX derivation section 135 derives the difference parameter deltaX. The deltaX derivation section 135 supplies the derived difference parameter deltaX to the encoding section 115 as the information associated with the extension bit precision.

<Details of Orthogonal Transform Section>

Figure 17:
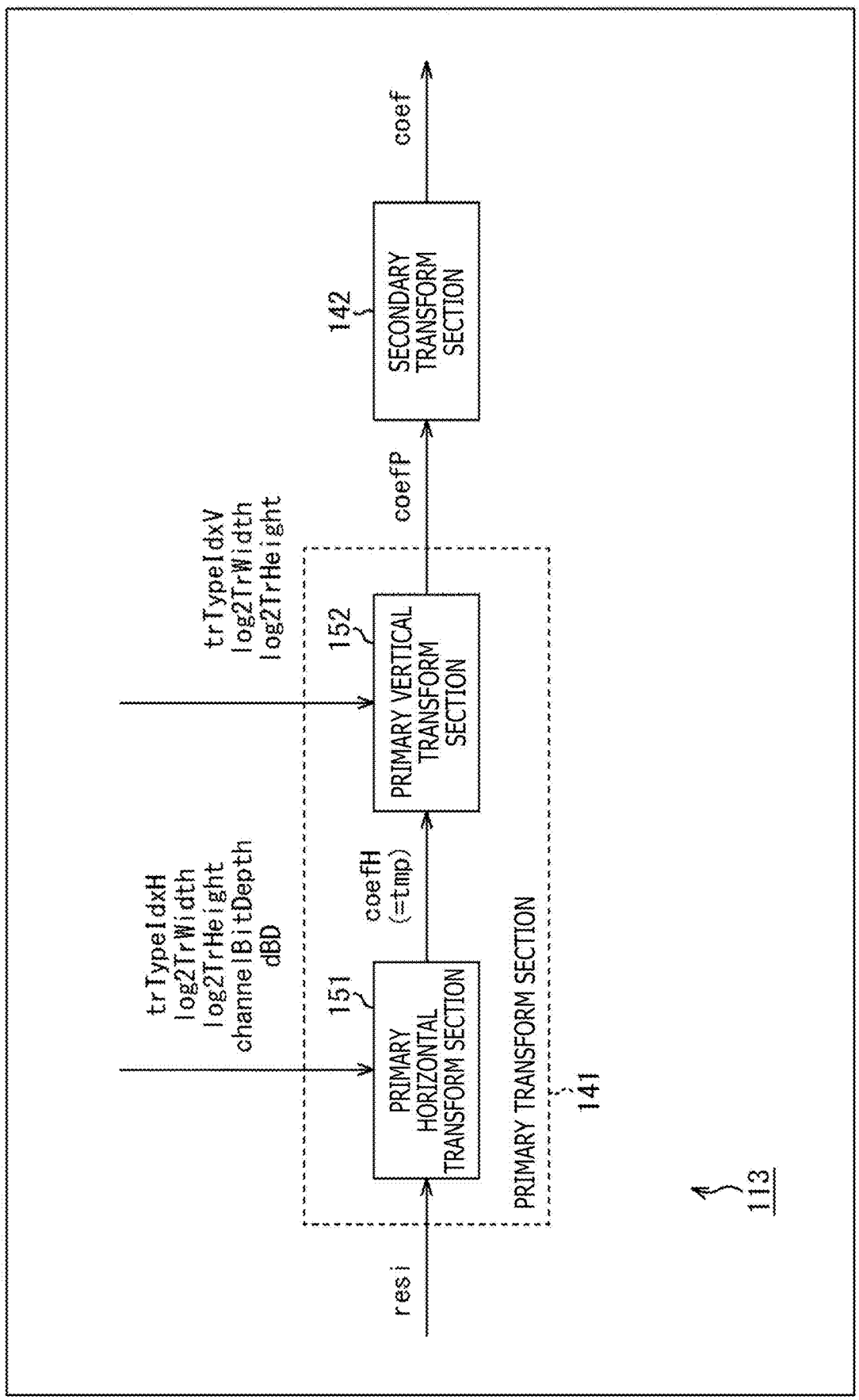
FIG. 17 is a block diagram depicting an example of principal configurations of an orthogonal transform section.

FIG. 17 is a block diagram depicting an example of principal configurations of the orthogonal transform section 113 of FIG. 15. As depicted in FIG. 17, the orthogonal transform section 113 has a primary transform section 141 and a secondary transform section 142.

The primary transform section 141 performs, for example, processing associated with primary transform that is predetermined transform processing such as orthogonal transform. For example, the prediction residual resi, the transform information Tinfo, the prediction mode information Pinfo (not depicted), and the like are input to the primary transform section 141, and the primary transform section 141 performs primary transform on the prediction residual resi and supplies obtained coefficient data coefP to the secondary transform section 142. Furthermore, at a time of the primary transform, pieces of information such as transform type identifiers trTypeIdxH and trTypeIdxV, a horizontal size log 2TrWidth of a transform block, a vertical size log 2TrHeight of the transform block, the sequence bit depth channelBitDepth, and the extension bit precision dBD are input to the primary transform section 141, and the primary transform section 141 controls the number of significant figures of a coefficient (controls the computing precision) according to the change of the bit depth in the time direction or the spatial direction within the sequence, on the basis of those pieces of information.

As depicted in FIG. 17, the primary transform section 141 has a primary horizontal transform section 151 and a primary vertical transform section 152.

The primary horizontal transform section 151 performs processing associated with primary horizontal transform that is one-dimensional transform in a horizontal direction. For example, the prediction residual resi, the transform information Tinfo, the prediction mode information Pinfo (not depicted), and the like are input to the primary horizontal transform section 151, and the primary horizontal transform section 151 performs primary horizontal transform on the prediction residual resi and supplies obtained coefficient data coefH (=tmp) to the primary vertical transform section 152.

At that time, the pieces of information such as the transform type identifier trTypeIdxH of the primary horizontal transform, the horizontal size log 2TrWidth of the transform block, the vertical size log 2TrHeight of the transform block, and the extension bit precision dBD are input to the primary horizontal transform section 151, and the primary horizontal transform section 151 controls the number of significant figures of the coefficient (controls the computing precision) according to the change of the bit depth in the time direction or the spatial direction within the sequence on the basis of those pieces of information.

The primary vertical transform section 152 performs processing associated with primary vertical transform that is one-dimensional transform in a vertical direction. For example, the coefficient data coefH (=tmp), the transform information Tinfo, the prediction mode information Pinfo (not depicted), and the like are input to the primary vertical transform section 152, and the primary vertical transform section 152 performs primary vertical transform on the coefficient data coefH and supplies obtained coefficient data coefP to the secondary transform section 142.

At that time, the pieces of information such as the transform type identifier trTypeIdxV of the primary vertical transform, the horizontal size log 2TrWidth of the transform block, and the vertical size log 2TrHeight of the transform block are input to the primary vertical transform section 152, and the primary vertical transform section 152 controls the number of significant figures per sequence (controls the computing precision) on the basis of those pieces of information.

The secondary transform section 142 performs processing associated with secondary transform that is predetermined transform processing such as orthogonal transform. For example, the coefficient data coefP, the transform information Tinfo (not depicted), the prediction mode information Pinfo (not depicted), and the like are input to the secondary transform section 142, and the secondary transform section 142 performs secondary transform on the coefficient data coefP and supplies the obtained coefficient data coefP to the quantization section 114.

It is noted that the primary transform section 141, the secondary transform section 142, the primary horizontal transform section 151, and the primary vertical transform section 152 may each skip (omit) its own processing.

<Primary Horizontal Transform Section>

Figure 18:
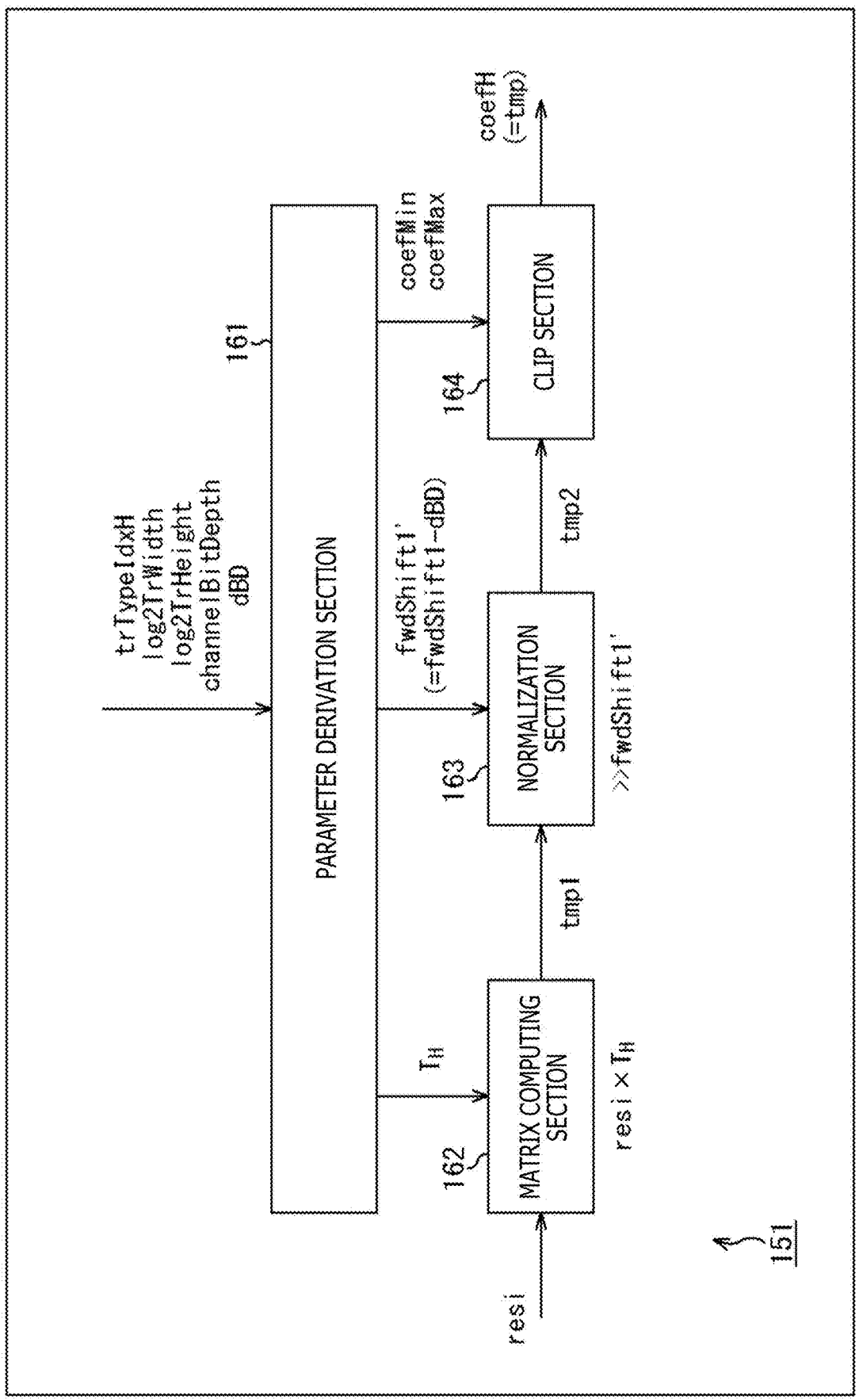
FIG. 18 is a block diagram depicting an example of principal configurations of a primary horizontal transform section.

FIG. 18 is a block diagram depicting an example of principal configurations of the primary horizontal transform section 151. As depicted in FIG. 18, the primary horizontal transform section 151 has a parameter derivation section 161, a matrix computing section 162, a normalization section 163, and a clip section 164.

Pieces of information such as the transform type identifier trTypeIdxH, the horizontal size log 2TrWidth of the transform block, the vertical size log 2TrHeight of the transform block, the sequence bit depth channelBitDepth, and the extension bit precision dBD are input to the parameter derivation section 161, and the parameter derivation section 161 derives parameters to be used in primary horizontal transform processing, on the basis of those pieces of information.

For example, the parameter derivation section 161 derives a transform matrix $T_H$ on the basis of information such as the transform type identifier trTypeIdxH and the horizontal size log 2TrWidth of the transform block.

Further, the parameter derivation section 161 derives, for example, the primary horizontal transform shift amount fwdShift1 that is the shift amount of the number of significant figures set per sequence in the primary horizontal transform, on the basis of information such as the horizontal size log 2TrWidth of the transform block, the sequence bit depth channelBitDepth, the transform matrix $T_H$, and the extension bit precision dBD. It is noted that this processing can be omitted in a case in which the primary horizontal transform shift amount fwdShift1 is already derived.

Moreover, the parameter derivation section 161 derives, for example, a primary horizontal transform shift amount fwdShift1' of the local level on the basis of the derived primary horizontal transform shift amount fwdShift1 of the sequence level and the extension bit precision dBD. In other words, the parameter derivation section 161 corrects the primary horizontal transform shift amount fwdShift1 by using the extension bit precision dBD per local level.

Further, the parameter derivation section 161 derives, for example, the minimum value coefMin and the maximum value coefMax of the transform coefficient.

The parameter derivation section 161 supplies the derived parameters to the processing sections. The parameter derivation section 161 supplies, for example, the derived transform matrix $T_H$ to the matrix computing section 162. Moreover, the parameter derivation section 161 supplies, for example, the derived primary horizontal transform shift amount fwdShift1' to the normalization section 163. Furthermore, the parameter derivation section 161 supplies, for example, the derived minimum value coefMin and the derived maximum value coefMax of the transform coefficient to the clip section 164.

The prediction residual resi and the transform matrix $T_H$ are input to the matrix computing section 162, and the matrix computing section 162 performs processing associated with matrix computing. For example, the matrix computing section 162 performs one-dimensional orthogonal transform on the prediction residual resi in the horizontal direction by using the transform matrix $T_H$. The matrix computing section 162 supplies intermediate data tmp1 that is a result of the computing to the normalization section 163.

The intermediate data tmp1 and the primary horizontal transform shift amount fwdShift1' are input to the normalization section 163, and the normalization section 163 performs processing associated with normalization. For example, the normalization section 163 bit-shifts the intermediate data tmp1 to the right by the primary horizontal transform shift amount fwdShift1' of the local level and normalizes the intermediate data tmp1. In other words, the normalization section 163 controls the number of significant figures of the intermediate data tmp1. The normalization section 163 supplies intermediate data tmp2 obtained by the normalization to the clip section 164.

The intermediate data tmp2 and the minimum value coefMin and the maximum value coefMax of the transform coefficient are input to the clip section 164, and the clip section 164 performs processing associated with clip processing. The clip processing is processing for transforming a value equal to or smaller than a predetermined minimum value into the minimum value and transforming a value equal to or greater than a predetermined maximum value into the maximum value. For example, the clip section 164 clips a value of the intermediate data tmp2 into a range from the minimum value coefMin to the maximum value coefMax of the transform coefficient. The clip section 164 supplies the coefficient data coefH (=tmp) obtained by clipping the intermediate data tmp2 to the primary vertical transform section 152. It is noted that the clip section 164 may be omitted.

<Primary Vertical Transform Section>

Figure 19:
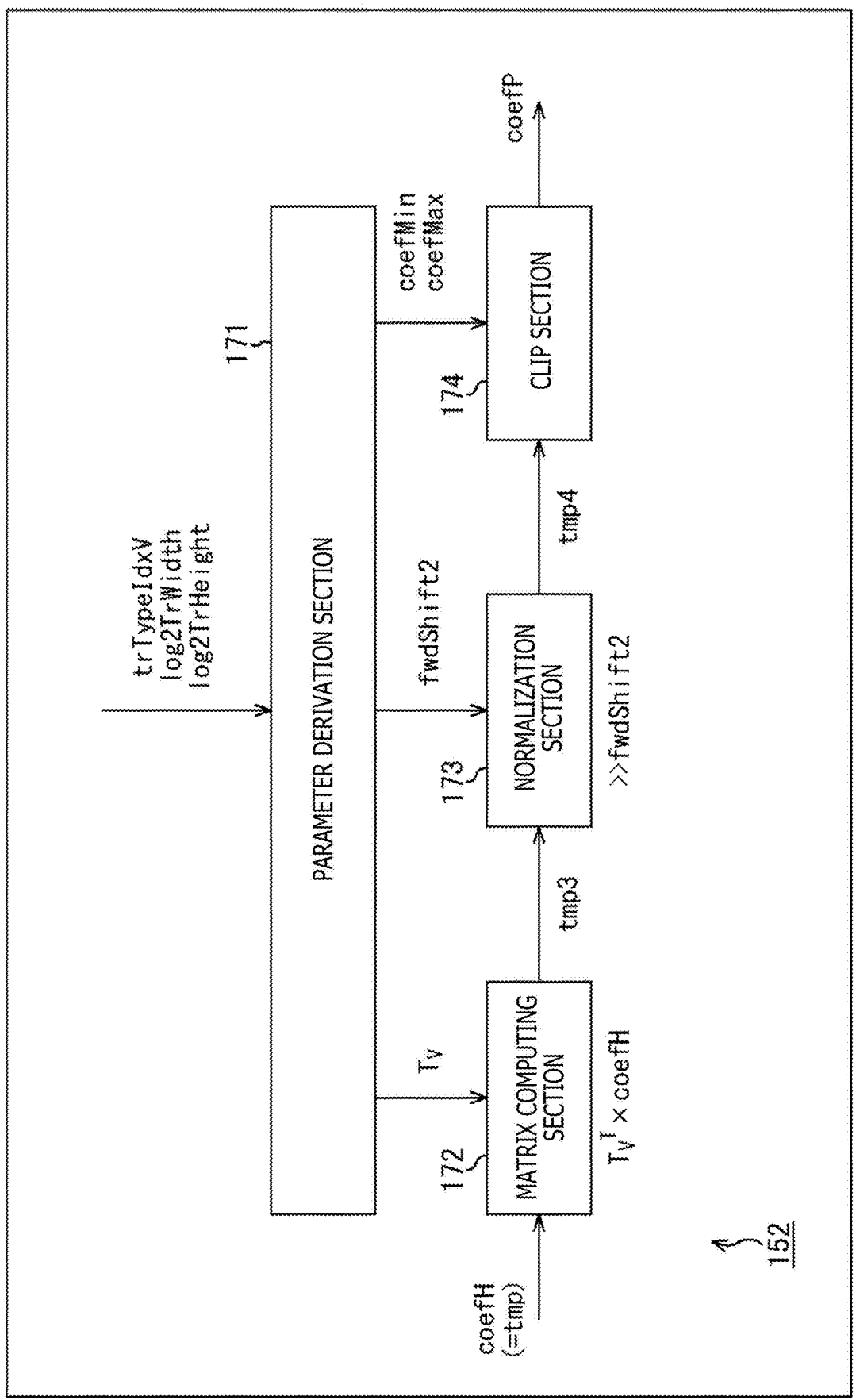
FIG. 19 is a block diagram depicting an example of principal configurations of a primary vertical transform section.

FIG. 19 is a block diagram depicting an example of principal configurations of the primary vertical transform section 152. As depicted in FIG. 19, the primary vertical transform section 152 has a parameter derivation section 171, a matrix computing section 172, a normalization section 173, and a clip section 174.

Pieces of information such as the transform type identifier trTypeIdxV, the horizontal size log 2TrWidth of the transform block, and the vertical size log 2TrHeight of the transform block are input to the parameter derivation section 171, and the parameter derivation section 171 derives parameters to be used in primary vertical transform processing, on the basis of those pieces of information.

The parameter derivation section 171 derives, for example, a transform matrix $T_V$ on the basis of the information such as the transform type identifier trTypeIdxV and the horizontal size log 2TrHeight of the transform block.

Further, the parameter derivation section 171 derives, for example, the primary vertical transform shift amount fwdShift2 that is the shift amount of the number of significant figures set per sequence in the primary vertical transform, on the basis of the information such as the vertical size log 2TrHeight of the transform block and the transform matrix $T_V$. It is noted that this processing can be omitted in a case in which the primary vertical transform shift amount fwdShift2 is already derived.

Moreover, the parameter derivation section 171 derives, for example, the minimum value coefMin and the maximum value coefMax of the transform coefficient.

The parameter derivation section 171 supplies the derived parameters to the processing sections. The parameter derivation section 171 supplies, for example, the derived transform matrix $T_V$ to the matrix computing section 172. Moreover, the parameter derivation section 171 supplies, for example, the derived primary vertical transform shift amount fwdShift2 to the normalization section 173. Furthermore, the parameter derivation section 171 supplies, for example, the derived minimum value coefMin and the derived maximum value coefMax of the transform coefficient to the clip section 174.

The coefficient data coefH and the transform matrix $T_1$ are input to the matrix computing section 172, and the matrix computing section 172 performs processing associated with matrix computing. The matrix computing section 172 performs, for example, one-dimensional orthogonal transform on the coefficient data coefH in the vertical direction by using the transform matrix $T_V$. The matrix computing section 172 supplies intermediate data tmp3 that is a result of the computing to the normalization section 173.

The intermediate data tmp3 and the primary vertical transform shift amount fwdShift2 are input to the normalization section 173, and the normalization section 173 performs processing associated with normalization. For example, the normalization section 173 bit-shifts the intermediate data tmp3 to the right by the primary vertical transform shift amount fwdShift2 of the sequence level and normalizes the intermediate data tmp3. In other words, the normalization section 173 controls the number of significant figures of the intermediate data tmp3. The normalization section 173 supplies intermediate data tmp4 obtained by the normalization to the clip section 174.

The intermediate data tmp4 and the minimum value coefMin and the maximum value coefMax of the transform coefficient are input to the clip section 174, and the clip section 174 performs processing associated with clip processing. For example, the clip section 174 clips a value of the intermediate data tmp4 into a range from the minimum value coefMin to the maximum value coefMax of the transform coefficient. The clip section 174 supplies the coefficient data coefP obtained by clipping the intermediate data tmp4 to the secondary transform section 142. It is noted that the clip section 174 may be omitted.

<Quantization Section>

Figure 20:
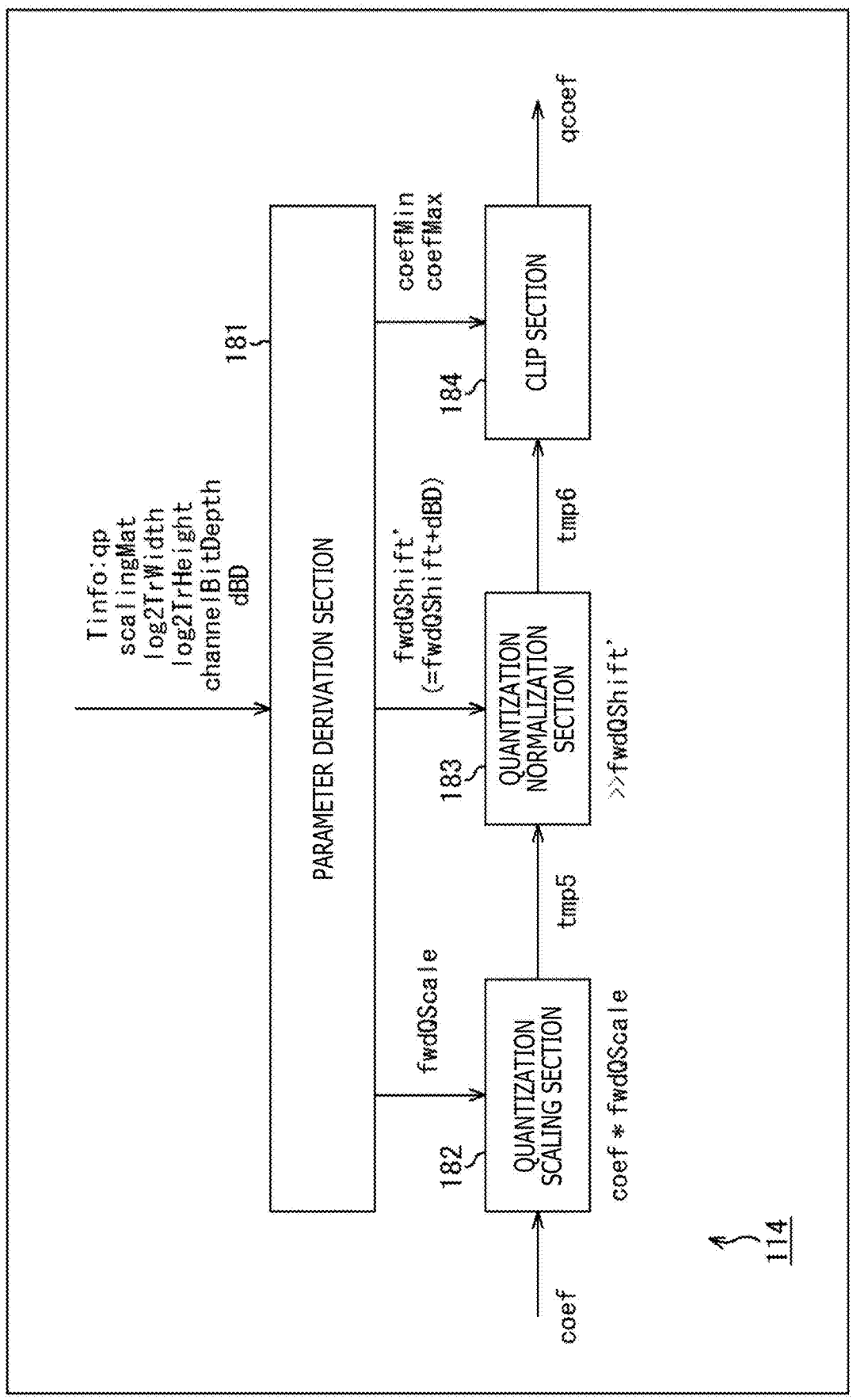
FIG. 20 is a block diagram depicting an example of principal configurations of a quantization section.

FIG. 20 is a block diagram depicting an example of principal configurations of the quantization section 114. As depicted in FIG. 20, the quantization section 114 has a parameter derivation section 181, a quantization scaling section 182, a quantization normalization section 183, and a clip section 184.

Pieces of information such as the quantization parameter qp, a quantization matrix scalingMat, the horizontal size log 2TrWidth of the transform block, the vertical size log 2TrHeight of the transform block, the sequence bit depth channelBitDepth, and the extension bit precision dBD are input to the parameter derivation section 181, and the parameter derivation section 181 derives parameters to be used in quantization processing, on the basis of those pieces of information.

The parameter derivation section 181 derives, for example, a quantization scale parameter fwdQScale on the basis of information such as the quantization parameter qp and the quantization matrix scalingMat.

Further, the parameter derivation section 181 derives, for example, the quantization shift amount fwdQShift that is the shift amount of the number of significant figures set per sequence in quantization, on the basis of the information such as the quantization parameter qp, the horizontal size log 2TrWidth of the transform block, the vertical size log 2TrHeight of the transform block, and the sequence bit depth channelBitDepth. It is noted that this processing can be omitted in a case in which the quantization shift amount fwdQShift is already derived.

Moreover, the parameter derivation section 181 derives, for example, a local-level quantization shift amount fwdQShift' on the basis of the derived sequence-level quantization shift amount fwdQShift and the extension bit precision dBD. In other words, the parameter derivation section 181 corrects the quantization shift amount fwdQShift by using the extension bit precision dBD per local level.

Furthermore, the parameter derivation section 181 derives, for example, the minimum value coefMin and the maximum value coefMax of the quantized coefficient.

The parameter derivation section 181 supplies the derived parameters to the processing sections. The parameter derivation section 181 supplies, for example, the derived quantization scale parameter fwdQScale to the quantization scaling section 182. Moreover, the parameter derivation section 181 supplies, for example, the derived quantization shift amount fwdQShift' to the quantization normalization section 183. Furthermore, the parameter derivation section 181 supplies, for example, the derived minimum value coefMin and the derived maximum value coefMax of the quantized coefficient to the clip section 184.

The transform coefficient coef and the quantization scale parameter fwdQScale are input to the quantization scaling section 182, and the quantization scaling section 182 performs processing associated with scaling of the coefficient. For example, the quantization scaling section 182 scales the transform coefficient coef by using the quantization scale parameter fwdQScale. The quantization scaling section 182 supplies intermediate data tmp5 that is a result of the computing to the quantization normalization section 183.

The intermediate data tmp5 and the quantization shift amount fwdQShift' are input to the quantization normalization section 183, and the quantization normalization section 183 performs processing associated with normalization. For example, the quantization normalization section 183 bit-shifts the intermediate data tmp5 to the right by the local-level quantization shift amount fwdQShift' and normalizes the intermediate data tmp5. In other words, the quantization normalization section 183 controls the number of significant figures of the intermediate data tmp5. The quantization normalization section 183 supplies intermediate data tmp6 obtained by the normalization to the clip section 184.

The intermediate data tmp6 and the minimum value coefMin and the maximum value coefMax of the quantized coefficient are input to the clip section 184, and the clip section 184 performs processing associated with clip processing. For example, the clip section 184 clips a value of the intermediate data tmp6 into the range from the minimum value coefMin to the maximum value coefMax of the quantized coefficient. The clip section 184 supplies the quantized coefficient qcoef obtained by clipping the intermediate data tmp6 to the encoding section 115 and the inverse quantization section 117. It is noted that the clip section 184 may be omitted.

<Flow of Image Encoding Processing>

A flow of each processing executed by the image encoding apparatus 100 described above will next be described. An example of a flow of image encoding processing will first be described with reference to a flowchart of FIG. 21.

When the image encoding processing is started, the reordering buffer 111 is controlled by the control section 101 to reorder input frames of the image sequence data from the order of display to the order of encoding in Step S101.

In Step S102, the control section 101 sets processing units to each input image held by the reordering buffer 111 (segments each input image into blocks).

In Step S103, the control section 101 determines (sets) encoding parameters for each input image held by the reordering buffer 111.

In Step S104, the prediction section 122 performs prediction processing and generates a predicted image or the like in an optimum prediction mode. For example, in this prediction processing, the prediction section 122 performs intra prediction to generate a predicted image or the like in an optimum intra prediction mode, performs inter prediction to generate a predicted image or the like in an optimum inter prediction mode, and selects the optimum prediction mode on the basis of a cost function value and the like from them.

In Step S105, the computing section 112 computes a difference between the input image and the predicted image in the optimum mode selected by the prediction processing of Step S104. In other words, the computing section 112 generates the prediction residual resi between the input image and the predicted image. Data volume of the prediction residual resi' obtained in such way is reduced, compared with original image data. Therefore, it is possible to compress the data volume, compared with a case of encoding an image as it is.

In Step S106, the orthogonal transform section 113 performs orthogonal transform processing on the prediction residual resi generated by the processing of Step S105 and derives the transform coefficient coef.

In Step S107, the quantization section 114 quantizes the transform coefficient coef obtained by the processing of Step S106 by use of the quantization parameter calculated by the control section 101 or the like and derives the quantized coefficient qcoef.

In Step S108, the inverse quantization section 117 inversely quantizes the quantized coefficient qcoef generated by the processing of Step S107 with characteristics corresponding to characteristics of quantization of Step S107 and derives the transform coefficient coef'. It is noted that description to be given (below) with respect to the decoding side can be applied to the inverse quantization processing of this Step S108 since this inverse quantization processing is similar to inverse quantization processing performed on the decoding side (to be described below).

In Step S109, the inverse orthogonal transform section 118 performs inverse orthogonal transform on the transform coefficient coef' obtained by the processing of Step S108, by a method corresponding to the orthogonal transform processing of Step S106, and derives the prediction residual resi'. It is noted that description to be given (below) with respect to the decoding side can be applied to the inverse orthogonal transform processing of this Step S109 since this inverse orthogonal transform processing is similar to inverse orthogonal transform processing performed on the decoding side (to be described below).

In Step S110, the computing section 119 generates a decoded image that is locally decoded, by adding the predicted image obtained by the prediction processing of Step S104 to the prediction residual resi' derived by the processing of Step S109.

In Step S111, the in-loop filter section 120 performs in-loop filter processing on the decoded image that is locally decoded and that is derived by the processing of Step S110.

In Step S112, the frame memory 121 stores the decoded image that is locally decoded and that is derived by the processing of Step S110 and the decoded image that is locally decoded and that is filter-processed in Step S112.

In Step S113, the encoding section 115 encodes the quantized coefficient qcoef obtained by the processing of Step S107. For example, the encoding section 115 encodes the quantized coefficient qcoef that is information associated with the image, by the arithmetic encoding or the like, and generates encoded data. In addition, the encoding section 115 encodes the various encoding parameters (header information Hinfo, prediction mode information Pinfo, transform information Tinfo, and the like) at this time. Furthermore, the encoding section 115 derives the residual information RInfo from the quantized coefficient qcoef and encodes the residual information RInfo.

In Step S114, the accumulation buffer 116 accumulates the encoded data obtained in such way and outputs the encoded data, as, for example, a bit stream, to outside of the image encoding apparatus 100. This bit stream is transmitted to the decoding side via, for example, the transmission line and the recording medium. Moreover, the rate control section 123 exercises rate control as needed.

When processing of Step S114 is ended, the image encoding processing is ended.

In the image encoding processing in the flow described above, the processing to which the present technology is applied as described above is performed as the processing of Steps S103, S106, S107, S108, and S113. Therefore, executing this image encoding processing makes it possible to suppress a reduction in encoding efficiency.

<Flow of dBD and deltaX Derivation Processing>

Figure 21:
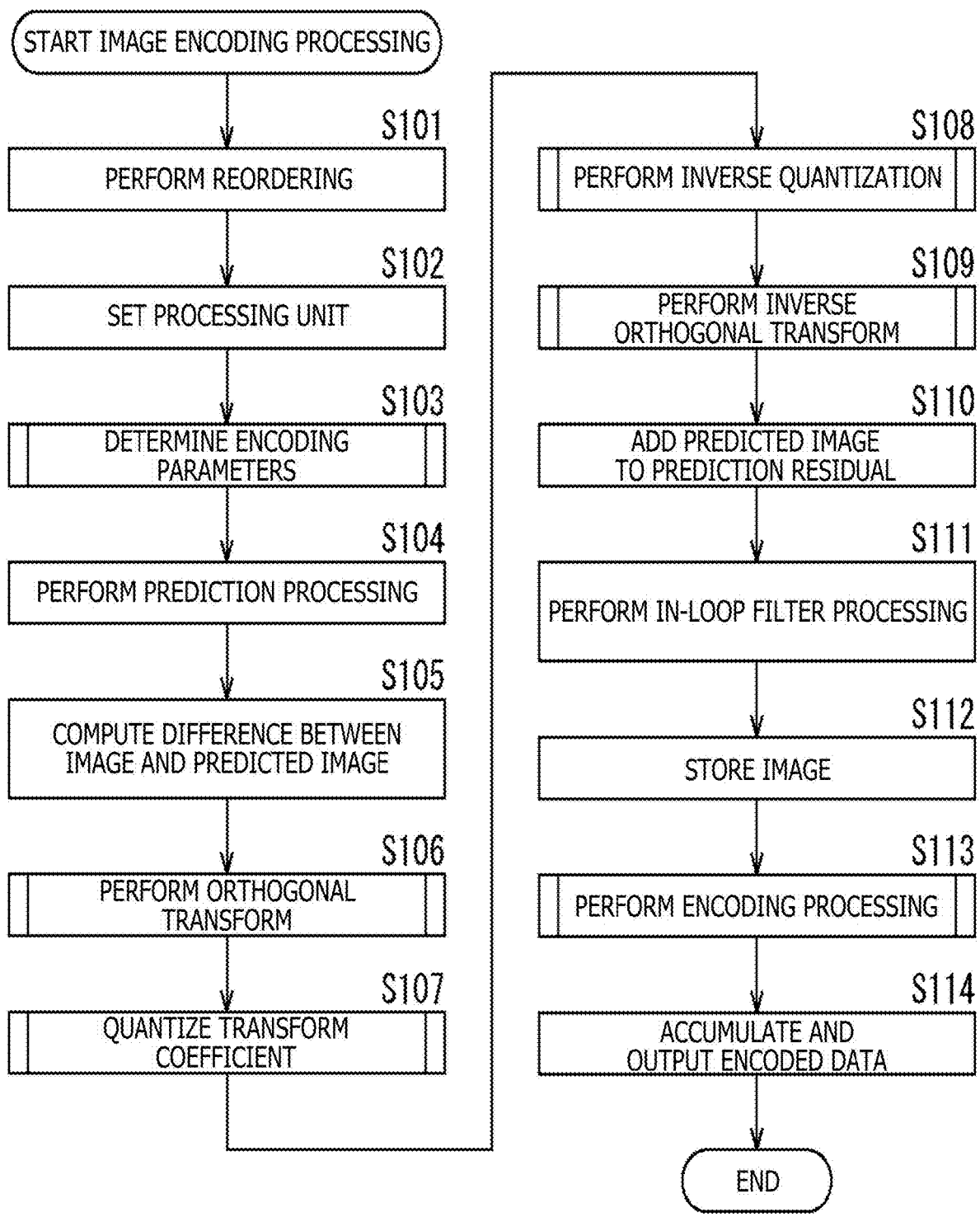
FIG. 21 is a flowchart illustrating an example of a flow of image encoding processing.

In Step S103 of FIG. 21, the various encoding parameters are derived. For example, the extension bit precision dBD, the difference parameter deltaX, and the like are derived. An example of a flow of dBD and deltaX derivation processing for deriving such parameters as the extension bit precision dBD and the difference parameter deltaX will be described with reference to a flowchart of FIG. 22.

When the dBD and deltaX derivation processing is started, the sequence bit depth setting section 131 of the control section 101 sets the sequence bit depth channelBitDepth of a component X on the basis of external parameters in Step S131. In other words, the sequence bit depth setting section 131 obtains a bit depth of each component of the input image input from outside and sets a value of the obtained bit depth to the sequence bit depth channelBitDepth of each component.

In Step S132, the slice bit depth setting section 132 derives the slice bit depth sliceBitDepth of the component X.

For example, the slice bit depth setting section 132 first derives the following syntaxes associated with the slice bit depth of each component per slice, on the basis of a pixel group of each component contained in the slice.

slice_min_val: minimum pixel value of component X (X=Y/Cb/Cr) within slice slice_max_val: maximum pixel value of component X (X=Y/Cb/Cr) within slice The slice bit depth setting section 132 then derives the slice bit depth sliceBitDepth by using those syntaxes, as represented by the following Equation (9).

$$sliceBitDepth = ceil(log2(slice\_max\_val - slice\_min\_val)) \quad (9)$$

In Step S133, the pixel minimum value/maximum value search section 133 derives the minimum pixel value minPixelValu and the maximum pixel value maxPixelValue of the component X per extension bit precision control group SG.

Figure 23:
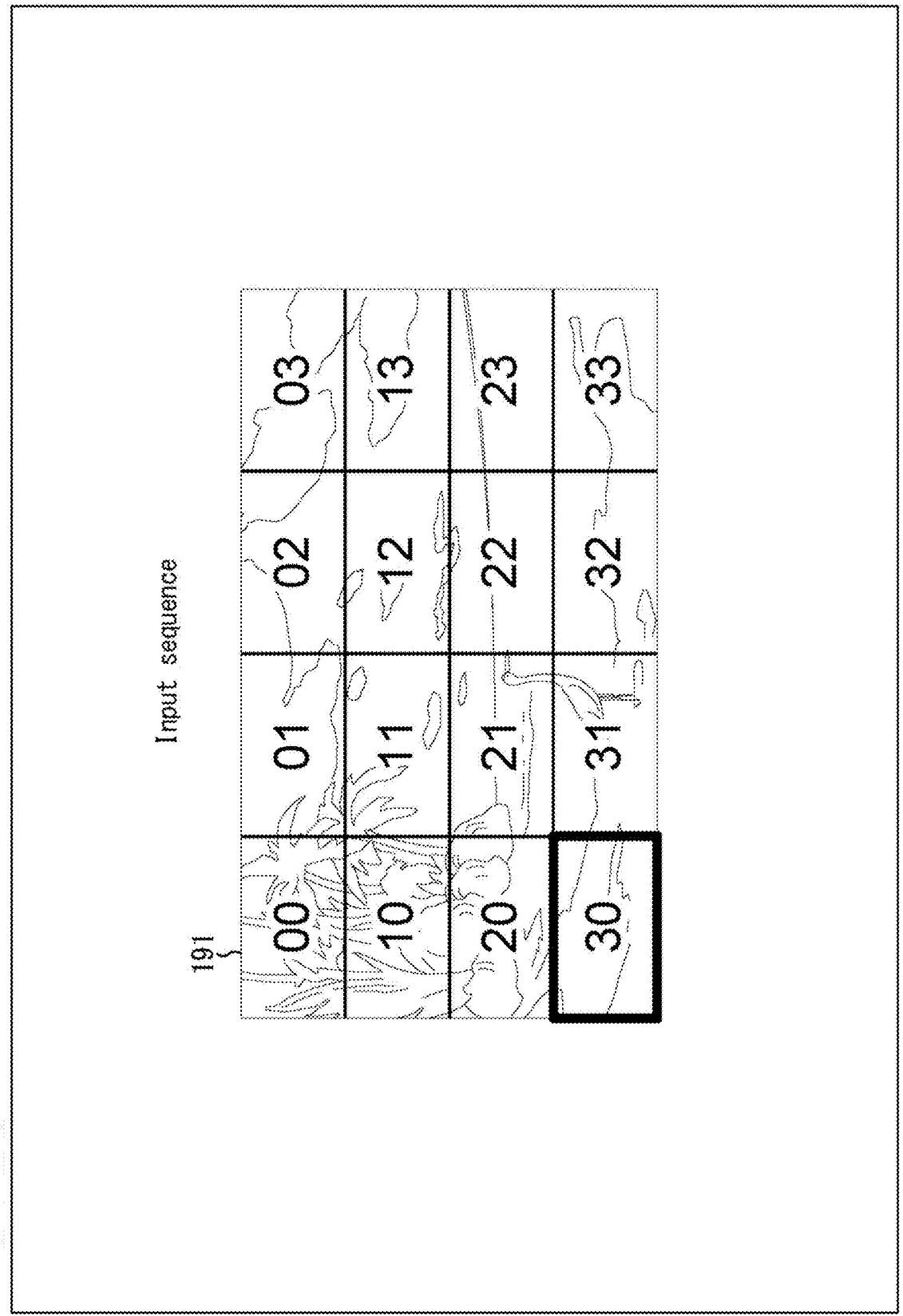
FIG. 23 is a diagram depicting an example of an input image.

Here, the extension bit precision control group SG refers to a group unit controlling the extension bit precision dBD for expanding the number of significant figures of the coefficient of the component X. For example, in a case of an input image 191 depicted in FIG. 23, an overall picture is segmented into 4×4=16, and the segmented parts are set as local areas (local areas 00 to 33). For example, such a local area can be designated as the extension bit precision control group SG. In other words, in this case, the extension bit precision dBD is derived per local area. In other words, the number of significant figures of the coefficient (computing precision) is controlled per local area. A magnitude and a shape of the area designated as such an extension bit precision control group SG can be selected freely. For example, the extension bit precision control group SG may be set using, as a unit, a Slice, a Tile, a CTU (Coding Tree Unit), a CTB (Coded Tree Block), a CU (Coding Unit), a CB (Coding Block), a TU (Transform Unit), a TB (Transform Block), or the like.

In Step S134, the dBD derivation section 134 derives the local-level bit depth LocalBitDepth (bit depth of each extension bit precision control group SG) per extension bit precision control group SG by using the minimum pixel value minPixelValue and the maximum pixel value maxPixelValue of the component X derived in Step S133, as represented by the following Equation (10). Furthermore, the dBD derivation section 134 derives the extension bit precision dBD indicating by what bits the number of significant figures of the coefficient is to be expanded, by using the local-level bit depth LocalBitDepth and the sequence bit depth channelBitDepth derived in Step S131, as represented by, for example, the following Equation (11).

It is noted that the local bit depth LocalBitDepth derived in Equation (10) may further be corrected to LocalBitDepth=max(minLocalBitDepth,LocalBitDepth) by reference to the predetermined threshold minLocalBitDepth (for example, eight), as represented in Equation (10A). By doing so, it is possible to suppress occurrence of the case in which the extension bit precision dBD derived in subsequent Equation (11) becomes excessively large in value (that is, the number of significant figures is excessively expanded, and intermediate coefficient data exceeds the range from the minimum value coefMin to the maximum value coefMax). It is noted that in Equation (10A), the operator max (x, y) is the operator that returns a larger value out of numeric values x and y.

$$LocalBitDepth = ceil(log\ 2(maxPixelValue - minPixelValue)) \quad (10)$$

$$LocalBitDepth = max(minLocalBitDepth, LocalBitDepth) \quad (10A)$$

$$dBD = channelBitDepth - LocalBitDepth \quad (11)$$

In Step S135, the deltaX derivation section 135 derives the difference parameter of the extension bit precision dBD of the component X per extension bit precision control group SG. For example, the deltaX derivation section 135 derives the difference parameter by using the sequence bit depth channelBitDepth, the slice bit depth sliceBitDepth, and the extension bit precision dBD of each extension bit precision control group SG, as represented by the following Equation (12). In other words, in this case, the difference parameter deltaX is a difference between the slice bit depth sliceBitDepth and the local-level bit depth LocalBitDepth of the image.

$$deltaX = dBD + sliceBitDepth - channelBitDepth \quad (12)$$
$$= sliceBitDepth - LocalBitDepth$$

It is noted that there is a relation of channelBitDepth≥sliceBitDepth≥deltaX. In such way, representing the difference parameter deltaX via the extension bit precision dBD, the sequence bit depth, and the slice bit depth makes it possible to make smaller (suppress an increase in) the value of the difference parameter deltaX. In other words, it is possible to decrease the code amount of the deltaX and suppress a reduction in encoding efficiency.

When the processing of Step S135 is ended, then the dBD and deltaX derivation processing is ended, and the processing returns to FIG. 21.

<Control Over Extension Bit Precision Control Group SG>

It is noted that the extension bit precision control group SG may be controlled by a difference value diff_cu_delta_depth of a segmentation depth with respect to a size CtbLog 2Size of a CTB. In this case, a size Log 2SGSize of the SG is obtained as represented by, for example, the following Equation (13).

$$Log\ 2SGSize = CtbLog\ 2Size - diff\_cu\_delta\_depth \quad (13)$$

Figure 24:
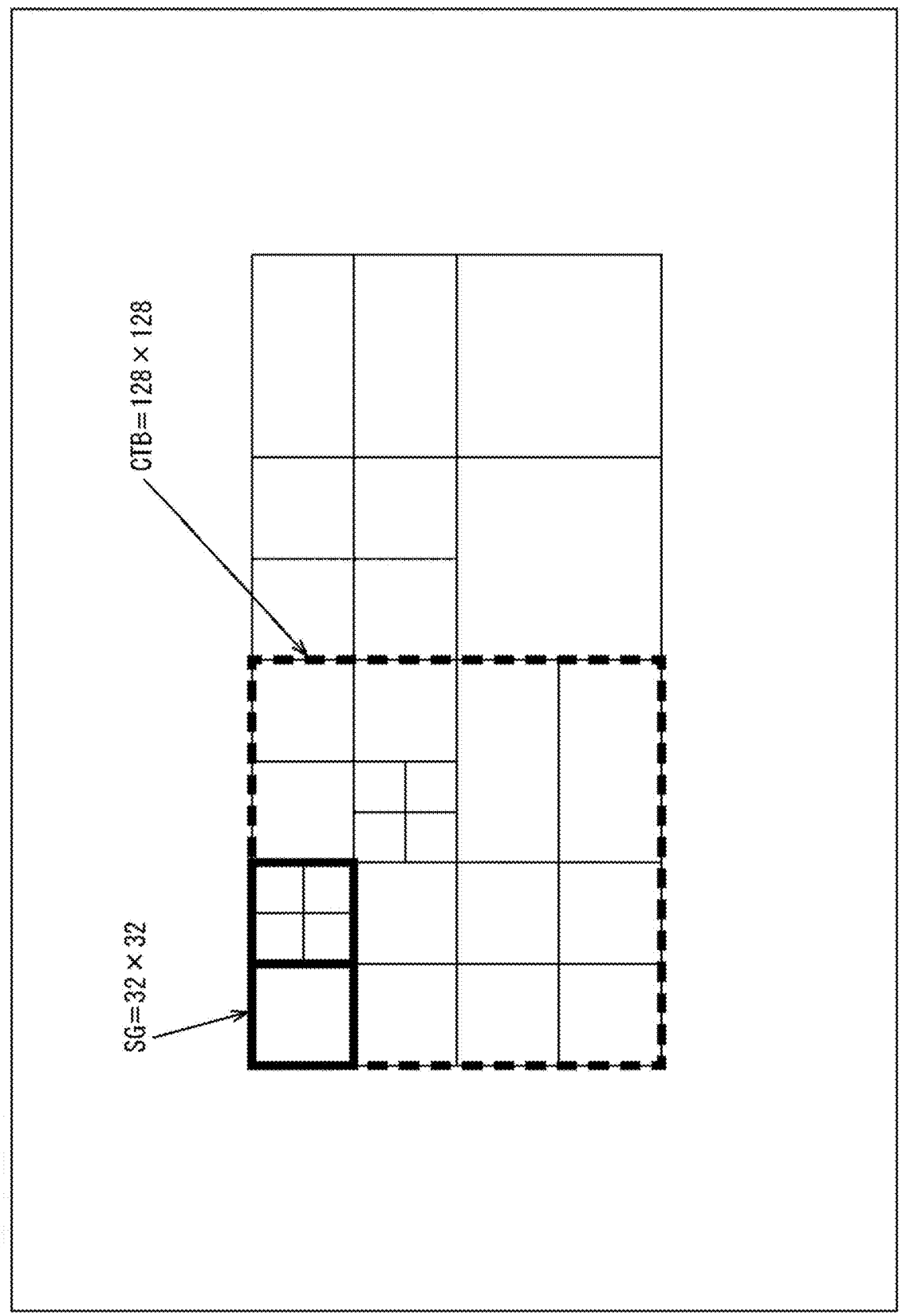
FIG. 24 is a diagram depicting an example of an extension bit precision control group.

In a case of assuming, for example, that a CTB indicated by a dotted-line frame in FIG. 24 has a size of 128×128 (CtbLog 2Size=7) and the SG indicated by a thick-line frame in FIG. 24 has a size of 32×32 (Log 2SGSize=5), the difference value diff_cu_delta_depth is two as represented by the following Equation (14).

$$diff\_cu\_delta\_depth = CtbLog\ 2Size - Log\ 2SGSize = 7 - 5 = 2 \quad (14)$$

It is noted that the difference value diff_cu_delta_depth is assumed to be notified in units of predetermined parameter sets (header information) (for example, a sequence parameter set (SPS), a picture parameter set (PPS)), or by a slice header (SH) or the like). By doing so, it is possible to control granularity of the extension bit precision control group SG by the difference value diff_cu_delta_depth.

In a case, for example, in which a signal range is constant in a large area to some extent, decreasing this difference value diff_cu_delta_depth makes it possible to expand the unit of notification of the difference parameter deltaX and to decrease overhead.

Conversely, in a case in which the signal range changes in a small area, increasing this difference value diff_cu_delta_depth makes it possible to diminish the unit of notification of the difference parameter deltaX and to expand the number of significant figures of the transform coefficient at the time of inverse quantization/inverse orthogonal transform with finer granularity.

Other Example 1 of Definition of Difference Parameter Deltax

While it is described above that the difference parameter deltaX of the extension bit precision dBD of the component X is obtained from the sequence bit depth channelBitDepth, the slice bit depth sliceBitDepth, and the extension bit precision dBD, definition of the difference parameter deltaX can be made freely and is not limited to this example.

For example, the extension bit precision dBD may be derived as a sum of the sequence bit depth channelBitDepth and the difference parameter deltaX. In other words, the difference parameter deltaX may be determined as a difference value between the sequence bit depth channelBitDepth and the extension bit precision dBD, as represented by the following Equation (15)

$$deltaX = channelBitDepth - dBD \quad (15)$$

By doing so, the difference parameter deltaX can be derived more easily than the example described above.

<Other Example 2 of Definition of Difference Parameter deltaX

Furthermore, the difference parameter deltaX may be defined to be equivalent to the extension bit precision dBD, as represented by the following Equation (16).

$$deltaX = dBD \quad (16)$$

In this case, the difference parameter deltaX can be derived without dependence on parameters other than the extension bit precision dBD.

<Other Example 3 of Definition of Difference Parameter deltaX

Further, as represented by, for example, the following Equation (17), the difference parameter deltaX may be defined as a difference between the extension bit precision dBD of the extension bit precision control group SG to be processed (referred to as a "current extension bit precision control group $SG_{cur}$") and a predicted value $dBD_{pred}$ of the extension bit precision dBD.

$$deltaX = dBD - dBD_{pred} \quad (17)$$

Figure 25:
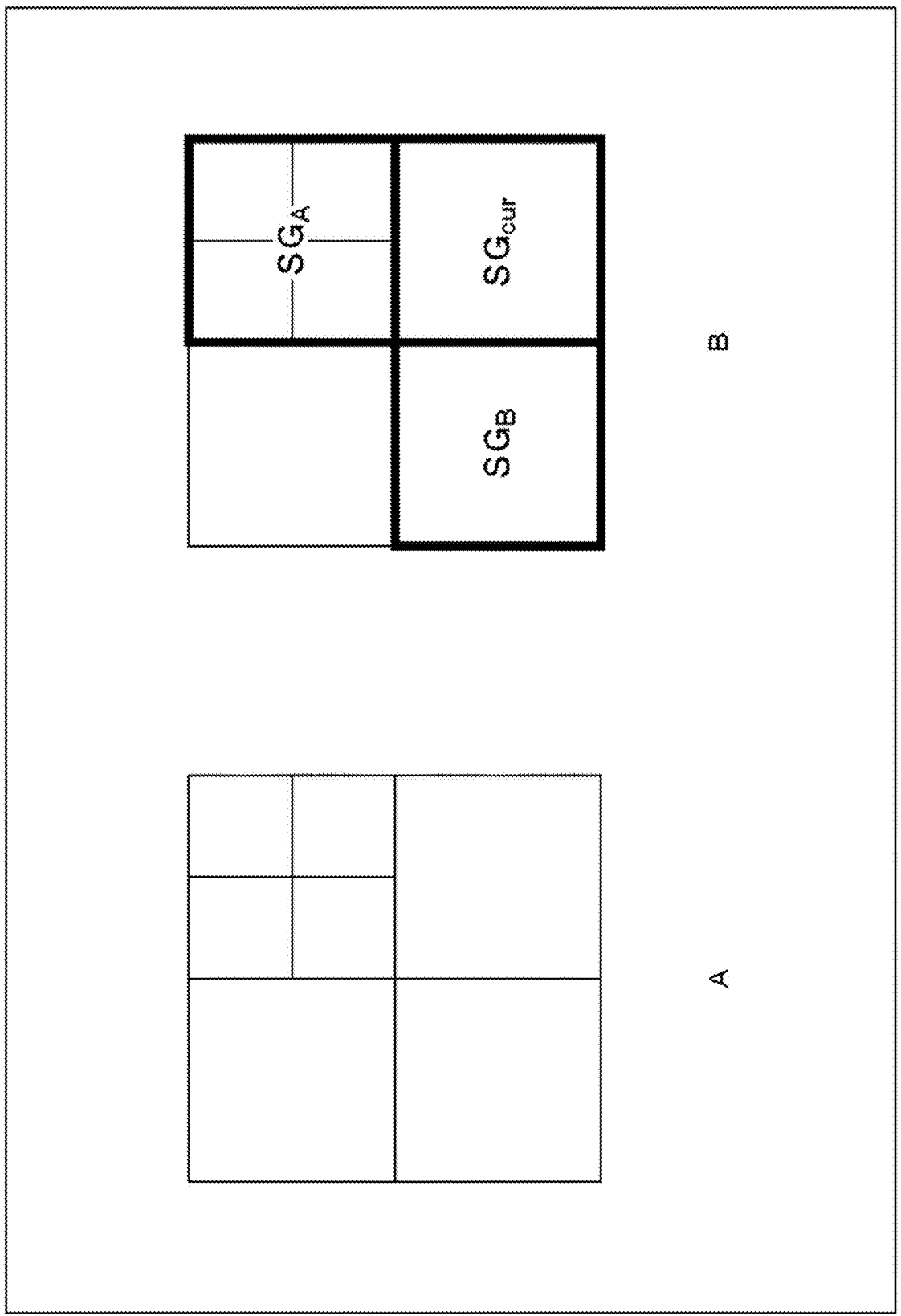
FIG. 25 is a diagram depicting an example of a method of deriving a predicted value of a difference parameter.

For example, this predicted value $dBD_{pred}$ is derived by referring to dBDs of encoded extension bit precision control groups neighborSGs in the neighborhood of the current extension bit precision control group $SG_{cur}$. In a CTB as depicted in A of FIG. 25, for example, it is assumed that a lower right quarter area is the current extension bit precision control group $SG_{cur}$ as depicted in B of FIG. 25. It is also assumed that the extension bit precision control group SG in the neighborhood of an upper side of the current extension bit precision control group $SG_{cur}$ is a neighboring extension bit precision control group $SG_A$ and the extension bit precision control group SG in the neighborhood of a left side of the current extension bit precision control group $SG_{cur}$ is a neighboring extension bit precision control group $SG_B$. The neighboring extension bit precision control groups $SG_A$ and $SG_B$ are encoded neighboring extension bit precision control groups.

In this case, the predicted value $dBD_{pred}$ of the extension bit precision dBD may be set on the basis of extension bit precision $dBD_A$ of the neighboring extension bit precision control group $SG_A$ and extension bit precision $dBD_B$ of the neighboring extension bit precision control group $SG_B$. Furthermore, the predicted value $dBD_{pred}$ of the extension bit precision dBD may be derived, for example, by a method according to whether or not these neighboring extension bit precision control groups can be referred to. For example, the predicted value $dBD_{pred}$ may be obtained by the following method.

In a case, for example, in which both the neighboring extension bit precision control groups $SG_A$ and $SG_B$ can be referred to, the predicted value $dBD_{pred}$ is derived as represented by the following Equation (18).

$$dBD_{pred} = \text{ave}(dBD_A, dBD_B) \quad (18)$$

In Equation (18), ave(x, y) is an operator that returns an average value of x and y.

For example, ave(x, y)=(x+y+1)>>1.

Moreover, in a case, for example, in which only the neighboring extension bit precision control group $SG_A$ can be referred to, the predicted value $dBD_{pred}$ is derived as represented by the following Equation (19).

$$dBD_{pred} = dBD_A \quad (19)$$

Further, in a case, for example, in which only the neighboring extension bit precision control group $SG_B$ can be referred to, the predicted value $dBD_{pred}$ is derived as represented by the following Equation (20).

$$dBD_{pred} = dBD_B \quad (20)$$

Further, in a case, for example, in which neither the neighboring extension bit precision control group $SG_A$ nor the neighboring extension bit precision control group $SG_B$ can be referred to, the predicted value $dBD_{pred}$ is derived as represented by the following Equation (21).

$$dBD_{pred} = \text{const}(=0) \quad (21)$$

In such way, predicting the dBD of the current extension bit precision control group $SG_{cur}$ by using each of the extension bit precision dBD of the encoded neighboring extension bit precision control groups neighborSGs makes it possible to decrease the value of the difference parameter deltaX. In other words, it is possible to suppress a growth of the code amount required for decoding or encoding the deltaX.

<Flow of Orthogonal Transform Processing>

An example of a flow of the orthogonal transform processing executed in the processing of Step S106 of FIG. 21 will be described with reference to a flowchart of FIG. 26.

When the orthogonal transform processing is started, the primary horizontal transform section 151 of the orthogonal transform section 113 performs primary horizontal transform processing in Step S151.

In Step S152, the primary vertical transform section 152 performs primary vertical transform processing.

In Step S153, the secondary transform section 142 performs secondary transform processing.

When the processing of Step S153 is ended, then the orthogonal transform processing is ended, and the processing returns to FIG. 21.

In the orthogonal transform processing described above, the processing to which the present technology is applied as described above is performed as the processing of Steps S151 and S152. Therefore, executing this orthogonal transform processing makes it possible to suppress a reduction in encoding efficiency.

It is noted that the steps (Steps S151 to S153) of this orthogonal transform processing can be skipped (omitted).

<Flow of Primary Horizontal Transform Processing>

An example of a flow of the primary horizontal transform processing executed in the processing of Step S151 of FIG. 26 will be described with reference to a flowchart of FIG. 27.

When the primary horizontal transform processing is started, the parameter derivation section 161 of the primary horizontal transform section 151 derives the transform matrix $T_H$ in Step S171. For example, the parameter derivation section 161 reads out a base transform matrix $T_{base}$ in (1<<log 2TrWidth) rows by (1<<log 2TrWidth) columns corresponding to information (log 2TrWidth) associated with the transform type identifier trTypeIdxH and the size of the transform block from an unillustrated look-up table LUT and sets the base transform matrix $T_{base}$ to the transform matrix $T_u$(that is, $T_H = T_{base}$)

In Step S172, the parameter derivation section 161 derives the primary horizontal transform shift amount fwdShift1'. For example, the parameter derivation section 161 derives the primary horizontal transform shift amount fwdShift1 per sequence on the basis of information associated with the size of the transform block (log 2TrWidth), the sequence bit depth channelBitDepth, a parameter trMatShift representing an integer approximation precision of the transform matrix $T_H$ derived in Step S171, and a parameter associated with a range of the transform coefficient log 2TransformRange, as represented by the following Equation (22). It is noted that the parameter trMatShift takes a value of, for example, eight.

$$\text{fwdShift1} = \log 2\text{TrWidth} + \text{channelBitDepth} + \text{trMatShift} - \log 2\text{TransformDynamicRange} \quad (22)$$

The parameter derivation section 161 then corrects the derived primary horizontal transform shift amount fwdShift1 per sequence by using the extension bit precision dBD, as represented by the following Equation (23). In other words, the parameter derivation section 161 derives the primary horizontal transform shift amount fwdShift1' of the local level (per extension bit precision control group SG) by using the primary horizontal transform shift amount fwdShift1 per sequence and the extension bit precision dBD.

$$\text{fwdShift1}' = \text{fwdShift1} - dBD \quad (23)$$

Diminishing a magnitude of the primary horizontal transform shift amount fwdShift1 by the extension bit precision dBD with use of this Equation (23) makes it possible to simultaneously perform normalization processing accompanying the primary horizontal transform and transform coefficient expansion processing for expanding the number of significant figures by dBD. Furthermore, diminishing the magnitude of the primary horizontal transform shift amount fwdShift1 by the extension bit precision dBD with use of Equation (23) makes it possible to expand the number of significant figures of the transform coefficient subjected to the primary horizontal transform, by dBD.

Moreover, in Step S172, the parameter derivation section 161 derives the minimum value coefMin and the maximum value coefMax of the transform coefficient by using a parameter log 2TransformRange associated with the range of the transform coefficient, as represented by the following Equations (24) and (25).

$$\text{coefMin}=-1<<\log 2\text{TransformRange} \qquad (24)$$

$$\text{coefMax}=(1<<\log 2\text{TransformRange})-1 \qquad (25)$$

In Step S173, the matrix computing section 162 performs the one-dimensional orthogonal transform on the prediction residual resi in the horizontal direction by using the transform matrix $T_H$ derived in Step S171 and obtains the intermediate data tmp1 as represented by the following Equation (26). It is noted that in Equation (26), x is an operator representing a matrix product.

$$tmp1 = resi \times T_H^T \qquad (26)$$

In Step S174, the normalization section 163 normalizes the intermediate data tmp1 (matrix product between the prediction residual resi and the transform matrix $T_H$) by bit-shifting the intermediate data tmp1 to the right by the primary horizontal transform shift amount fwdShift1' derived in Step S172 and obtains the intermediate data tmp2, as represented by the following Equation (27).

$$tmp2=(tmp1+\text{offsetFwdShift1})>>\text{fwdShift1}' \qquad (27)$$

It is noted that offsetFwdShift1 is a rounding offset at a time of normalization and is derived, as represented by, for example, the following Equation (28).

$$\text{offsetFwdShift1}=1<<(\text{fwdShift1}'-1) \qquad (28)$$

It is noted that the intermediate data tmp2 may be normalized by the following Equation (29) as an alternative to Equation (27) described above.

$$tmp2=\text{sign}(tmp1)*(\text{abs}(tmp1)+\text{offsetFwdShift1})>>\text{fwdShift1}' \qquad (29)$$

In Step S175, the clip section 164 clips a value of the intermediate data tmp2 so that the value falls within the range from the minimum value coefMin of the coefficient to the maximum value coefMax of the coefficient derived in Step S172 and derives the coefficient data coefH subjected to clipping, as represented by the following Equation (30).

$$coefH=\text{clip3}(\text{coefMin},\text{coefMax},tmp2) \qquad (30)$$

In Equation (30), clip3(a_min, a_max, val) is a clip operator that returns a_min when val is smaller than a_min, returns a_max when val is greater than a_max, and returns val otherwise (when val is within a range from a_min to a_max).

Figure 26:
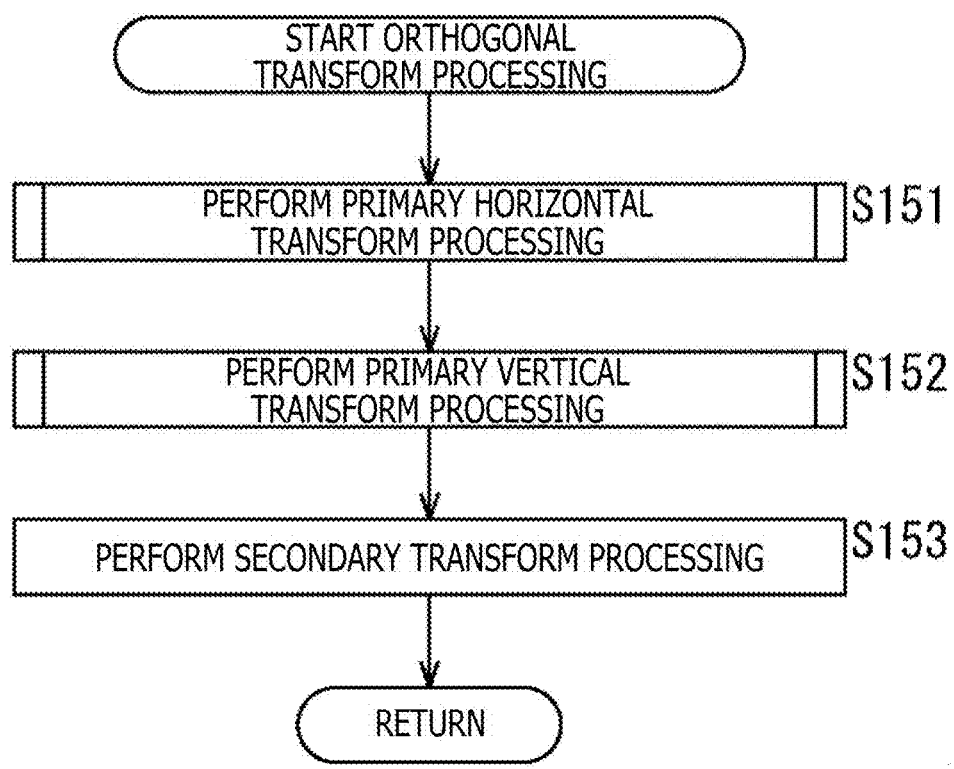
FIG. 26 is a flowchart illustrating an example of a flow of orthogonal transform processing.
Figure 27:
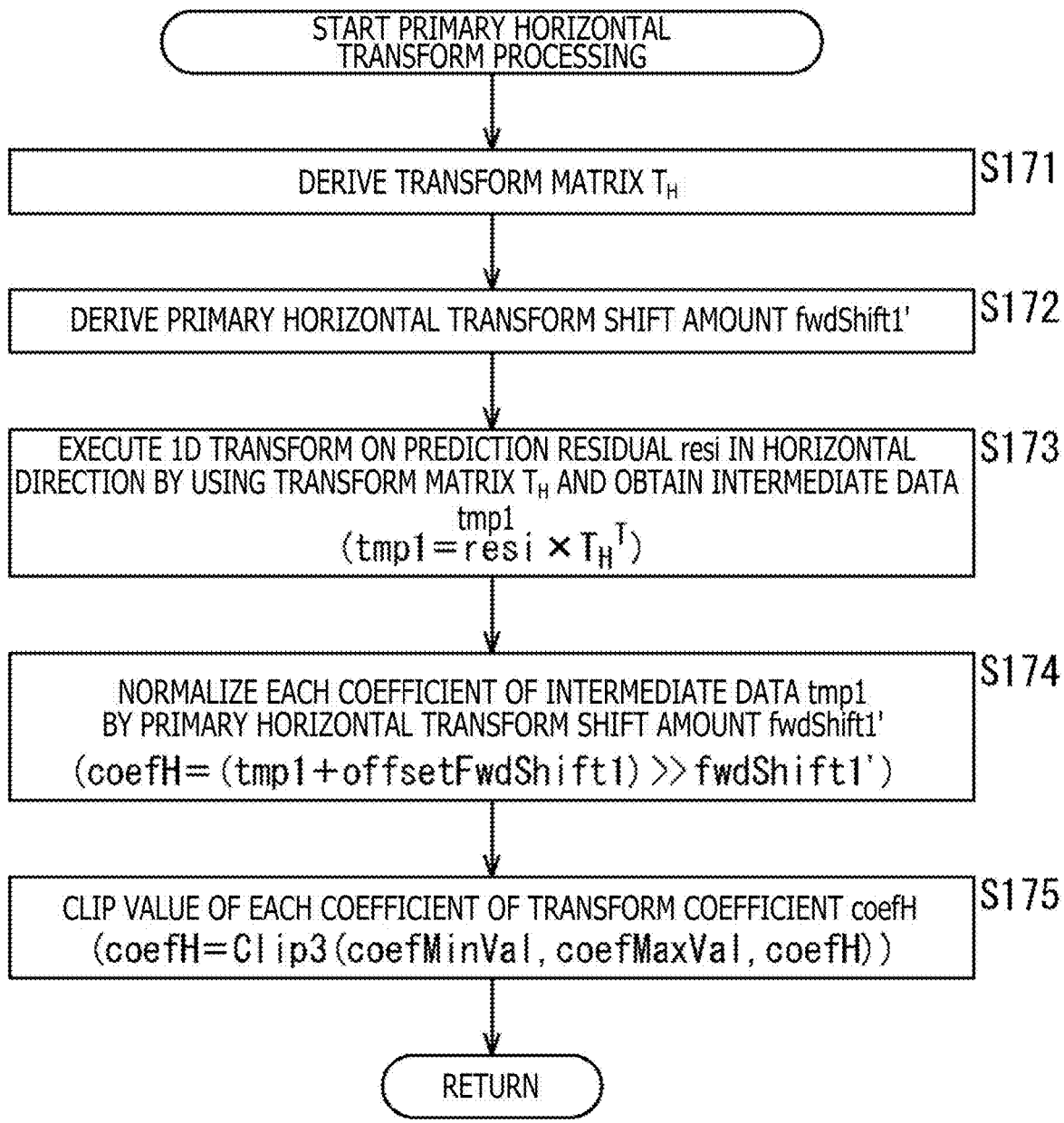
FIG. 27 is a flowchart illustrating an example of a flow of primary horizontal transform processing.

When the processing of Step S175 is ended, the processing returns to FIG. 26.

As described above, diminishing the magnitude of the primary horizontal transform shift amount fwdShift1 by the extension bit precision dBD makes it possible for the primary horizontal transform section 151 to expand the number of significant figures of the coefficient data coefH subjected to the primary horizontal transform, by dBD. It is therefore possible to perform transform and quantization in subsequent transform and quantization processing with improved computing precision. Furthermore, it is possible to simultaneously perform the normalization processing accompanying the primary horizontal transform and the transform coefficient expansion processing for expanding the number of significant figures by dBD.

It is noted that the processing of Step S175 may be omitted.

<Flow of Primary Vertical Transform Processing>

Figure 28:
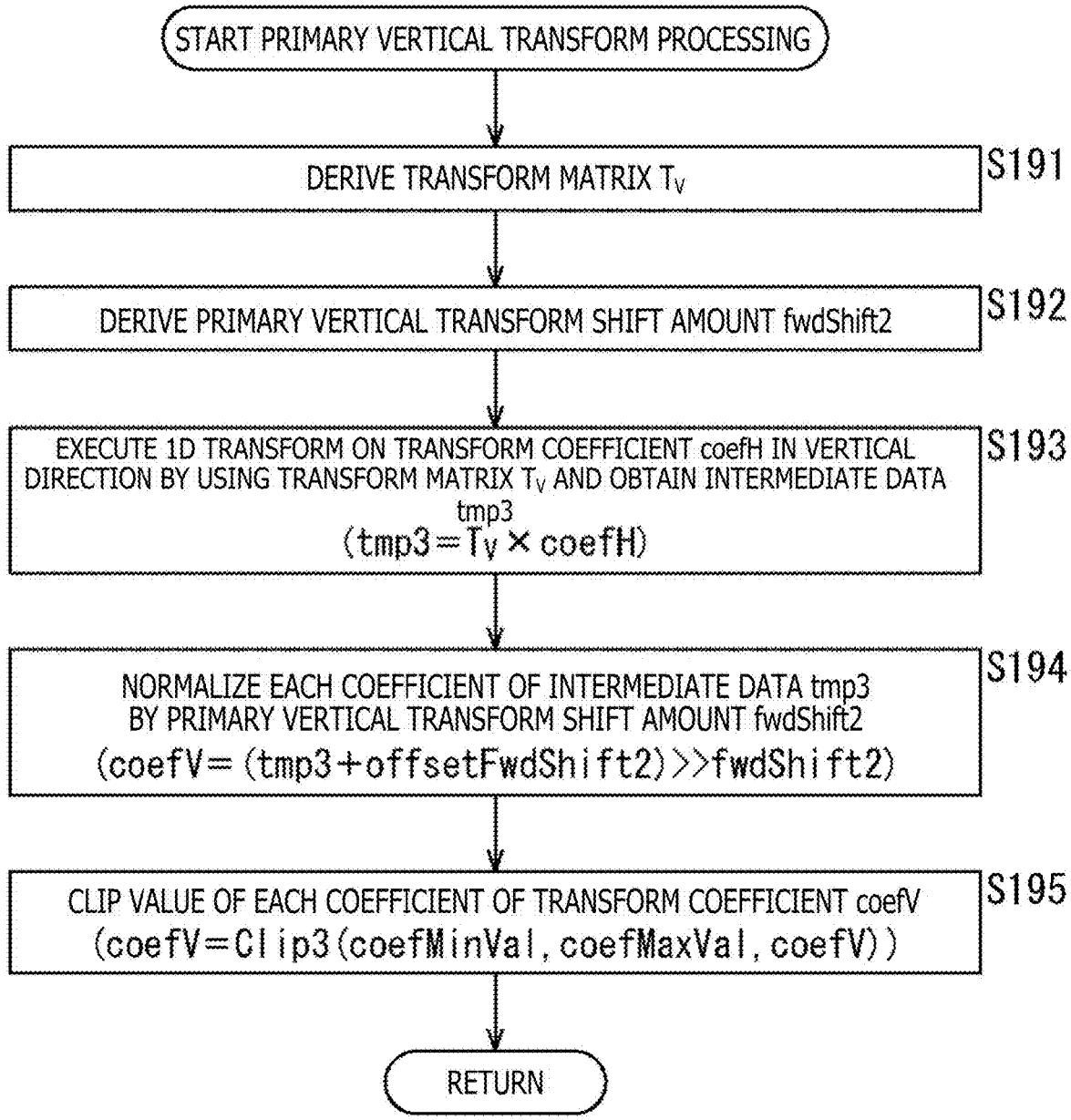
FIG. 28 is a flowchart illustrating an example of a flow of primary vertical transform processing.

An example of a flow of the primary vertical transform processing executed in Step S152 of FIG. 26 will be described with reference to a flowchart of FIG. 28.

When the primary vertical transform processing is started, the parameter derivation section 171 of the primary vertical transform section 152 derives the transform matrix $T_V$ in Step S191. For example, the parameter derivation section 171 reads out a base transform matrix $T_{base}$ in (1<<log 2TrHeight) rows by (1<<log 2TrHeight) columns corresponding to information (log 2TrHeight) associated with the transform type identifier trTypeIdxV and the size of the transform block from an unillustrated look-up table LUT and sets the base transform matrix $T_{base}$ to the transform matrix $T_V$ (that is, $T_V=T_{base}$)

In Step S192, the parameter derivation section 171 derives the primary vertical transform shift amount fwdShift2. For example, the parameter derivation section 171 derives the primary vertical transform shift amount fwdShift2 per sequence on the basis of information associated with the size of the transform block (log 2TrHeight) and the parameter trMatShift representing an integer approximation precision of the transform matrix $T_V$, as represented by the following Equation (31). It is noted that the parameter trMatShift takes a value of, for example, eight. In that case, it means that the integer approximation precision of the transform matrix $T_V$ is eight bits.

$$\text{fwdShift2}=\log 2\text{TrHeight}+\text{trMatShift} \qquad (31)$$

Furthermore, in Step S192, the parameter derivation section 171 derives the minimum value coefMin and the maximum value coefMax of the transform coefficient by using the parameter log 2TransformRange associated with the range of the transform coefficient, as represented by the above Equations (24) and (25).

In Step S193, the matrix computing section 172 performs the one-dimensional orthogonal transform on the coefficient data coefH in the vertical direction by using the transform matrix $T_V$ derived in Step S191 and obtains the intermediate data tmp3, as represented by the following Equation (32). It is noted that in Equation (32), x is an operator representing a matrix product.

$$tmp3=T_V \times coefH \qquad (32)$$

In Step S194, the normalization section 173 normalizes the intermediate data tmp3 (matrix product between the transform matrix $T_V$ and the coefficient data coefH) by bit-shifting the intermediate data tmp3 to the right by the primary vertical transform shift amount fwdShift2 derived in Step S192 and obtains the intermediate data tmp4, as represented by the following Equation (33).

$$tmp4=(tmp3+\text{offsetFwdShift2})>>\text{fwdShift2} \qquad (33)$$

It is noted that offsetFwdShift2 is a rounding offset at the time of normalization and is derived, as represented by, for example, the following Equation (34).

$$\text{offsetFwdShift2}=1<<(\text{fwdShift2}-1) \qquad (34)$$

It is noted that the intermediate data tmp4 may be normalized by the following Equation (35) as an alternative to Equation (33) described above.

$$tmp4=\text{sign}(tmp3)*(\text{abs}(tmp3)+\text{offsetFwdShift2})\text{>>}fwdShift2 \quad (35)$$

In Step S195, the clip section 174 clips a value of the intermediate data tmp4 so that the value falls within the range from the minimum value coefMin of the coefficient to the maximum value coefMax of the coefficient derived in Step S192 and derives the coefficient data coefP subjected to clipping, as represented by the following Equation (36).

$$coefP=\text{clip3}(coefMin,coefMax,tmp4) \quad (36)$$

When the processing of Step S195 is ended, the processing returns to FIG. 26.

As described above, performing the one-dimensional orthogonal transform on the coefficient data coefH the number of significant figures of which is expanded by the extension bit precision dBD, in the vertical direction, makes it possible for the primary vertical transform section 152 to obtain the coefficient data coefP subjected to the primary vertical transform. In other words, it is possible to perform the primary vertical transform with improved computing precision.

It is noted that the processing of Step S195 may be omitted.

<Flow of Quantization Processing>

Figure 29:
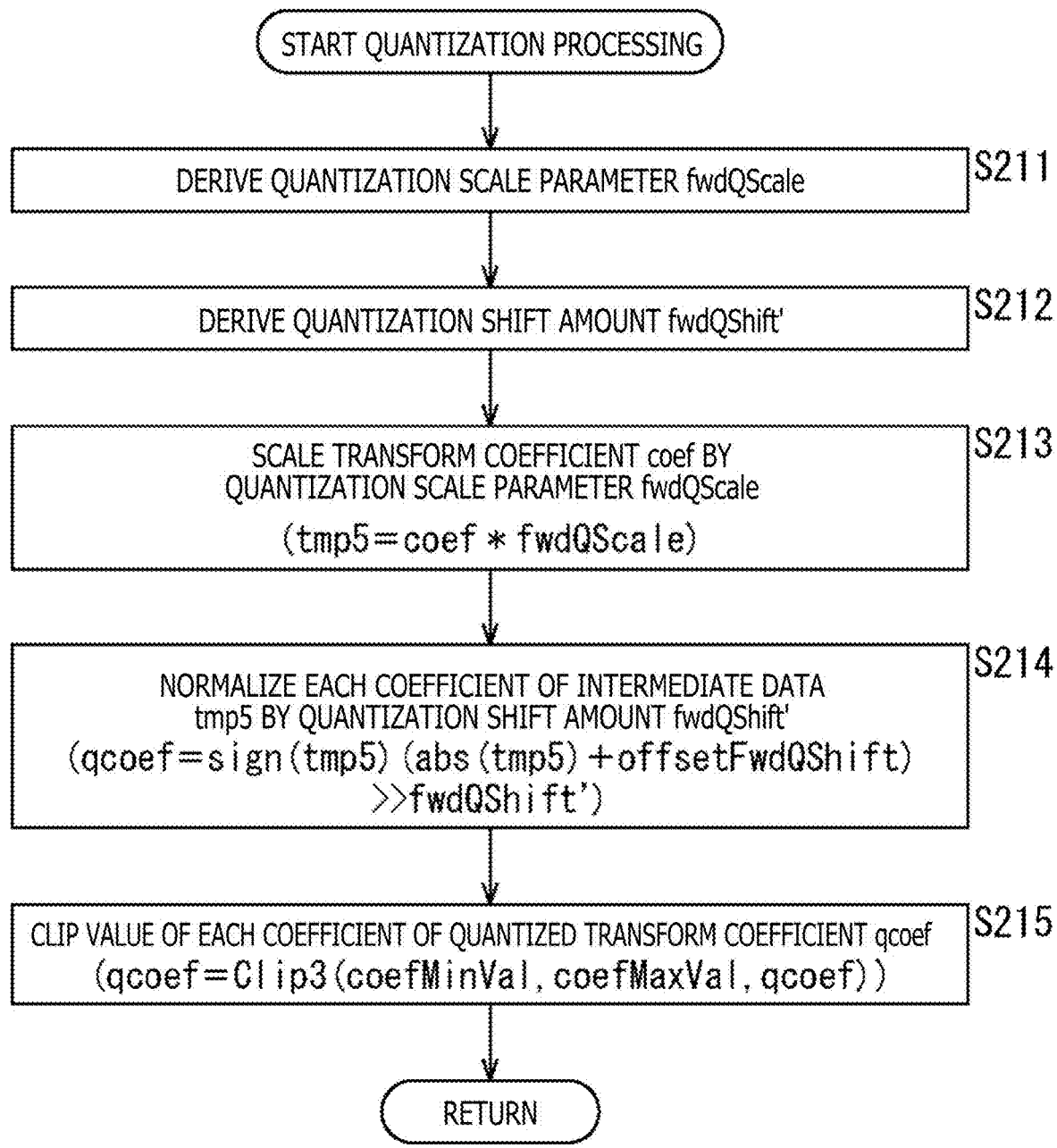
FIG. 29 is a flowchart illustrating an example of a flow of quantization processing.

An example of a flow of the quantization processing executed in the processing of Step S107 of FIG. 21 will be described with reference to a flowchart of FIG. 29.

When the quantization processing is started, the parameter derivation section 181 of the quantization section 114 derives the quantization scale parameter fwdQScale in Step S211. In a case, for example, in which a length and a width of the transform block are identical in size (that is, the transform block is a square) (log 2TrSize %2==0), the parameter derivation section 181 derives the quantization scale parameter fwdQScale, as represented by the following Equation (37).

$$fwdQScale=fwdLevelScale[qp\_rem]*(16/scaleMat) \quad (37)$$

Furthermore, in a case in which the length and the width of the transform block differ (log 2TrSize %2==1), the parameter derivation section 181 derives the quantization scale parameter fwdQScale, as represented by the following Equation (38).

$$fwdQScale=fwdLevelScale[qp\_rem]*(16/scaleMat)*WHScale \quad (38)$$

In Equations (37) and (38), qp_rem is a value of qp %6 (remainder when qp is divided by 6). In addition, qp_per is a value of qp//6 (quotient of dividing qp by 6). Further, WHScale is a correction scaling parameter in a case in which the size of the transform block is not a square size, and a predetermined value (for example, 181) is set to WHScale. Moreover, fwdLevelScale[ ] is an array in which scaling parameters per qp_rem (=qp %6) are stored, and values of fwdLevelScale=[26214,23302,20560,18396,16384,14564] are stored. Furthermore, scalingMat is a quantization matrix, and a value is set thereto per location of the transform coefficient.

In Step S212, the parameter derivation section 181 derives the quantization shift amount fwdQShift'. In the case, for example, in which the length and the width of the transform block are identical in size (that is, the transform block is a square) (log 2TrSize %2==0), the parameter derivation section 181 derives the quantization shift amount fwdQShift per sequence, as represented by the following Equation (39).

$$fwdQShift=quantShift+qp\_per+(\log 2TransformRange-channelBitDepth-\log 2TrSize) \quad (39)$$

In addition, in the case in which the length and the width of the transform block differ (log 2TrSize %2==1), the parameter derivation section 181 derives the quantization shift amount fwdQShift per sequence, as represented by the following Equation (40).

$$fwdQShift=quantShift+qp\_per+(\log 2TransformRange-channelBitDepth-\log 2TrSize-fwdWHShift) \quad (40)$$

In Equations (39) and (40), quantShift is a shift amount associated with the precision of the quantization scaling parameter, and a predetermined value (for example, 14) is set to quantShift. Indicated by log 2TrSize is a logarithmic value of the size of the transform block. Represented by log 2TransformRange is a parameter associated with the range of the transform coefficient, and a predetermined value (for example, 15) is set to log 2TransformRange. Represented by fwdWHShift is a correction shift amount when the size of the transform block is not a square size, and a predetermined value (for example, seven) is set to fwdWHShift. The extension bit precision dBD is a shift amount for expanding the number of significant figures of the transform coefficient. In a case, for example, of dBD=1, the precision is set to ½ times as that in the case of dBD=0.

The parameter derivation section 181 then corrects the derived quantization shift amount fwdQShift per sequence by using the extension bit precision dBD, as represented by the following Equation (41). In other words, the parameter derivation section 181 derives the local-level quantization shift amount fwdQShift' by using the quantization shift amount fwdQShift per sequence and the extension bit precision dBD.

$$fwdQShift'=fwdQShift+dBD \quad (41)$$

As represented by Equation (41), increasing a magnitude of the quantization shift amount fwdQShift by the extension bit precision dBD makes it possible to decrease the number of significant figures of the transform coefficient coef' subjected to quantization, by dBD. Moreover, in this case, it is possible to simultaneously perform the normalization processing accompanying the quantization and the transform coefficient normalization processing for normalizing the number of significant figures by dBD.

Further, in Step S212, the parameter derivation section 181 derives the minimum value coefMin and the maximum value coefMax of the transform coefficient by using the parameter log 2TransformRange associated with the range of the transform coefficient, as represented by the above Equations (24) and (25).

In Step S213, the quantization scaling section 182 scales the transform coefficient coef by the quantization scaling parameter fwdQScale derived in Step S211 and obtains the intermediate data tmp5, as represented by, for example, the following Equation (42).

$$tmp5=qcoef*fwdQScale \quad (42)$$

In Step S214, the quantization normalization section 183 normalizes the intermediate data tmp5 derived in Step S213, by bit-shifting the intermediate data tmp5 to the right by the quantization shift amount fwdQShift' derived in Step S212 and obtains the intermediate data tmp6, as represented by the following Equation (43).

$$tmp6 = \text{sign}(tmp5) * (\text{abs}(tmp5) + \text{offsetFwdQShift}) >> \text{fwdQShift'} \quad (43)$$

In Equation (43), offsetFwdQShift is a rounding offset at the time of quantization normalization, and an optimum rounding offset is determined by an approach such as RDOQ (Rate Distortion Optimized Quantization).

In Step S215, the clip section 184 clips a value of the intermediate data tmp6 obtained by the processing of Step S214 so that the value falls within the range from the minimum value coefMin of the coefficient to the maximum value coefMax of the coefficient derived in Step S212, and derives the coefficient data qcoef subjected to clipping, as represented by, for example, the following Equation (44).

$$qcoef = \text{clip3}(\text{coefMin}, \text{coefMax}, tmp6) \quad (44)$$

When the processing of Step S215 is ended, the processing returns to FIG. 21.

As described above, the quantization section 114 obtains the quantized coefficient qcoef by quantizing the transform coefficient coef the number of significant figures of which is expanded by the extension bit precision dBD. In other words, it is possible to perform the quantization with improved computing precision. Furthermore, in a case of this method, it is possible to simultaneously perform the normalization processing accompanying the quantization and the normalization processing for returning the precision of the transform coefficient the number of significant figures of which is expanded by dBD to the original precision of the number of significant figures.

It is noted that the processing of Step S215 may be omitted.

<Flow of Extension Bit Precision Information Encoding Processing>

In the encoding processing of Step S113 of FIG. 21, the information, such as the difference parameter deltaX of the extension bit precision dBD, associated with the control over the number of significant figures (control over the computing precision) and supplied from the control section 101 is also encoded and contained in the bit stream.

Figure 30:
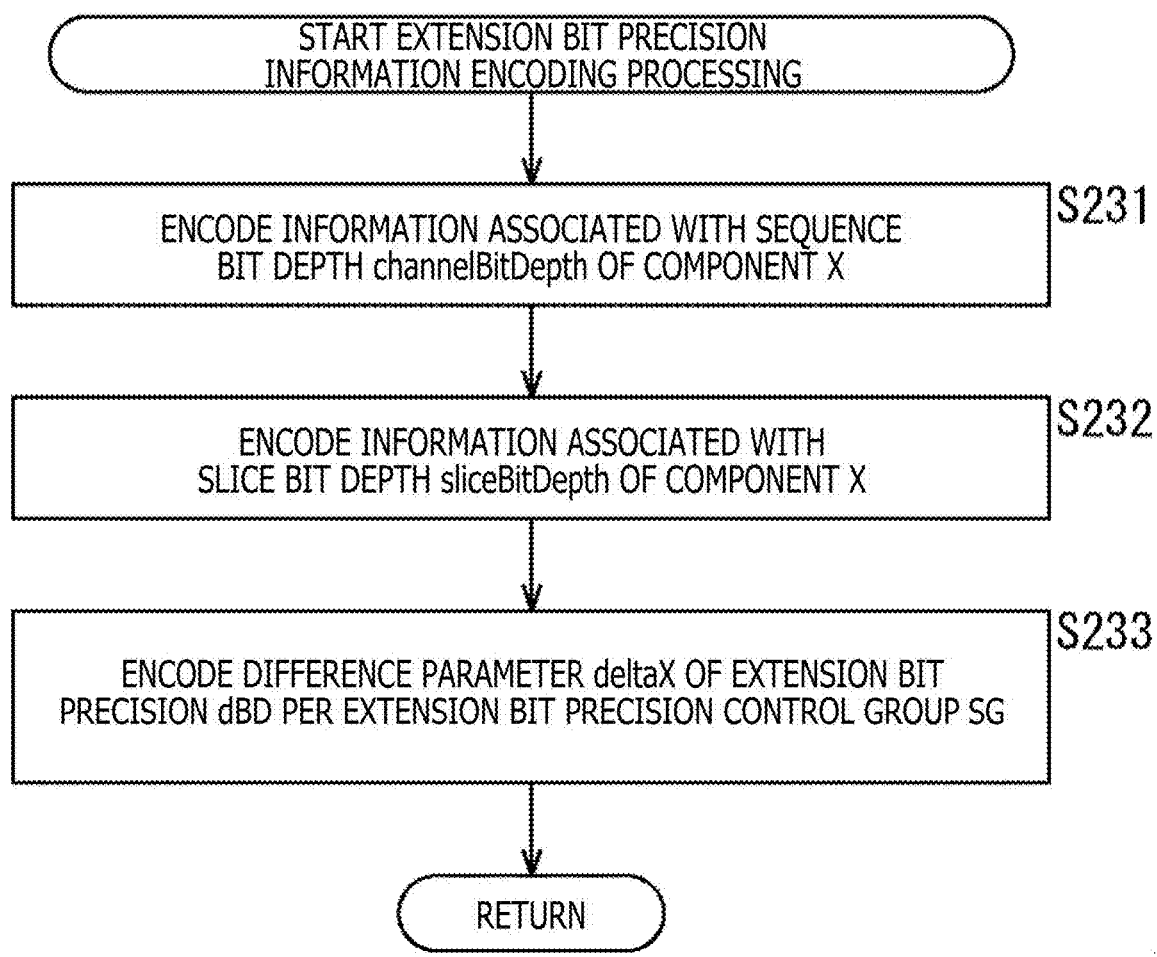
FIG. 30 is a flowchart illustrating an example of a flow of extension bit precision information encoding processing.

An example of a flow of extension bit precision information encoding processing for encoding such information associated with the control over the number of significant figures (control over the computing precision) will be described with reference to a flowchart of FIG. 30.

When the extension bit precision information encoding processing is started, the encoding section 115 encodes information associated with the sequence bit depth channelBitDepth of each component (syntax values), as one parameter in the sequence parameter set in Step S231. Examples of syntaxes associated with channelBitDepth are as follows.

bit_depth_luma_minus8: syntax indicating sequence bit depth of luminance bit_depth_chroma_minus8: syntax indicating sequence bit depth of chrominance These syntax values are derived as represented by, for example, the following Equations (45) and (46). For example, the sequence bit depth setting section 131 of the control section 101 derives these syntax values in Step S131 of FIG. 22.

$$\text{bit\_depth\_luma\_minus8} = \text{channelBitDepth} - 8 \quad (45)$$

$$\text{bit\_depth\_chroma\_minus8} = \text{channelBitDepth} - 8 \quad (46)$$

The encoding section 115 encodes these syntax values supplied from the control section 101, as the information associated with the sequence bit depth channelBitDepth, and contains the encoded result in a bit stream (generates a bit stream containing the information associated with the sequence bit depth).

Figure 22:
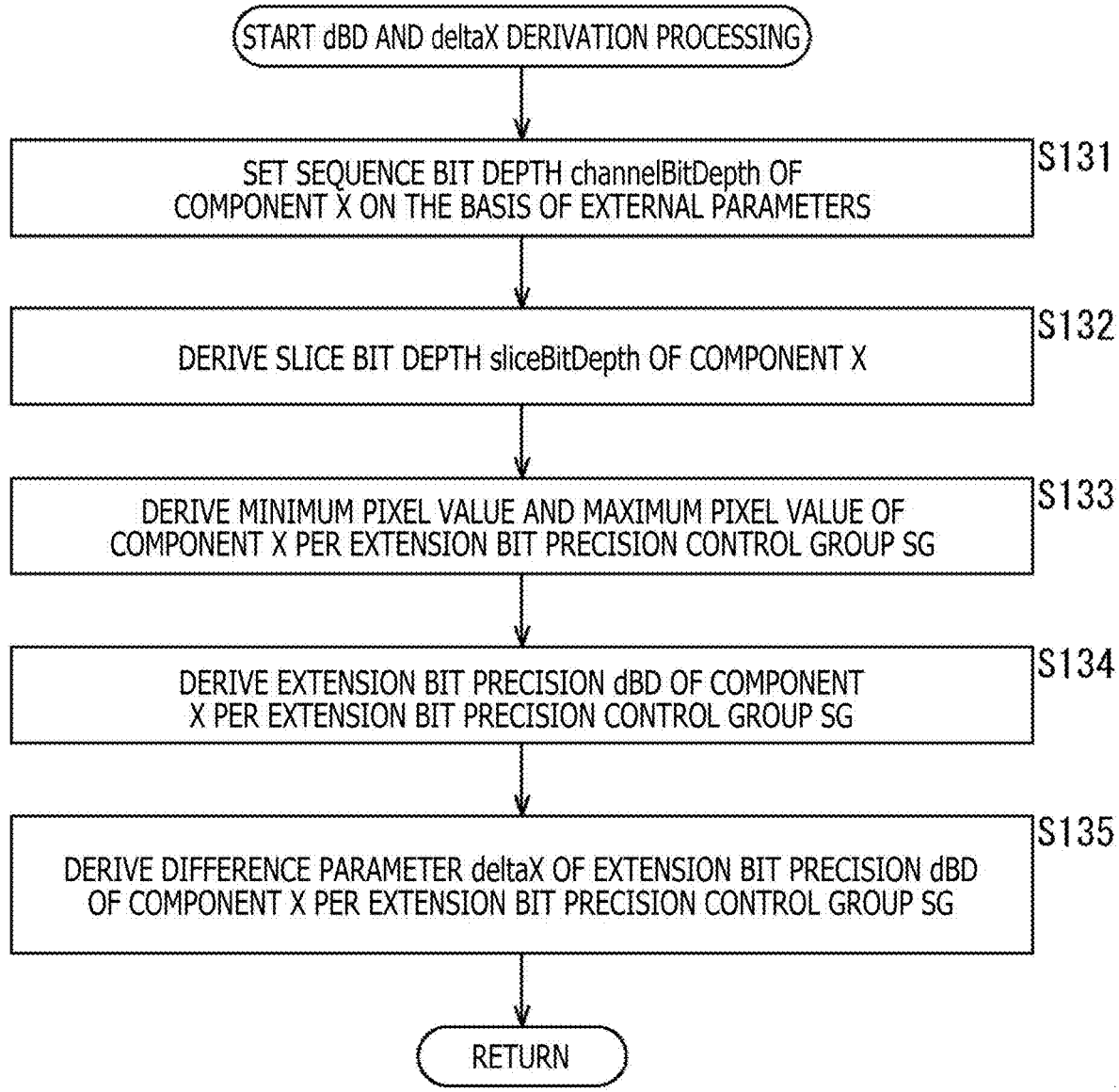
FIG. 22 is a flowchart illustrating an example of a flow of dBD and deltaX derivation processing.

In Step S232, the encoding section 115 encodes information associated with the slice bit depth sliceBitDepth of each component (syntax values), as one parameter in the slice header SH. Examples of syntaxes associated with the slice bit depth sliceBitDepth are as follows.

slice_min_val: minimum pixel value of component X (X=Y/Cb/Cr) within slice slice_max_val: maximum pixel value of component X (X=Y/Cb/Cr) within slice For example, the slice bit depth setting section 132 of the control section 101 derives these syntax values in Step S132 of FIG. 22. The encoding section 115 encodes these syntax values supplied from the control section 101, as the information associated with the slice bit depth sliceBitDepth, and contains the encoded result in a bit stream (generates a bit stream containing the information associated with the slice bit depth).

In Step S233, the encoding section 115 encodes the difference parameter deltaX of the extension bit precision dBD of the component X per extension bit precision control group SG. For example, the deltaX derivation section 135 of the control section 101 derives this difference parameter deltaX in Step S135 of FIG. 22. The encoding section 115 encodes the difference parameter deltaX supplied from the control section 101, as the information associated with the extension bit precision dBD, and contains the encoded difference parameter deltaX in a bit stream (generates a bit stream containing the difference parameter deltaX).

When processing of Step S233 is ended, then the extension bit precision information encoding processing is ended, and the processing returns to FIG. 21.

As described above, by encoding the information associated with the control over the number of significant figures such as the difference parameter deltaX (control over the computing precision), containing the encoded information in the bit stream, and transmitting the bit stream from the encoding side to the decoding side, it is possible for the decoding side to perform decoding by the method to which the present technology is applied. It is therefore possible to suppress a reduction in encoding efficiency.

FIG. 31 is a diagram depicting an example of syntaxes of the difference parameter deltaX. The syntax in A of FIG. 31 depicts an example of a case of signaling the difference parameter deltaX in larger units than the transform blocks such as CTUs, CTBs, CUs, or CBs. This can decrease overhead.

It is noted that adaptive_scaling_enabled_flag is a flag indicating whether or not adaptive scaling is applicable, and adaptive_scaling_enabled_flag is notified by header information (for example, the sequence parameter set (SPS), the picture parameter set (PPS), or the slice header (SH)).

When the flag is true (1), the adaptive scaling is applied; thus, a syntax group associated with adaptive scaling is decoded/encoded. On the other hand, when the flag is false (0), the adaptive scaling is not applied; thus, it is interpreted that deltaX(X=Y/Cb/Cr)=0.

The syntax in B of FIG. 31 indicates an example of a case of signaling the different parameter deltaX in transform block units. In this case, the difference parameter is encoded/decoded with respect to the transform block having a significant coefficient, by referring to a cbf (coded block flag) of each component. This can decrease overhead.

<Image Decoding Apparatus>

Figure 32:
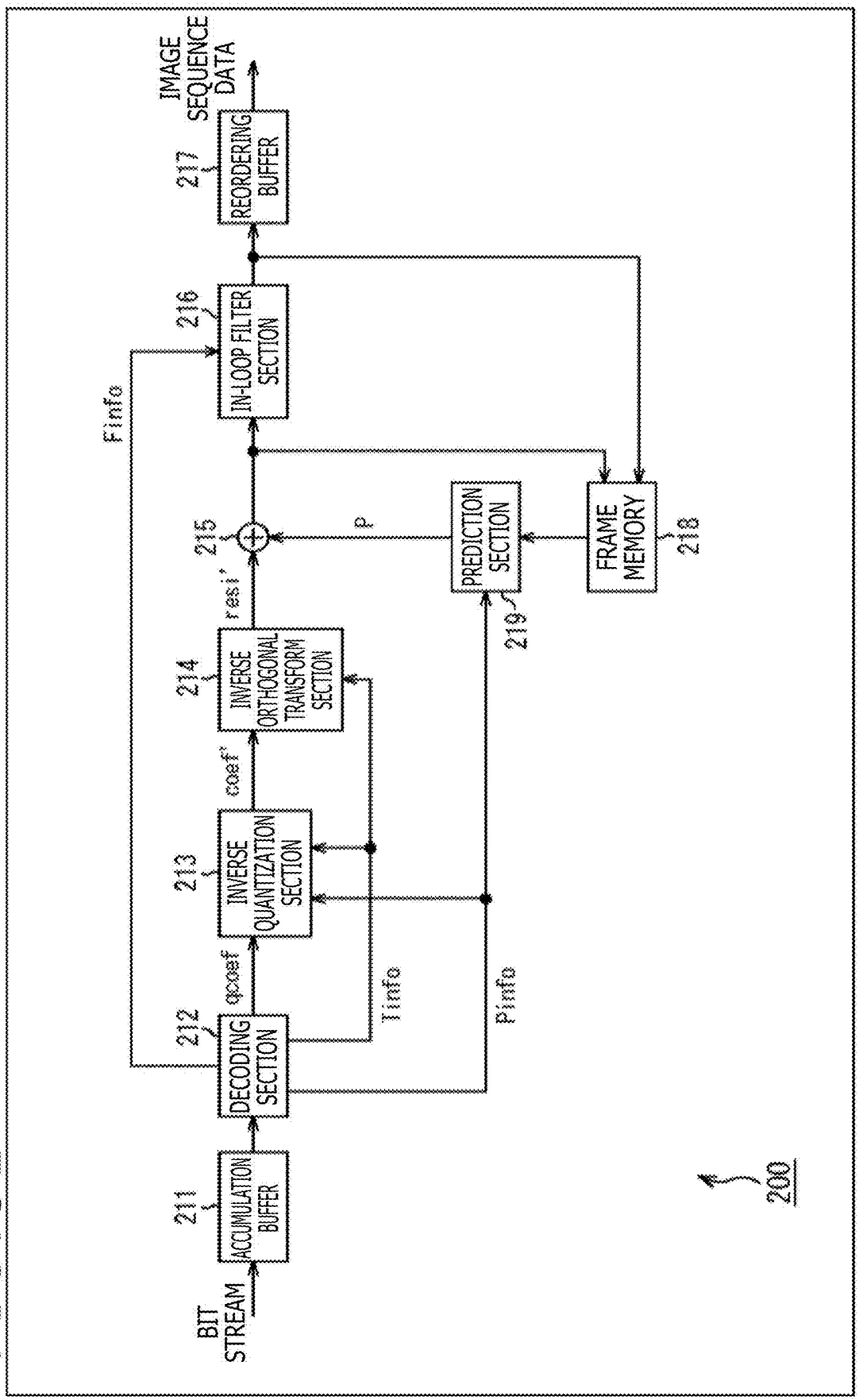
FIG. 32 is a block diagram depicting an example of principal configurations of an image decoding apparatus.

Next, configurations of controlling the computing precision in the method #1 in the table of FIG. 9 at the time of decoding will be described. FIG. 32 is a block diagram depicting an example of configurations of an image decoding apparatus that is one aspect of the image processing apparatus to which the present technology is applied. An image decoding apparatus 200 depicted in FIG. 32 is an apparatus that decodes encoded data obtained by encoding a prediction residual between an image and a predicted image thereof such as an AVC or HEVC-compliant apparatus. For example, the image decoding apparatus 200 implements the technologies described in NPL 1 to NPL 3 and decodes encoded data obtained by encoding image data regarding an image sequence with use of a method compliant with standards described in any of those documents. For example, the image decoding apparatus 200 decodes encoded data (bit stream) generated by the image encoding apparatus 100 described above.

It is noted that principal configurations such as processing sections and flows of data depicted in FIG. 32 are not necessarily all configurations. In other words, processing sections that are not depicted as blocks in FIG. 32 may be present or processing and flows of data that are not indicated by arrows or the like in FIG. 32 may be present in the image decoding apparatus 200. This applies to other drawings for illustrating processing sections and the like within the image decoding apparatus 200.

In FIG. 32, the image decoding apparatus 200 includes an accumulation buffer 211, a decoding section 212, an inverse quantization section 213, an inverse orthogonal transform section 214, a computing section 215, an in-loop filter section 216, a reordering buffer 217, a frame memory 218, and a prediction section 219. It is noted that the prediction section 219 includes an intra prediction section and an inter prediction section that are not depicted. The image decoding apparatus 200 is an apparatus for generating image sequence data by decoding the encoded data (bit stream).

<Accumulation Buffer>

The accumulation buffer 211 acquires the bit stream input to the image decoding apparatus 200 and holds (stores) the bit stream. The accumulation buffer 211 supplies the accumulated bit stream to the decoding section 212 either at a predetermined timing or in a case, for example, in which a predetermined condition is satisfied.

<Decoding Section>

The decoding section 212 performs processing associated with image decoding. For example, the bit stream supplied from the accumulation buffer 211 is input to the decoding section 212, and the decoding section 212 performs variable-length decoding on a syntax value of each syntax element from a bit sequence thereof according to a definition of a syntax table and derives parameters.

The parameters derived from the syntax elements and the syntax values of the syntax elements contain information such as the header information Hinfo, the prediction mode information Pinfo, the transform information Tinfo, the residual information RInfo, and the filter information Finfo, for example. In other words, the decoding section 212 parses these pieces of information (analyzes and acquires these pieces of information) from the bit stream. These pieces of information will hereinafter be described.

<Header Information Hinfo>

The header information Hinfo contains header information which is, for example, a VPS (Video Parameter Set), an SPS (Sequence Parameter Set), a PPS (Picture Parameter Set), and an SH (slice header). The header information Hinfo contains information specifying, for example, an image size (width PicWidth, height PicHeight), bit depths (luminannce bitDepthY, chrominance bitDepthC), a chrominance array type ChromaArrayType, a maximum value MaxCUSize/minimum value MinCUSize of a CU size, a maximum depth MaxQTDepth/minimum depth MinQTDepth of a quadtree segmentation (also referred to as a "Quad-tree segmentation"), maximum depth MaxBTDepth/minimum depth MinBTDepth of Binary-tree segmentation, a maximum value MaxTSSize of a transform skip block (also referred to as a "maximum transform skip block size"), and an on-off flag (also referred to as an "enabled flag") of each encoding tool.

Examples of the on-off flag of each encoding tool contained in the header information Hinfo include an on-off flag associated with transform and quantization processing described below. It is noted that the on-off flag of the encoding tool can also be interpreted as a flag that indicates whether or not a syntax associated with the encoding tool is present in the encoded data. In addition, a case in which a value of the on-off flag is 1 (true) indicates that the encoding tool is available, and a case in which the value of the on-off flag is 0 (false) indicates that the encoding tool is unavailable. It is noted that the flag values can be interpreted reversely.

Cross-component prediction enabled flag (ccp_enabled_flag): flag information indicating whether or not cross-component prediction (CCP) (also referred to as "CC prediction") is available. For example, a case in which this flag information is "1" (true) indicates that the CCP is available, and a case in which the flag information is "0" (false) indicates that the CCP is unavailable.

It is noted that this CCP is also referred to as a "cross-component linear prediction (CCLM or CCLMP)."

<Prediction Mode Information Pinfo>

The prediction mode information Pinfo contains, for example, information such as size information PBSize (prediction block size), intra prediction mode information IPinfo, and movement prediction information MVinfo regarding a PB (prediction block) to be processed.

The intra prediction mode information IPinfo contains, for example, prev_intra_luma_pred_flag, mpm_idx, and rem_intra_pred_mode in JCTVC-W1005, 7.3.8.5 Coding Unit syntax and a luminance intra prediction mode IntraPredModeY derived from the syntax.

Further, the intra prediction mode information IPinfo contains, for example, a cross-component prediction flag (ccp_flag (cclmp_flag)), a multi-class linear prediction mode flag (mclm_flag), a chrominance sample location type identifier (chroma_sample_loc_type_idx), a chrominance MPM identifier (chroma_mpm_idx), and a luminance intra prediction mode (IntraPredModeC) derived from these syntaxes.

The cross-component prediction flag (ccp_flag (cclmp_flag)) is flag information indicating whether or not to apply the cross-component linear prediction. For example, ccp_flag==1 indicates that the cross-component prediction is to be applied, and ccp_flag==0 indicates that the cross-component prediction is not to be applied.

The multi-class linear prediction mode flag (mclm_flag) is information associated with a linear prediction mode (linear prediction mode information). More specifically, the multi-class linear prediction mode flag (mclm_flag) is flag information indicating whether or not to set a multi-class linear prediction mode. For example, a case of "0" indicates a one-class mode (single-class mode) (for example, CCLMP), and a case of "1" indicates a two-class mode (multi-class mode) (for example, MCLMP).

The chrominance sample location type identifier (chroma_sample_loc_type_idx) is an identifier that identifies a type of a pixel location of a chrominance component (also referred to as a "chrominance sample location type"). For example, in a case in which the chrominance array type (ChromaArrayType) that is information associated with a color format indicates format 420, the chrominance sample location type identifier is assigned as represented by the following Expression (47).

$$\text{chroma\_sample\_loc\_type\_idx}==0{:}\text{Type2}$$

$$\text{chroma\_sample\_loc\_type\_idx}==1{:}\text{Type3}$$

$$\text{chroma\_sample\_loc\_type\_idx}==2{:}\text{Type1}$$

$$\text{chroma\_sample\_loc\_type\_idx}==3{:}\text{Type0} \quad (47)$$

It is noted that this chrominance sample location type identifier (chroma_sample_loc_type_idx) is transmitted as information associated with pixel locations of a chrominance component (chroma_sample_loc_info( )) (transmitted while being stored in the information associated with pixel locations of a chrominance component (chroma_sample_loc_info( )).

The chrominance MPM identifier (chroma_mpm_idx) is an identifier representing which prediction mode candidate in a chrominance intra prediction mode candidate list (intraPredModeCandListC) is to be designated as the chrominance intra prediction mode.

The movement prediction information MVinfo contains, for example, information such as merge_idx, merge_flag, inter_pred_idc, ref_idx_LX, mvp_lX_flag, X={0,1}, and mvd (refer to, for example, JCTVC-W1005, 7.3.8.6 Prediction Unit Syntax).

Needless to say, the information to be contained in the prediction mode information Pinfo may be any information, and information other than those pieces of information may be contained in the prediction mode information Pinfo.

<Transform Information Tinfo>

The transform information Tinfo contains, for example, the following pieces of information. Needless to say, the information to be contained in the transform information Tinfo may be any information, and information other than those pieces of information may be contained in the transform information Tinfo.

A width size TBWSize and a height size TBHSize of the transform block to be processed (which may be base 2 logarithmic values log 2TBWSize (or log 2TrWidth) and log 2TBHSize (or log 2TrHeight) of TBWSize (or TrWidth) and TBHSize (or TrHeight)).

A transform skip flag (ts_flag): a flag indicating whether or not to skip (inverse) primary transform and (inverse) secondary transform.

Scan identifier (scanIdx)

Quantization parameter (qp)

Quantization matrix (scaling_matrix (for example, JCTVC-W1005, 7.3.4 Scaling list data syntax))

<Residual Information RInfo>

The residual information RInfo (refer to, for example, 7.3.8.11 Residual Coding syntax of JCTVC-W1005) contains, for example, the following syntaxes.

cbf (coded_block_flag): a flag indicating whether or not residual data is present last_sig_coeff_x_pos: a last nonzero coefficient X coordinate last_sig_coeff_y_pos: a last nonzero coefficient Y coordinate coded_sub_block_flag: a flag indicating whether or not a sub-block nonzero coefficient is present sig_coeff_flag: a flag indicating whether or not a nonzero coefficient is present gr1_flag: a flag indicating whether a level of a nonzero coefficient is greater than one (also referred to as a "GR1 flag")

gr2_flag: a flag indicating whether a level of a nonzero coefficient is greater than two (also referred to as a "GR2 flag")

sign_flag: a sign indicating whether a nonzero coefficient is positive or negative (also referred to as a "sign code")

coeff_abs_level_remaining: remaining level of a nonzero coefficient (also referred to as a "nonzero coefficient remaining level)

Needless to say, the information to be contained in the residual information RInfo may be any information, and information other than these pieces of information may be contained in the residual information RInfo.

<Filter Information Finfo>

The filter information Finfo contains, for example, control information associated with each of the following filter processing.

Control information associated with the deblocking filter (DBF)

Control information associated with the pixel adaptive offset (SAO)

Control information associated with the adaptive loop filter (ALF)

Control information associated with other linear/nonlinear filters

More specifically, the filter information Finfo contains, for example, information designating a picture or an area in the picture to which each filter is applied, filter On/Off control information in each CU, and filter On/Off control information associated with boundaries of slices and tiles. Needless to say, the information to be contained in the filter information Finfo may be any information, and information other than these pieces of information may be contained in the filter information Finfo.

The decoding section 212 will be described again. The decoding section 212 refers to the residual information RInfo and derives the quantized coefficient qcoef at each coefficient location within each transform block. The decoding section 212 supplies the quantized coefficient qcoef to the inverse quantization section 213.

Further, the decoding section 212 supplies the header information Hinfo, the prediction mode information Pinfo, the quantized coefficient qcoef, the transform information Tinfo, and the filter information Finfo that are completed with parsing to blocks. Specifically, the decoding section 212 supplies the parsed information as follows.

The header information Hinfo is supplied to the inverse quantization section 213, the inverse orthogonal transform section 214, the prediction section 219, and the in-loop filter section 216.

The prediction mode information Pinfo is supplied to the inverse quantization section 213 and the prediction section 219.

The transform information Tinfo is supplied to the inverse quantization section 213 and the inverse orthogonal transform section 214.

The filter information Finfo is supplied to the in-loop filter section 216.

Needless to say, supply destinations described above are one example and are not limited to this example. For example, each encoding parameter may be supplied to a freely-selected processing section. Furthermore, the other pieces of information may be supplied to a freely-selected processing section.

For example, the information associated with the control over the effective coefficient (control over computing precision) such as the information associated with the sequence bit depth channelBitDepth, the information associated with the slice bit depth sliceBitDepth, and the difference parameter deltaX described above in the description of the image encoding apparatus 100 may be contained in the transform information Tinfo.

<Inverse Quantization Section>

The inverse quantization section 213 performs processing associated with inverse quantization. For example, the transform information Tinfo and the quantized coefficient qcoef supplied from the decoding section 212 are input to the inverse quantization section 213, and the inverse quantization section 213 scales (inversely quantizes) the value of the quantized coefficient qcoef on the basis of the transform information Tinfo and derives the transform coefficient coef' subjected to the inverse quantization.

It is noted that this inverse quantization is performed as inverse processing of the quantization performed by the quantization section 114. In addition, this inverse quantization is processing similar to the inverse quantization performed by the inverse quantization section 117. In other words, the inverse quantization section 117 performs the processing (inverse quantization) similar to that performed by the inverse quantization section 213.

The inverse quantization section 213 supplies the derived transform coefficient coef' to the inverse orthogonal transform section 214.

<Inverse Orthogonal Transform Section>

The inverse orthogonal transform section 214 performs processing associated with inverse orthogonal transform. For example, the transform coefficient coef' supplied from the inverse quantization section 213 and the transform information Tinfo supplied from the decoding section 212 are input to the inverse orthogonal transform section 214, and the inverse orthogonal transform section 214 performs inverse orthogonal transform processing on the transform coefficient coef' on the basis of the transform information Tinfo and derives the prediction residual resi'.

It is noted that this inverse orthogonal transform is performed as inverse processing of the orthogonal transform performed by the orthogonal transform section 113. In addition, this inverse orthogonal transform is processing similar to the inverse orthogonal transform performed by the inverse orthogonal transform section 118. In other words, the inverse orthogonal transform section 118 performs the processing (inverse orthogonal transform) similar to that performed by the inverse orthogonal transform section 214.

The inverse orthogonal transform section 214 supplies the derived prediction residual resi' to the computing section 215.

<Computing Section>

The computing section 215 performs processing associated with addition of information associated with the image. For example, the prediction residual resi' supplied from the inverse orthogonal transform section 214 and the predicted image P supplied from the prediction section 219 are input to the computing section 215. The computing section 215 adds up the prediction residual resi' and the predicted image P (predicted signal) corresponding to the prediction residual resi' and derives the local decoded image $R_{local}$, as represented by the following Equation (48).

$$R_{local} = resi' + P \qquad (48)$$

The computing section 215 supplies the derived local decoded image $R_{local}$ to the in-loop filter section 216 and the frame memory 218.

<In-Loop Filter Section>

The in-loop filter section 216 performs processing associated with in-loop filter processing. For example, the local decoded image $R_{local}$ supplied from the computing section 215 and the filter information Finfo supplied from the decoding section 212 are input to the in-loop filter section 216. It is noted that information to be input to the in-loop filter section 216 may be any information, and information other than these pieces of information may be input to the in-loop filter section 216.

The in-loop filter section 216 performs filter processing on the local decoded image $R_{local}$ on the basis of the filter information Finfo as appropriate.

For example, as described in NPL 1, the in-loop filter section 216 applies four in-loop filters, which are the bilateral filter, the deblocking filter (DBF (DeBlocking Filter)), the adaptive offset filter (SAO (Sample Adaptive Offset), and the adaptive loop filter (ALF (Adaptive Loop Filter)), in this order. It is noted that the specific filters and order of application thereof can be selected freely, and selection can be made as appropriate.

The in-loop filter section 216 performs filter processing corresponding to the filter processing performed by the encoding side (for example, in-loop filter section 120 of the image encoding apparatus 100). Needless to say, the filter processing to be performed by the in-loop filter section 216 can be selected freely and is not limited to an example described above. For example, the in-loop filter section 216 may apply a Wiener filter and the like.

The in-loop filter section 216 supplies the filter-processed local decoded image $R_{local}$ to the reordering buffer 217 and the frame memory 218.

<Reordering Buffer>

The local decoded image $R_{local}$ supplied from the in-loop filter section 216 is input to the reordering buffer 217, and the reordering buffer 217 holds (stores) the local decoded image $R_{local}$. The reordering buffer 217 reconstructs the decoded image R of each picture unit by using the local decoded image $R_{local}$ and holds the decoded image R (stores the decoded image R in a buffer). The reordering buffer 217 reorders the obtained decoded images R from an order of decoding to an order of reproduction. The reordering buffer 217 outputs the reordered decoded image R group to outside of the image decoding apparatus 200, as image sequence data.

<Frame Memory>

The frame memory 218 performs processing related to storage of data associated with images. For example, the local decoded image $R_{local}$ supplied by the computing section 215 is input to the frame memory 218, and the frame memory 218 reconstructs the decoded image R of each picture unit and stores the decoded image R in a buffer of the frame memory 218.

Further, the in-loop-filter-processed local decoded image $R_{local}$ supplied from the in-loop filter section 216 is input to the frame memory 218, and the frame memory 218 reconstructs the decoded image R of each picture unit and stores the decoded image R in the buffer of the frame memory 218. The frame memory 218 supplies the stored decoded image R (or part of the decoded image R) to the prediction section 219, as a reference image, as appropriate.

It is noted that the frame memory 218 may store the header information Hinfo, the prediction mode information Pinfo, the transform information Tinfo, the filter information Finfo, and the like related to generation of the decoded image.

<Prediction Section>

The prediction section 219 performs processing associated with generation of a predicted image. For example, the prediction mode information Pinfo supplied from the decoding section 212 is input to the prediction section 219, and the prediction section 219 performs prediction by a prediction method designated by the prediction mode information Pinfo and derives the predicted image P. At the time of the derivation, the prediction section 219 uses either the pre-filtering processing or post-filtering processing decoded image R (or part of the decoded image R) designated by the prediction mode information Pinfo and stored in the frame memory 218, as a reference image. The prediction section 219 supplies the derived predicted image P to the computing section 215.

In the image decoding apparatus 200 configured as described above, the decoding section 212, the inverse quantization section 213, and the inverse orthogonal transform section 214 perform processing to which the present technology is applied as described above. Furthermore, the decoding section 212 performs, as the decoding section, the processing (processing associated with the control over the number of significant figures within a sequence) to which the present technology is applied as described above.

For example, the decoding section 212 decodes the bit stream and extracts information associated with the control over the number of significant figures contained in the bit stream. For example, the decoding section 212 extracts information such as the information associated with the sequence bit depth channelBitDepth, the information associated with the slice bit depth sliceBitDepth, and the difference parameter deltaX as this information associated with the control over the number of significant figures. Moreover, the decoding section 212 derives the sequence bit depth channelBitDepth, the slice bit depth sliceBitDepth, the extension bit precision dBD, and the like from those pieces of information.

The decoding section 212 supplies these pieces of information to predetermined processing sections. For example, the decoding section 212 supplies the sequence bit depth channelBitDepth and the extension bit precision dBD to the inverse quantization section 213 and the inverse orthogonal transform section 214, as the transform information Tinfo.

The inverse quantization section 213 performs inverse quantization as described above and controls the computing precision (the number of significant figures of the coefficient data) according to the change of the bit depth in the time direction or the spatial direction within the sequence, on the basis of the sequence bit depth channelBitDepth and the extension bit precision dBD supplied from the decoding section 212 as the transform information Tinfo. For example, the inverse quantization section 213 controls the number of significant figures of the coefficient data by bit-shifting the coefficient data by the shift amount according to the local-level bit depth (shift amount according to the extension bit precision dBD).

The inverse orthogonal transform section 214 performs inverse orthogonal transform as described above and controls the computing precision (the number of significant figures of coefficient data) according to the change of the bit depth in the time direction or the spatial direction within the sequence, on the basis of the sequence bit depth channelBitDepth and the extension bit precision dBD supplied from the control section 101 as the transform information Tinfo. For example, the inverse orthogonal transform section 214 controls the number of significant figures of the residual data by bit-shifting the residual data by the shift amount according to the local-level bit depth (shift amount according to the extension bit precision dBD).

Therefore, the image decoding apparatus 200 can suppress a reduction in encoding efficiency.

<Details of Decoding Section>

Figure 33:
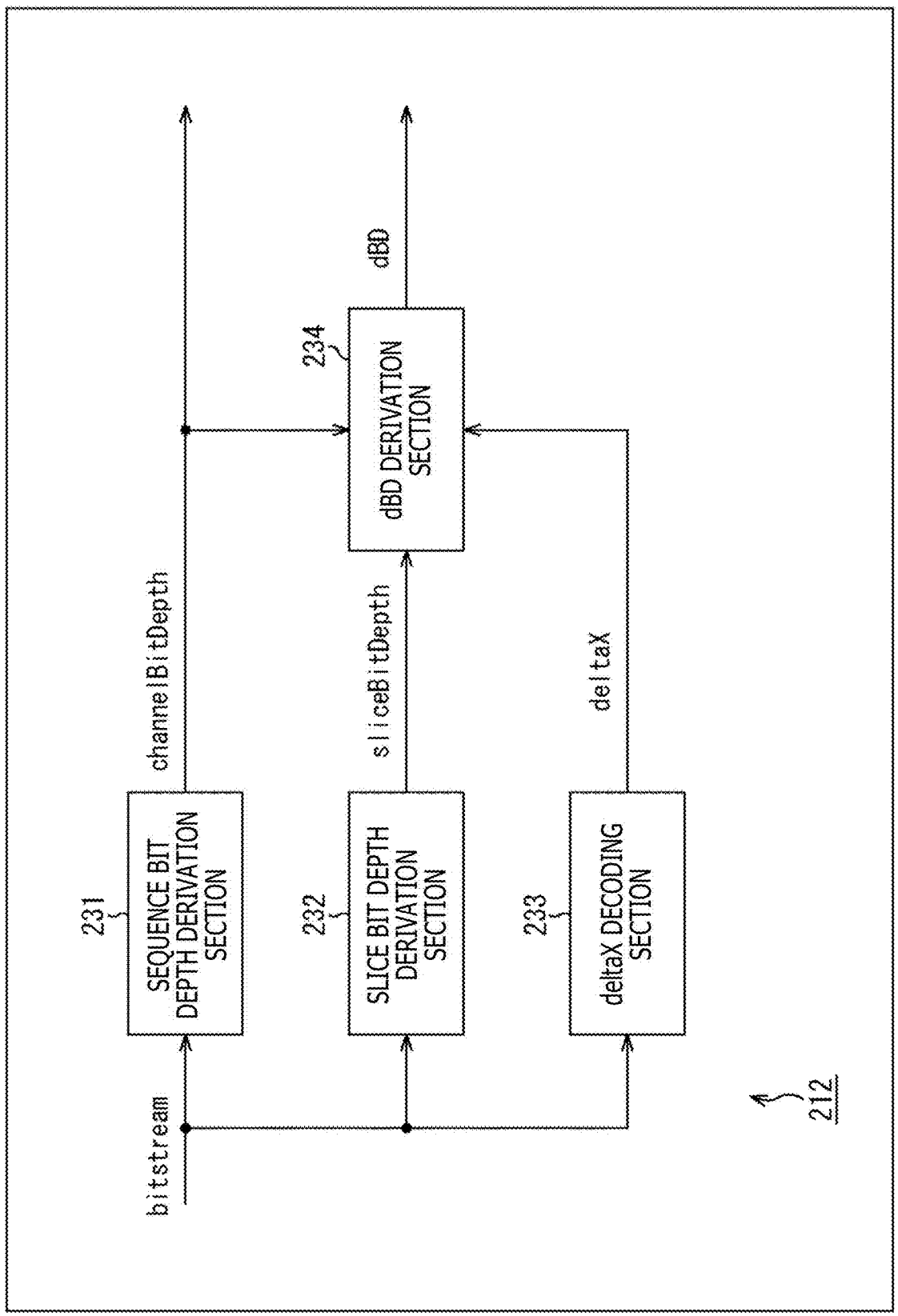
FIG. 33 is a block diagram depicting an example of principal configurations of a decoding section.

FIG. 33 is a block diagram depicting an example of principal configurations of the decoding section 212, the principal configurations being related to extraction of information associated with control over the number of significant figures. As depicted in FIG. 33, the decoding section 212 has a sequence bit depth derivation section 231, a slice bit depth derivation section 232, a deltaX decoding section 233, and a dBD derivation section 234. While the decoding section 212 performs processing other than the extraction or the like of the information associated with the control over the number of significant figures, i.e., decoding of other pieces of information, as described above, description of configurations with respect to such series of processing is omitted.

The bit stream bitstream in the accumulation buffer 211 is input to the sequence bit depth derivation section 231, and the sequence bit depth derivation section 231 performs processing associated with derivation of the sequence bit depth channelBitDepth. For example, the sequence bit depth derivation section 231 decodes and extracts information associated with the sequence bit depth contained in the bit stream. Further, for example, the sequence bit depth derivation section 231 drives the sequence bit depth channelBitDepth by using the extracted information associated with the sequence bit depth. Moreover, for example, the sequence bit depth derivation section 231 supplies the derived sequence bit depth channelBitDepth to the dBD derivation section 234. Furthermore, for example, the sequence bit depth derivation section 231 supplies the derived sequence bit depth channelBitDepth to the inverse quantization section 213 and the inverse orthogonal transform section 214, as the transform information Tinfo.

The bit stream bitstream in the accumulation buffer 211 is input to the slice bit depth derivation section 232, and the slice bit depth derivation section 232 performs processing associated with derivation of the slice bit depth sliceBitDepth. For example, the slice bit depth derivation section 232 decodes and extracts information associated with the slice bit depth contained in the bit stream. Further, for example, the slice bit depth derivation section 232 derives the slice bit depth sliceBitDepth by using the derived information associated with the slice bit depth. Moreover, for example, the slice bit depth derivation section 232 supplies the derived slice bit depth sliceBitDepth to the dBD derivation section 234.

The bit stream bitstream in the accumulation buffer 211 is input to the deltaX decoding section 233, and the deltaX decoding section 233 performs processing associated with decoding of the difference parameter deltaX. For example, the deltaX decoding section 233 decodes and extracts the difference parameter deltaX (information associated with the extension bit precision) contained in the bit stream. The deltaX decoding section 233 supplies the obtained difference parameter deltaX to the dBD derivation section 234.

The sequence bit depth channelBitDepth supplied from the sequence bit depth derivation section 231, the slice bit depth sliceBitDepth supplied from the slice bit depth derivation section 232, and the difference parameter deltaX supplied from the deltaX decoding section 233 are input to the dBD derivation section 234, and the dBD derivation section 234 performs processing associated with derivation of the extension bit precision dBD. For example, the dBD derivation section 234 derives the extension bit precision dBD per local level on the basis of those parameters. In addition, the dBD derivation section 134 supplies the derived extension bit precision dBD to the inverse quantization section 213 and the inverse orthogonal transform section 214, as the transform information Tinfo.

<Inverse Quantization Section>

Figure 34:
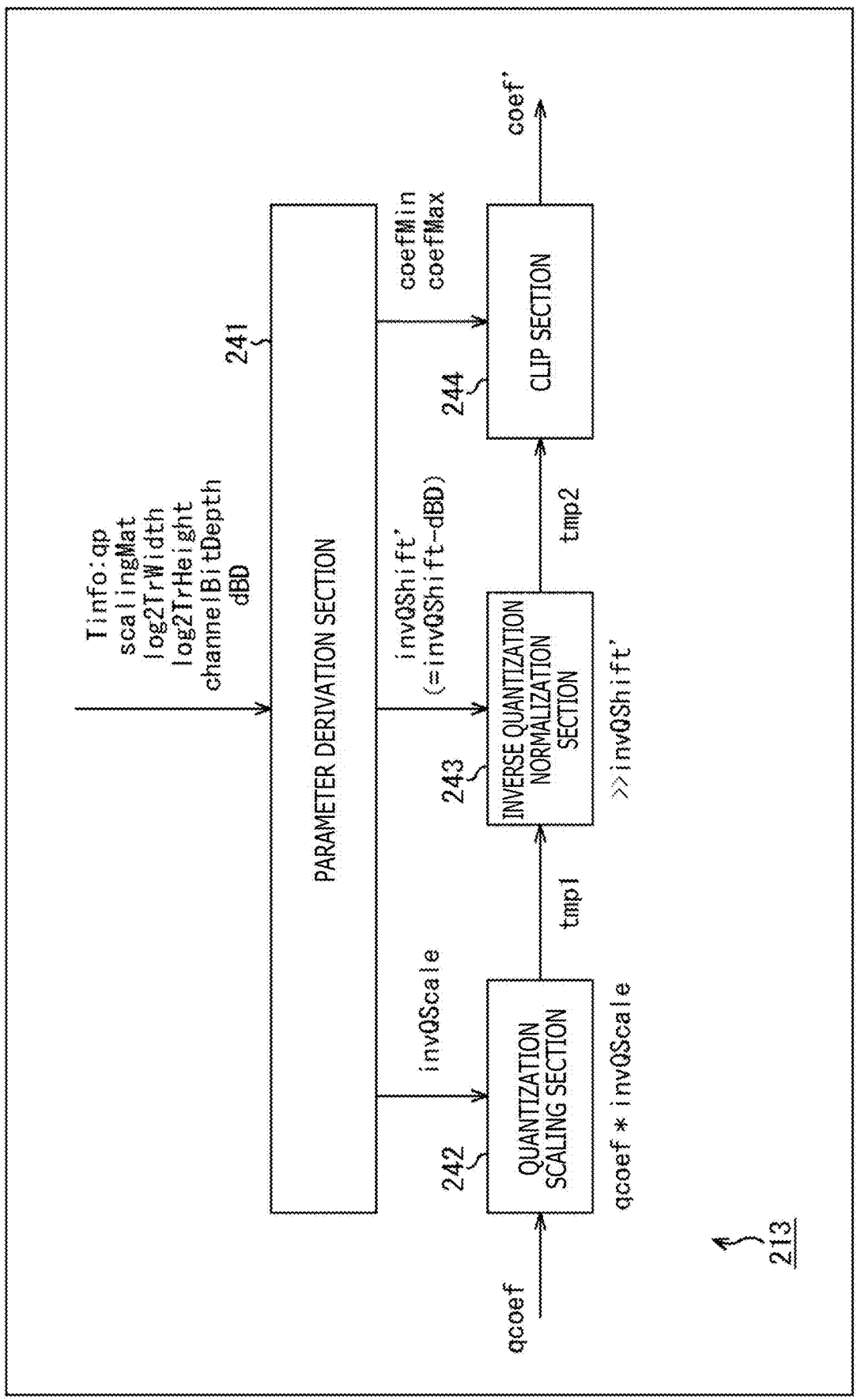
FIG. 34 is a block diagram depicting an example of principal configurations of an inverse quantization section.

FIG. 34 is a block diagram depicting an example of principal configurations of the inverse quantization section 213. As depicted in FIG. 34, the inverse quantization section 213 has a parameter derivation section 241, an inverse quantization scaling section 242, an inverse quantization normalization section 243, and a clip section 244.

Pieces of information such as the quantization parameter qp, the quantization matrix scalingMat, the horizontal size log 2TrWidth of the transform block, the vertical size log 2TrHeight of the transform block, the sequence bit depth channelBitDepth, and the extension bit precision dBD are input to the parameter derivation section 241, and the parameter derivation section 241 derives parameters to be used in inverse quantization processing, on the basis of those pieces of information.

The parameter derivation section 241 derives, for example, an inverse quantization scale parameter invQScale on the basis of information such as the quantization parameter qp and the quantization matrix scalingMat.

Furthermore, the parameter derivation section 241 derives, for example, an inverse quantization shift amount invQShift that is the shift amount of the number of significant figures set per sequence in quantization, on the basis of the information such as the quantization parameter qp, the horizontal size log 2TrWidth of the transform block, the vertical size log 2TrHeight of the transform block, and the sequence bit depth channelBitDepth. It is noted that this processing can be omitted in a case in which the inverse quantization shift amount invQShift is already derived.

Moreover, the parameter derivation section 241 derives, for example, a local-level inverse quantization shift amount invQShift' on the basis of the derived sequence-level inverse quantization shift amount invQShift and the extension bit prevision dBD. In other words, the parameter derivation section 241 corrects the inverse quantization shift amount invQShift by using the extension bit precision dBD, per local level.

Further, the parameter derivation section 241 derives, for example, the minimum value coefMin and the maximum value coefMax of the transform coefficient.

The parameter derivation section 241 supplies the derived parameters to the processing sections. The parameter derivation section 241 supplies, for example, the derived inverse quantization scale parameter invQScale to the inverse quantization scaling section 242. Moreover, the parameter derivation section 241 supplies, for example, the derived inverse quantization shift amount invQShift' to the inverse quantization normalization section 243. Furthermore, the parameter derivation section 241 supplies, for example, the derived minimum value coefMin and the derived maximum value coefMax of the transform coefficient to the clip section 244.

The quantized coefficient qcoef and the inverse quantization scale parameter invQScale are input to the inverse quantization scaling section 242, and the inverse quantization scaling section 242 performs processing associated with scaling of the coefficient. For example, the inverse quantization scaling section 242 scales the quantized coefficient qcoef by using the inverse quantization scale parameter invQScale. The inverse quantization scaling section 242 supplies the intermediate data tmp1 that is a result of the computing to the inverse quantization normalization section 243.

The intermediate data tmp1 and the inverse quantization shift amount invQShift' are input to the inverse quantization normalization section 243, and the inverse quantization normalization section 243 performs processing associated with normalization. For example, the inverse quantization normalization section 243 bit-shifts the intermediate data tmp1 to the right by the local-level inverse quantization shift amount invQShift' and normalizes the intermediate data tmp1. In other words, the inverse quantization normalization section 243 controls the number of significant figures of the intermediate data tmp1. The inverse quantization normalization section 243 supplies the intermediate data tmp2 obtained by the normalization to the clip section 244.

The intermediate data tmp2 and the minimum value coefMin and the maximum value coefMax of the transform coefficient are input to the clip section 244, and the clip section 244 performs processing associated with clip processing. For example, the clip section 244 clips a value of the intermediate data tmp2 into the range from the minimum value coefMin to the maximum value coefMax of the transform coefficient. The clip section 244 supplies the coefficient data coef' obtained by clipping the intermediate data tmp2 to the inverse orthogonal transform section 214. It is noted that the clip section 244 may be omitted.

<Details of Inverse Orthogonal Transform Section>

Figure 35:
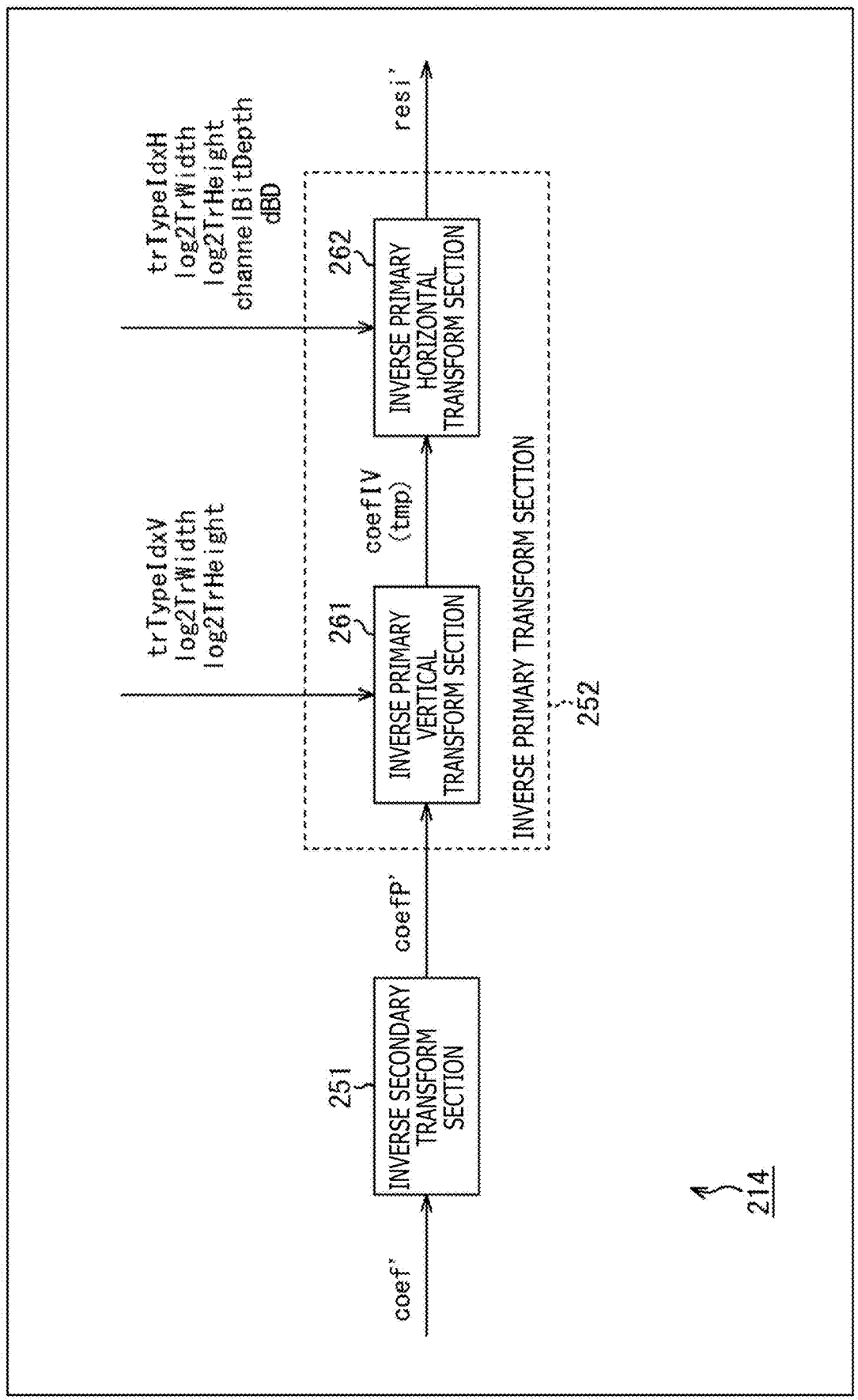
FIG. 35 is a block diagram depicting an example of principal configurations of an inverse orthogonal transform section.

FIG. 35 is a block diagram depicting an example of principal configurations of the inverse orthogonal transform section 214 of FIG. 32. As depicted in FIG. 35, the inverse orthogonal transform section 214 has an inverse secondary transform section 251 and an inverse primary transform section 252.

The inverse secondary transform section 251 performs processing associated with inverse secondary transform that is predetermined transform processing such as inverse orthogonal transform. For example, the transform coefficient coef', the transform information Tinfo (not depicted), and the like are input to the inverse secondary transform section 251, and the inverse secondary transform section 251 performs inverse secondary transform on the transform coefficient coef' and supplies obtained coefficient data coefP' to the inverse primary transform section 252.

The inverse primary transform section 252 performs processing associated with inverse primary transform that is predetermined transform processing such as inverse orthogonal transform. For example, the coefficient data coefP', the transform information Tinfo, and the like are input to the inverse primary transform section 252, and the inverse primary transform section 252 performs inverse primary transform on the coefficient data coefP' and supplies the obtained prediction residual resi' to the computing section 215. Moreover, at a time of the inverse primary transform, the transform type identifiers trTypeIdxH and trTypeIdxV, the horizontal size log 2TrWidth of the transform block, the vertical size log 2TrHeight of the transform block, the sequence bit depth channelBitDepth, and the extension bit precision dBD are input to the inverse primary transform section 252, and the inverse primary transform section 252 controls the number of significant figures of the coefficient (controls the computing precision) according to the change of the bit depth in the time direction or the spatial direction within the sequence on the basis of those pieces of information.

As depicted in FIG. 35, the inverse primary transform section 252 has an inverse primary vertical transform section 261 and an inverse primary horizontal transform section 262.

The inverse primary vertical transform section 261 performs processing associated with inverse primary vertical transform that is one-dimensional inverse orthogonal transform in the vertical direction. For example, the coefficient data coefP', the transform information Tinfo, and the like are input to the inverse primary vertical transform section 261, and the inverse primary vertical transform section 261 performs inverse primary vertical transform on the coefficient data coefP' and supplies obtained coefficient data coefIV (=tmp) to the inverse primary horizontal transform section 262.

At that time, pieces of information such as the transform type identifier trTypeIdxV of the inverse primary vertical transform, the horizontal size log 2TrWidth of the transform block, and the vertical size log 2TrHeight of the transform block are input to the inverse primary vertical transform section 261, and the inverse primary vertical transform section 261 controls the number of significant figures of the coefficient of each sequence (controls the computing precision) on the basis of those pieces of information.

The inverse primary horizontal transform section 262 performs processing associated with inverse primary horizontal transform that is one-dimensional inverse orthogonal transform in the horizontal direction. For example, the coefficient data coefIV (=tmp), the transform information Tinfo, and the like are input to the inverse primary horizontal transform section 262, and the inverse primary horizontal transform section 262 performs inverse primary horizontal transform on the coefficient data coefIV and supplies the obtained prediction residual resi' to the computing section 215.

At that time, pieces of information such as the transform type identifier trTypeIdxH of the inverse primary horizontal transform, the horizontal size log 2TrWidth of the transform block, the vertical size log 2TrHeight of the transform block, the sequence bit depth channelBitDepth, and the extension bit precision dBD are input to the inverse primary horizontal transform section 262, and the inverse primary horizontal transform section 262 controls the number of significant figures of the coefficient (controls the computing precision) according to the change of the bit depth in the time direction or the spatial direction within the sequence on the basis of those pieces of information.

<Inverse Primary Vertical Transform Section>

Figure 36:
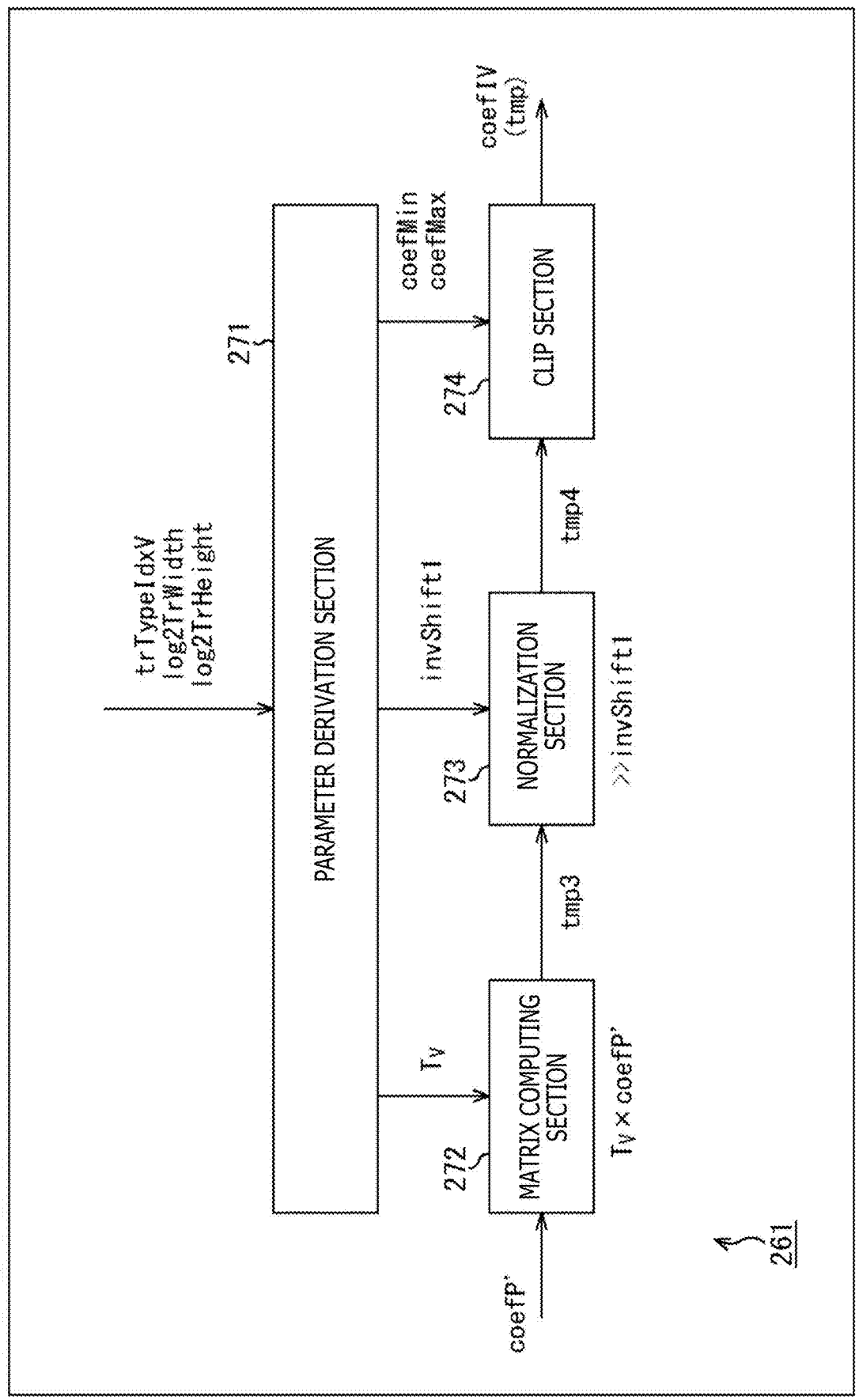
FIG. 36 is a block diagram depicting an example of principal configurations of an inverse primary vertical transform section.

FIG. 36 is a block diagram depicting an example of principal configurations of the inverse primary vertical transform section 261. As depicted in FIG. 36, the inverse primary vertical transform section 261 has a parameter derivation section 271, a matrix computing section 272, a normalization section 273, and a clip section 274.

Pieces of information such as the transform type identifier trTypeIdxV, the horizontal size log 2TrWidth of the transform block, and the vertical size log 2TrHeight of the transform block are input to the parameter derivation section 271, and the parameter derivation section 271 derives parameters to be used in inverse primary vertical transform processing, on the basis of those pieces of information.

The parameter derivation section 271 derives, for example, the transform matrix $T_V$ on the basis of the information such as the transform type identifier trTypeIdxV and the horizontal size log 2TrHeight of the transform block.

Moreover, the parameter derivation section 271 derives, for example, the inverse primary vertical transform shift amount invShift1 that is the shift amount of the number of significant figures set per sequence in the inverse primary vertical transform, on the basis of the information such as the vertical size log 2TrHeight of the transform block and the transform matrix $T_V$. It is noted that this processing can be omitted in a case in which the inverse primary vertical transform shift amount invshift1 is already derived.

Further, the parameter derivation section 271 derives, for example, the minimum value coefMin and the maximum value coefMax of the transform coefficient.

The parameter derivation section 271 supplies the derived parameters to the processing sections. The parameter derivation section 271 supplies, for example, the derived transform matrix $T_V$ to the matrix computing section 272. Moreover, the parameter derivation section 271 supplies, for example, the derived inverse primary vertical transform shift amount invShift1 to the normalization section 273. Furthermore, the parameter derivation section 271 supplies, for example, the derived minimum value coefMin and the derived maximum value coefMax of the transform coefficient to the clip section 274.

The coefficient data coefP' and the transform matrix $T_V$ are input to the matrix computing section 272, and the matrix computing section 272 performs processing associated with matrix computing. The matrix computing section 272 performs, for example, one-dimensional inverse orthogonal transform on the coefficient data coefP' in the vertical direction by using the transform matrix $T_V$. The matrix computing section 272 supplies intermediate data tmp3 that is a result of the computing to the normalization section 273.

The intermediate data tmp3 and the inverse primary vertical transform shift amount invShift1 are input to the normalization section 273, and the normalization section 273 performs processing associated with normalization. For example, the normalization section 273 bit-shifts the intermediate data tmp3 to the right by the inverse primary vertical transform shift amount invShift1 of the sequence level and normalizes the intermediate data tmp3. In other words, the normalization section 273 controls the number of significant figures of the intermediate data tmp3. The normalization section 273 supplies the intermediate data tmp4 obtained by the normalization to the clip section 274.

The intermediate data tmp4 and the minimum value coefMin and the maximum value coefMax of the transform coefficient are input to the clip section 1274, and the clip section 274 performs processing associated with clip processing. For example, the clip section 274 clips a value of the intermediate data tmp4 into the range from the minimum value coefMin to the maximum value coefMax of the transform coefficient. The clip section 274 supplies the coefficient data coefIV obtained by clipping the intermediate data tmp4 to the inverse primary horizontal transform section 262. It is noted that the clip section 274 may be omitted.
<Inverse Primary Horizontal Transform Section>

Figure 37:
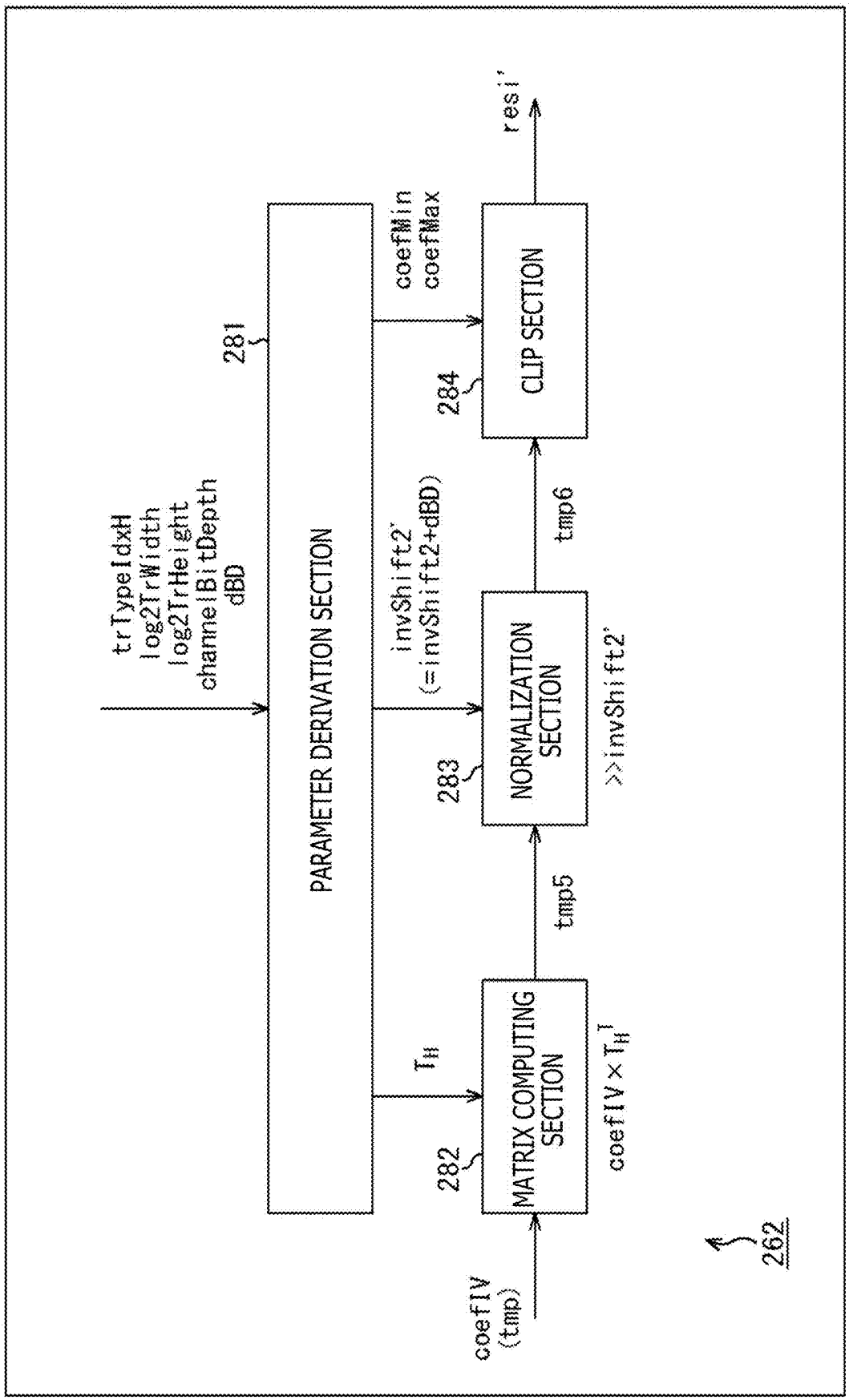
FIG. 37 is a block diagram depicting an example of principal configurations of an inverse primary horizontal transform section.

FIG. 37 is a block diagram depicting an example of principal configurations of the inverse primary horizontal transform section 262. As depicted in FIG. 37, the inverse primary horizontal transform section 262 has a parameter derivation section 281, a matrix computing section 282, a normalization section 283, and a clip section 284.

Pieces of information such as the transform type identifier trTypeIdxH, the horizontal size log 2TrWidth of the transform block, the vertical size log 2TrHeight of the transform block, the sequence bit depth channelBitDepth, and the extension bit precision dBD are input to the parameter derivation section 281, and the parameter derivation section 281 derives parameters to be used in inverse primary horizontal transform processing, on the basis of those pieces of information.

For example, the parameter derivation section 281 derives the transform matrix $T_H$ on the basis of such information as the transform type identifier trTypeIdxH and the horizontal size log 2TrWidth of the transform block.

Moreover, the parameter derivation section 281 derives, for example, the inverse primary horizontal transform shift amount invShift2 that is the shift amount of the number of significant figures set per sequence in the inverse primary horizontal transform, on the basis of such information as the horizontal size log 2TrWidth of the transform block, the sequence bit depth channelBitDepth, the transform matrix $T_H$, and the extension bit precision dBD. It is noted that this processing can be omitted in a case in which the inverse primary horizontal transform shift amount invShift2 is already derived.

Further, the parameter derivation section 281 derives, for example, an inverse primary horizontal transform shift amount invShift2' of the local level on the basis of the derived inverse primary horizontal transform shift amount invShift2 of the sequence level and the extension bit precision dBD. In other words, the parameter derivation section 281 corrects the inverse primary horizontal transform shift amount invShift2 by using the extension bit precision dBD, per local level.

Furthermore, the parameter derivation section 281 derives, for example, the minimum value coefMin and the maximum value coefMax of the residual data.

The parameter derivation section 281 supplies the derived parameters to the processing sections. The parameter derivation section 281 supplies, for example, the derived transform matrix $T_H$ to the matrix computing section 282. Moreover, the parameter derivation section 281 supplies, for example, the derived inverse primary horizontal transform shift amount invShift2' to the normalization section 283. Furthermore, the parameter derivation section 281 supplies, for example, the derived minimum value coefMin and the derived maximum value coefMax of the residual data to the clip section 284.

The coefficient data coefIV and the transform matrix $T_H$ are input to the matrix computing section 282, and the matrix computing section 282 performs processing associated with matrix computing. The matrix computing section 282 performs, for example, one-dimensional inverse orthogonal transform on the coefficient data coefIV in the horizontal direction by using the transform matrix $T_H$. The matrix computing section 282 supplies the intermediate data tmp5 that is a result of the computing to the normalization section 283.

The intermediate data tmp5 and the inverse primary horizontal transform shift amount invShift2' are input to the normalization section 283, and the normalization section 283 performs processing associated with normalization. For example, the normalization section 283 bit-shifts the intermediate data tmp5 to the right by the inverse primary horizontal transform shift amount invShift2' of the local level and normalizes the intermediate data tmp5. In other words, the normalization section 283 controls the number of significant figures of the intermediate data tmp5. The normalization section 283 supplies the intermediate data tmp6 obtained by the normalization to the clip section 284.

The intermediate data tmp6 and the minimum value coefMin and the maximum value coefMax of the residual data are input to the clip section 284, and the clip section 284 performs processing associated with clip processing. For example, the clip section 284 clips a value of the intermediate data tmp6 into the range from the minimum value coefMin to the maximum value coefMax of the residual data. The clip section 284 supplies the prediction residual resi' obtained by clipping the intermediate data tmp6 to the computing section 215. It is noted that the clip section 284 may be omitted.

<Flow of Image Decoding Processing>

A flow of each processing executed by the image decoding apparatus 200 described above will next be described. An example of a flow of image decoding processing will first be described with reference to a flowchart of FIG. 38.

When the image decoding processing is started, the accumulation buffer 211 acquires the encoded data (bit stream) supplied from outside of the image decoding apparatus 200 and holds (accumulates) the encoded data in Step S301.

In Step S302, the decoding section 212 decodes the encoded data (bit stream) and obtains the quantized coefficient qcoef. In addition, the decoding section 212 parses (analyzes and acquires) various encoding parameters from the encoded data (bit stream) by this decoding.

In Step S303, the inverse quantization section 213 performs inverse quantization, which is the inverse processing of the quantization performed on the encoding side, on the quantized coefficient qcoef obtained by the processing of Step S302 and obtains the transform coefficient coef'.

In Step S304, the inverse orthogonal transform section 214 performs inverse orthogonal transform processing, which is the inverse processing of the orthogonal transform processing performed on the encoding side, on the transform coefficient coef' obtained by the processing of Step S303 and obtains the prediction residual resi'.

In Step S305, the prediction section 219 executes prediction processing by a prediction method designated by the encoding side, on the basis of the information parsed in Step S302, and generates the predicted image P by, for example, referring to the reference image stored in the frame memory 218.

In Step S306, the computing section 215 adds up the prediction residual resi' obtained by the processing of Step S304 and the predicted image P obtained by the processing of Step S305 and derives the local decoded image $R_{local}$.

In Step S307, the in-loop filter section 216 performs in-loop filter processing on the local decoded image $R_{local}$ obtained by the processing of Step S306.

In Step S308, the reordering buffer 217 derives the decoded image R by using the filter-processed local decoded image $R_{local}$ obtained by the processing of Step S307 and reorders the decoded image R group from the order of decoding to the order of reproduction. The decoded image R group reordered to the order of reproduction is output to outside of the image decoding apparatus 200, as an image sequence.

Moreover, in Step S309, the frame memory 218 stores at least one of the local decoded image Roca obtained by the processing of Step S306 or the filter-processed local decoded image Roca obtained by the processing of Step S307.

When the processing of Step S309 is ended, the image decoding processing is ended.

In the image decoding processing in the flow described above, the processing to which the present technology is applied as described above is performed as the processing of Steps S302, S303, and S304. Therefore, executing this image decoding processing makes it possible to suppress a reduction in encoding efficiency.

<Flow of dBD Derivation Processing>

Figure 38:
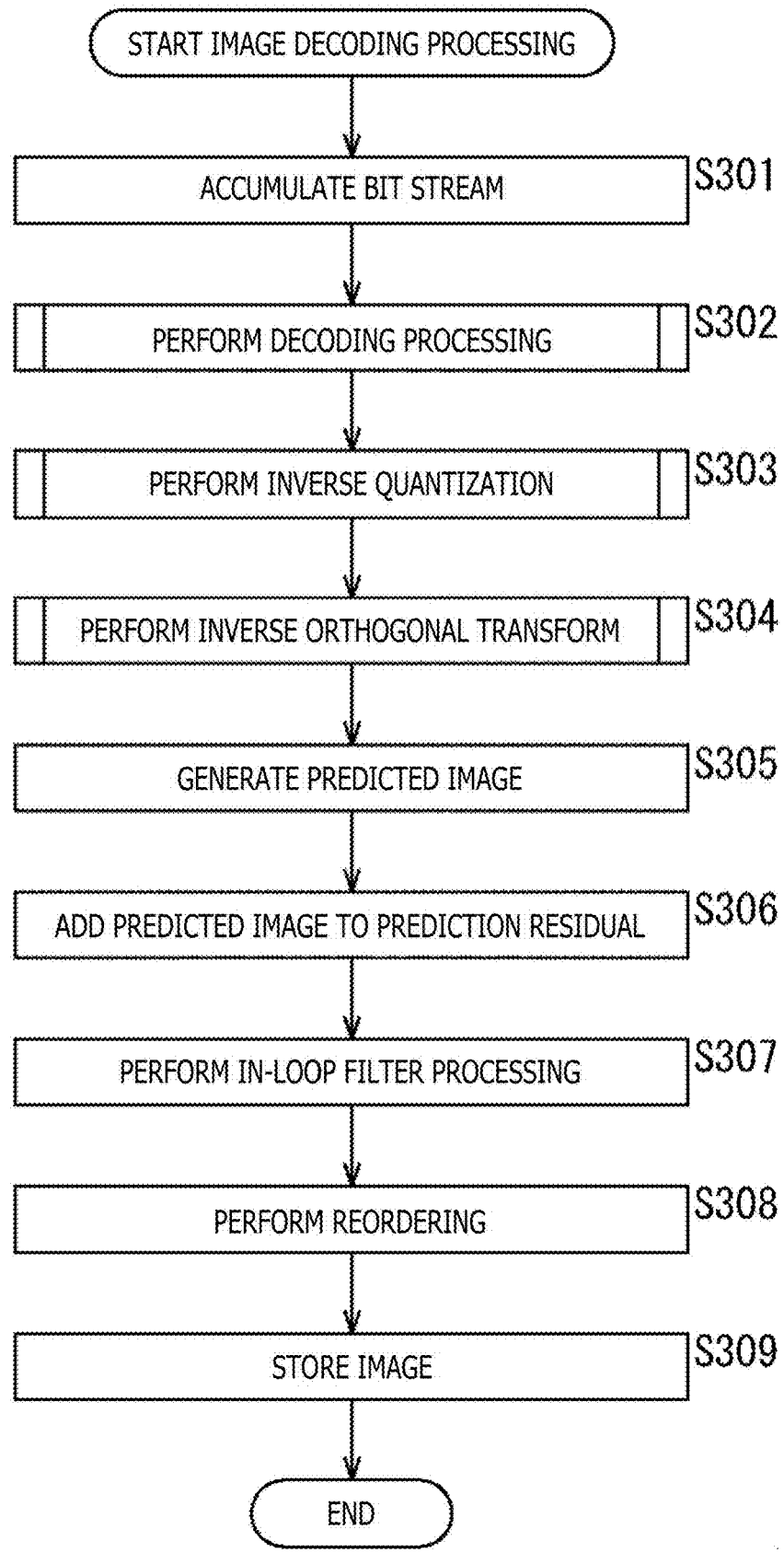
FIG. 38 is a flowchart illustrating an example of a flow of image decoding processing.

In Step S302 of FIG. 38, various encoding parameters are derived. For example, the extension bit precision dBD and the like are derived. An example of a flow of the dBD derivation processing for deriving such parameters as this extension bit precision dBD will be described with reference to a flowchart of FIG. 39.

When the dBD derivation processing is started, the sequence bit depth derivation section 231 of the decoding section 212 derives the sequence bit depth channelBitDepth of the component X in Step S321.

For example, the sequence bit depth derivation section 231 decodes and extracts syntax values associated with the sequence bit depth channelBitDepth of each component (information associated with the sequence bit depth) contained in the sequence parameter set SPS of the bit stream. In addition, the sequence bit depth derivation section 231 derives the sequence bit depth channelBtiDepth from the extracted syntax values. Examples of syntaxes associated with channelBitDepth are as follows.

bit_depth_luma_minus8: syntax indicating sequence bit depth of luminance bit_depth_chroma_minus8: syntax indicating sequence bit depth of chrominance In a case of, for example, luminance, the sequence bit depth derivation section 231 derives the sequence bit depth channelBtiDepth, as represented by the following Equation (49).

$$channelBitDepth=8+bit\_depth\_luma\_minus8 \quad (49)$$

Furthermore, in a case of, for example, chrominance, the sequence bit depth derivation section 231 derives the sequence bit depth channelBitDepth, as represented by the following Equation (50).

$$channelBitDepth=8+bit\_depth\_chroma\_minus8 \quad (50)$$

In Step S322, the slice bit depth derivation section 232 derives the slice bit depth sliceBitDepth of the component X. For example, the slice bit depth derivation section 232 decodes and extracts syntax values associated with slice bit depth of each component (information associated with the slice bit depth) contained in the slice header SH of the bit stream. In addition, the slice bit depth derivation section 232 derives the slice bit depth sliceBitDepth from the extracted syntax values. Examples of syntaxes associated with the slice bit depth sliceBitDepth are as follows.

slice_min_val: minimum pixel value of component X (X=Y/Cb/Cr) within slice slice_max_val: maximum pixel value of component X (X=Y/Cb/Cr) within slice The slice bit depth derivation section 232 derives the slice bit depth sliceBitDepth from these values, as represented by, for example, the following Equation (51).

$$sliceBitDepth=ceil(log\ 2(slice\_max\_val-slice\_min\_val)) \quad (51)$$

It is noted that the slice bit depth sliceBitDepth may be decoded directly from the slice header as an alternative to the minimum pixel value slice_min_val and the maximum pixel value slice_max_val within each slice, and the difference value slice_bit_depth_diffX between the sequence bit depth channelBitDepth and the slice bit depth sliceBitDepth may be decoded.

slice_bit_depth_diffX: a difference value of slice bit depth with respect to sequence bit depth channelBitDepth of component X In a case of deriving the slice bit depth sliceBitDepth from slice_bit_depth_diffX, the slice bit depth sliceBitDepth is derived, as represented by, for example, the following Equation (52).

$$sliceBitDepth=channelBitDepth-slice\_bit\_depth\_diffX \quad (52)$$

In Step S323, the deltaX decoding section 233 decodes the difference parameter deltaX of the extension bit precision dBD of the component X per extension bit precision control group SG.

For example, the deltaX decoding section 233 decodes the difference parameter deltaX of the extension bit precision dBD indicating by how many bits the number of significant figures of the coefficient of the component X is expanded per extension bit precision control group SG (Scaling Group), from the encoded data.

In Step S324, the dBD derivation section 234 derives the extension bit precision dBD of the component X, per extension bit precision control group SG.

For example, the dBD derivation section 234 derives the extension bit precision dBD from the difference parameter deltaX of the extension bit precision dBD of the component X, the sequence bit depth channelBitDepth, and the slice bit depth sliceBitDepth, per extension bit precision control group SG, as represented by the following Equation (53).

$$dBD=channelBitDepth-sliceBitDepth+deltaX \quad (53)$$

It is noted that there is a relation of channelBitDepth>sliceBitDepth≥ deltaX. Representing the extension bit precision dBD via the sequence bit depth and the slice bit depth makes it possible to make smaller the value of the difference parameter deltaX. In other words, it is possible to decrease the code amount required for decoding/encoding the difference parameter deltaX.

When the processing of Step S324 is ended, then the dBD derivation processing is ended, and the processing returns to FIG. 38.

<Control Over Extension Bit Precision Control Group SG>

It is noted that the extension bit precision control group SG may be controlled by a difference value diff_cu_delta_depth of a segmentation depth with respect to a size CtbLog2Size of a CTB. In this case, a size Log 2SGSize of the SG is obtained as represented by the following Equation (54).

$$Log\ 2SGSize=CtbLog\ 2Size-diff\_cu\_delta\_depth \quad (54)$$

In a case of assuming, for example, that the CTB indicated by the dotted-line frame in FIG. 24 has the size of 128×128 (CtbLog2Size=7) and the SG indicated by the thick-line frame in FIG. 24 has the size of 32×32 (Log 2SGSize=5), the difference value diff_cu_delta_depth is two as represented by the following Equation (55).

$$\text{diff\_cu\_delta\_depth} = \text{CtbLog 2Size} - \text{Log 2}SG\text{Size} = 7 - 5 = 2 \quad (55)$$

It is noted that the difference value diff_cu_delta_depth is assumed to be notified in units of predetermined parameter sets (header information) (for example, a sequence parameter set (SPS), a picture parameter set (PPS)) or by a slice header (SH) or the like). By doing so, it is possible to control granularity of the extension bit precision control group SG by the difference value diff_cu_delta_depth.

In a case, for example, in which a signal range is constant in a large area to some extent, decreasing this difference value diff_cu_delta_depth makes it possible to expand the unit of notification of the difference parameter deltaX and to decrease overhead.

Conversely, in a case in which the signal range changes in a small area, increasing this difference value diff_cu_delta_depth makes it possible to diminish the unit of notification of the difference parameter deltaX and to expand the number of significant figures of the transform coefficient at the time of inverse quantization/inverse orthogonal transform with finer granularity.

Other Example 1 of Definition of Extension Bit Precision dBD

While it is described above that the extension bit precision dBD of the component X is obtained from the sequence bit depth channelBitDepth, the slice bit depth sliceBitDepth, and the extension bit precision dBD, definition of the extension bit precision dBD can be made freely and is not limited to this example.

For example, the difference parameter deltaX may be defined as the difference value between the sequence bit depth channelBitDepth and the extension bit precision dBD. In other words, the extension bit precision dBD may be defined as the difference value between the sequence bit depth channelBitDepth and the difference parameter deltaX, as represented by the following Equation (56)

$$dBD = \text{channelBitDepth} - \text{delta}X \quad (56)$$

(that is, deltaX=channelBitDepth−dBD)

By doing so, it is possible to derive the extension bit precision dBD more easily than the example described above.

Other Example 2 of Definition of Extension Bit Precision dBD

Moreover, the extension bit precision dBD may be defined to be equivalent to the difference parameter deltaX, as represented by the following Equation (57).

$$dBD = \text{delta}X \quad (57)$$

In this case, the extension bit precision dBD can be derived without dependence on the parameters other than the difference parameter deltaX.

Other Example 3 of Definition of Extension Bit Precision dBD

Further, the extension bit precision dBD may be defined as a sum of the predicted value $dBD_{pred}$ of the extension bit precision dBD of the extension bit precision control group SG to be processed (referred to as a "current extension bit precision control group $SG_{cur}$") and the difference parameter deltaX, as represented by, for example, the following Equation (58).

$$dBD = dBD_{pred} + \text{delta}X \quad (58)$$

(that is, deltaX=dBD−$dBD_{pred}$)

For example, this predicted value $dBD_{pred}$ is derived by referring to the encoded extension bit precision control groups neighborSGs in the neighborhood of the current extension bit precision control group $SG_{cur}$ as described above with reference to FIG. 25. Moreover, in this case, the predicted value $dBD_{pred}$ of the extension bit precision dBD may be set on the basis of the extension bit precision $dBD_A$ of the neighboring extension bit precision control group $SG_A$ and the extension bit precision $dBD_B$ of the neighboring extension bit precision control group $SG_B$. Furthermore, the predicted value $dBD_{pred}$ of the extension bit precision dBD may be derived, for example, by a method according to whether or not these neighboring extension bit precision control groups can be referred to (for example, Equations (18) to (21) described above).

In such way, predicting the dBD of the current extension bit precision control group $SG_{cur}$ by using each of the extension bit precision dBD of the encoded neighboring extension bit precision control groups neighborSGs makes it possible to decrease the value of the difference parameter deltaX. In other words, it is possible to suppress the growth of the code amount required for decoding or encoding the deltaX.

<Flow of Inverse Quantization Processing>

Figure 40:
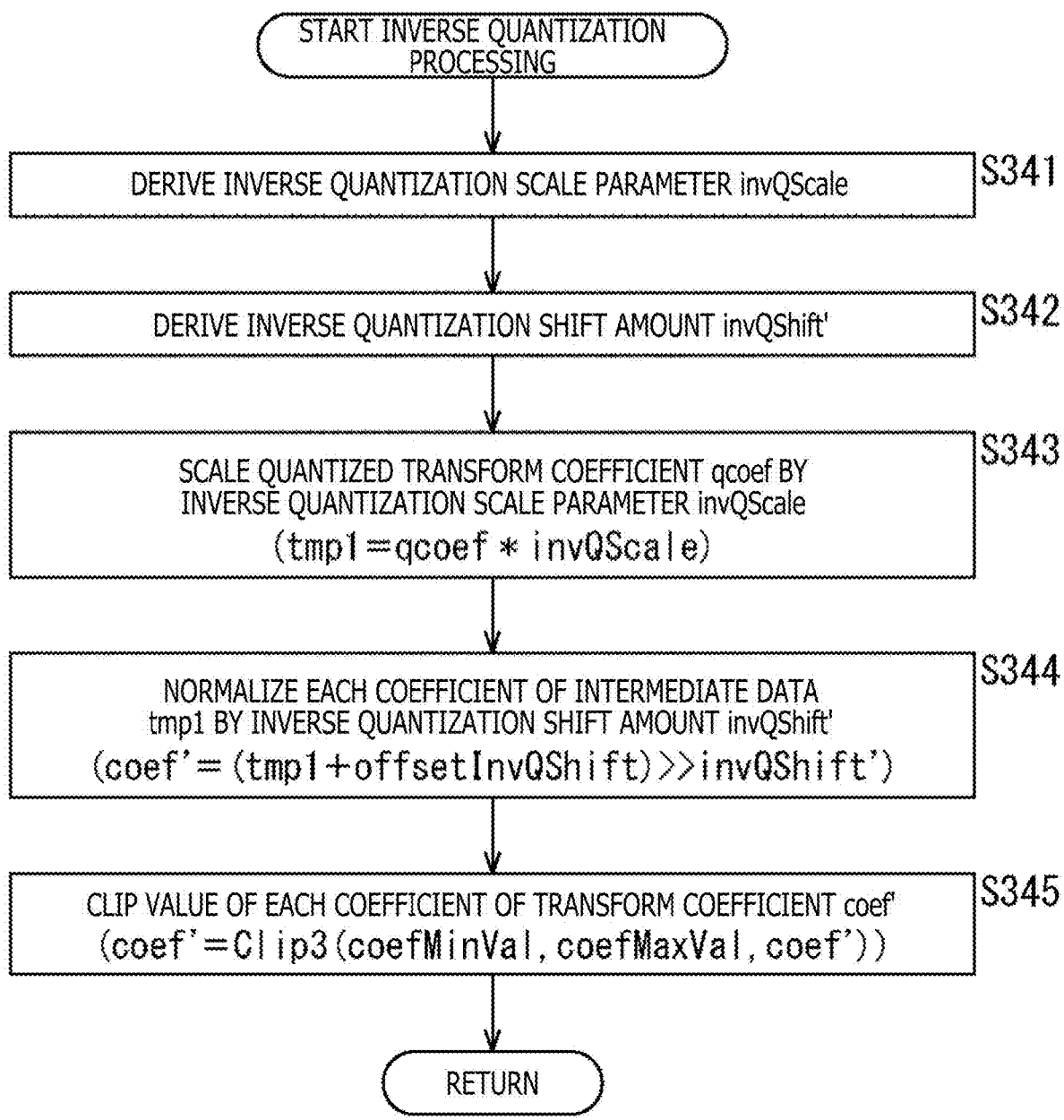
FIG. 40 is a flowchart illustrating an example of a flow of inverse quantization processing.

An example of a flow of the inverse quantization processing executed in the processing of Step S303 of FIG. 38 will be described with reference to a flowchart of FIG. 40.

When the inverse quantization processing is started, the parameter derivation section 241 of the inverse quantization section 213 derives the inverse quantization scale parameter invQScale in Step S341. In a case, for example, in which the length and the width of the transform block are identical in size (that is, the transform block is a square) (log 2TrSize %2==0), the parameter derivation section 241 derives the inverse quantization scale parameter invQScale, as represented by the following Equation (59).

$$\text{invQScale} = \text{levelScale}[\text{qp\_rem}] * \text{scaleMat} * (1 << \text{qp\_per}) \quad (59)$$

Moreover, in a case in which the length and the width of the transform block differ (log 2TrSize %2==1), the parameter derivation section 241 derives the inverse quantization scale parameter invQScale, as represented by the following Equation (60).

$$\text{invQScale} = \text{levelScale}[\text{qp\_rem}] * \text{scaleMat} * WH\text{Scale} * (1 << \text{qp\_per}) \quad (60)$$

In Equations (59) and (60), qp_rem is a value of qp %6 (remainder when qp is divided by 6). In addition, qp_per is a value of qp//6 (quotient of dividing qp by 6). Moreover, WHScale is a correction scaling parameter in a case in which the size of the transform block is not a square size, and a predetermined value (for example, 181) is set to WHScale. Further, levelScale[ ] is an array in which scaling parameters per qp_rem (=qp %6) are stored, and values of levelScale= [40, 45, 51, 57, 64, 72] are stored. Furthermore, scalingMat is a quantization matrix, and a value is set thereto per location of the transform coefficient.

In Step S342, the parameter derivation section 241 derives the inverse quantization shift amount invQShift'. In the case, for example, in which the length and the width of the transform block are identical in size (that is, the transform block is a square) (log 2TrSize %2==0), the parameter derivation section 241 derives the inverse quantization shift amount invQShift per sequence, as represented by the following Equation (61).

$$\text{invQShift}=\text{channelBitDepth}+\log 2\text{TrSize}+10-\log 2\text{TransformRange} \quad (61)$$

In addition, in the case in which the length and the width of the transform block differ (log 2TrSize %2==1), the parameter derivation section 241 derives the inverse quantization shift amount invQShift per sequence, as represented by the following Equation (62).

$$\text{invQShift}=\text{channelBitDepth}+\log 2\text{TrSize}+10-\log 2\text{TransformRange}+\text{inv}W\!H\text{Shift} \quad (62)$$

In Equations (61) and (62), log 2TrSize indicates a logarithmic value of the size of the transform block. Represented by log 2TransformRange is a parameter associated with the range of the transform coefficient, and a predetermined value (for example, 15) is set to log 2TransformRange. Represented by invWHShift is a correction shift amount when the size of the transform block is not a square size, and a predetermined value (for example, eight) is set to invWHShift. The extension bit precision dBD is a shift amount for expanding the number of significant figures of the transform coefficient. In a case, for example, of dBD=1, the precision is set to ½ times as that in the case of dBD=0.

The parameter derivation section 241 then corrects the derived inverse quantization shift amount invQShift per sequence by using the extension bit precision dBD, as represented by the following Equation (63). In other words, the parameter derivation section 241 derives the local-level inverse quantization shift amount invQShift' by using the inverse quantization shift amount invQShift per sequence and the extension bit precision dBD.

$$\text{invQShift}'=\text{invQShift}-dBD \quad (63)$$

As represented by Equation (63), decreasing a magnitude of the inverse quantization shift amount invQShift by the extension bit precision dBD makes it possible to expand the number of significant figures of the transform coefficient coef' subjected to inverse quantization, by dBD.

Moreover, in Step S342, the parameter derivation section 241 derives the minimum value coefMin and the maximum value coefMax of the transform coefficient by using the parameter log 2TransformRange associated with the range of the transform coefficient, as represented by the above Equations (24) and (25).

In Step S343, the inverse quantization scaling section 242 scales the quantized coefficient qcoef by the inverse quantization scale parameter invQScale derived in Step S341 and obtains the intermediate data tmp1, as represented by, for example, the following Equation (64).

$$\text{tmp1}=\text{qcoef}*\text{invQScale} \quad (64)$$

In Step S344, the inverse quantization normalization section 243 normalizes each coefficient of the intermediate data tmp1 by the inverse quantization shift amount invQShift'.

For example, the inverse quantization normalization section 243 normalizes the intermediate data tmp1 derived in Step S343, by bit-shifting the intermediate data tmp1 to the right by the inverse quantization shift amount invQShift' derived in Step S342, and obtains the intermediate data tmp2, as represented by the following Equation (65).

$$\text{tmp2}=(\text{tmp1}+\text{offsetInvQShift})>>\text{invQShift}' \quad (65)$$

In Equation (65), offsetInvQShift is a rounding offset at the time of normalization and is derived, as represented by, for example, the following Equation (66).

$$\text{offsetInvQShift}=1<<(\text{invQShift}'-1) \quad (66)$$

It is noted that the intermediate data tmp1 may be normalized by the following Equation (67) as an alternative to Equation (65) described above.

$$\text{tmp2}=\text{sign}(tmp1)*(\text{abs}(tmp1)+\text{offsetInvQShift})>>\text{invQShift}' \quad (67)$$

In Step S345, the clip section 244 clips a value of the intermediate data tmp2 obtained by the processing of Step S344 so that the value falls within the range from the minimum value coefMin of the coefficient to the maximum value coefMax of the coefficient derived in Step S342 and obtains the transform coefficient coef' subjected to clipping, as represented by, for example, the following Equation (68).

$$\text{coef}'=\text{clip3}(\text{coefMin},\text{coefMax},\text{coef}') \quad (68)$$

When the processing of Step S345 is ended, then the inverse quantization processing is ended, and the processing returns to FIG. 38.

<Flow of Inverse Orthogonal Transform Processing>

An example of a flow of the inverse orthogonal transform processing executed in the processing of Step S304 of FIG. 38 will be described with reference to a flowchart of FIG. 41.

When the inverse orthogonal transform processing is started, the inverse secondary transform section 251 of the inverse orthogonal transform section 214 performs inverse secondary transform processing in Step S361.

In Step S362, the inverse primary vertical transform section 261 performs inverse primary vertical transform processing.

In Step S363, the inverse primary horizontal transform section 262 performs inverse primary horizontal transform processing.

When the processing of Step S363 is ended, then the inverse orthogonal transform processing is ended, and the processing returns to FIG. 38.

In the inverse orthogonal transform processing described above, the processing to which the present technology is applied as described above is performed as the processing of Steps S362 and S363. Therefore, executing this inverse orthogonal transform processing makes it possible to suppress a reduction in encoding efficiency.

It is noted that the steps (Steps S361 to S363) of this inverse orthogonal transform processing can each be skipped (omitted).

<Flow of Inverse Primary Vertical Transform Processing>

An example of a flow of the inverse primary vertical transform processing executed in Step S362 of FIG. 41 will be described with reference to a flowchart of FIG. 42.

When the inverse primary vertical transform processing is started, the parameter derivation section 271 of the inverse primary vertical transform section 261 derives the transform matrix $T_V$ in Step S381. For example, the parameter derivation section 271 reads out the base transform matrix $T_{base}$ in (1<<log 2TrHeight) rows by (1<<log 2TrHeight) columns corresponding to information (log 2TrHeight) associated with the transform type identifier trTypeIdxV and the size of the transform block from the unillustrated look-up table LUT and sets the base transform matrix $T_{base}$ to the transform matrix $T_V$ (that is, $T_V=T_{base}$)

In Step S382, the parameter derivation section 271 derives the inverse primary vertical transform shift amount invShift1. For example, the parameter derivation section 271 derives the inverse primary vertical transform shift amount invShift1 per sequence on the basis of the parameter trMatShift representing the integer approximation precision of the transform matrix $T_V$, as represented by the following Equation (69). It is noted that the parameter trMatShift takes a value of, for example, eight. In that case, it means that the integer approximation precision of the transform matrix $T_V$ is eight bits.

$$\text{fwdShift1}=\text{trMatShift}+1 \quad (69)$$

Furthermore, in Step S382, the parameter derivation section 271 derives the minimum value coefMin and the maximum value coefMax of the transform coefficient by using the parameter log 2TransformRange associated with the range of the transform coefficient, as represented by the above Equations (24) and (25).

In Step S383, the matrix computing section 272 performs the one-dimensional orthogonal transform on the coefficient data coefP' in the vertical direction by using the transform matrix $T_V$ derived in Step S381 and obtains the intermediate data tmp3, as represented by the following Equation (70). It is noted that in Equation (70), x is an operator representing a matrix product.

$$tmp3 = T_V^T \times coefP' \quad (70)$$

In Step S384, the normalization section 273 normalizes the intermediate data tmp3 (matrix product between the transform matrix TVT and the coefficient data coefP') by bit-shifting the intermediate data tmp3 to the right by the inverse primary vertical transform shift amount invShift1 derived in Step S382 and obtains the intermediate data tmp4, as represented by the following Equation (71).

$$tmp4=(tmp3+\text{offsetInvShift1})>>\text{invShift1} \quad (71)$$

It is noted that offsetInvShift1 is a rounding offset at the time of normalization and is derived, as represented by, for example, the following Equation (72).

$$\text{offsetInvShift1}=1<<(\text{invShift1}-1) \quad (72)$$

It is noted that the intermediate data tmp3 may be normalized by the following Equation (73) as an alternative to Equation (71) described above.

$$tmp4=\text{sign}(tmp3)*(\text{abs}(tmp3)+\text{offsetInvShift1})>>\text{invShift1} \quad (73)$$

In Step S385, the clip section 274 clips a value of the intermediate data tmp4 so that the value falls within the range from the minimum value coefMin of the coefficient to the maximum value coefMax of the coefficient derived in Step S382 and derives the coefficient data coefIV (=tmp) subjected to clipping, as represented by the following Equation (74).

$$coefIV=\text{clip3}(\text{coefMin},\text{coefMax},tmp4) \quad (74)$$

Figure 41:
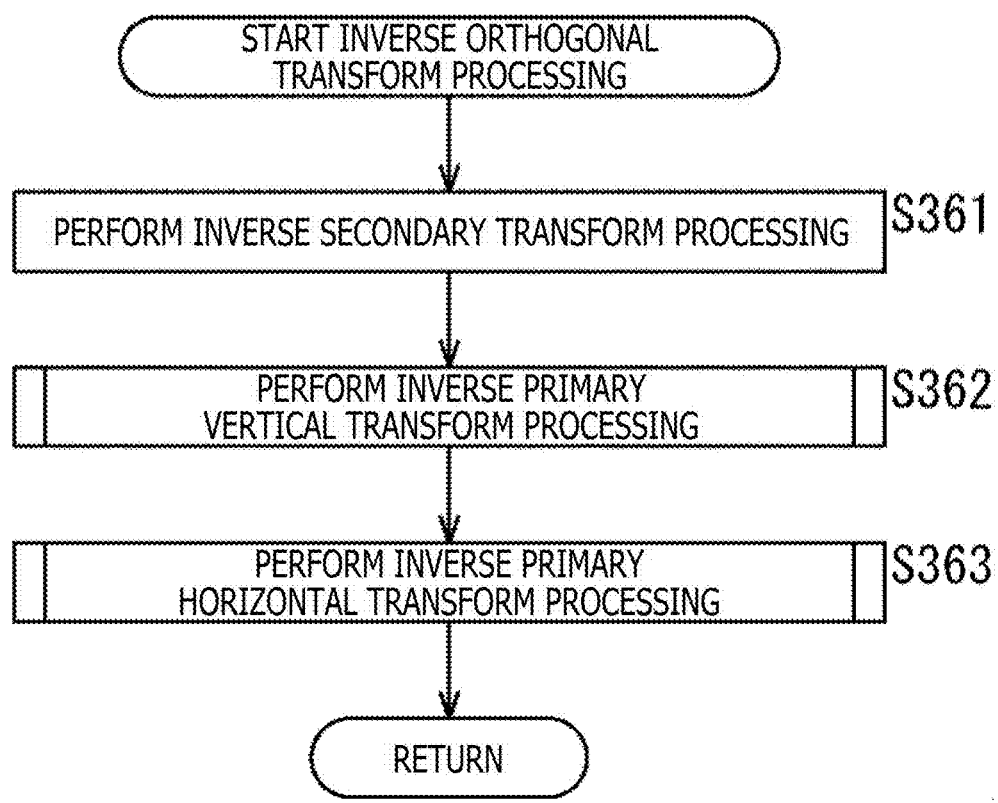
FIG. 41 is a flowchart illustrating an example of a flow of inverse orthogonal transform processing.
Figure 42:
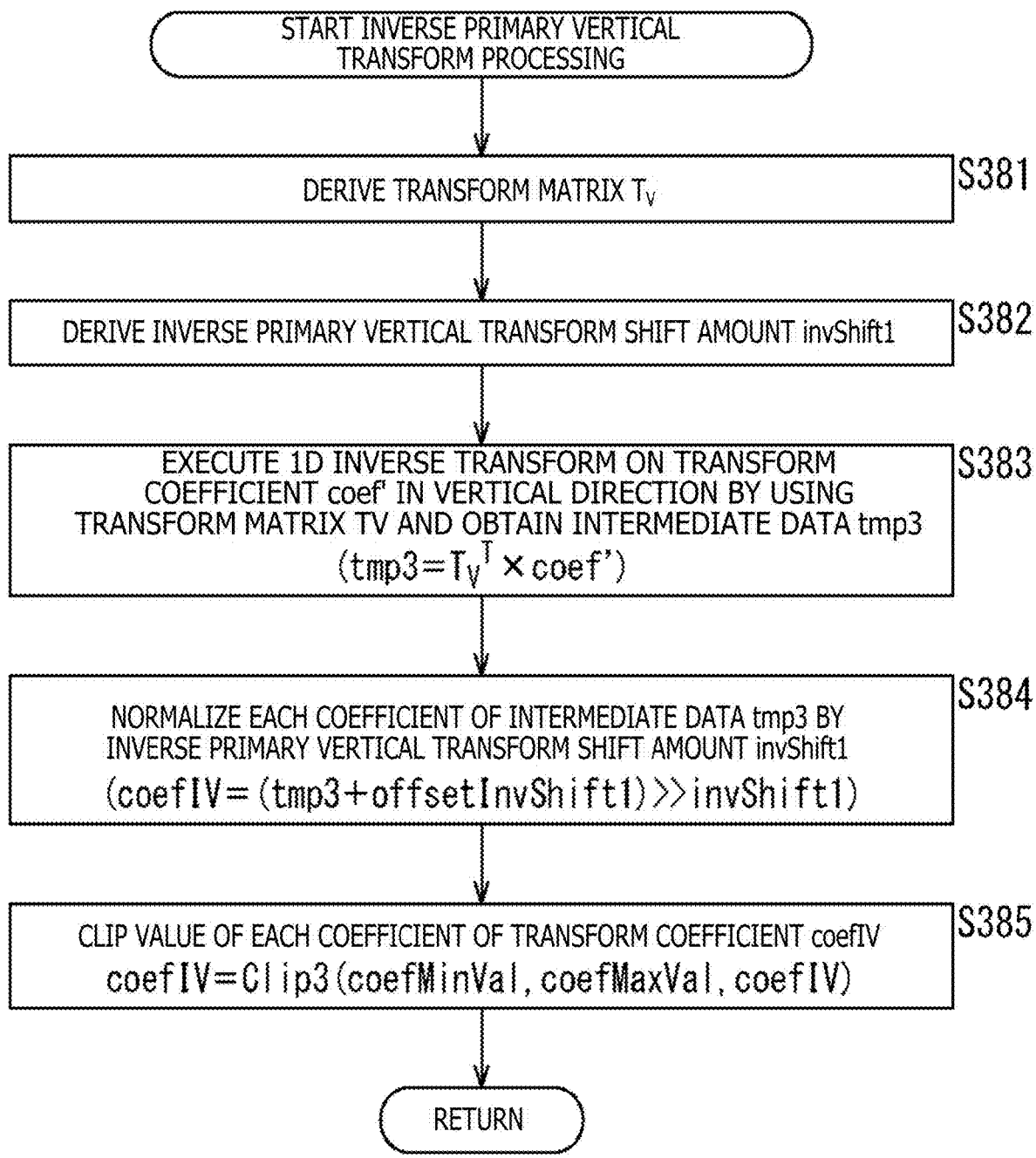
FIG. 42 is a flowchart illustrating an example of a flow of inverse primary vertical transform processing.

When the processing of Step S385 is ended, then the inverse primary vertical transform processing is ended, and the processing returns to FIG. 41.

As described above, performing the one-dimensional inverse orthogonal transform on the coefficient data coef' the number of significant figures of which is expanded by the extension bit precision dBD, in the vertical direction, makes it possible for the inverse primary vertical transform section 261 to obtain the coefficient data coefIV subjected to the inverse primary vertical transform. In other words, it is possible to perform the inverse primary vertical transform with improved computing precision.

It is noted that the processing of Step S385 may be omitted.

<Flow of Inverse Primary Horizontal Transform Processing>

Figure 43:
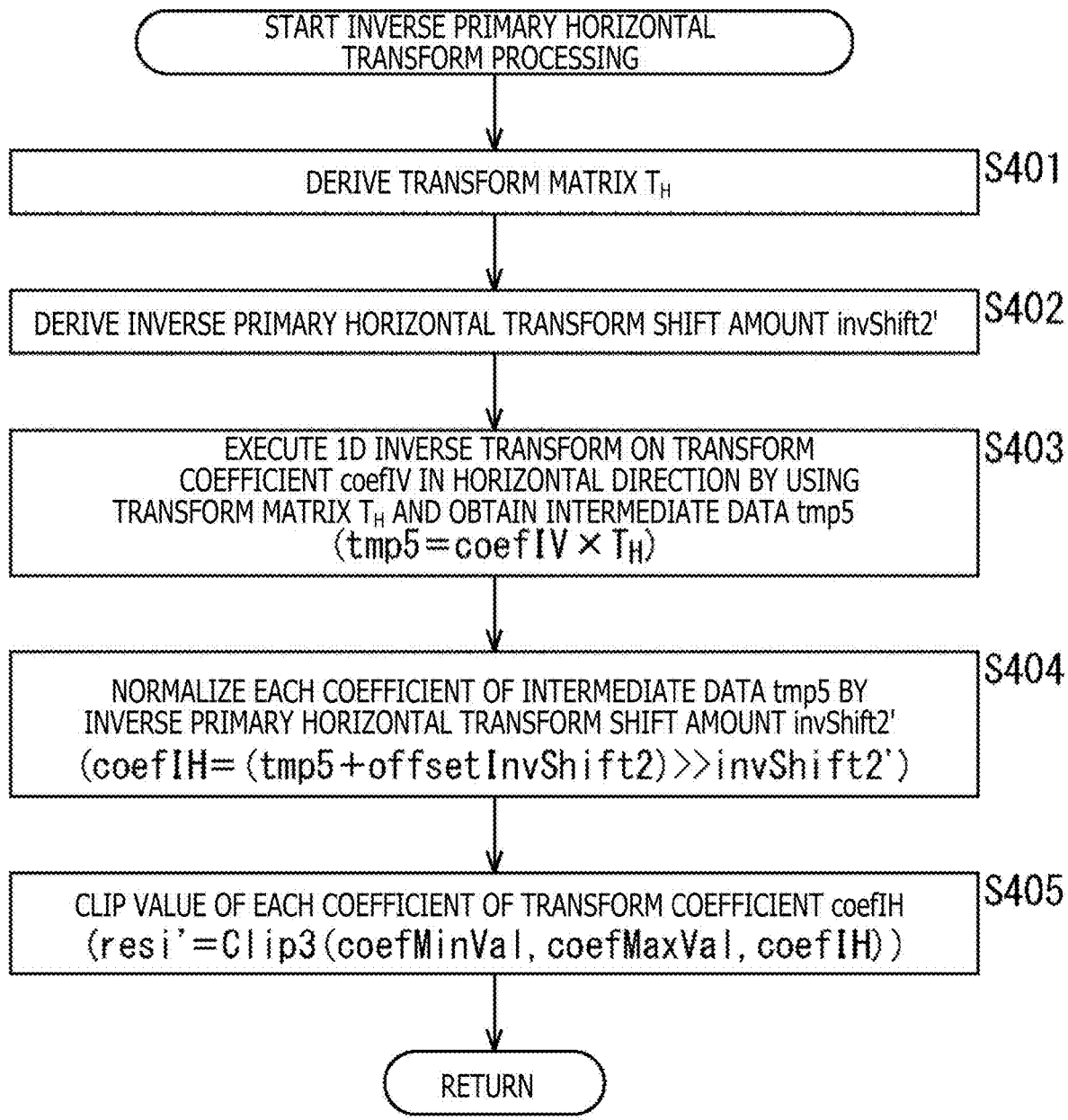
FIG. 43 is a flowchart illustrating an example of a flow of inverse primary horizontal transform processing.

An example of a flow of the inverse primary horizontal transform processing executed in Step S363 of FIG. 41 will be described with reference to a flowchart of FIG. 43.

When the inverse primary horizontal transform processing is started, the parameter derivation section 281 of the inverse primary horizontal transform section 262 derives the transform matrix $T_H$ in Step S401. For example, the parameter derivation section 281 reads out a base transform matrix $T_{base}$ in (1<<log 2TrWidth) rows by (1<<log 2TrWidth) columns corresponding to information (log 2TrWidth) associated with the transform type identifier trTypeIdxH and the size of the transform block from the unillustrated look-up table LUT and sets the base transform matrix $T_{base}$ to the transform matrix $T_H$ (that is, $T_H=T_{base}$)

In Step S402, the parameter derivation section 281 derives the inverse primary horizontal transform shift amount invShift2'. For example, the parameter derivation section 281 derives the inverse primary horizontal transform shift amount invShift2 per sequence on the basis of the parameter trMatShift representing the integer approximation precision of the transform matrix $T_H$, the parameter log 2TransformRange associated with the range of the transform coefficient, and the sequence bit depth channelBitDepth, as represented by the following Equation (75). It is noted that the parameter trMatShift takes a value of, for example, eight.

$$\text{invShift2}=\text{trMatShift}+\text{log 2TransformDynamicRange}-1-\text{channelBitDepth} \quad (75)$$

The parameter derivation section 281 then corrects the derived inverse primary horizontal transform shift amount invShift2 per sequence by using the extension bit precision dBD, as represented by the following Equation (76). In other words, the parameter derivation section 281 derives the inverse primary horizontal transform shift amount invShift2' of the local level (per extension bit precision control group SG) by using the inverse primary horizontal transform shift amount invShift2 per sequence and the extension bit precision dBD.

$$\text{invShift2'}=\text{invShift2}+dBD \quad (76)$$

Increasing a magnitude of the inverse primary horizontal transform shift amount invShift2 by the extension bit precision dBD with use of this Equation (76) makes it possible to simultaneously perform normalization processing accompanying the inverse primary horizontal transform and normalization processing for returning the precision of the transform coefficient the number of significant figures of which is expanded by dBD to the original precision of the number of significant figures.

Furthermore, in Step S402, the parameter derivation section 281 derives the minimum value coefMin and the maximum value coefMax of the residual data by using the parameter log 2TransformRange associated with the range of the transform coefficient, as represented by the above Equations (24) and (25).

In Step S403, the matrix computing section 282 performs the one-dimensional inverse orthogonal transform on the coefficient data coefIV in the horizontal direction by using the transform matrix T derived in Step S401 and obtains the intermediate data tmp5, as represented by the following Equation (77). It is noted that in Equation (77), x is an operator representing a matrix product.

$$tmp5 = coefIV \times T_H \qquad (77)$$

In Step S404, the normalization section 283 normalizes the intermediate data tmp5 (matrix product between the coefficient data coeIV and the transform matrix $T_H$) by bit-shifting the intermediate data tmp5 to the right by the inverse primary horizontal transform shift amount invShift2' of the local level derived in Step S402 and obtains the intermediate data tmp6, as represented by the following Equation (78).

$$tmp6 = (tmp5 + offsetInvShift2) \gg invShift2' \qquad (78)$$

It is noted that offsetInvShift2 is a rounding offset at the time of normalization and is derived, as represented by, for example, the following Equation (79).

$$offsetInvShift2 = 1 \ll (invShift2'-1) \qquad (79)$$

It is noted that the intermediate data tmp5 may be normalized by the following Equation (80) as an alternative to Equation (78) described above.

$$tmp6 = sign(tmp5)*(abs(tmp5) + offsetInvShift2) \gg invShift2' \qquad (80)$$

In Step S405, the clip section 284 clips a value of the intermediate data tmp6 so that the value falls within the range from the minimum value coefMin of the coefficient to the maximum value coefMax of the coefficient derived in Step S402 and derives the prediction residual resi' subjected to clipping, as represented by the following Equation (81).

$$resi' = clip3(coefMin, coefMax, tmp6) \qquad (81)$$

When the processing of Step S405 is ended, then the inverse primary horizontal transform processing is ended, and the processing returns to FIG. 41.

As described above, diminishing the magnitude of the inverse primary horizontal transform shift amount invShift2 by the extension bit precision dBD makes it possible for the inverse primary horizontal transform section 262 to expand the number of significant figures of resi' subjected to the inverse primary horizontal transform, by dBD. It is therefore possible to perform transform and quantization in subsequent transform and quantization processing with improved computing precision. Furthermore, it is possible to simultaneously perform the normalization processing accompanying the inverse primary horizontal transform and the normalization processing for returning the precision of the transform coefficient the number of significant figures of which is expanded by dBD to the original precision of the number of significant figures.

It is noted that the processing of Step S405 may be omitted.

4. Second Embodiment

<Image Encoding Apparatus>

Figure 44:
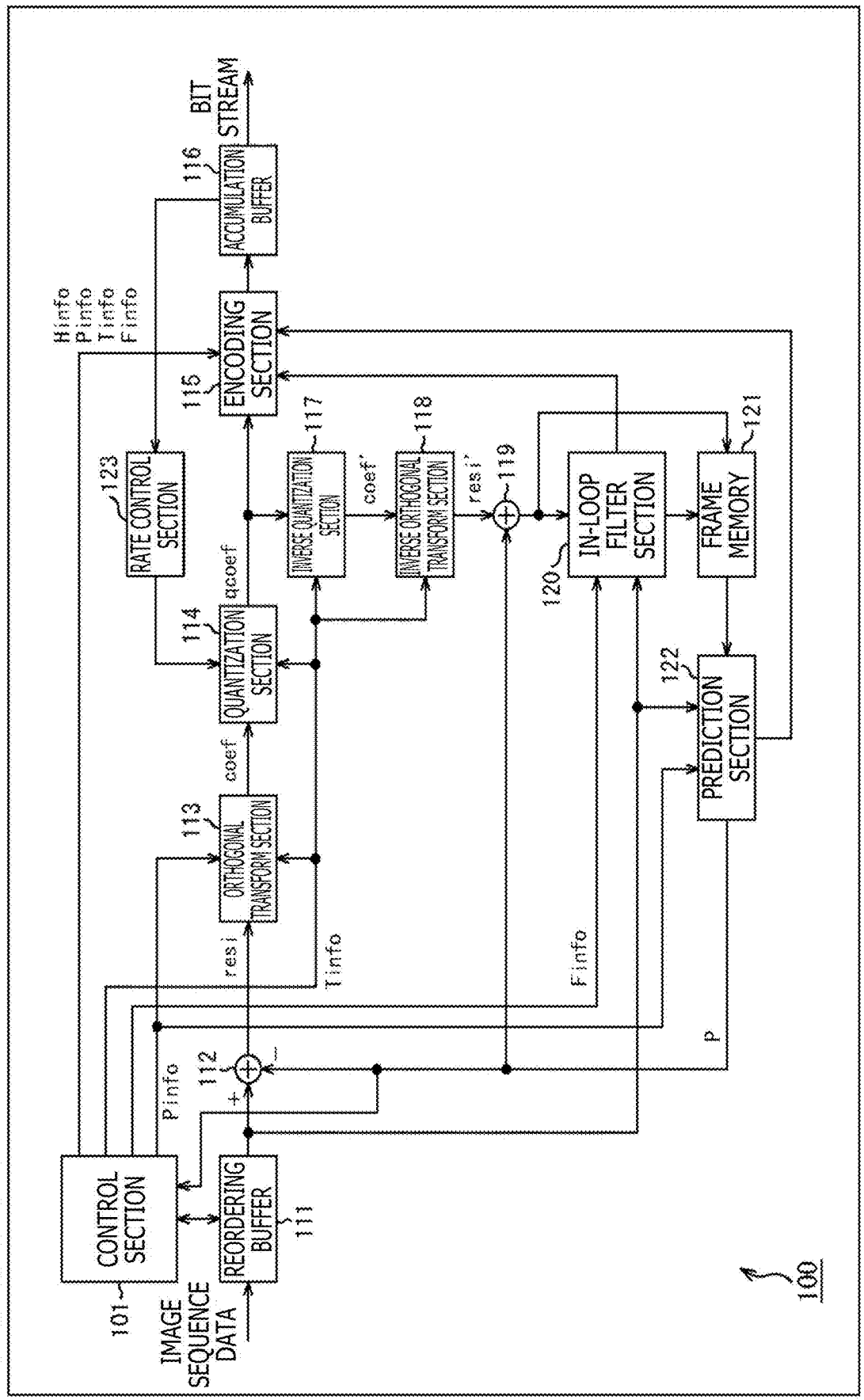
FIG. 44 is a block diagram depicting an example of principal configurations of an image encoding apparatus.

In the second embodiment, details of the method #2 in the table of FIG. 9 will be described. First, configurations of exercising such control over the computing precision at the time of encoding will be described. FIG. 44 is a block diagram depicting an example of principal configurations of the image encoding apparatus 100 in this case. Also in the case of FIG. 44, the image encoding apparatus 100 basically has configurations similar to those in the case of the method #1 (FIG. 15) except that the predicted image P obtained by the prediction section 122 is also supplied to the control section 101.

For example, the control section 101 derives the extension bit precision dBD per local level on the basis of this predicted image. Further, in this case, the extension bit precision dBD is derived from the predicted image; thus, the decoding side can similarly derive the extension bit precision dBD from the predicted image. In other words, it is unnecessary to transmit the difference parameter deltaX. Therefore, the control section 101 omits derivation of this difference parameter deltaX. Naturally, the encoding section 115 omits encoding of the difference parameter deltaX (information associated with the extension bit precision).

<Details of Control Section>

Figure 45:
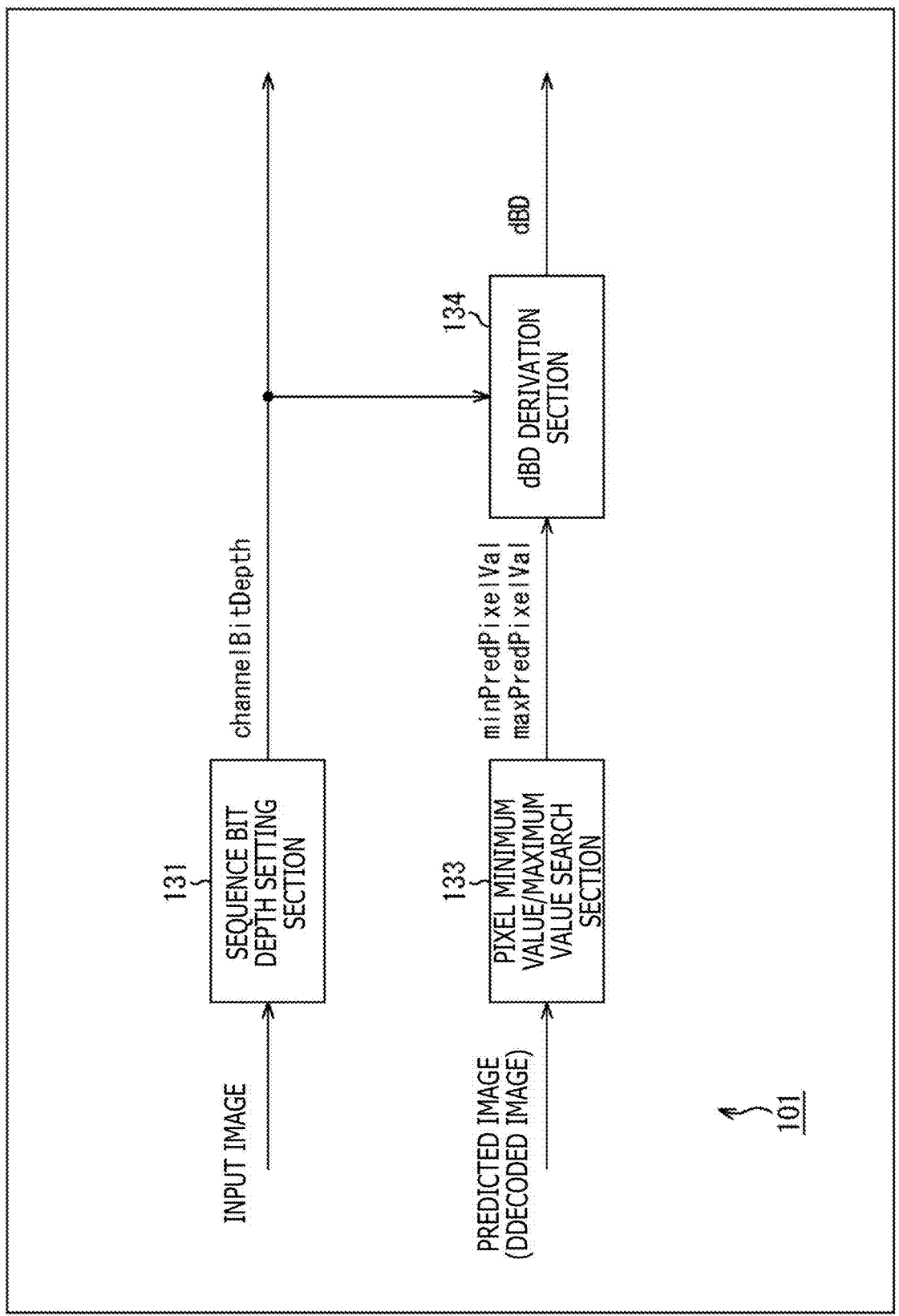
FIG. 45 is a block diagram depicting an example of principal configurations of a control section.

FIG. 45 is a block diagram depicting an example of principal configurations of the control section 101 in this case, the principal configurations being related to generation of information associated with control over the number of significant figures. As depicted in FIG. 45, the control section 101 in this case has the sequence bit depth setting section 131, the pixel minimum value/maximum value search section 133, and the dBD derivation section 134. Since the transmission of the difference parameter deltaX from the encoding side to the decoding side is omitted, the deltaX derivation section 135 is omitted. Owing to this, the slice bit depth setting section 132 is also omitted.

Further, the predicted image is input to the pixel minimum value/maximum value search section 133, and the pixel minimum value/maximum value search section 133 searches the minimum value (minPredPixelVal) and the maximum value (maxPredPixelVal) of pixel values of the predicted image per local level that is a data unit smaller than the sequence level. The pixel minimum value/maximum value search section 133 supplies the minimum value (minPredPixelVal) and the maximum value (maxPredPixelVal) of each local level detected by the search to the dBD derivation section 134.

The sequence bit depth channelBitDepth supplied from the sequence bit depth setting section 131 and the minimum value (minPredPixelVal) and the maximum value (maxPredPixelVal) of the pixel values of the predicted image supplied from the pixel minimum value/maximum value search section 133 are input to the dBD derivation section 134, and the dBD derivation section 134 derives the extension bit precision dBD per local level on the basis of those parameters.

The dBD derivation section 134 supplies the derived extension bit precision dBD to the orthogonal transform section 113, the quantization section 114, the inverse quantization section 117, and the inverse orthogonal transform section 118, as the transform information Tinfo.

In other words, the method #2 differs from the method #1 only in the method of deriving the extension bit precision dBD and omission of the transmission of the difference parameter deltaX and is basically similar to the method #1 in the other series of processing, for example, the control over the number of significant figures and the like in the orthogonal transform section 113, the quantization section 114, the inverse quantization section 117, and the inverse orthogonal transform section 118.

In this case, therefore, it is possible to suppress a reduction in encoding efficiency, similarly to the method #1.

<Flow of Image Encoding Processing>

An example of a flow of the image encoding processing in this case will next be described with reference to a flowchart of FIG. 46.

When the image encoding processing is started, processing of each of Steps S501 and S502 is executed similarly to processing of each of Steps S101 and S102 of FIG. 21.

In Step S503, the control section 101 determines (sets) encoding parameters for each input image held by the reordering buffer 111. In this case, however, the control section 101 only sets the sequence bit depth channelBitDepth on the basis of the input image and does not derive the extension bit precision dBD with respect to the information associated with the control over the number of significant figures.

In Step S504, the prediction section 122 performs prediction processing and generates the predicted image or the like in the optimum prediction mode, similarly to the case in Step S104.

In Step S505, the control section 101 derives the extension bit precision dBD from the predicted image generated in Step S504.

Processing of each of Steps S506 to S515 is performed similarly to the processing of each of Steps S105 to S114 of FIG. 21.

In the image encoding processing in the flow described above, the processing to which the present technology is applied as described above is performed as the processing of Steps S503, S505, S507, S508, S509, S510, and S514. Therefore, executing this image encoding processing makes it possible to suppress a reduction in encoding efficiency.

<Flow of Sequence Bit Depth Setting Processing>

Figure 46:
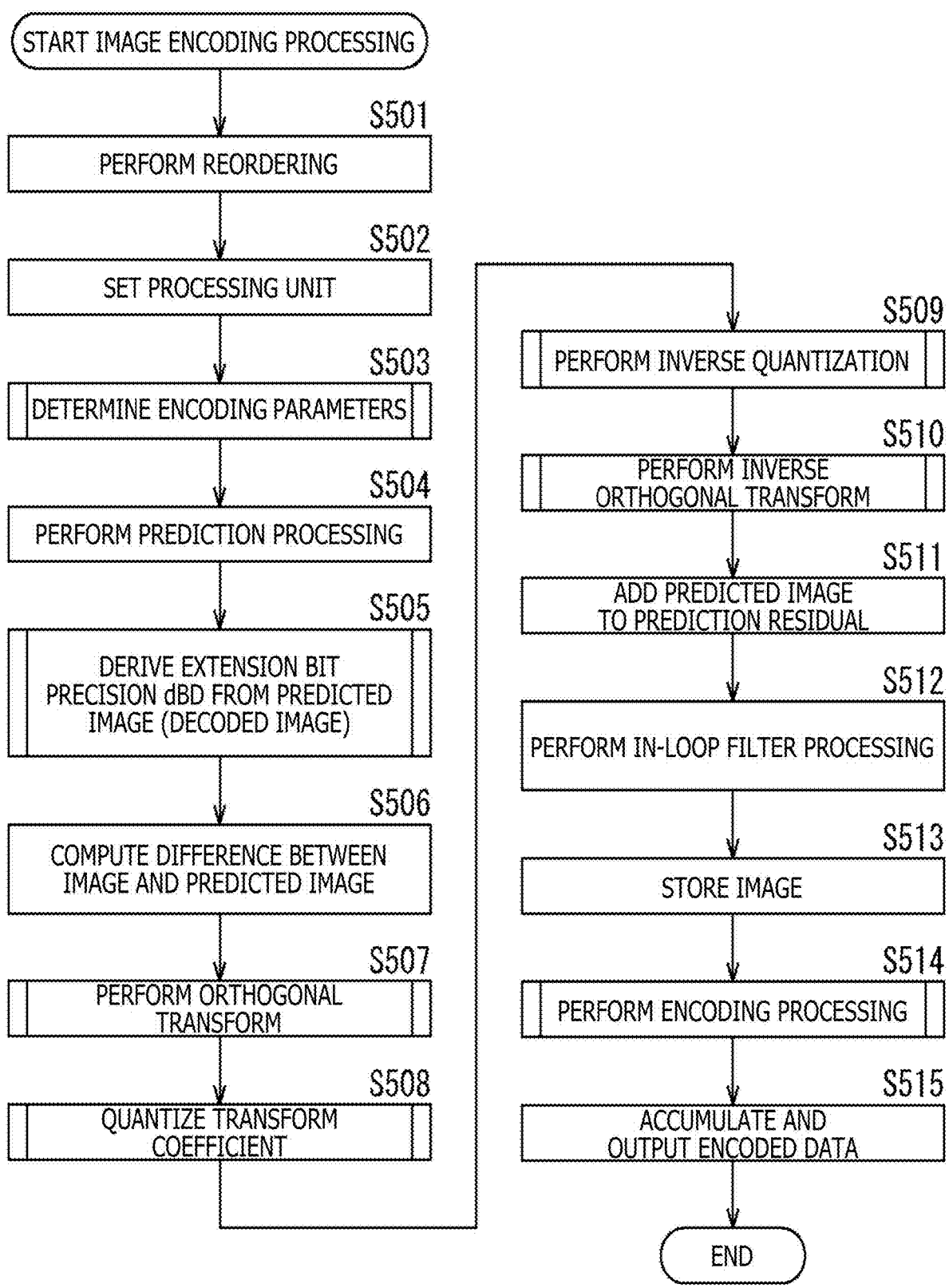
FIG. 46 is a flowchart illustrating an example of a flow of image encoding processing.
Figure 47:
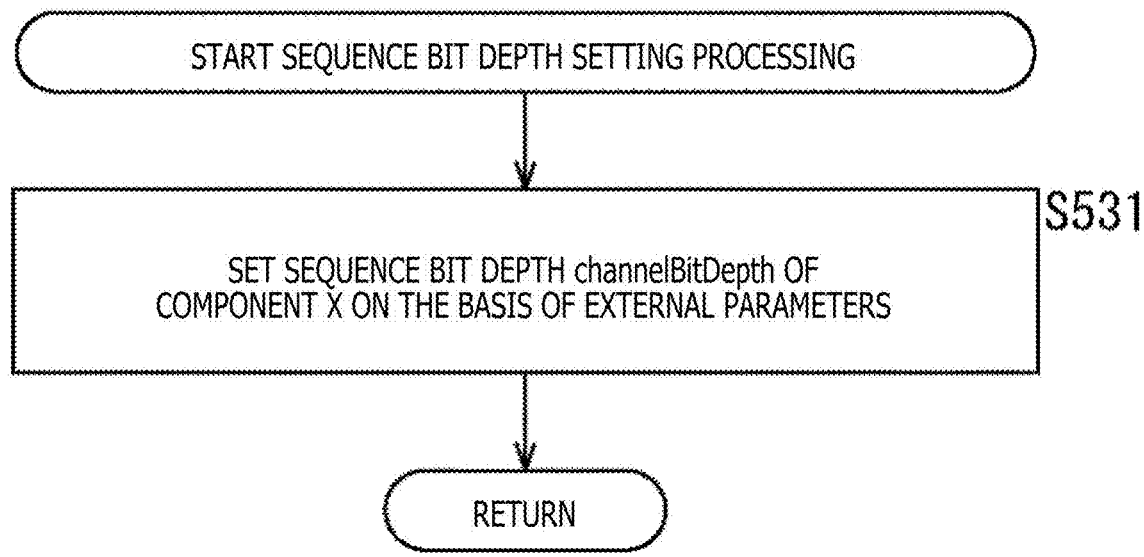
FIG. 47 is a flowchart illustrating an example of a flow of sequence bit depth setting processing.

In Step S503 of FIG. 46, the various encoding parameters are set. For example, the sequence bit depth channelBitDepth is set. An example of a flow of the sequence bit depth setting processing for setting this sequence bit depth channelBitDepth will be described with reference to a flowchart of FIG. 47.

When the sequence bit depth setting processing is started, the sequence bit depth setting section 131 obtains the bit depth of each component of the input image input from outside and sets the value of the obtained bit depth to the sequence bit depth channelBitDepth of each component in Step S531.

When the processing of Step S531 is ended, then sequence bit depth setting processing is ended, and the processing returns to FIG. 46.

<Flow of dBD Derivation Processing>

Figure 48:
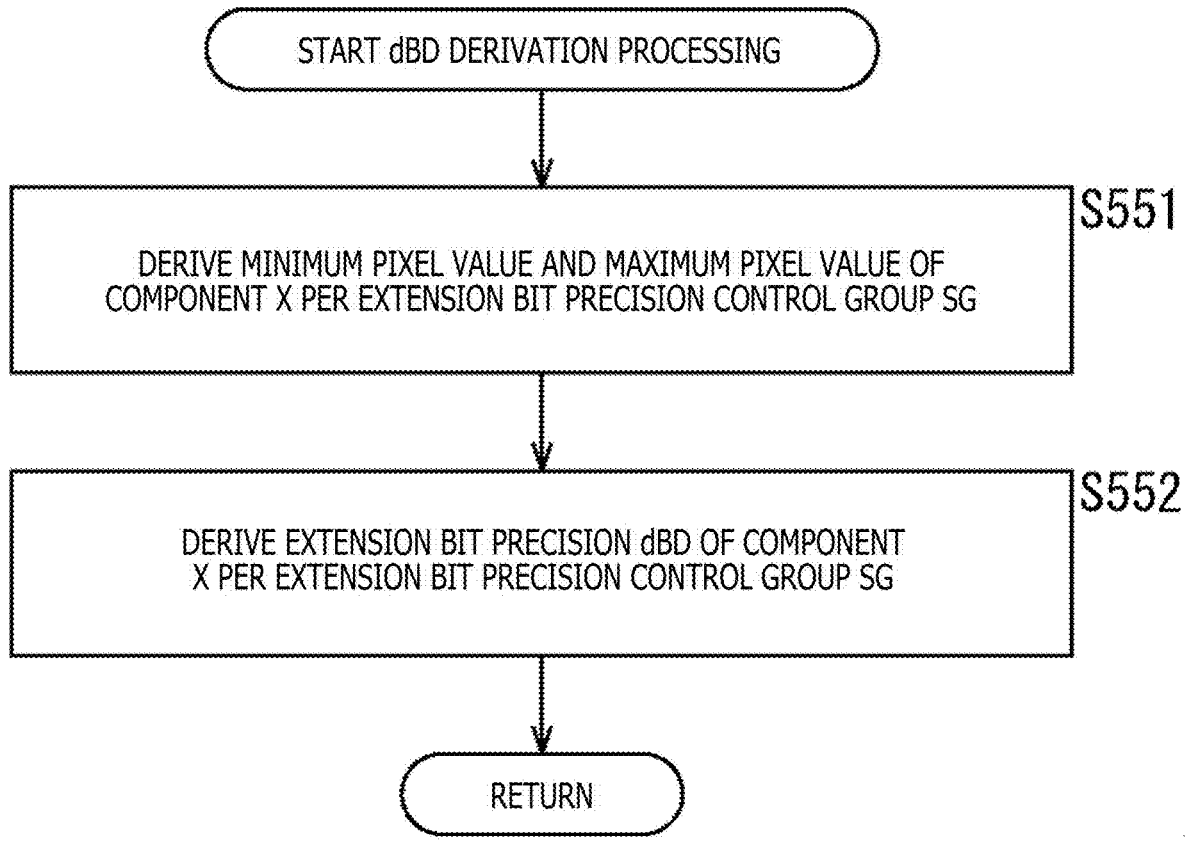
FIG. 48 is a flowchart illustrating an example of a flow of dBD derivation processing.

An example of a flow of the dBD derivation processing executed in the processing of Step S505 of FIG. 46 will be described with reference to a flowchart of FIG. 48.

When the dBD derivation processing is started, the pixel minimum value/maximum value search section 133 derives the minimum pixel value minPredPixelVal and the maximum pixel value maxPredPixelVal of the component X of the predicted image per extension bit precision control group SG in Step S551.

In Step S552, the dBD derivation section 134 derives the extension bit precision dBD of the component X per extension bit precision control group SG, on the basis of the minimum pixel value minPredPixelVal and the maximum pixel value maxPredPixelVal of the predicted image derived in Step S551.

When the processing of Step S552 is ended, then the dBD derivation processing is ended, and the processing returns to FIG. 46.

As described above, the extension bit precision dBD is derived per extension bit precision control group SG; thus, the orthogonal transform section 113, the quantization section 114, the inverse quantization section 117, and the inverse orthogonal transform section 118 can each control the number of significant figures of the coefficient (computing precision) per extension bit precision control group SG by using the extension bit precision dBD, as in the case of the method #1. In this case, therefore, it is possible to suppress a reduction in encoding efficiency, as in the case of the method #1.

<Flow of Extension Bit Precision Information Encoding Processing>

In the processing of Step S514 of FIG. 46, the information associated with the sequence bit depth is encoded as the information associated with the control over the number of significant figures (control over the computing precision) and is contained in the bit stream.

Figure 49:
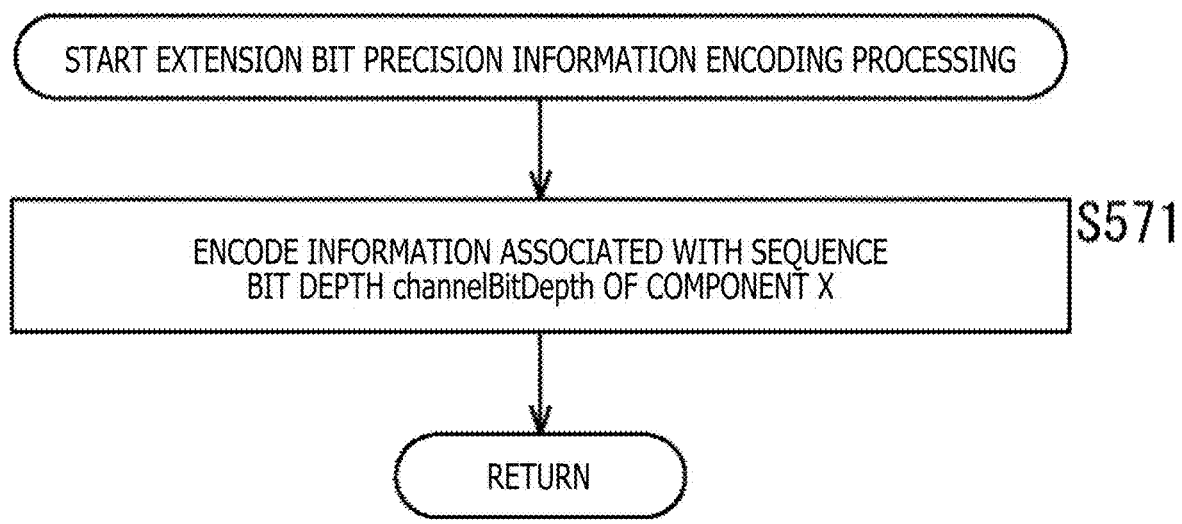
FIG. 49 is a flowchart illustrating an example of a flow of extension bit precision information encoding processing.

An example of a flow of extension bit precision information encoding processing for encoding this information associated with the sequence bit depth will be described with reference to a flowchart of FIG. 49.

When the extension bit precision information encoding processing is started, the encoding section 115 encodes the information associated with the sequence bit depth channelBitDepth of the component X and contains the encoded information in the bit stream (for example, sequence parameter set SPS) in Step S571.

When processing of Step S571 is ended, then the extension bit precision information encoding processing is ended, and the processing returns to FIG. 46.

As described above, in this case, the encoding section 115 encodes the information associated with the sequence bit depth and contains the encoded information in the bit stream (generates the bit stream containing the information associated with the sequence bit depth), but encoding of the difference parameter deltaX is omitted. It is therefore possible to suppress a reduction in encoding efficiency.

<Modification>

In the image encoding apparatus according to the second embodiment (method #2 in the table of FIG. 9), the extension bit precision dBD per local level is derived by referring to the predicted image corresponding to the block to be processed. Alternatively, the image encoding apparatus may be configured such that a local bit depth of the block to be processed is derived using the decoded image referred to at the time of generation of the predicted image as an alternative to the predicted image and that the extension bit precision dBD is derived by referring to the local bit depth (method #2').

In other words, in FIG. 45, the decoded image $Rec_{ref}$ referred to in generating the predicted image of the block to be processed is input to the pixel minimum value/maximum value search section 133, and the pixel minimum value/maximum value search section 133 searches a minimum value (minRecPixelVal) and a maximum value (maxRecPixelVal) of pixel values of the decoded image $Rec_{ref}$ per local level that is a data unit smaller than the sequence level. The pixel minimum value/maximum value search section 133 supplies the minimum value (minRecPixelVal) and the maximum value (maxRecPixelVal) of each local level detected by the search to the dBD derivation section 134.

Further, the sequence bit depth channelBitDepth supplied from the sequence bit depth setting section 131 and the minimum value (minRecPixelVal) and the maximum value (maxRecPixelVal) of the pixel values of the decoded image $Rec_{ref}$ supplied from the pixel minimum value/maximum value search section 133 are input to the dBD derivation section 134, and the dBD derivation section 134 derives the extension bit precision dBD per local level on the basis of those parameters.

Likewise, it is interpreted that in Step S505 of FIG. 46, "the extension bit precision dBD is derived from the decoded image."

In this case, therefore, it is possible to suppress a reduction in encoding efficiency, as in the case of the method #2. Furthermore, the advantage of the method #2' over the method #2 is that the extension bit precision dBD can be derived only from the decoded image without the need to generate the predicted image.

It is noted that the decoded image $Rec_{ref}$ in the above description indicates the local decoded pixel area referred to for generating an intra predicted image of a block to be processed in the case of intra prediction and indicates a local decoded pixel area referred to for generating an inter predicted image of a block to be processed in the case of inter prediction.

<Image Decoding Apparatus>

Figure 50:
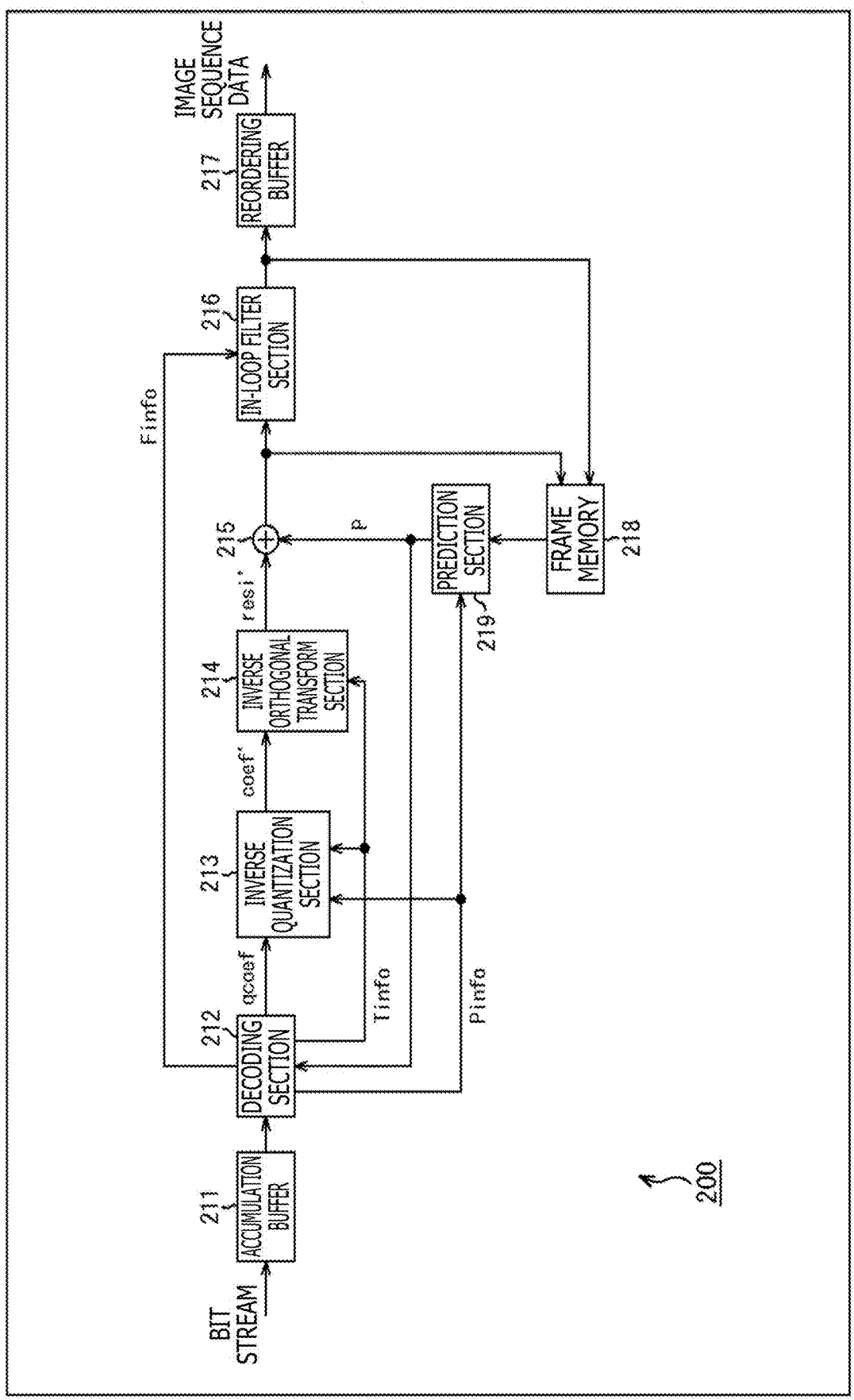
FIG. 50 is a block diagram depicting an example of principal configurations of an image decoding apparatus.

Next, configurations of controlling the computing precision in the method #2 in the table of FIG. 9 at the time of decoding will be described. FIG. 50 is a block diagram depicting an example of principal configurations of the image decoding apparatus 200 in this case. Also in the case of FIG. 50, the image decoding apparatus 200 basically has configurations similar to those in the case of the method #2 (FIG. 32) except that the predicted image P obtained by the prediction section 219 is also supplied to the decoding section 212.

For example, the decoding section 212 derives the extension bit precision dBD per local level on the basis of this predicted image. In other words, it is unnecessary to transmit the difference parameter deltaX. It is therefore possible to suppress a reduction in encoding efficiency. In addition, the decoding section 212 naturally omits decoding of this difference parameter deltaX.

<Details of Decoding Section>

Figure 51:
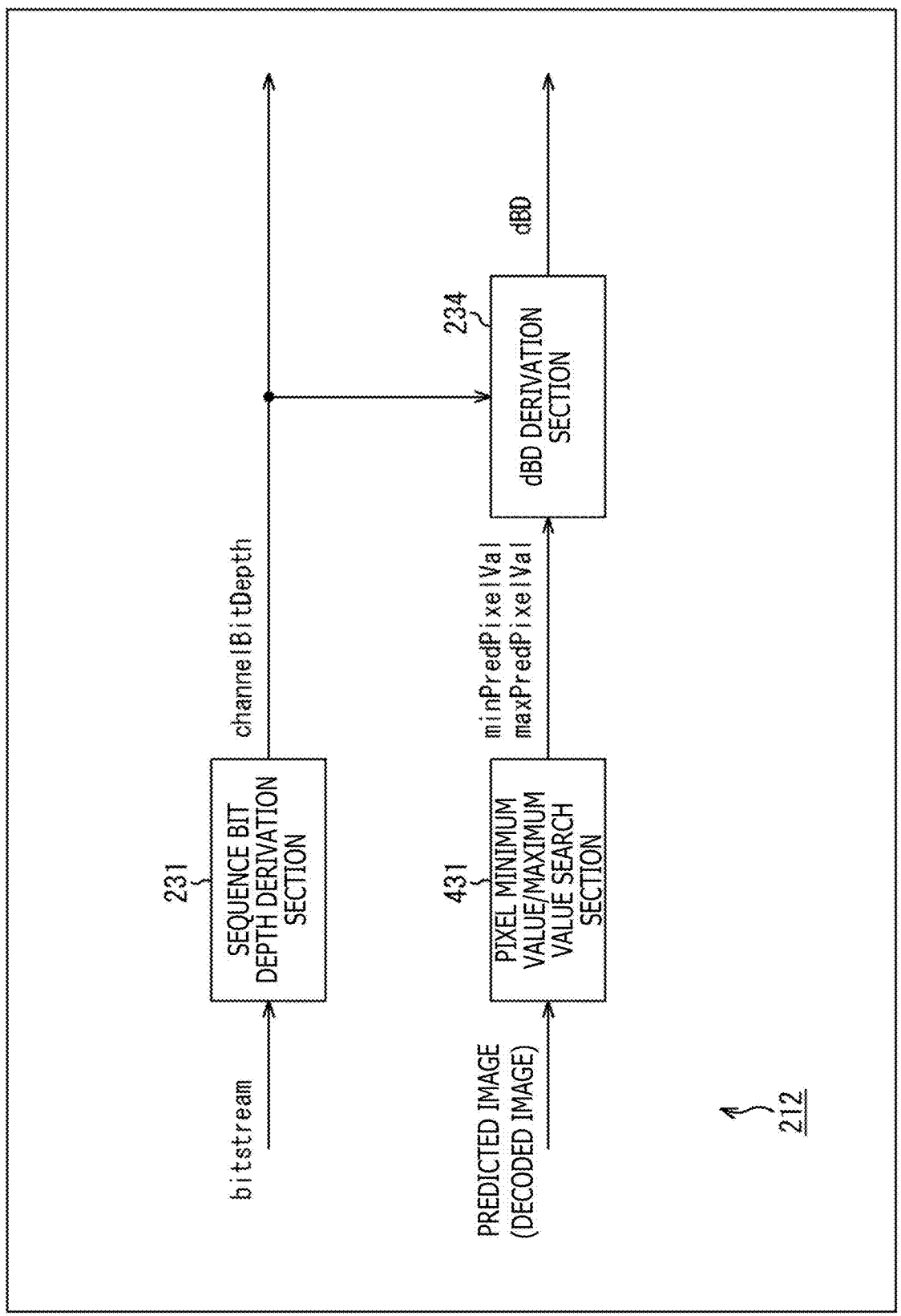
FIG. 51 is a block diagram depicting an example of principal configurations of a decoding section.

FIG. 51 is a block diagram depicting an example of principal configurations of the decoding section 212 in this case, the principal configurations being related to extraction of information associated with control over the number of significant figures. As depicted in FIG. 51, the decoding section 212 in this case has the sequence bit depth derivation section 231, the dBD derivation section 234, and a pixel minimum value/maximum value search section 431. Since the transmission of the difference parameter deltaX from the encoding side to the decoding side is omitted, the slice bit depth derivation section 232 and the deltaX decoding section 233 are omitted.

The predicted image is input to the pixel minimum value/maximum value search section 431, and the pixel minimum value/maximum value search section 431 searches the minimum value (minPredPixelVal) and the maximum value (maxPredPixelVal) of pixel values of the predicted image, per local level that is a data unit smaller than the sequence level. The pixel minimum value/maximum value search section 431 supplies the minimum value (minPredPixelVal) and the maximum value (maxPredPixelVal) of each local level detected by the search to the dBD derivation section 234.

The sequence bit depth channelBitDepth supplied from the sequence bit depth derivation section 231 and the minimum value (minPredPixelVal) and the maximum value (maxPredPixelVal) of the pixel values of the predicted image supplied from the pixel minimum value/maximum value search section 431 are input to the dBD derivation section 234, and the dBD derivation section 234 derives the extension bit precision dBD per local level on the basis of those parameters.

The dBD derivation section 234 supplies the derived extension bit precision dBD to the inverse quantization section 213 and the inverse orthogonal transform section 214, as the transform information Tinfo.

In other words, the method #2 differs from the method #1 only in the method of deriving the extension bit precision dBD and omission of the transmission of the difference parameter deltaX in the decoding side as well and is basically similar to the method #1 in the other series of processing, for example, the control over the number of significant figures and the like in the inverse quantization section 213 and the inverse orthogonal transform section 214.

In this case, therefore, it is possible to suppress a reduction in encoding efficiency, as in the case of the method #1.

<Flow of Image Decoding Processing>

An example of a flow of the image decoding processing in this case will next be described with reference to a flowchart of FIG. 52.

When the image decoding processing is started, processing of Step S601 is executed similarly to processing of Step S301 of FIG. 38.

In Step S602, the decoding section 212 performs decoding processing. In the case of this method #2, processing such as decoding of the difference parameter deltaX and derivation of the slice bit depth sliceBitDepth is omitted (not performed) in this decoding processing.

In Step S603, the prediction section 219 performs prediction processing and generates the predicted image P, similarly in the case of Step S305.

Figure 39:
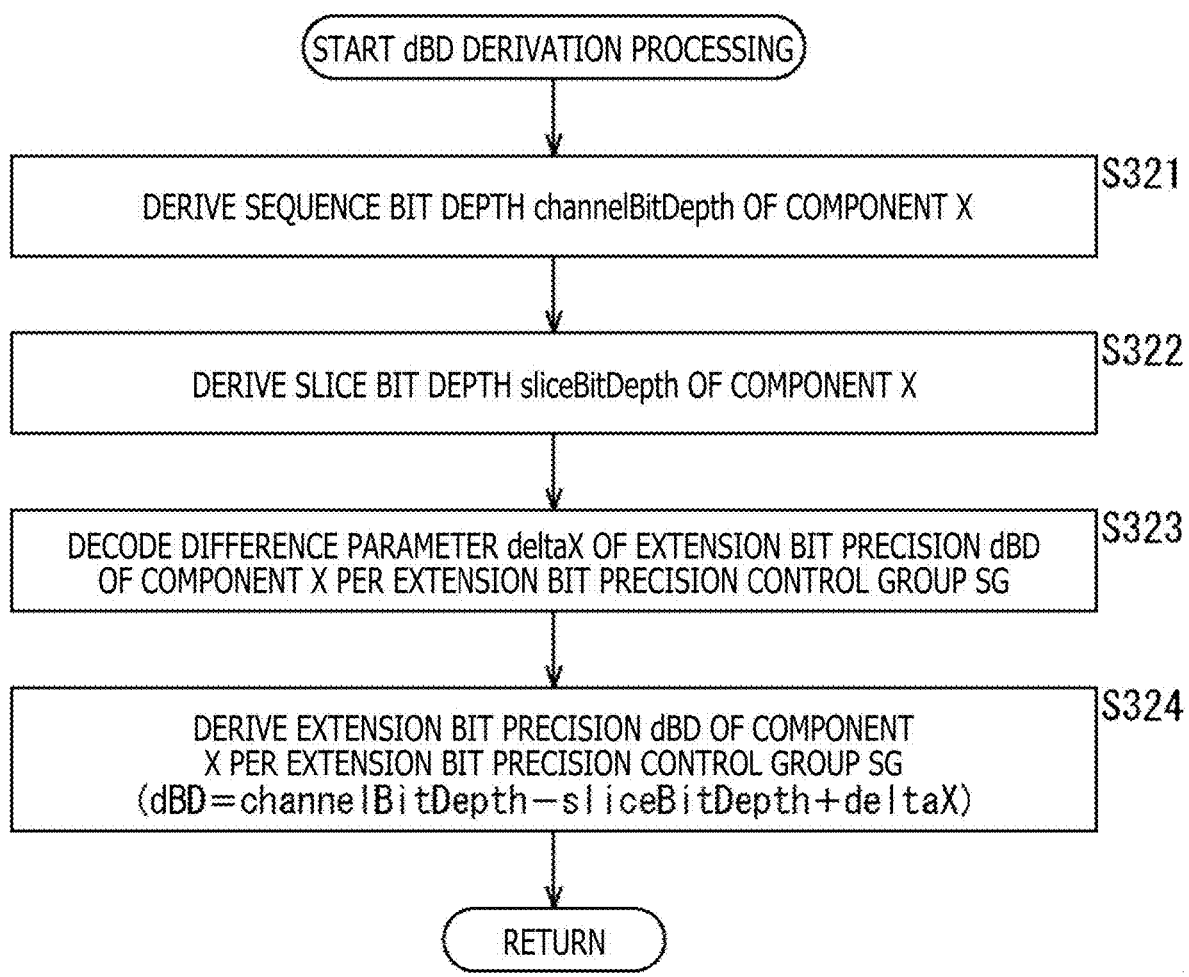
FIG. 39 is a flowchart illustrating an example of a flow of dBD derivation processing.

In Step S604, the decoding section 212 derives the extension bit precision dBD from the predicted image P generated in Step S603. It is noted that this derivation of the extension bit precision dBD is performed similarly to the case of the method #1 (FIG. 39).

Processing of each of Steps S605 and S606 is performed similarly to the processing of each of Steps S303 and S304. In other words, the inverse quantization section 213 and the inverse orthogonal transform section 214 perform the inverse quantization processing and the inverse orthogonal transform processing, similarly to the case of the method #1. In other words, the control over the number of significant figures (control over the computing precision) with use of the extension bit precision dBD of the local level is exercised, similarly to the case of the method #1. In this case, therefore, it is similarly possible to suppress a reduction in encoding efficiency.

Processing of each of Steps S607 to S610 is executed similarly to processing of each of Steps S306 to S309.

<Flow of Sequence Bit Depth Derivation Processing>

Figure 52:
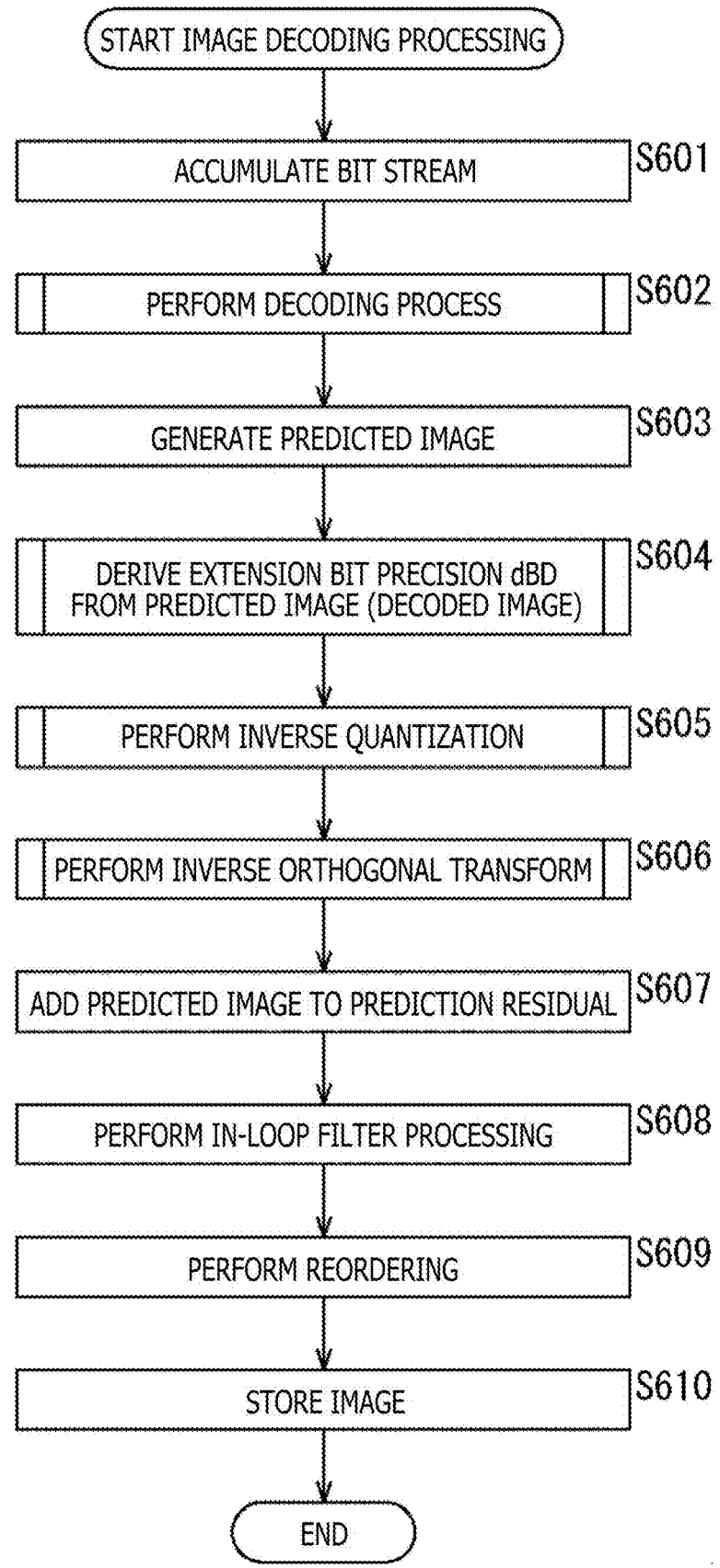
FIG. 52 is a flowchart illustrating an example of a flow of image decoding processing.
Figure 53:
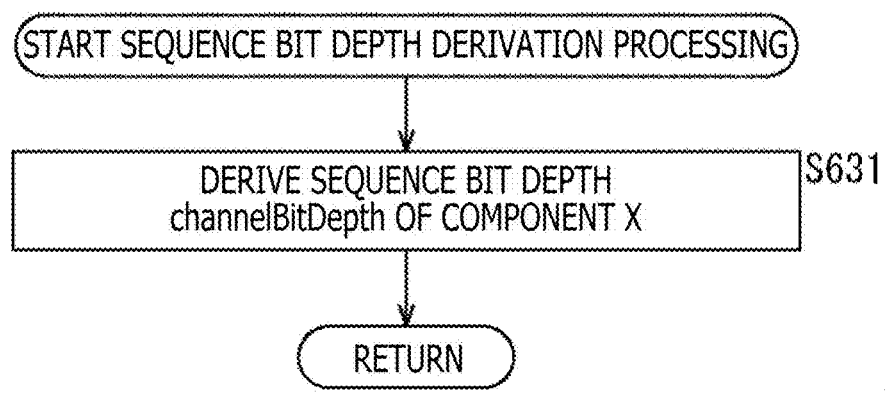
FIG. 53 is a flowchart illustrating an example of a flow of sequence bit depth derivation processing.

In the decoding processing of Step S602 of FIG. 52, the various encoding parameters are set. For example, the information associated with the sequence bit depth is read out from the bit stream, and the sequence bit depth channelBitDepth is derived from the information associated with the sequence bit depth. An example of a flow of the sequence bit depth derivation processing for deriving this sequence bit depth channelBitDepth will be described with reference to a flowchart of FIG. 53.

When the sequence bit depth derivation processing is started, the sequence bit depth derivation section 231 decodes the bit stream, extracts the information associated with the sequence bit depth, and derives the sequence bit depth channelBitDepth of each component on the basis of the extracted information associated with the sequence bit depth in Step S631.

When the processing of Step S631 is ended, then the sequence bit depth derivation processing is ended, and the processing returns to FIG. 52.

By executing each processing in such way, it is possible to exercise control over the number of significant figures of the transform coefficient per local level that is a data unit smaller than the sequence level. In the case of the method #2, therefore, it is similarly possible to suppress a reduction in encoding efficiency.

<Modification>

In the image decoding apparatus according to the second embodiment (method #2 in the table of FIG. 9), the extension bit precision dBD per local level is derived by referring to the predicted image corresponding to the block to be processed. Alternatively, the image decoding apparatus may be configured such that the local bit depth of the block to be processed is derived using the decoded image referred to at the time of generation of the predicted image as an alternative to the predicted image and that the extension bit precision dBD is derived by referring to the local bit depth (method #2').

In other words, in FIG. 51, the decoded image $Rec_{ref}$ referred to in generating the predicted image of the block to be processed is input to the pixel minimum value/maximum value search section 431, and the pixel minimum value/maximum value search section 431 searches the minimum value (minRecPixelVal) and the maximum value (maxRecPixelVal) of pixel values of the decoded image $Rec_{ref}$, per local level that is a data unit smaller than the sequence level. The pixel minimum value/maximum value search section 431 supplies the minimum value (minRecPixelVal) and the maximum value (maxRecPixelVal) of each local level detected by the search to the dBD derivation section 234.

Further, the sequence bit depth channelBitDepth supplied from the sequence bit depth setting section 231 and the minimum value (minRecPixelVal) and the maximum value (maxRecPixelVal) of the pixel values of the decoded image $Rec_{ref}$ supplied from the pixel minimum value/maximum value search section 431 are input to the dBD derivation section 234, and the dBD derivation section 234 derives the extension bit precision dBD per local level on the basis of those parameters.

Likewise, it is interpreted that in Step S604 of FIG. 52, "the extension bit precision dBD is derived from the decoded image."

In this case, therefore, it is possible to suppress a reduction in encoding efficiency, as in the case of the method #2. Furthermore, the advantage of the method #2' over the method #2 is that the extension bit precision dBD can be derived only from the decoded image without the need to generate the predicted image.

It is noted that the decoded image $Rec_{ref}$ in the above description indicates a local decoded pixel area referred to for generating an intra predicted image of a block to be processed in a case of intra prediction and indicates a local decoded pixel area referred to for generating an inter predicted image of the block to be processed in a case of inter prediction.

5. Notes

<Computer>

A series of processing described above can be executed either by hardware or by software. In a case of executing the series of processing by the software, a program configuring the software is installed into a computer. Here, types of the computer include a computer incorporated into dedicated hardware and a computer, for example, a general-purpose personal computer, capable of executing various functions by installing various programs into the computer.

FIG. 54 is a block diagram illustrating an example of a configuration of the hardware of the computer executing the series of processes described above by the program.

In a computer 800 depicted in FIG. 54, a CPU (Central Processing Unit) 801, a ROM (Read Only Memory) 802, and a RAM (Random Access Memory) 803 are mutually connected by a bus 804.

An input/output interface 810 is also connected to the bus 804. An input section 811, an output section 812, a storage section 813, a communication section 814, and a drive 815 are connected to the input/output interface 810.

The input section 811 includes, for example, a keyboard, a mouse, a microphone, a touch panel, and an input terminal. The output section 812 includes, for example, a display, a speaker, and an output terminal. The storage section 813 includes, for example, a hard disk, a RAM disk, and a nonvolatile memory. The communication section 814 includes, for example, a network interface. The drive 815 drives a removable medium 821 such as a magnetic disk, an optical disk, a magneto-optical disk, or a semiconductor memory.

In the computer configured as described above, the CPU 801 loads a program stored in, for example, the storage section 813 to the RAM 803 via the input/output interface 810 and the bus 804 and executes the program, whereby the series of processing described above is performed. Data and the like necessary for the CPU 801 to execute various kinds of processing are also stored in the RAM 803 as appropriate.

The program to be executed by the computer (CPU 801) can be applied by, for example, recording the program in a removable medium 821 serving as a package medium or the like. In that case, the program can be installed into the storage section 813 via the input/output interface 810 by attaching the removable medium 821 to the drive 815.

Alternatively, the program can be provided via a wired or wireless transmission medium such as a local area network, the Internet, or a digital satellite service. In that case, the program can be received by the communication section 814 and installed into the storage section 813.

As another alternative, this program can be installed into the ROM 802 or the storage section 813 in advance.

<Unit of Information/Processing>

The data unit in which the various kinds of information described so far are set and the data unit to be subjected to various kinds of processing can each be selected freely and are not limited to the examples described above. For example, the information or the processing may be set per TU (Transform Unit), TB (Transform Block), PU (Prediction Unit), PB (Prediction Block), CU (Coding Unit), LCU (Largest Coding Unit), sub-block, block, tile, slice, picture, sequence, or component, and data in the data unit may be subjected to the processing. Needless to say, this data unit can be set per information or per processing, and it is not always necessary to use a uniform data unit in all information or all processing. It is noted that a storage location of these pieces of information can be selected freely, and these pieces of information may be stored in the header, the parameter set, or the like in the data unit described above. Furthermore, these pieces of information may be stored in plural locations.

<Control Information>

Control information related to the present technology described in the embodiments so far may be transmitted from the encoding side to the decoding side. For example, control information (for example, enabled_flag) for controlling whether or not to permit (or prohibit) application of the present technology described above may be transmitted. Alternatively, control information indicating, for example, an object to which the present technology described above is to be applied (or an object to which the present technology is not to be applied) may be transmitted. For example, control information for designating a block size (one of or both an upper limit and a lower limit of the block size), a frame, a component, a layer, or the like to which the present technology is to be applied (or for permitting or prohibiting the application) may be transmitted.

<Objects to which Present Technology is Applied>

The present technology is applicable to any image encoding/decoding approach. In other words, without contradiction with the present technology described above, various kinds of processing associated with the image encoding/decoding such as the transform (inverse transform), the quantization (inverse quantization), the encoding (decoding), and the prediction may have freely-selected specifications, and the specifications are not limited to the examples described above. In addition, without contradiction with the present technology described above, part of these kinds of processing may be omitted.

Moreover, the present technology is applicable to a multiview image encoding/decoding system for encoding/decoding a multiview image containing images at plural views. In that case, the present technology may be applied to encoding/decoding of each view.

Furthermore, the present technology is applicable to a hierarchical image encoding (scalable encoding)/decoding system for encoding/decoding a hierarchical image that has plural layers (that are hierarchized) in such a manner as to have scalability for predetermined parameters. In that case, the present technology may be applied to encoding/decoding of each hierarchy (layer).

The image encoding apparatus 100 and the image decoding apparatus 200 according to the embodiments described above are applicable to various electronic apparatuses, such as a transmitter and a receiver (for example, a television receiver and a cellular telephone) in distribution on satellite broadcasting, wired broadcasting for a cable TV and the like, and the Internet and in distribution to a terminal by cellular communication and apparatuses (for example, a hard disk recorder and a camera) for recording images in a medium such as an optical disk, a magnetic disk, and a flash memory and reproducing images from these storage media.

Moreover, the present technology can be carried out as any configuration mounted in a freely selected apparatus or an apparatus configuring a system, for example, as a processor (for example, video processor) serving as system LSI (Large Scale Integration), a module (for example, video module) using a plurality of processors or the like, a unit (for example, video unit) using a plurality of modules or the like, a set (for example, video set) obtained by further adding other functions to the unit, or the like (that is, as partial configurations of the apparatus).

Further, the present technology is also applicable to a network system configured with plural apparatuses. For example, the present technology is applicable to a cloud service for providing services associated with images (image sequence) to any terminal such as an AV (Audio Visual) apparatus, a mobile information processing terminal, or an IoT (Internet of Things) device.

It is noted that systems, apparatuses, processing sections, and the like to which the present technology is applied can be used in any field, for example, a field of transportation, medicine, crime prevention, agriculture, livestock, mining, beauty, factories, consumer electronics, weather, and nature monitoring. In addition, use applications of the present technology may be determined freely.

For example, the present technology is applicable to a system or a device used for providing listening and viewing content. In addition, the present technology is applicable to, for example, a system or a device used for transportation such as monitoring of a traffic situation and autonomous driving control. Moreover, the present technology is applicable to, for example, a system or a device used for security. Further, the present technology is applicable to, for example, a system or a device used for automatic control over machines and the like. Further, the present technology is applicable to, for example, a system or a device used for agriculture and livestock businesses. Further, the present technology is applicable to, for example, a system or a device for monitoring states of nature such as volcanos, forests, and oceans, wildlife, and the like. Furthermore, the present technology is applicable to, for example, a system or a device used for sports.

<Others>

It is noted that in the present specification, a "flag" is information for identifying plural states and includes not only information for use at a time of identifying two states of true (1) and false (0) but also information by which three or more states can be identified. Therefore, a value which this "flag" possibly takes may be binary such as 1 or 0 or may be three or more values. In other words, the number of bits configuring this "flag" can be selected freely and may be one or may be two or more. Moreover, not only a form of containing identification information (including the flag) in a bit stream but also a form of containing difference information regarding identification information with respect to information that forms a certain basis is supposed; thus, in the present specification, the "flag" or the "identification information" encompasses not only the information but also the difference information with respect to the information that forms the basis.

Furthermore, various kinds of information (such as metadata) related to encoded data (bit stream) may be transmitted or recorded in any form as long as the various kinds of information is associated with the encoded data. A term "associate" means herein, for example, to allow the other data to be used (linked) at a time of processing one data. In other words, pieces of data associated with each other may be compiled as one data or individual pieces of data. For example, information associated with the encoded data (image) may be transmitted on a transmission line different from a transmission line used to transmit the encoded data (image). Moreover, the information associated with the encoded data (image) may be recorded, for example, in a recording medium different from a recording medium in which the encoded data (image) is recorded (or in a different recording area in the same recording medium). It is noted that this "association" may be association of part of data instead of overall data. For example, an image and information corresponding to the image may be associated with each other in any unit such as plural frames, one frame, or a portion in a frame.

It is noted that in the present specification, terms such as "combine," "multiplex," "add," "integrate," "contain/include," "store," "incorporate," "plug," and "insert" mean to compile plural things into one, for example, to compile the encoded data and the metadata into one data, and mean one method for the "association" described above.

Moreover, the embodiments of the present technology are not limited to the embodiments described above, and various changes can be made without departing from the spirit of the present technology.

Furthermore, the present technology can be carried out as any configuration configuring an apparatus or a system, for example, as a processor as system LSI (Large Scale Integration), a module using a plurality of processors or the like, a unit using a plurality of modules or the like, or a set obtained by further adding other functions to a unit (that is, configuration of part of an apparatus).

It is noted that a system means in the present specification a collection of plural constituent elements (apparatuses, modules (parts), and the like), regardless of whether all the constituent elements are provided in the same casing. Therefore, plural apparatuses accommodated in different casings and connected to one another via a network and one apparatus in which plural modules are accommodated in one casing can both be referred to as the "system."

Further, the configurations described as one apparatus (or processing section), for example, may be divided and configured as plural apparatuses (or processing sections). Conversely, configurations described above as plural apparatuses (or processing sections) may be compiled and configured as one apparatus (or one processing section). Moreover, needless to say, configurations other than those of each apparatus (or each processing section) described above may be added to the configurations of each apparatus (or each processing section). Furthermore, if the configurations or operations are substantially identical as an overall system, part of configurations of a certain apparatus (or a certain processing section) may be included in the configurations of another apparatus (or another processing section).

For example, the present technology can adopt a cloud computing configuration for causing plural apparatuses to process one function in a sharing or cooperative fashion.

Further, the program described above can be executed by, for example, any apparatus. In that case, the apparatus is only required to be configured with necessary functions (functional blocks or the like) to be capable of obtaining necessary information.

Furthermore, each step described in the above flowcharts, for example, can be executed not only by one apparatus but also by plural apparatuses in a sharing fashion. Moreover, in a case in which one step includes plural series of processing, the plural series of processing included in the one step can be executed not only by one apparatus but also by plural apparatuses in a sharing fashion. In other words, the plural series of processing included in the one step can be executed as processing of plural steps. Conversely, processing described as plural steps may be compiled into one step and executed collectively.

It is noted that the program to be executed by a computer may be a program for performing processing of steps describing the program in time series in an order described in the present specification or may be a program for individually performing the processing either in parallel or at necessary timing such as a timing of calling. In other words, the series of processing in the steps may be executed in an order different from the order described above unless contradiction arises. Furthermore, the processing in the steps that describe this program may be executed in parallel to processing of other programs or may be executed in combination with the processing of other programs.

The present technologies described in plural numbers in the present specification can be carried out independently and solely unless contradiction arises. Needless to say, the freely-selected plural present technologies can be carried out in combination. For example, part of or entirety of the present technology described in any of the embodiments may be combined with part of or entirety of the present technology described in another embodiment, and the combination can be carried out. Furthermore, part of or entirety of the freely-selected present technology described above can be combined with another technology that is not described above, and the combination of the technologies can be carried out.

It is noted that the present technology can also be configured as follows.

(1)

An image processing apparatus including:

an orthogonal transform section that orthogonally transforms a prediction residual of an image and that controls the number of significant figures of coefficient data obtained by orthogonal transform of the prediction residual, on the basis of a bit depth indicating a range of pixel values of a local level that is a data unit smaller than a sequence level of the image;

a quantization section that quantizes the coefficient data obtained by the orthogonal transform section and that controls the number of significant figures of a quantized coefficient obtained by quantization of the coefficient data, on the basis of the bit depth of the local level; and an encoding section that encodes the quantized coefficient obtained by the quantization section and that generates a bit stream.

(2)

The image processing apparatus according to (1), in which the orthogonal transform section controls the number of significant figures of the coefficient data by bit-shifting the coefficient data by a shift amount according to the bit depth of the local level, and the quantization section controls the number of significant figures of the quantized coefficient by bit-shifting the quantized coefficient by the shift amount according to the bit depth of the local level.

(3)

The image processing apparatus according to (1) or (2), in which the orthogonal transform section performs primary orthogonal transform on the prediction residual and performs secondary orthogonal transform on an obtained result of the primary orthogonal transform, and controls the number of significant figures of the coefficient data on the basis of the bit depth of the local level, in the primary orthogonal transform.

(4)

The image processing apparatus according to (3), in which in the primary orthogonal transform, the orthogonal transform section performs one-dimensional transform on the prediction residual in a horizontal direction, controls the number of significant figures of obtained intermediate data on the basis of the bit depth of the local level, performs one-dimensional transform on the intermediate data the number of significant figures of which is controlled, in a vertical direction, and controls the number of significant figures of obtained coefficient data on the basis of the bit depth of the sequence level.

(5)

The image processing apparatus according to (4), in which the orthogonal transform section corrects a controlled variable of the number of significant figures of the intermediate data set per sequence of the image, on the basis of the bit depth of the local level, and controls the number of significant figures of the intermediate data by the corrected controlled variable.

(6)

The image processing apparatus according to any one of (1) to (5), in which the quantization section corrects a controlled variable of the number of significant figures of the quantized coefficient set per sequence of the image, on the basis of the bit depth of the local level, and controls the number of significant figures of the quantized coefficient by the corrected controlled variable.

(7)

The image processing apparatus according to any one of (1) to (6), further including:

an extension bit precision derivation section that derives extension bit precision that includes a correction value of a controlled variable of the number of significant figures of the coefficient data set per sequence of the image and of a controlled variable of the number of significant figures of the quantized coefficient, on the basis of the bit depth of the local level, in which the orthogonal transform section corrects the controlled variable of the number of significant figures of the coefficient data by using the extension bit precision derived by the extension bit precision derivation section, and controls the number of significant figures of the coefficient data by the corrected controlled variable, and the quantization section corrects the controlled variable of the number of significant figures of the quantized coefficient using the extension bit precision derived by the extension bit precision derivation section, and controls the number of significant figures of the quantized coefficient by the corrected controlled variable.

(8)

The image processing apparatus according to (7), in which the extension bit precision derivation section derives a difference between the bit depth of the sequence level and the bit depth of the local level, as the extension bit precision.

(9)

The image processing apparatus according to (8), further including:

a sequence bit depth setting section that sets the bit depth of the sequence level on the basis of external parameters, in which the extension bit precision derivation section derives the difference by using the bit depth of the sequence level set by the sequence bit depth setting section.

(10)

The image processing apparatus according to (8) or (9), further including:

a pixel minimum value/maximum value search section that searches a minimum value and a maximum value of the local level of pixel values of the image, in which the extension bit precision derivation section derives the bit depth of the local level by using a difference between the maximum value and the minimum value detected by search performed by the pixel minimum value/maximum value search section, and derives the difference by using the derived bit depth of the local level.

(11)

The image processing apparatus according to any one of (7) to (10), in which the extension bit precision derivation section derives the extension bit precision per area at a size determined on the basis of a difference value between a CTB size and a segmentation depth with respect to the CTB size.

(12)

The image processing apparatus according to (11), in which the encoding section encodes the difference value of the segmentation depth with respect to the CTB size and generates the bit stream containing the difference value of the segmentation depth with respect to the CTB size.

(13)

The image processing apparatus according to any one of (7) to (12), in which the encoding section encodes information associated with the extension bit precision derived by the extension bit precision derivation section and generates the bit stream containing the information associated with the extension bit precision.

(14)

The image processing apparatus according to (13), further including:

a difference parameter derivation section that derives a difference parameter by using the extension bit precision derived by the extension bit precision derivation section, in which the encoding section encodes the difference parameter derived by the difference parameter derivation section, as the information associated with the extension bit precision, and generates the bit stream containing the difference parameter.

(15)

The image processing apparatus according to (14), in which the difference parameter includes a difference between the bit depth of a slice level of the image and the bit depth of the local level.

(16)

The image processing apparatus according to (14) or (15), in which the difference parameter includes a difference between the bit depth of a sequence level of the image and the bit depth of the local level.

(17)

The image processing apparatus according to any one of (14) to (16), in which the difference parameter includes a difference between the extension bit precision and a predicted value of the extension bit precision.

(18)

The image processing apparatus according to (17), in which the predicted value of a current area corresponding to the local level is derived on the basis of each of the extension bit precision of neighboring areas of the current area corresponding to the local level.

(19)

The image processing apparatus according to any one of (1) to (18), in which the encoding section encodes control information indicating whether control over the number of significant figures based on the bit depth of the local level is possible and generates the bit stream containing the control information.

(20)

An image processing method including:

orthogonally transforming a prediction residual of an image, and controlling the number of significant figures of coefficient data obtained by orthogonal transform of the prediction residual, on the basis of a bit depth indicating a range of pixel values of a local level that is a data unit smaller than a sequence level of the image;

quantizing the coefficient data and controlling the number of significant figures of a quantized coefficient obtained by quantization of the coefficient data, on the basis of the bit depth of the local level; and encoding the quantized coefficient and generating a bit stream.

(21)

An image processing apparatus including:

a decoding section that decodes a bit stream;

an inverse quantization section that inversely quantizes a quantized coefficient obtained by decoding of the bit stream by the decoding section and that controls the number of significant figures of coefficient data obtained by inverse quantization of the quantized coefficient, on the basis of a bit depth indicating a range of pixel values of a local level that is a data unit smaller than a sequence level; and an inverse orthogonal transform section that performs inverse orthogonal transform on the coefficient data obtained by inverse quantization of the quantized coefficient by the inverse quantization section and that controls the number of significant figures of residual data obtained by performance of the inverse orthogonal transform on the coefficient data, on the basis of the bit depth of the local level.

(22)

The image processing apparatus according to (21), in which the inverse quantization section controls the number of significant figures of the coefficient data by bit-shifting the coefficient data by a shift amount according to the bit depth of the local level, and the inverse orthogonal transform section controls the number of significant figures of the residual data by bit-shifting the residual data by the shift amount according to the bit depth of the local level.

(23)

The image processing apparatus according to (21) or (22), in which the inverse quantization section corrects a controlled variable of the number of significant figures of the coefficient data set per sequence of the image, on the basis of the bit depth of the local level, and controls the number of significant figures of the coefficient data by the corrected controlled variable.

(24)

The image processing apparatus according to any one of (21) to (23), in which the inverse orthogonal transform section performs inverse secondary orthogonal transform on the coefficient data and performs inverse primary orthogonal transform on an obtained result of the inverse secondary orthogonal transform, and controls the number of significant figures of the residual data on the basis of the bit depth of the local level, in the inverse primary orthogonal transform.

(25)

The image processing apparatus according to (24), in which in the inverse primary orthogonal transform, the inverse orthogonal transform section performs one-dimensional inverse transform on a result of the inverse secondary orthogonal transform, in a vertical direction, controls the number of significant figures of obtained intermediate data on the basis of the bit depth of the sequence level, performs one-dimensional inverse transform on the intermediate data the number of significant figures of which is controlled, in a horizontal direction, and controls the number of significant figures of obtained residual data on the basis of the bit depth of the local level.

(26)

The image processing apparatus according to (25), in which the inverse orthogonal transform section corrects a controlled variable of the number of significant figures of the residual data set per sequence of the image, on the basis of the bit depth of the local level, and controls the number of significant figures of the residual data by the corrected controlled variable.

(27)

The image processing apparatus according to any one of (21) to (26), in which the bit stream contains information associated with extension bit precision that includes a correction value of a controlled variable of the number of significant figures of the coefficient data set per sequence and of a controlled variable of the number of significant figures of the residual data, the decoding section decodes the bit stream and extracts the information associated with the extension bit precision and contained in the bit stream, and derives the extension bit precision on the basis of the extracted information associated with the extension bit precision, the inverse quantization section corrects the controlled variable of the number of significant figures of the coefficient data by using the extension bit precision derived by the decoding section, and controls the number of significant figures of the coefficient data by the corrected controlled variable, and the inverse orthogonal transform section corrects the controlled variable of the number of significant figures of the residual data by using the extension bit precision derived by the decoding section, and controls the number of significant figures of the residual data by the corrected controlled variable.

(28)

The image processing apparatus according to (27), in which the extension bit precision includes a difference between the bit depth of the sequence level and the bit depth of the local level.

(29)

The image processing apparatus according to (28), in which the information associated with the extension bit precision contains a difference parameter that includes a difference between the bit depth of a slice level of the image and the bit depth of the local level, and the decoding section derives the extension bit precision by subtracting the bit depth of the slice level from the bit depth of the sequence level and adding the difference parameter to a subtraction result.

(30)

The image processing apparatus according to (29), in which the bit stream further contains information associated with the bit depth of the sequence level, and the decoding section decodes the bit stream and extracts the information associated with the bit depth of the sequence level and contained in the bit stream, derives the bit depth of the sequence level on the basis of the extracted information associated with the bit depth of the sequence level, and derives the extension bit precision by using the derived bit depth of the sequence level.

(31)

The image processing apparatus according to (30), in which the information associated with the bit depth of the sequence level includes a value obtained by subtracting a predetermined value from the bit depth of the sequence level, and the decoding section derives the bit depth of the sequence level by adding the predetermined value to the information associated with the bit depth of the sequence level.

(32)

The image processing apparatus according to any one of (29) to (31), in which the bit stream further contains information associated with the bit depth of the slice level, and the decoding section decodes the bit stream and extracts the information associated with the bit depth of the slice level and contained in the bit stream, derives the bit depth of the slice level on the basis of the extracted information associated with the bit depth of the slice level, and derives the extension bit precision by using the derived bit depth of the slice level.

(33)

The image processing apparatus according to (32), in which the information associated with the bit depth of the slice level includes a minimum value and a maximum value of the slice level of pixel values of the image, and the decoding section derives the bit depth of the slice level by using a difference between the maximum value and the minimum value.

(34)

The image processing apparatus according to any one of (28) to (33), in which the information associated with the extension bit precision contains a difference parameter that includes a difference between the bit depth of the sequence level of the image and the bit depth of the local level, and the decoding section derives the extension bit precision by subtracting the difference parameter from the bit depth of the sequence level.

(35)

The image processing apparatus according to any one of (28) to (34), in which the information associated with the extension bit precision contains a difference parameter that includes a difference between the extension bit precision and a predicted value of the extension bit precision, and the decoding section derives the extension bit precision by adding the predicted value to the difference parameter.

(36)

The image processing apparatus according to (35), in which the predicted value of a current area corresponding to the local level is derived on the basis of each of the extension bit precision of neighboring areas of the current area corresponding to the local level.

(37)

The image processing apparatus according to any one of (27) to (36), in which the decoding section derives the extension bit precision per area at a size determined on the basis of a difference value between a CTB size and a segmentation depth with respect to the CTB size.

(38)

The image processing apparatus according to (37), in which the decoding section decodes the bit stream and extracts the difference value of the segmentation depth with respect to the CTB size.

(39)

The image processing apparatus according to any one of (21) to (38), in which the decoding section decodes the bit stream, extracts control information indicating whether control over the number of significant figures based on the bit depth of the local level is possible, and controls application of the control over the number of significant figures based on the bit depth of the local level, according to the extracted control information.

(40)

An image processing method including:

decoding a bit stream;

inversely quantizing a quantized coefficient obtained by decoding of the bit stream, and controlling the number of significant figures of coefficient data obtained by inverse quantization of the quantized coefficient, on the basis of a bit depth indicating a range of pixel values of a local level that is a data unit smaller than a sequence level; and performing inverse orthogonal transform on the coefficient data obtained by inverse quantization of the quantized coefficient, and controlling the number of significant figures of residual data obtained by performance of the inverse orthogonal transform on the coefficient data, on the basis of the bit depth of the local level.

(41)

An image processing apparatus including:

an orthogonal transform section that orthogonally transforms a prediction residual of an image and that controls the number of significant figures of coefficient data obtained by orthogonal transform of the prediction residual, on the basis of a bit depth indicating a range of pixel values of a local level that is a data unit smaller than a sequence level of a predicted image corresponding to the image or of a decoded image referred to at a time of generation of the predicted image;

a quantization section that quantizes the coefficient data obtained by the orthogonal transform section and that controls the number of significant figures of a quantized coefficient obtained by quantization of the coefficient data, on the basis of the bit depth of the local level of the predicted image or the decoded image; and an encoding section that encodes the quantized coefficient obtained by the quantization section and that generates a bit stream.

(42)

The image processing apparatus according to (41), in which the orthogonal transform section controls the number of significant figures of the coefficient data by bit-shifting the coefficient data by a shift amount according to the bit depth of the local level of the predicted image, and the quantization section controls the number of significant figures of the quantized coefficient by bit-shifting the quantized coefficient by the shift amount according to the bit depth of the local level of the predicted image.

(43)

The image processing apparatus according to (41) or (42), in which the orthogonal transform section performs primary orthogonal transform on the prediction residual, and performs secondary orthogonal transform on an obtained result of the primary orthogonal transform, and controls the number of significant figures of the coefficient data on the basis of the bit depth of the local level of the predicted image, in the primary orthogonal transform.

(44)

The image processing apparatus according to (43), in which in the primary orthogonal transform, the orthogonal transform section performs one-dimensional transform on the prediction residual in a horizontal direction, controls the number of significant figures of obtained intermediate data on the basis of the bit depth of the local level of the predicted image, performs one-dimensional transform on the intermediate data the number of significant figures of which is controlled, in a vertical direction, and controls the number of significant figures of obtained coefficient data on the basis of the bit depth of the sequence level of the image.

(45)

The image processing apparatus according to (44), in which the orthogonal transform section corrects a controlled variable of the number of significant figures of the intermediate data set per sequence of the image, on the basis of the bit depth of the local level of the predicted image, and controls the number of significant figures of the intermediate data by the corrected controlled variable.

(46)

The image processing apparatus according to any one of (41) to (45), in which the quantization section corrects a controlled variable of the number of significant figures of the quantized coefficient set per sequence of the image, on the basis of the bit depth of the local level of the predicted image, and controls the number of significant figures of the quantized coefficient by the corrected controlled variable.

(47)

The image processing apparatus according to any one of (41) to (46), further including:

an extension bit precision derivation section that derives extension bit precision that includes a correction value of a controlled variable of the number of significant figures of the coefficient data set per sequence of the image and of a controlled variable of the number of significant figures of the quantized coefficient, on the basis of the bit depth of the local level of the predicted image, in which the orthogonal transform section corrects the controlled variable of the number of significant figures of the coefficient data by using the extension bit precision derived by the extension bit precision derivation section, and controls the number of significant figures of the coefficient data by the corrected controlled variable, and the quantization section corrects the controlled variable of the number of significant figures of the quantized coefficient by using the extension bit precision derived by the extension bit precision derivation section, and controls the number of significant figures of the quantized coefficient by the corrected controlled variable.

(48)

The image processing apparatus according to (47), in which the extension bit precision derivation section derives a difference between the bit depth of the sequence level and the bit depth of the local level of the predicted image, as the extension bit precision.

(49)

The image processing apparatus according to (48), further including:

a sequence bit depth setting section that sets the bit depth of the sequence level on the basis of external parameters, in which the extension bit precision derivation section derives the difference by using the bit depth of the sequence level set by the sequence bit depth setting section.

(50)

The image processing apparatus according to any one of (47) to (49), further including:

a prediction section that predicts the image and that generates the predicted image, in which the extension bit precision derivation section derives the extension bit precision on the basis of the bit depth of the local level of the predicted image generated by the prediction section.

(51)

The image processing apparatus according to (50), further including:

a pixel minimum value/maximum value search section that searches a minimum value and a maximum value of the local level of pixel values of the predicted image generated by the prediction section, in which the extension bit precision derivation section derives the bit depth of the local level of the predicted image by using a difference between the maximum value and the minimum value detected by search performed by the pixel minimum value/maximum value search section, and derives the extension bit precision on the basis of the derived bit depth of the local level of the predicted image.

(52)

The image processing apparatus according to any one of (47) to (51), in which the extension bit precision derivation section derives the extension bit precision per area at a size determined on the basis of a difference value between a CTB size and a segmentation depth with respect to the CTB size.

(53)

The image processing apparatus according to (52), in which the encoding section encodes the difference value of the segmentation depth with respect to the CTB size and generates the bit stream containing the difference value of the segmentation depth with respect to the CTB size.

(54)

The image processing apparatus according to any one of (41) to (53), in which the encoding section encodes control information indicating whether control over the number of significant figures based on the bit depth of the local level of the predicted image is possible and generates the bit stream containing the control information.

(55)

An image processing method including:

orthogonally transforming a prediction residual of an image and controlling the number of significant figures of coefficient data obtained by performance of orthogonal transform on the prediction residual, on the basis of a bit depth indicating a range of pixel values of a local level that is a data unit smaller than a sequence level of a predicted image corresponding to the image or of a decoded image referred to at a time of generation of the predicted image;

quantizing the coefficient data and controlling the number of significant figures of a quantized coefficient obtained by quantization of the coefficient data, on the basis of the bit depth of the local level of the predicted image or the decoded image; and encoding the quantized coefficient and generating a bit stream.

(61)

An image processing apparatus including:

a decoding section that decodes a bit stream;

an inverse quantization section that inversely quantizes a quantized coefficient obtained by decoding of the bit stream by the decoding section and that controls the number of significant figures of coefficient data obtained by inverse quantization of the quantized coefficient, on the basis of a bit depth indicating a range of pixel values of a local level that is a data unit smaller than a sequence level of a predicted image or of a decoded image referred to at a time of generation of the predicted image; and an inverse orthogonal transform section that performs inverse orthogonal transform on the coefficient data obtained by inverse quantization of the quantized coefficient by the inverse quantization section and that controls the number of significant figures of residual data obtained by performance of the inverse orthogonal transform on the coefficient data, on the basis of the bit depth of the local level of the predicted image or the decoded image.

(62)

The image processing apparatus according to (61), in which the inverse quantization section controls the number of significant figures of the coefficient data by bit-shifting the coefficient data by a shift amount according to the bit depth of the local level of the predicted image, and the inverse orthogonal transform section controls the number of significant figures of the residual data by bit-shifting the residual data by the shift amount according to the bit depth of the local level of the predicted image.

(63)

The image processing apparatus according to (61) or (62), in which the inverse quantization section corrects a controlled variable of the number of significant figures of the coefficient data set per sequence of the image, on the basis of the bit depth of the local level of the predicted image, and controls the number of significant figures of the coefficient data by the corrected controlled variable.

(64)

The image processing apparatus according to any one of (61) to (63), in which the inverse orthogonal transform section performs inverse secondary orthogonal transform on the coefficient data, and performs inverse primary orthogonal transform on an obtained result of the inverse secondary orthogonal transform; and controls the number of significant figures of the residual data on the basis of the bit depth of the local level of the predicted image, in the inverse primary orthogonal transform.

(65)

The image processing apparatus according to (64), in which in the inverse primary orthogonal transform, the inverse orthogonal transform section performs one-dimensional inverse transform on a result of the inverse secondary orthogonal transform, in a vertical direction, controls the number of significant figures of obtained intermediate data on the basis of the bit depth of the sequence level, performs one-dimensional inverse transform on the intermediate data the number of significant figures of which is controlled, in a horizontal direction, and controls the number of significant figures of obtained residual data on the basis of the bit depth of the local level of the predicted image.

(66)

The image processing apparatus according to (65), in which the inverse orthogonal transform section corrects a controlled variable of the number of significant figures of the residual data set per sequence of the image, on the basis of the bit depth of the local level of the predicted image, and controls the number of significant figures of the residual data by the corrected controlled variable.

(67)

The image processing apparatus according to any one of (61) to (66), further including:

an extension bit precision derivation section that derives extension bit precision that includes a correction value of a controlled variable of the number of significant figures of the coefficient data set per sequence of the image and of a controlled variable of the number of significant figures of the residual data, on the basis of the bit depth of the local level of the predicted image, in which the inverse quantization section
corrects the controlled variable of the number of significant figures of the coefficient data by using the extension bit precision derived by the extension bit precision derivation section, and
controls the number of significant figures of the coefficient data by the corrected controlled variable, and
the inverse orthogonal transform section
corrects the controlled variable of the number of significant figures of the residual data by using the extension bit precision derived by the extension bit precision derivation section, and
controls the number of significant figures of the residual data by the corrected controlled variable.

(68)
The image processing apparatus according to (67), in which
the extension bit precision derivation section derives a difference between the bit depth of the sequence level and the bit depth of the local level of the predicted image, as the extension bit precision.

(69)
The image processing apparatus according to (68), further including:
a sequence bit depth setting section that sets the bit depth of the sequence level on the basis of external parameters, in which
the extension bit precision derivation section derives the difference by using the bit depth of the sequence level set by the sequence bit depth setting section.

(70)
The image processing apparatus according to any one of (67) to (69), further including:
a prediction section that predicts the image and that generates the predicted image, in which
the extension bit precision derivation section derives the extension bit precision on the basis of the bit depth of the local level of the predicted image generated by the prediction section.

(71)
The image processing apparatus according to (70), further including:
a pixel minimum value/maximum value search section that searches a minimum value and a maximum value of the local level of pixel values of the predicted image generated by the prediction section, in which
the extension bit precision derivation section
derives the bit depth of the local level of the predicted image by using a difference between the maximum value and the minimum value detected by search performed by the pixel minimum value/maximum value search section, and
derives the extension bit precision on the basis of the derived bit depth of the local level of the predicted image.

(72)
The image processing apparatus according to any one of (67) to (71), in which
the extension bit precision derivation section derives the extension bit precision per area at a size determined on the basis of a difference value between a CTB size and a segmentation depth with respect to the CTB size.

(73)
The image processing apparatus according to (72), in which
the decoding section decodes the bit stream and extracts the difference value of the segmentation depth with respect to the CTB size, and
the extension bit precision derivation section derives the extension bit precision per area at the size determined on the basis of the difference value between the CTB size and the segmentation depth with respect to the CTB size.

(74)
The image processing apparatus according to any one of (61) to (73), in which
the decoding section decodes the bit stream, extracts control information indicating whether expansion of the number of significant figures based on the bit depth of the local level of the predicted image is applicable, and controls application of the expansion of the number of significant figures based on the bit depth of the local level of the predicted image, according to the extracted control information.

(75)
An image processing method including:
decoding a bit stream;
inversely quantizing a quantized coefficient obtained by decoding of the bit stream, and controlling the number of significant figures of coefficient data obtained by inverse quantization of the quantized coefficient, on the basis of a bit depth indicating a range of pixel values of a local level that is a data unit smaller than a sequence level of a predicted image or of a decoded image referred to at a time of generation of the predicted image; and
performing inverse orthogonal transform on the coefficient data obtained by inverse quantization of the quantized coefficient, and controlling the number of significant figures of residual data obtained by performance of the inverse orthogonal transform on the coefficient data, on the basis of the bit depth of the local level of the predicted image or the decoded image.

REFERENCE SIGNS LIST

100: Image encoding apparatus, 101: Control section, 112: Computing section, 113: Orthogonal transform section, 114: Quantization section, 115: Encoding section, 117: Inverse quantization section, 118: Inverse orthogonal transform section, 122: Prediction section, 131: Sequence bit depth setting section, 132: Slice bit depth setting section, 133: Pixel minimum value/maximum value search section, 134: dBD derivation section, 135: deltaX derivation section, 141: Primary transform section, 151: Primary horizontal transform section, 152: Primary vertical transform section, 161: Parameter derivation section, 162: Matrix computing section, 163: Normalization section, 164: Clip section, 171: Parameter derivation section, 172: Matrix computing section, 173: Normalization section, 174: Clip section, 181: Parameter derivation section, 182: Quantization scaling section, 183: Quantization normalization section, 184: Clip section, 200: Image decoding apparatus, 212: Decoding section, 213: Inverse quantization section, 214: Inverse orthogonal transform section, 215: Computing section, 219: Prediction section, 231: Sequence bit depth derivation section, 232: Slice bit depth derivation section, 233: deltaX decoding section, 234: dBD derivation section, 241: Parameter derivation section, 242: Inverse quantization scaling section, 243: Inverse quantization normalization section, 244: Clip section, 252: Inverse primary transform section, 261: Inverse primary vertical transform section, 262: Inverse primary horizontal transform section, 271: Parameter derivation section, 272: Matrix computing section, 273: Normalization section, 274: Clip section, 281: Parameter derivation section, 282: Matrix computing section, 283: Normalization section, 284: Clip section, 431: Pixel minimum value/maximum value search section

The invention claimed is:

1. An image processing apparatus comprising:
an orthogonal transform section configured to orthogonally transform a prediction residual of an image and control a number of significant figures of coefficient data obtained by performance of orthogonal transform on the prediction residual, on a basis of a bit depth indicating a range of pixel values of a local level that is a data unit smaller than a sequence level of the image;
a quantization section configured to quantize the coefficient data obtained by the orthogonal transform section and control a number of significant figures of a quantized coefficient obtained by quantization of the coefficient data, on a basis of the bit depth of the local level;
an extension bit precision derivation section configured to derive extension bit precision that includes a correction value of a controlled variable of the number of significant figures of the coefficient data set per sequence of the image, on the basis of the bit depth of the local level; and
an encoding section configured to encode the quantized coefficient obtained by the quantization section and generate a bit stream, wherein
the orthogonal transform section, the quantization section, the extension bit precision derivation section, and the encoding section are each implemented via at least one processor.

2. The image processing apparatus according to claim 1, wherein
the orthogonal transform section is further configured to control the number of significant figures of the coefficient data by bit-shifting the coefficient data by a shift amount according to the bit depth of the local level, and
the quantization section is further configured to control the number of significant figures of the quantized coefficient by bit-shifting the quantized coefficient by the shift amount according to the bit depth of the local level.

3. The image processing apparatus according to claim 1, wherein
the extension bit precision further includes a correction value of a controlled variable of the number of significant figures of the quantized coefficient, on the basis of the bit depth of the local level,
the orthogonal transform section is further configured to correct the controlled variable of the number of significant figures of the coefficient data by using the extension bit precision derived by the extension bit precision derivation section, and
control the number of significant figures of the coefficient data by the corrected controlled variable, and
the quantization section is further configured to
correct the controlled variable of the number of significant figures of the quantized coefficient by using the extension bit precision derived by the extension bit precision derivation section, and
control the number of significant figures of the quantized coefficient by the corrected controlled variable.

4. The image processing apparatus according to claim 3, wherein
the extension bit precision derivation section is further configured to derive a difference between the bit depth of the sequence level and the bit depth of the local level, as the extension bit precision.

5. The image processing apparatus according to claim 3, wherein
the encoding section is further configured to encode information associated with the extension bit precision derived by the extension bit precision derivation section and generates the bit stream containing the information associated with the extension bit precision.

6. The image processing apparatus according to claim 5, further comprising:
a difference parameter derivation section configured to derive a difference parameter by using the extension bit precision derived by the extension bit precision derivation section, wherein
the encoding section is further configured to encode the difference parameter derived by the difference parameter derivation section, as the information associated with the extension bit precision, and generate the bit stream containing the difference parameter, and
the difference parameter derivation section is implemented via at least one processor.

7. The image processing apparatus according to claim 6, wherein
the difference parameter includes a difference between the bit depth of a slice level of the image and the bit depth of the local level.

8. An image processing method comprising:
orthogonally transforming a prediction residual of an image and controlling a number of significant figures of coefficient data obtained by performance of orthogonal transform on the prediction residual, on a basis of a bit depth indicating a range of pixel values of a local level that is a data unit smaller than a sequence level of the image;
quantizing the coefficient data and controlling a number of significant figures of a quantized coefficient obtained by quantization of the coefficient data, on a basis of the bit depth of the local level;
deriving extension bit precision that includes a correction value of a controlled variable of the number of significant figures of the coefficient data set per sequence of the image, on the basis of the bit depth of the local level; and
encoding the quantized coefficient and generating a bit stream.

9. An image processing apparatus comprising:
an orthogonal transform section configured to orthogonally transform a prediction residual of an image and that controls a number of significant figures of coefficient data obtained by performance of orthogonal transform on the prediction residual, on a basis of a bit depth indicating a range of pixel values of a local level that is a data unit smaller than a sequence level of a predicted image corresponding to the image or of a decoded image referred to at a time of generation of the predicted image;
a quantization section configured to quantize the coefficient data obtained by the orthogonal transform section and control a number of significant figures of a quantized coefficient obtained by quantization of the coefficient data, on a basis of the bit depth of the local level of the predicted image or the decoded image;

an extension bit precision derivation section configured to derive extension bit precision that includes a correction value of a controlled variable of the number of significant figures of the coefficient data set per sequence of the image, on the basis of the bit depth of the local level; and an encoding section configured to encode the quantized coefficient obtained by the quantization section and generate a bit stream, wherein the orthogonal transform section, the quantization section, the extension bit precision derivation section, and the encoding section are each implemented via at least one processor.

10. An image processing method comprising:

orthogonally transforming a prediction residual of an image and controlling a number of significant figures of coefficient data obtained by performance of orthogonal transform on the prediction residual, on a basis of a bit depth indicating a range of pixel values of a local level that is a data unit smaller than a sequence level of a predicted image corresponding to the image or of a decoded image referred to at a time of generation of the predicted image;

quantizing the coefficient data and controlling a number of significant figures of a quantized coefficient obtained by quantization of the coefficient data, on a basis of the bit depth of the local level of the predicted image or the decoded image;

deriving extension bit precision that includes a correction value of a controlled variable of the number of significant figures of the coefficient data set per sequence of the image, on the basis of the bit depth of the local level; and encoding the quantized coefficient and generating a bit stream.

11. An image processing apparatus comprising:

a decoding section configured to decode a bit stream;

an inverse quantization section configured to inversely quantize a quantized coefficient obtained by decoding of the bit stream by the decoding section and control a number of significant figures of coefficient data obtained by inverse quantization of the quantized coefficient, on a basis of a bit depth indicating a range of pixel values of a local level that is a data unit smaller than a sequence level of an image; and an inverse orthogonal transform section configured to perform inverse orthogonal transform on the coefficient data obtained by inverse quantization of the quantized coefficient by the inverse quantization section and control a number of significant figures of residual data obtained by performance of the inverse orthogonal transform on the coefficient data, on a basis of the bit depth of the local level, wherein the bit stream contains information associated with extension bit precision that includes a correction value of a controlled variable of the number of significant figures of the coefficient data set per sequence, and the decoding section, the inverse quantization section, and the inverse orthogonal transform section are each implemented via at least one processor.

12. The image processing apparatus according to claim 11, wherein the inverse quantization section is further configured to control the number of significant figures of the coefficient data by bit-shifting the coefficient data by a shift amount according to the bit depth of the local level, and the inverse orthogonal transform section is further configured to control the number of significant figures of the residual data by bit-shifting the residual data by the shift amount according to the bit depth of the local level.

13. The image processing apparatus according to claim 11, wherein the extension bit precision further includes a correction value of a controlled variable of the number of significant figures of the residual data, the decoding section is further configured to decode the bit stream and extracts the information associated with the extension bit precision and contained in the bit stream, and derive the extension bit precision on a basis of the extracted information associated with the extension bit precision, the inverse quantization section is further configured to correct the controlled variable of the number of significant figures of the coefficient data by using the extension bit precision derived by the decoding section, and control the number of significant figures of the coefficient data by the corrected controlled variable, and the inverse orthogonal transform section is further configured to correct the controlled variable of the number of significant figures of the residual data by using the extension bit precision derived by the decoding section, and control the number of significant figures of the residual data by the corrected controlled variable.

14. The image processing apparatus according to claim 13, wherein the extension bit precision includes a difference between the bit depth of the sequence level and the bit depth of the local level.

15. The image processing apparatus according to claim 14, wherein the information associated with the extension bit precision contains a difference parameter that includes a difference between the bit depth of a slice level of the image and the bit depth of the local level, and the decoding section is further configured to derive the extension bit precision by subtracting the bit depth of the slice level from the bit depth of the sequence level and adding the difference parameter to a subtraction result.

16. The image processing apparatus according to claim 14, wherein the information associated with the extension bit precision contains a difference parameter that includes a difference between the bit depth of the sequence level of the image and the bit depth of the local level, and the decoding section is further configured to derive the extension bit precision by subtracting the difference parameter from the bit depth of the sequence level.

17. The image processing apparatus according to claim 14, wherein the information associated with the extension bit precision contains a difference parameter that includes a difference between the extension bit precision and a predicted value of the extension bit precision, and the decoding section is further configured to derive the extension bit precision by adding the predicted value to the difference parameter.

18. An image processing method comprising:

decoding a bit stream;

inversely quantizing a quantized coefficient obtained by decoding of the bit stream, and controlling a number of significant figures of coefficient data obtained by inverse quantization of the quantized coefficient, on a basis of a bit depth indicating a range of pixel values of a local level that is a data unit smaller than a sequence level; and performing inverse orthogonal transform on the coefficient data obtained by inverse quantization of the quantized coefficient, and controlling a number of significant figures of residual data obtained by performance of the inverse orthogonal transform on the coefficient data, on a basis of the bit depth of the local level, wherein the bit stream contains information associated with extension bit precision that includes a correction value of a controlled variable of the number of significant figures of the coefficient data set per sequence.

19. An image processing apparatus comprising:

a decoding section configured to decode a bit stream;

an inverse quantization section configured to inversely quantize a quantized coefficient obtained by decoding of the bit stream by the decoding section and control a number of significant figures of coefficient data obtained by inverse quantization of the quantized coefficient, on a basis of a bit depth indicating a range of pixel values of a local level that is a data unit smaller than a sequence level of a predicted image or of a decoded image referred to at a time of generation of the predicted image; and an inverse orthogonal transform section configured to perform inverse orthogonal transform on the coefficient data obtained by inverse quantization of the quantized coefficient by the inverse quantization section and control a number of significant figures of residual data obtained by performance of the inverse orthogonal transform on the coefficient data, on a basis of the bit depth of the local level of the predicted image or the decoded image, wherein the bit stream contains information associated with extension bit precision that includes a correction value of a controlled variable of the number of significant figures of the coefficient data set per sequence, and the decoding section, the inverse quantization section, and the inverse orthogonal transform section are each implemented via at least one processor.

20. An image processing method comprising:

decoding a bit stream;

inversely quantizing a quantized coefficient obtained by decoding of the bit stream, and controlling a number of significant figures of coefficient data obtained by inverse quantization of the quantized coefficient, on a basis of a bit depth indicating a range of pixel values of a local level that is a data unit smaller than a sequence level of a predicted image or of a decoded image referred to at a time of generation of the predicted image; and performing inverse orthogonal transform on the coefficient data obtained by inverse quantization of the quantized coefficient, and controlling a number of significant figures of residual data obtained by performance of the inverse orthogonal transform on the coefficient data, on a basis of the bit depth of the local level of the predicted image or the decoded image, wherein the bit stream contains information associated with extension bit precision that includes a correction value of a controlled variable of the number of significant figures of the coefficient data set per sequence.

* * * * *